United States Patent
Phallen et al.

(10) Patent No.: US 9,394,155 B2
(45) Date of Patent: *Jul. 19, 2016

(54) BEVERAGE DISPENSING

(71) Applicant: DD Operations Ltd. (UK company # 8149351), London (GB)

(72) Inventors: Iver J. Phallen, Youngstown, NY (US); Douglas Vogt, Grand Island, NY (US); Thomas Gagliano, London (GB)

(73) Assignee: DD OPERATIONS LTD. (UK COMPANY #8149351, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/487,842

(22) Filed: Sep. 16, 2014

(65) Prior Publication Data

US 2015/0069084 A1 Mar. 12, 2015

Related U.S. Application Data

(63) Continuation of application No. 11/611,835, filed on Dec. 15, 2006, now Pat. No. 8,833,405.

(60) Provisional application No. 60/751,167, filed on Dec. 15, 2005, provisional application No. 60/751,120, filed on Dec. 15, 2005, provisional application No. 60/795,825, filed on Apr. 28, 2006, provisional application No. 60/795,824, filed on Apr. 28, 2006, provisional application No. 60/795,823, filed on Apr. 28, 2006.

(51) Int. Cl.

| B67D 1/12 | (2006.01) |
|---|---|
| B67D 1/14 | (2006.01) |
| G05D 7/06 | (2006.01) |
| F17C 13/04 | (2006.01) |
| B67D 1/08 | (2006.01) |

(52) U.S. Cl.
CPC ............ *B67D 1/1234* (2013.01); *B67D 1/0857* (2013.01); *B67D 1/0888* (2013.01); *B67D 1/124* (2013.01); *B67D 1/127* (2013.01); *B67D 1/1243* (2013.01); *B67D 1/1272* (2013.01); *B67D 1/1411* (2013.01); *F17C 13/04* (2013.01); *G05D 7/0652* (2013.01); *Y10T 137/87917* (2015.04)

(58) Field of Classification Search
CPC .... B67D 1/1243; B67D 1/127; B67D 1/1272; B67D 1/1277; B67D 1/1279
USPC ............ 141/18, 94, 95, 374; 222/73, 95, 102, 222/212; 251/7; 137/613, 614.02
See application file for complete search history.

(56) References Cited

U.S. PATENT DOCUMENTS

| 4,890,774 A | * | 1/1990 | Poore | ............................ 222/640 |
| 4,916,910 A | * | 4/1990 | Schroeder | ........................ 62/59 |

(Continued)

*Primary Examiner* — Timothy L Maust
(74) *Attorney, Agent, or Firm* — Greenberg Traurig LLP

(57) ABSTRACT

A beverage dispenser for dispensing a carbonated beverage includes a housing defining an interior volume and having a first surface proximal to the beverage source and a second surface distal to the beverage source. The beverage dispenser includes a conduit in fluid communication with the beverage source entering the first surface of the housing and terminating proximate the second surface of the housing. The dispenser includes a flow rate controller including a processor disposed within the interior volume of said housing and a subsurface dispensing nozzle in fluid communication with the terminal end of the conduit. The dispenser also includes a user interface including user-selectable indicia for providing data to the processor. The flow through the conduit to the subsurface dispensing nozzle is compensated to maintain substantially hydraulic beverage flow within the conduit, and is based on data provided to the processor by a user operation of the user interface.

52 Claims, 119 Drawing Sheets

(56) References Cited

U.S. PATENT DOCUMENTS 5,465,583 A * 11/1995 Goode ............................ 62/50.2
6,571,151 B1 * 5/2003 Leatherman ................... 700/282
6,763,860 B2 * 7/2004 Jungmann et al. ............. 141/104
8,833,405 B2 * 9/2014 Phallen et al. ................... 141/67

* cited by examiner

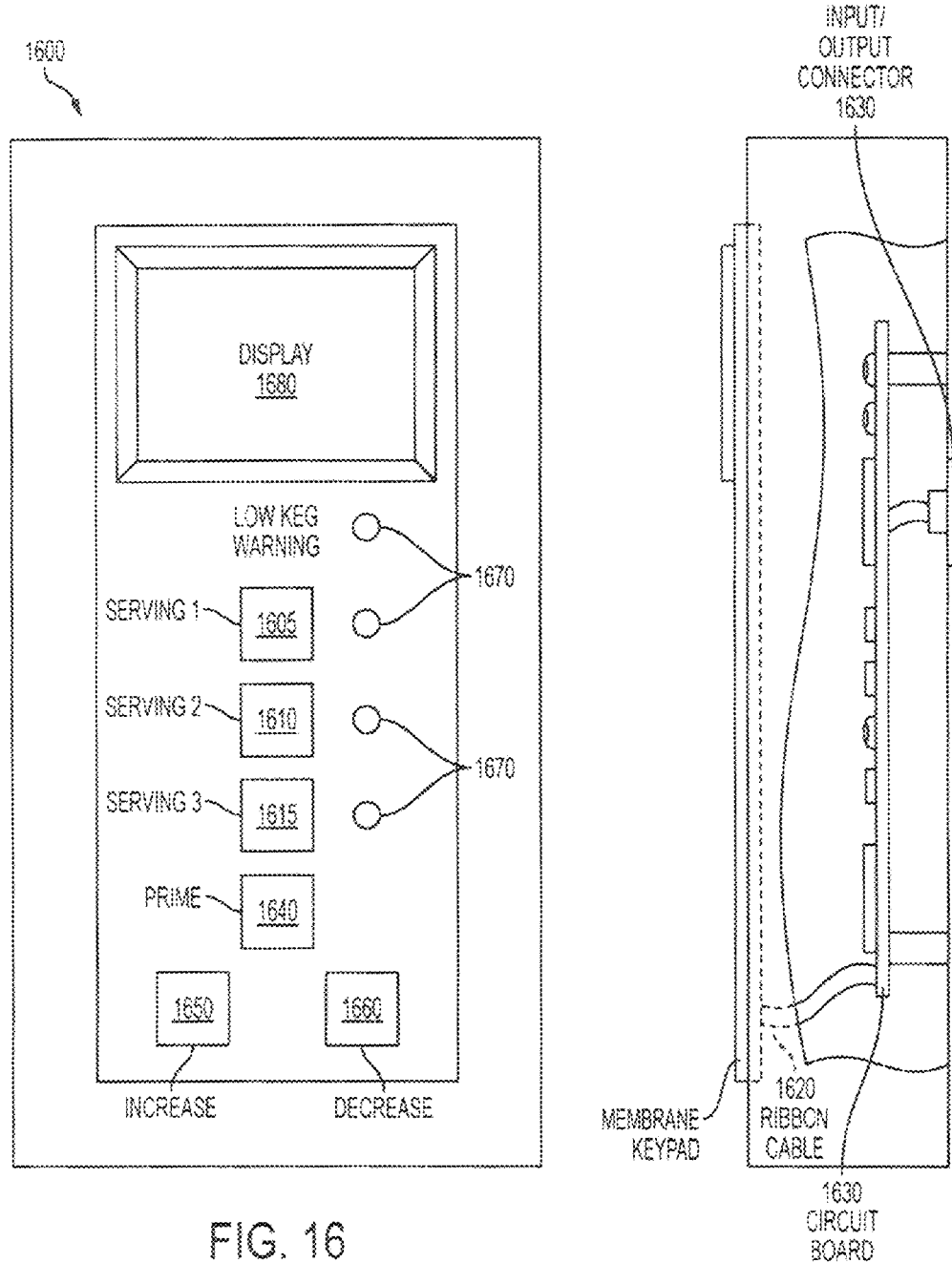

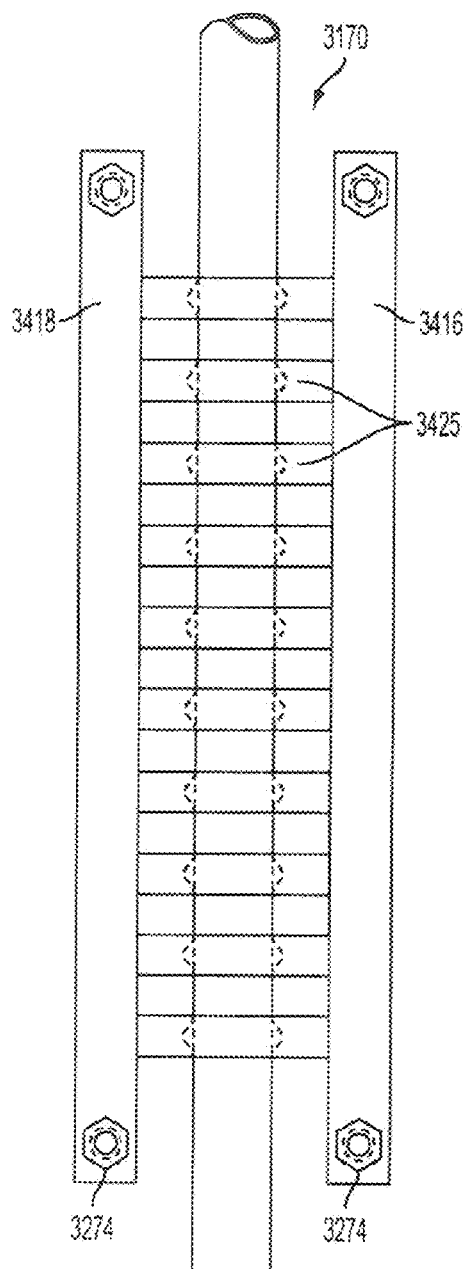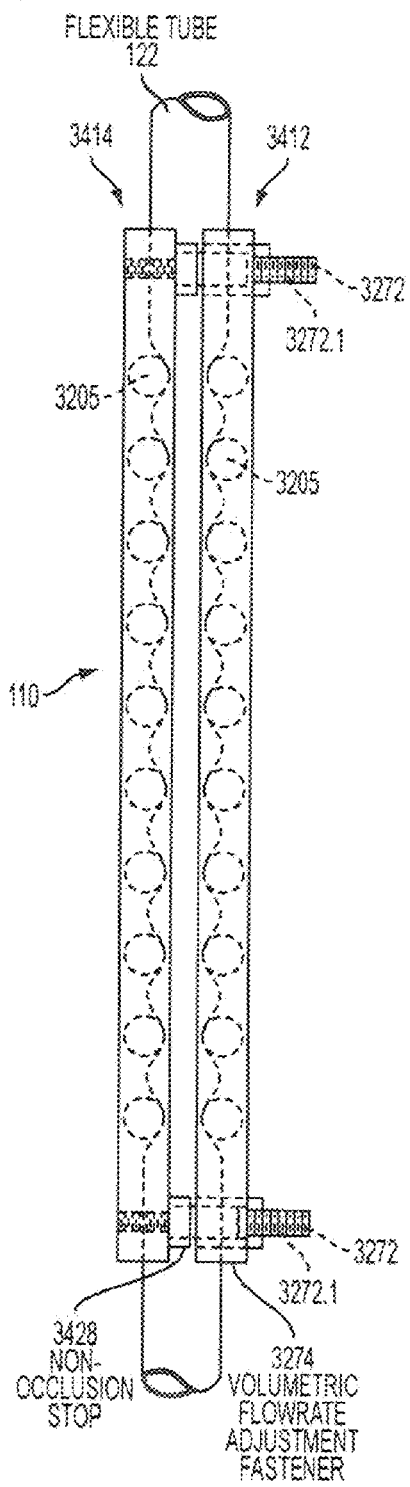
FIG. 31
FIG. 32

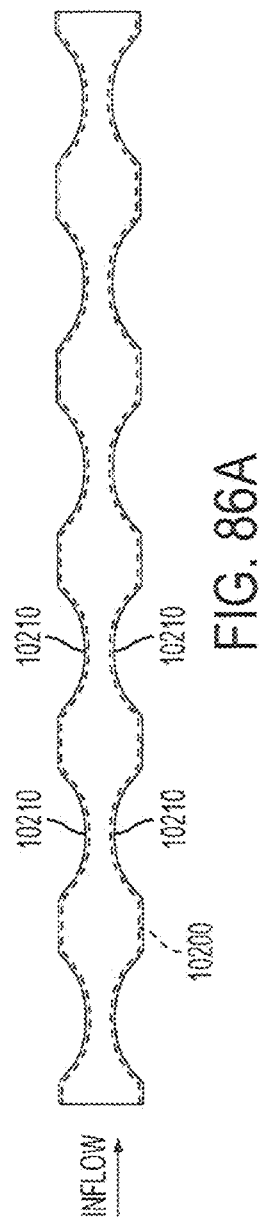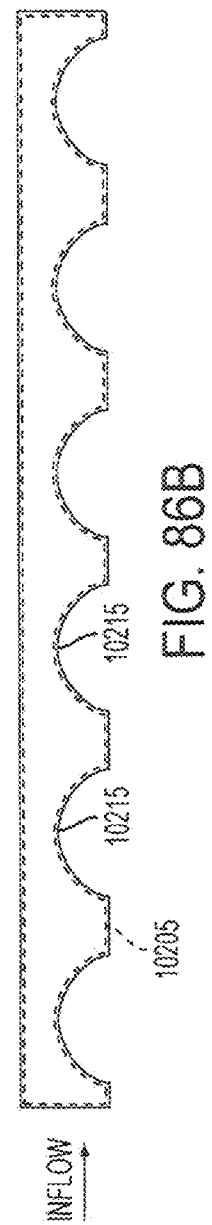

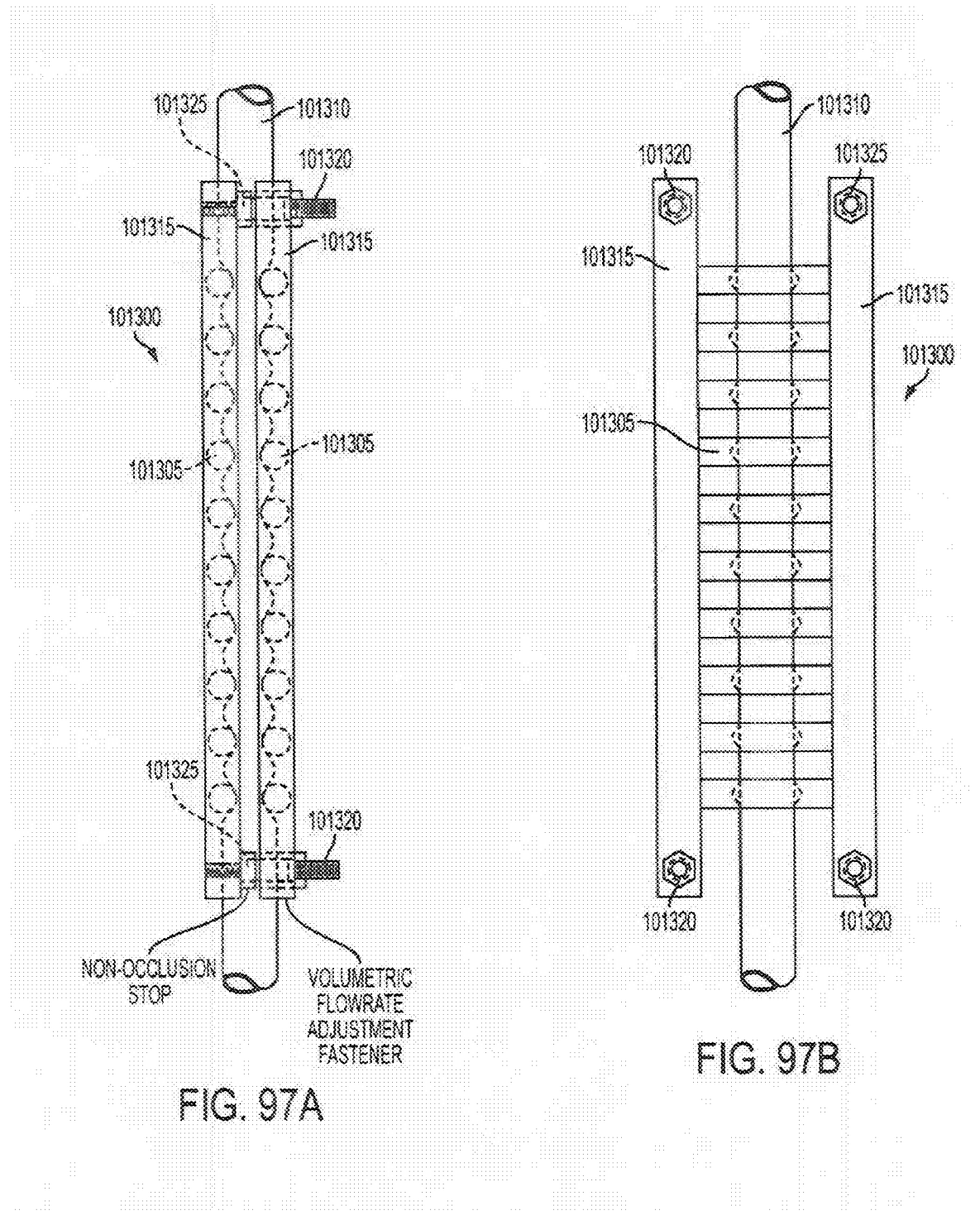

BEVERAGE DISPENSING

CROSS-REFERENCE TO RELATED APPLICATIONS

This application claims priority under 35 U.S.C. §120 to U.S. patent application Ser. No. 11/611,835 filed Dec. 15, 2006, which claims the priority under 35 U.S.C. §119 to U.S. Provisional Application No. 60/751,167, filed Dec. 15, 2005, U.S. Provisional Application No. 60/751,120, filed Dec. 15, 2005, U.S. Provisional Application No. 60/795,825, filed Apr. 28, 2006, U.S. Provisional Application No. 60/795,824, filed Apr. 28, 2006, and U.S. Provisional Application No. 60/795,823, filed Apr. 28, 2006, each of which are incorporated herein by reference in their entirety

TECHNICAL FIELD

This description relates to beverage dispensing.

BACKGROUND

The dispensing of beer for public consumption is a ubiquitous activity. The dispensing of other carbonated and still beverages is equally widespread.

One issue associated with the dispensing of beer and other carbonated beverages is the control of foaming within the fluid flow pathway as a result of flow and associated pressure changes within a carbonated beverage or beer dispensing apparatus. The flow rate and pressure directly correlate, and drops in pressure beyond a defined magnitude or rate cause dissolved gases (typically carbon dioxide) in carbonated beverages to leave solution and enter gas phase. This physical phenomenon is variously referred to in the beverage domain as foaming, blooming, breakout, out gassing, or foam out.

Another issue is the control of foaming as a result of the physical interaction of the beer or carbonated beverage with the vessel into which it is dispensed. For example, the degree of foaming that occurs during the pouring of a draft beer increases with increasing flow rates into the cup, glass, or pitcher, or any other vessel. The excessive foaming that may occur as a draft beer is flowed into a drinking vessel is increased as a function of the flow rate, and foam formation is further increased by the entrainment of air into the beer as a function of such flow induced agitation. This foam event associated with high flow rates into the serving vessel is variously referred to as foaming, frothing, or fobbing.

SUMMARY

Some embodiments of the invention include a beverage dispenser for dispensing a carbonated beverage from a beverage source into a receptacle comprising a housing defining an interior volume, and having a first surface proximal to the beverage source, and a second surface distal to the beverage source. The beverage dispenser comprises a conduit in fluid communication with the beverage source entering the first surface of the housing and terminating proximate the second surface of the housing. The beverage dispenser also comprises a flow meter in fluid communication with the conduit, and a flow rate controller disposed within the interior volume of said housing, the flow rate controller including a processor. The beverage dispenser also comprises a user interface including user-selectable indicia for providing data to the processor. The beverage dispenser also includes a subsurface dispensing nozzle in fluid communication with the terminal end of the conduit where the flow through the conduit to the subsurface dispensing nozzle is compensated by the flow rate controller to maintain substantially hydraulic beverage flow within the conduit. Further, at least one of the beverage flow and aggregate volume of beverage dispensed is controlled by the flow rate controller based on data provided to the processor by a user operation of the user interface.

In some embodiments of the invention, the flow rate controller is configured to cause a local fluid flow restriction within the conduit. In some embodiments, the flow rate controller further comprises a motive element configured and arranged to apply force to the beverage flow. In some further embodiments, the motive element comprises a thrust block and an adjustment member. The thrust block and adjustment member configured to provide for adjustment of minimum flow and maximum flow through the flow rate controller. In some embodiments, the adjustment member comprises a threaded stud coupled to an adjustment nut. In some embodiments, the threaded stud and adjustment nut are configured and arranged to provide fine adjustment of the minimum and maximum flow through the flow rate controller.

Some embodiments of the invention include user-selectable indicia that includes at least one condition selected from the group of conditions consisting of: the volume of the receptacle, duration of dispensation, and thickness of a foam layer of the beverage after dispensation. In some embodiments, the flow rate controller is configured to be set for a maximum desired flow rate and a minimum desired flow rate. In some other embodiments, the dispenser is configured to be operable in an active mode and a passive mode.

Some embodiments include a motive element that is used to apply force to define a flow rate of fluid through the conduit, and when the dispenser is operable in the active mode, the motive element is controlled via pulse width modulation. In some further embodiments, at least a portion of the subsurface dispensing nozzle actuates between a first position and a second position.

In some embodiments, the entire subsurface dispensing nozzle actuates between a first position and a second position. In some embodiments, the conduit and flow rate controller are selected to minimize gas breakout during dispensation of the beverage. In some embodiments, the subsurface dispensing nozzle further comprises a dispensing tip movable between a first, open position and a second, closed position.

In some embodiments, the dispensing tip selectively provides a subsurface foam-generating dispensation in response to input from a user of the dispenser. Some embodiments of the invention further comprise at least one sensor selected from the group consisting of a pressure sensor and a temperature sensor.

Some embodiments of the invention comprise a cooling circuit having a coolant disposed therein, and the cooling circuit is configured to pass in proximity to the flow rate controller to provide a cooling effect to the beverage in the conduit. In some embodiments, the flow rate controller is configured to create a turbulent fluid recirculation zone in the fluid flow pathway. In some embodiments, the fluid recirculation zones are denoted by fluid flow separation from the conduit wall at points of flow restriction such that substantial head loss is introduced by way of turbulent energy dissipation within any ensuing recirculation zones. In some embodiments, the flow rate controller is substantially completely housed within an internal fluid flow pathway of the subsurface nozzle.

Some embodiments of the invention further comprise a horizontal mounting surface, where the beverage source is disposed below the horizontal surface and the dispensing nozzle is disposed above the horizontal surface. In some embodiments, the flow rate controller is disposed above the horizontal surface. In some further embodiments, the housing is disposed on the horizontal surface and wherein the dispensing nozzle is disposed within the housing. In other embodiments, the housing is mounted on the horizontal surface and wherein the dispensing nozzle and the flow rate controller are disposed in the housing.

In some embodiments of the invention, the dispenser is capable of filling about one pint or 0.5 liter receptacle to a desired measured line with a wide variety of beverages in a dose time measured from start of beverage flow to end of beverage flow of about 3.5 seconds or less, with a manual or electronically definable and controllable amount of foam generation.

In some embodiments of the invention, the exterior surfaces of the dispensing nozzle comprise an antibacterial coating or film. Further, the antibacterial coating or film is configured to reduce the rate of bacterial growth on the nozzle.

In some embodiments of the invention, substantially all portions of the fluid flow pathway internal to the dispenser are configured to allow to be self-draining of fluid to enhance ease and efficacy of cleaning, rinsing, and sanitation.

Some embodiments of the invention include a beverage dispensing system for use in an environment having an ambient pressure and temperature comprising a source of pressurized gas, and a beverage source including a beverage pressurized to a level greater than the ambient pressure by the source of pressurized gas. The beverage dispensing system also comprises a dispenser including a conduit in fluid communication with the beverage source and a subsurface dispensing nozzle in fluid communication with the conduit. Further, the beverage dispensing system comprises a flow meter in fluid communication with the conduit, and a flow rate controller including a processor disposed along said at least one conduit proximal to the beverage source in relation to the subsurface dispensing nozzle. The beverage dispensing system also includes a user interface including user-selectable indicia for providing data to the processor. Further, flow of the beverage through the conduit to the subsurface dispensing nozzle is compensated by the flow rate controller to maintain substantially hydraulic flow within the conduit. Further, at least one of the beverage flow and aggregate volume of beverage dispensed is controlled by the flow rate controller based on data provided to the processor by a user operation of the user interface.

Some embodiments of the invention include a flow rate controller that is disposed within the dispenser and in close proximity to a cooling circuit. Further, the cooling circuit is configured and arranged to provide a cooling effect to a beverage in the conduit. In some embodiments, the subsurface dispensing nozzle includes a tip movable between a first position and a second position, and the flow of a beverage through the conduit to the subsurface dispensing nozzle depends at least in part on a flow rate signal generated by the flow meter.

In some embodiments, the subsurface dispensing nozzle tip is actuated using the same gas source as is used to pressurize the beverage source. In some embodiments, the subsurface dispensing nozzle tip is actuated using a gas source separate from that used to pressurize the beverage source. In some embodiments of the invention, the subsurface dispensing nozzle tip is actuated by action of an electric motor. In some embodiments, the subsurface dispensing nozzle tip is actuated by action of an electric solenoid.

Some embodiments of the invention comprise a subsurface dispensing nozzle tip that selectively provides a subsurface foam-generating dispensation in response to input from a user of the dispenser. In some further embodiments, the subsurface dispensing nozzle tip provides at least one subsurface pulse of a fluid through the beverage in the receptacle to generate foam in the beverage. In some other embodiments, the exterior surfaces of the dispensing nozzle are coated with an antibacterial coating or film, the antibacterial coating or film configured to reduce the rate of bacterial growth on the nozzle.

Some embodiments of the invention include an apparatus for compensation of flow in a fluid dispensing system comprising a subsurface fluid dispensing nozzle for initiating and terminating fluid flow. The apparatus comprises a fluid flow pathway, and a volumetric fluid flow rate controller including a processor. The volumetric fluid flow controller is in communication with the subsurface fluid dispensing nozzle via the fluid flow pathway and defines a first fluid flow rate through the subsurface fluid dispensing nozzle. The apparatus comprises a user interface including user-selectable indicia for providing data to the processor, and a flow meter in fluid communication with a conduit. Further, at least one of the first flow rate and an aggregate volume of dispensed fluid is controlled by the volumetric fluid flow controller based on data provided to the processor by a user operation of the user interface.

In some embodiments of the invention, the volumetric fluid flow controller defines the first fluid flow rate during a first portion of a fluid dispense cycle and defines a second fluid flow rate through the subsurface fluid dispensing nozzle during a second portion of the fluid dispense cycle. In some embodiments, the volumetric fluid flow controller changes the second fluid flow rate to a third fluid flow rate through the subsurface fluid dispensing nozzle prior to the completion of the fluid dispense cycle.

In some embodiments, the first fluid flow rate is less than the second fluid flow rate. In some other embodiments, the third fluid flow rate is less than the second fluid flow rate. In some embodiments, the third fluid flow rate is higher than the second fluid flow rate. In some embodiments, the fluid flows through the subsurface fluid dispensing nozzle at the first fluid flow rate throughout the fluid dispense cycle.

In some embodiments, the volumetric fluid flow controller is disposed upstream of the subsurface fluid dispensing nozzle in the fluid flow pathway. In some embodiment, the volumetric fluid flow controller is in close proximity to a coolant circuit which is configured and arranged to provide a cooling effect to a fluid in the conduit.

In some embodiments, the apparatus comprises a volumetric fluid flow controller that is disposed in the subsurface fluid dispensing nozzle. In some further embodiments, the subsurface fluid dispensing nozzle includes an internal passageway having a diameter of less than about 1 inch. In some embodiments, the subsurface fluid dispensing nozzle includes a volumetric displacement that allows the entire beverage portion to be delivered into a receptacle with the dispensing nozzle remaining at the bottom of the receptacle without causing overflow of the receptacle. In some embodiments, the volumetric fluid flow controller defines the first, second, and third fluid flow rates based on temperature or pressure readings of the fluid flowing through the subsurface fluid dispensing nozzle.

Some embodiments of the invention include a beverage dispenser for dispensing a carbonated beverage from a beverage source into a receptacle comprising a housing defining an interior volume and having a first surface proximal to the beverage source and a second surface distal to the beverage source. The beverage dispenser comprises a conduit in fluid communication with the beverage source entering the first surface of the housing and terminating proximate the second surface of the housing. The beverage dispenser comprises a flow meter in fluid communication with the conduit, and a flow rate controller including a processor and disposed within the interior volume of the housing. The beverage dispenser comprises a subsurface dispensing nozzle in fluid communication with the terminal end of the conduit. Further, the flow through the conduit to the subsurface dispensing nozzle is compensated to maintain substantially hydraulic beverage flow within the conduit by adjusting the contact between a flow rate controller and the conduit. The beverage dispenser comprises a user interface including user-selectable indicia for providing data to the processor. The user interface is configured and arranged for receiving information indicating at least one condition selected from the group of conditions consisting of: the volume of a receptacle, duration of dispensation, and thickness of a foam layer of the beverage after dispensation. Further, at least one of the first volumetric flow rate and an aggregate volume of dispensed fluid is controlled by the volumetric flow rate controller based on data provided to the processor by a user operation of the user interface.

In some embodiments, the beverage dispenser comprises a flow rate controller that is separate and apart from the dispensing nozzle, and in close proximity to a coolant circuit. Further, the cooling circuit is configured and arranged to provide a cooling effect to a beverage in the conduit. In some embodiments, the flow rate controller is hydraulically upstream of the dispensing nozzle, and the flow of a beverage through the conduit to the dispensing nozzle depends at least in part on a flow rate signal generated by the flow meter.

The details of one or more aspects of the beverage dispensing system, methods, and components thereof are set forth in the accompanying drawings and the description below. Other features and advantages will be apparent from the description and drawings, and from the claims.

DESCRIPTION OF DRAWINGS

FIGS. 16 and 17 are enlarged front and side views of an electronic controller of the beverage dispenser of FIG. 15.

FIGS. 31 and 32 are front and side views of a volumetric liquid flow rate control device that is separate and apart from a shut-off valve and is not adjustable during a pour.

FIGS. 86A and 86B show rigid formed tube digital flow controls.

FIGS. 97A and 97B show a digital flow control assembly where a plurality of nodes formed in a flexible tube are controlled by volumetric flow-rate adjustment fasteners.

Like reference symbols in the various drawings indicate like elements.

DETAILED DESCRIPTION

Figure 1:
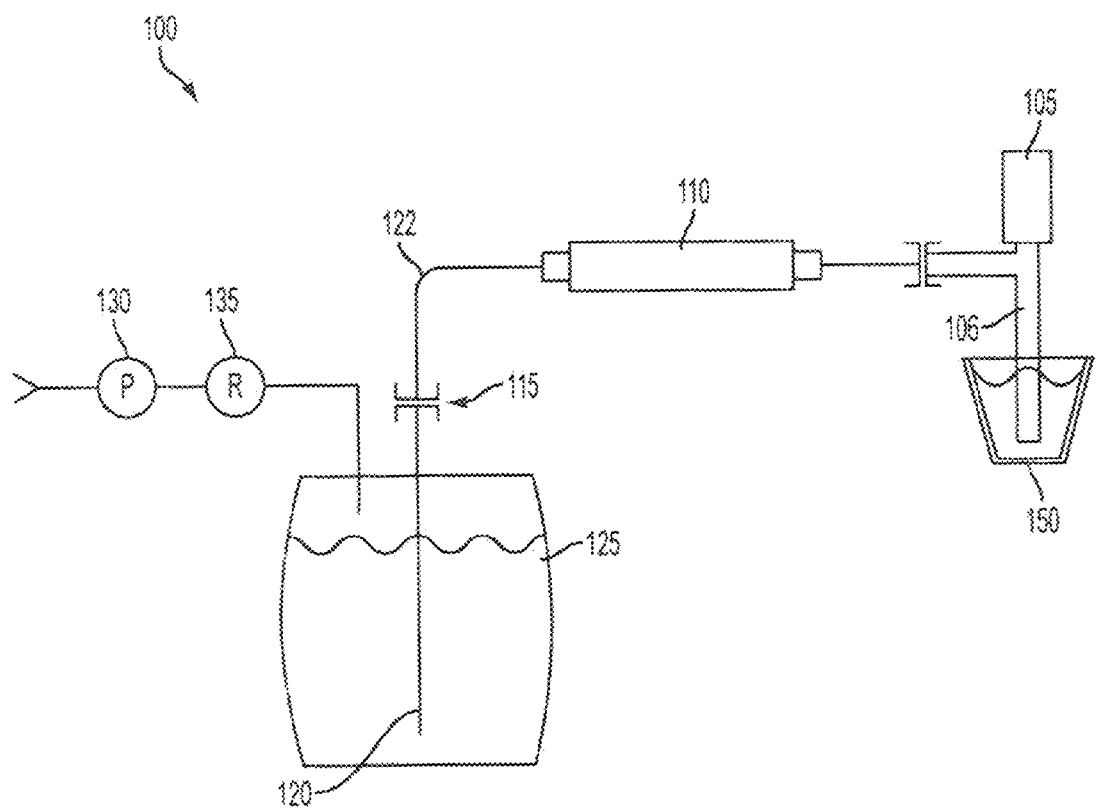
FIGS. 1 and 5-15 are diagrams of beverage dispensers.

Referring to FIG. 1, a high speed, high control beverage dispenser 100 for use with carbonated or foamy beverages, such as draft beer, includes a subsurface filling positive shut-off dispensing nozzle 105, which includes a dispensing tube 106, in combination with a volumetric liquid or fluid flow rate control device 110. The system may be configured to rapidly dispense, for example, draft beer with user defined pour attributes and a high degree of control and repeatability of operation from pour to pour over extended time periods. As shown in FIG. 1, the flow rate control device 110 is connected between the nozzle 105 and a keg connector 115. The keg connector 115 is connected to a dip tube 120 that extends into a keg 125. The keg 125 is also connected to a pressure source 130 through a pressure regulator 135 and is connected to the beverage dispenser by a conduit 122 that extends from the beer keg 125.

The beer keg is kept at rack pressure via a pressure source P 130 which delivers gas to the keg, the pressure being regulated by a pressure regulator R 135. When the beverage dispenser has been primed the beer is at rack pressure as long as the shut-off valve is closed. To dispense beer a beverage container 150, which may be a beer pitcher, a beer cup, or beer glass, is positioned as shown in the various views with the bottom of the nozzle assembly adjacent the bottom of the beverage container.

Nozzle 105 is of a type that may be positioned at the bottom of a container for an entire fill period, with the liquid being permitted to rise up over the nozzle such that the point of dispense at the nozzle tip remains below the surface of the liquid.

For convenience, a subsurface filling bottom shut-off beverage dispensing nozzle may be referred to in this document as the nozzle, the dispensing nozzle, or the beverage dispensing nozzle.

A volumetric liquid flow rate control device, such as the device 110, may be used to establish and manage the flow of a beverage through the subsurface filling positive shut-off nozzle 105 into a consumer container.

A volumetric liquid flow rate is conventionally expressed and defined as units of volume in units of time as measured at a defined point or location in a liquid flow conduit or container. For example, fluid flow rates may be expressed as ten gallons per minute, ten milliliters per millisecond, two liters per second, and one ounce per second. Volumetric flow rate is independent of the geometry of the flow conduit in which the flow occurs and is measured. For example, the volumetric flow rate measured to be at 180 milliliters per second in a flow tube having hydraulic flow and an internal diameter of five centimeters is identical to the volumetric flow rate measured to be at 180 milliliters per second in a flow tube having hydraulic flow and an internal diameter of one centimeter. Thus, it can be stated that volumetric liquid flow rate is independent of the geometry of the flow conduit in which the flow occurs and is measured.

Liquid flow velocity is a distinct and separate concept and definition from volumetric liquid flow rate. Liquid flow velocity is conventionally expressed and defined as instantaneous volume of flow per unit of square area as measured at a defined point or location in a liquid flow conduit or container. For example, one gallon per square inch, 200 milliliters per square centimeter, and 400 liters per square meter are all expressions of liquid flow velocity. These expressions represent a complete expression such as one gallon per second per square inch. Using the two examples given above, in a flow tube having hydraulic flow and an internal diameter of five centimeters with a measured volumetric liquid flow rate of 180 milliliters per second, the velocity of liquid flow would be 9.17 milliliters per square centimeter. On the other hand, in a flow tube having hydraulic flow and an internal diameter of one centimeter with a measured volumetric liquid flow rate of 180 milliliters per second, the velocity of liquid flow would be 229.30 milliliters per square centimeter. Thus, it can be stated that liquid flow velocity is dependent upon and variable with the geometry of the flow conduit in which it occurs and is measured.

These liquid flow concepts can be further understood and illustrated by reference to FIGS. 2 and 3.

Figure 2:
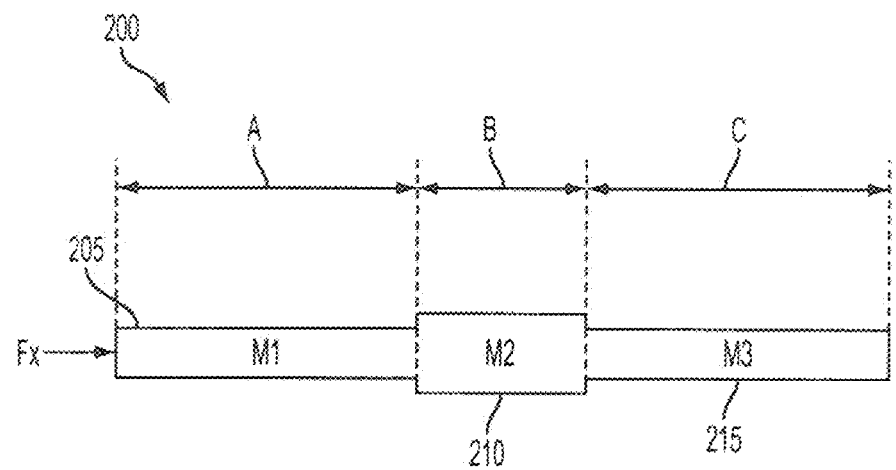
FIG. 2 shows a flow conduit having a varying internal diameter.

In FIG. 2, a flow conduit 200 having a varying internal diameter has a Section A 205 that has the same internal diameter as a Section C 210. A Section B 215 has an internal diameter greater than Sections A and C. Points of volumetric flow rate measurement and flow velocity measurement are shown in Section A at M1, Section B at M2, and Section C at M3. FX indicates a steady state source of liquid flow through the A-B-C liquid flow pathway depicted.

If the term VOL is used to signify volumetric flow rate as previously defined, and the term VEL is used to signify flow velocity as previously defined, then it is clear that VOL M1=VOL M2=VOL M3. It is also clear that VEL M1>VEL M2, VEL M2<VEL M3, and VEL M1=VEL M3.

Figure 3:
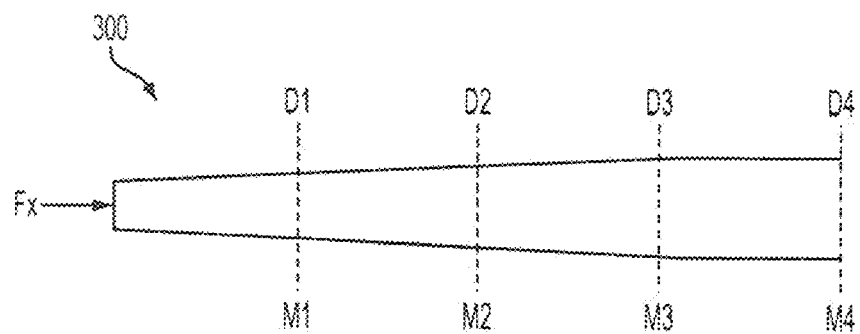
FIG. 3 shows a flow conduit which has an internal diameter which increases in a gradual and linear manner.

Referring to FIG. 3, a flow conduit 300 has an internal diameter which increases in a gradual and linear manner, such that the diameter as measured at point D1 is less than the diameter as measured at D2, which is less than the diameter as measured at D3. Such a flow structure or shape is often referred to as a diffuser since a given volumetric flow rate is distributed or diffused across an increasing area of flow within the conduit. Points of liquid volumetric flow rate and flow velocity measurement coincide with D1, D2, and D3 at M1, M2, and M3. FX again signifies a steady state source of liquid flow through the structure depicted. Using the terms VOL and VEL as above, it is clear that VOL M1=VOL M2=VOL M3 and that VEL M1>VEL M2>VEL M3. Thus, from this illustration and analysis it is clear that liquid volumetric flow rate is not altered or changed as a function of flow conduit square area, but liquid flow velocity decreases as flow conduit square area increases. Further to this illustration, where the conduit diameters at D3 and D4 are the same, the volumetric flow rate and flow velocity as measured at M3 and M4 are unchanged. In the instance where the direction of flow is reversed in the diffuser structure, the flow velocity relationship is reversed and the structure is often referred to as a restrictor.

Having defined and distinguished between volumetric flow rate and volumetric flow velocity, the term "flow control" as used throughout this specification can be defined as a device or structure having an intended purpose of controlling the volumetric flow rate of a liquid. Similarly, the term "control" can be defined as a volumetric liquid flow rate defining device which is manually adjusted and largely invariant in its flow rate control characteristics or structure unless manually altered or adjusted. Thus, a flow rate control may be thought of as a passive volumetric liquid flow control device which is not automatically adjustable or automatically interactive with or reactive to changing conditions. As used frequently throughout this specification, the volumetric flow rate control term is often abbreviated simply to flow control.

The term "flow controller" can be defined to mean a structure or device having an intended purpose of altering, establishing, or defining the volumetric flow rate of a liquid. Similarly, the "controller" can be defined as a volumetric liquid flow rate defining device which can be automatically controlled and adjusted in its flow rate control characteristics in response to some externally derived signal, command, or event. Thus, a flow controller may be thought of as an active or interactive or dynamic volumetric liquid flow control device. As used frequently throughout this specification, the volumetric flow rate controller term is often abbreviated simply to flow controller.

In instances where the distinction between a volumetric liquid flow rate control and a volumetric liquid flow rate controller are unimportant, either may be referred to as a volumetric flow rate control device.

As used herein, neither a flow control or a flow controller is mean to encompass any liquid valving action wherein the flow of liquid may be completely stopped or started by the device.

Figure 4:
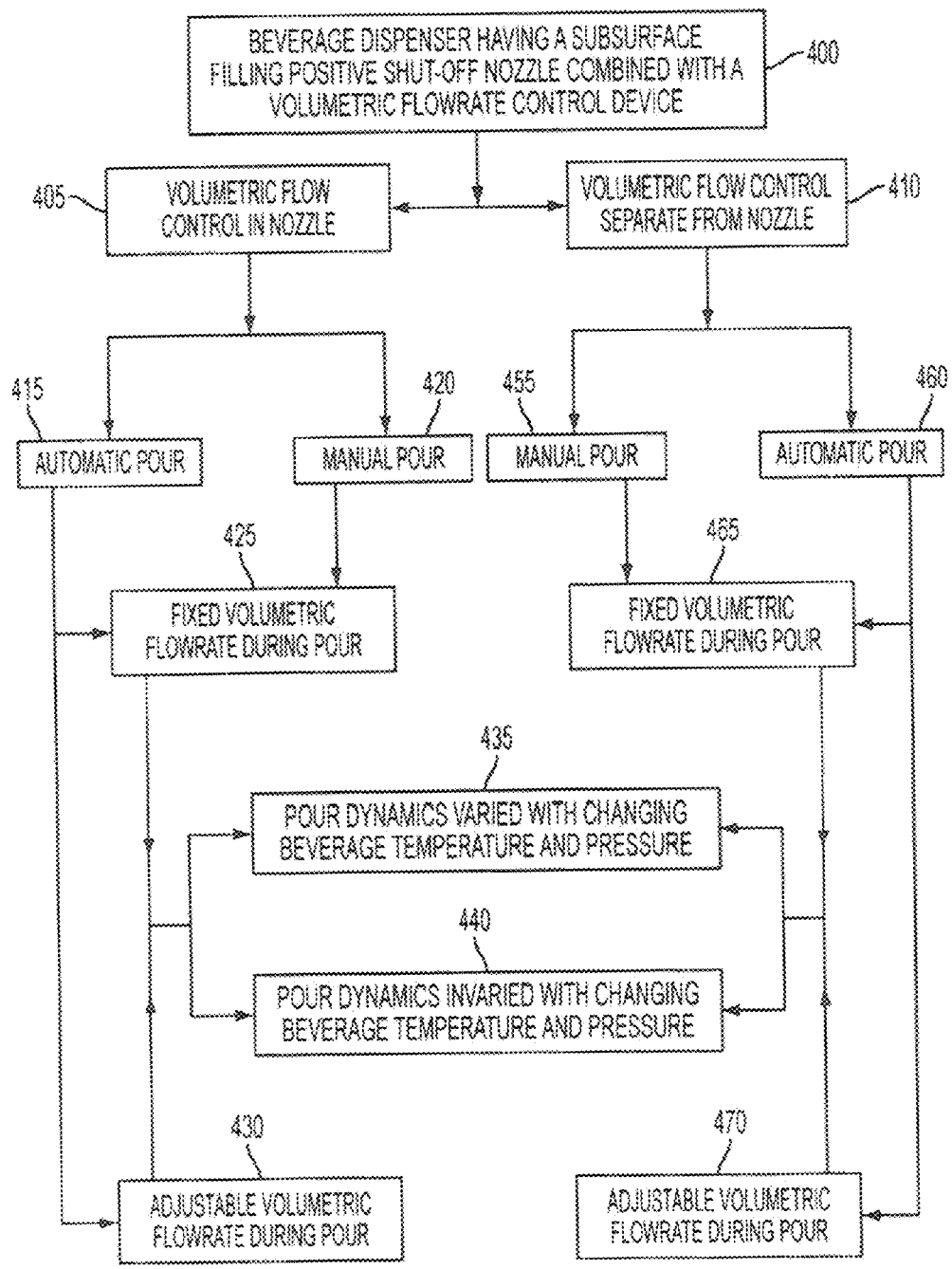
FIG. 4 is a flow chart of dispenser configurations.

FIG. 4 illustrates parameters that may be used to classify different arrangements of dispenser components, and FIGS. 5-15 illustrate a number of alternatives to the beverage dispenser 100 of FIG. 1. Each of these alternatives includes a volumetric liquid flow rate control device or flow rate controller and a beverage dispensing nozzle assembly having a subsurface filling positive shut-off valve.

Figure 5:
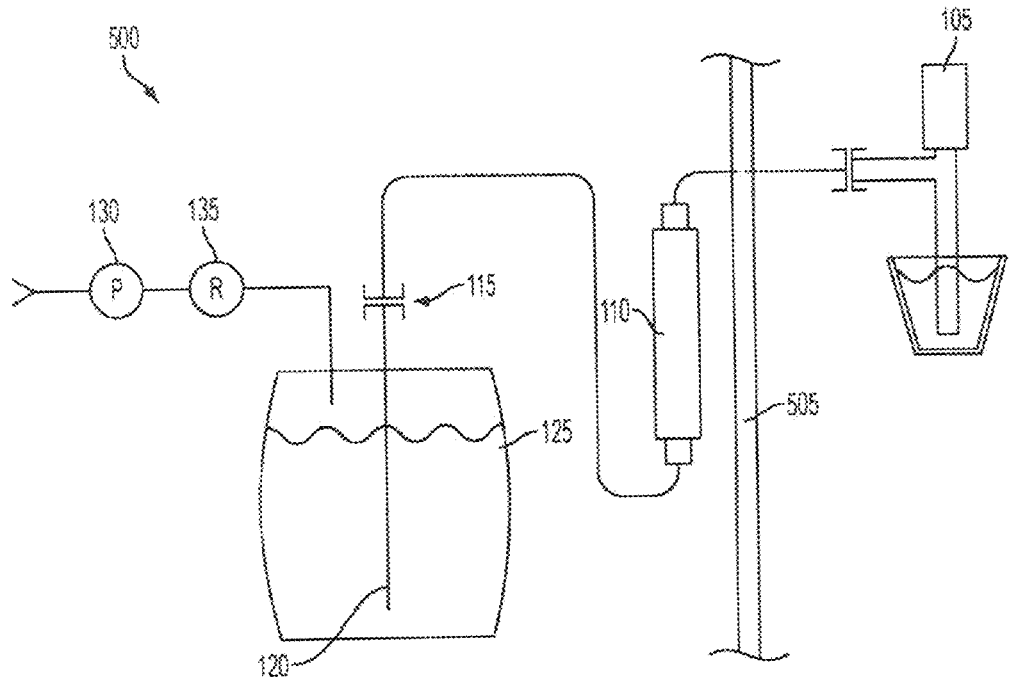
Figure 6:
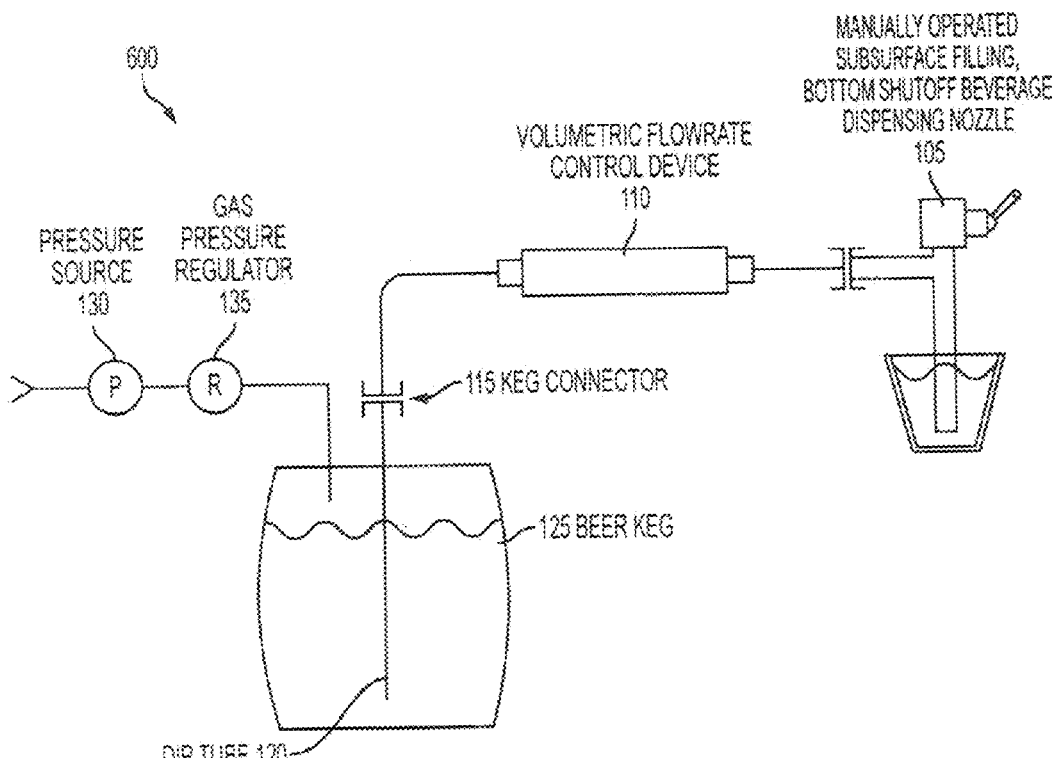
Figure 7:
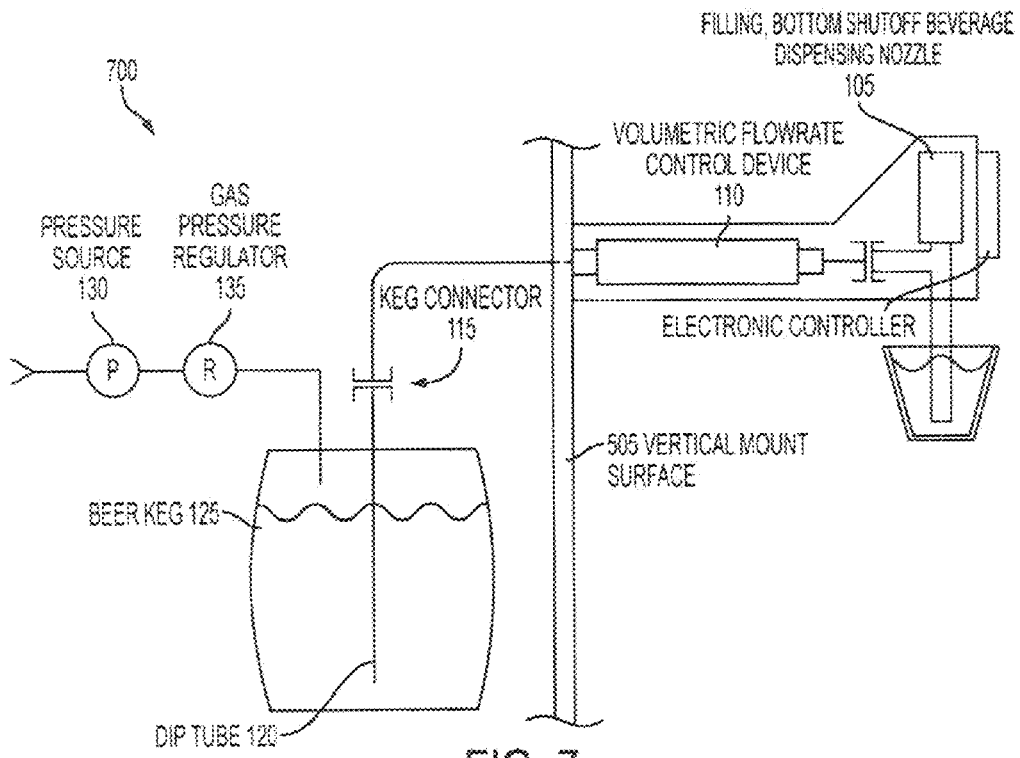
Figure 8:
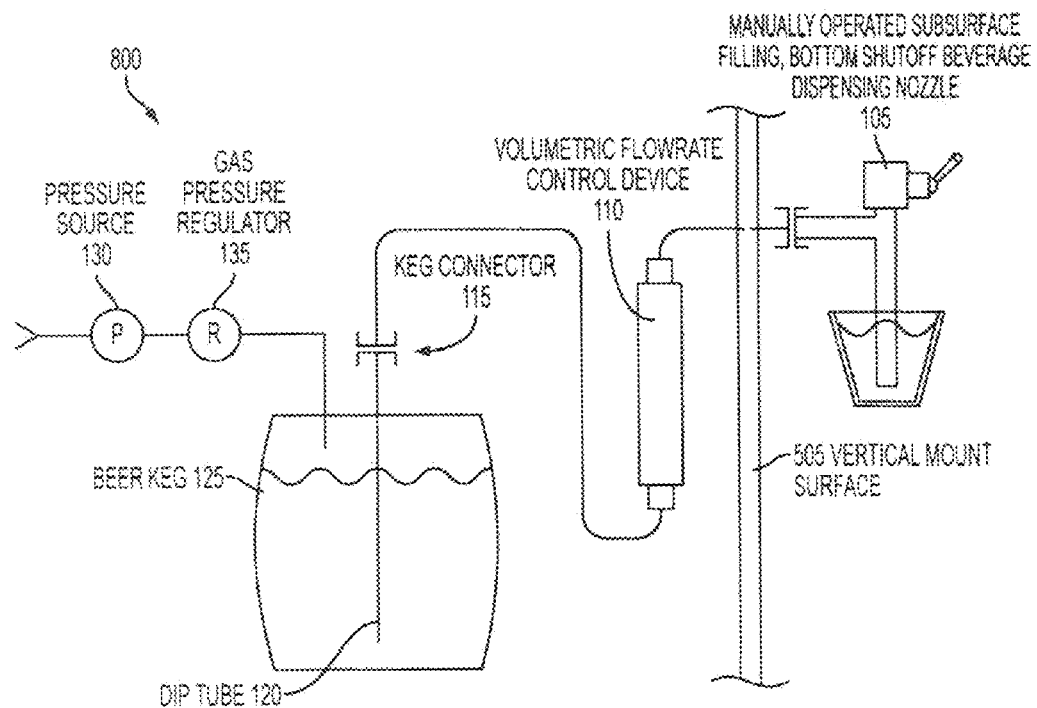
Figure 9:
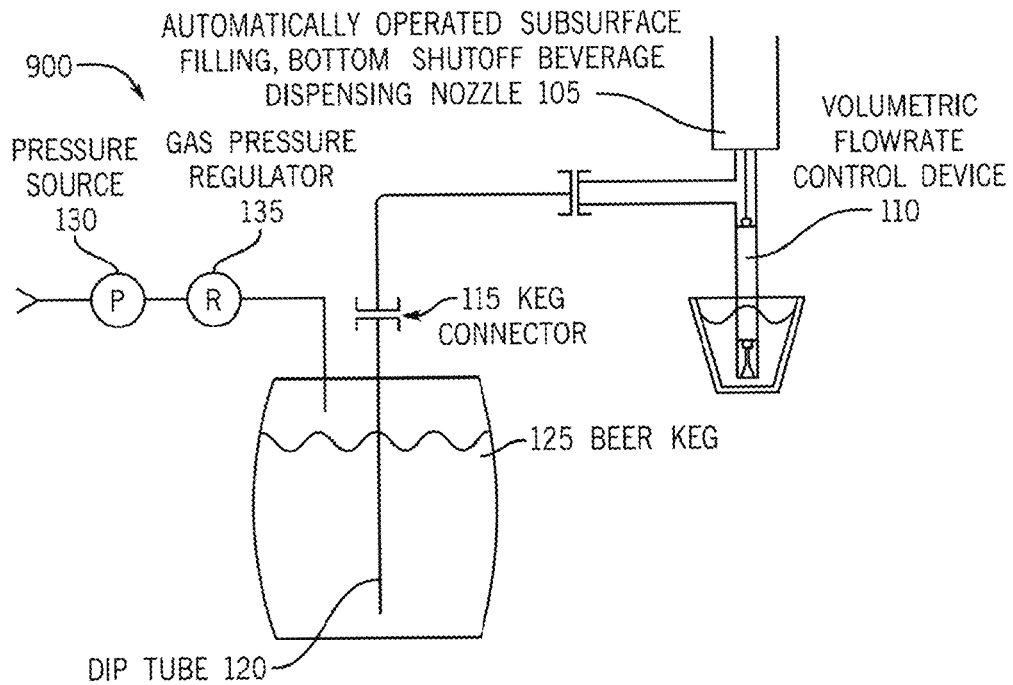
Figure 10:
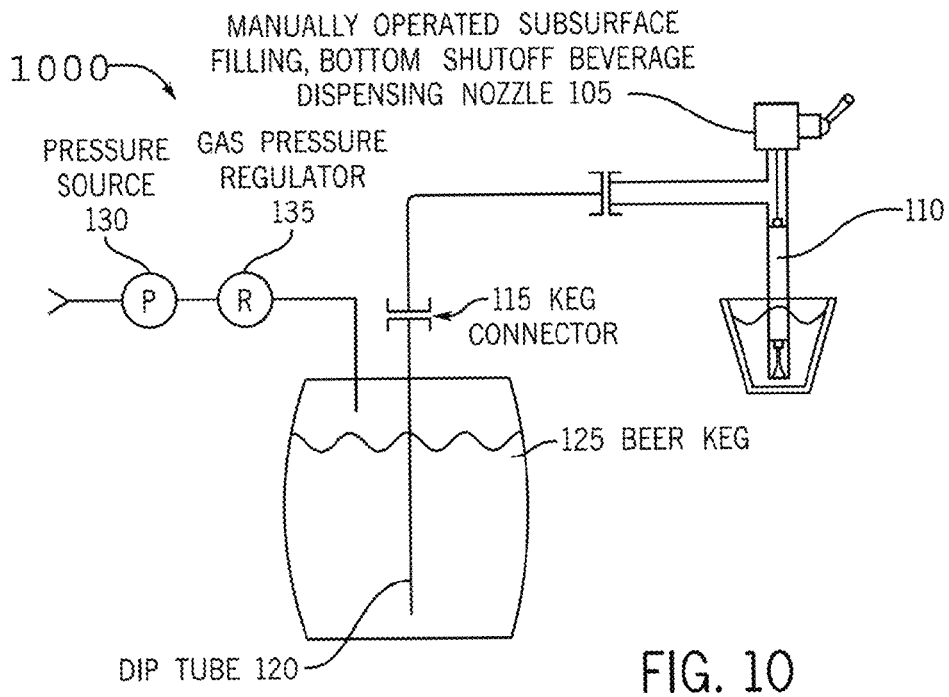
Figure 11:
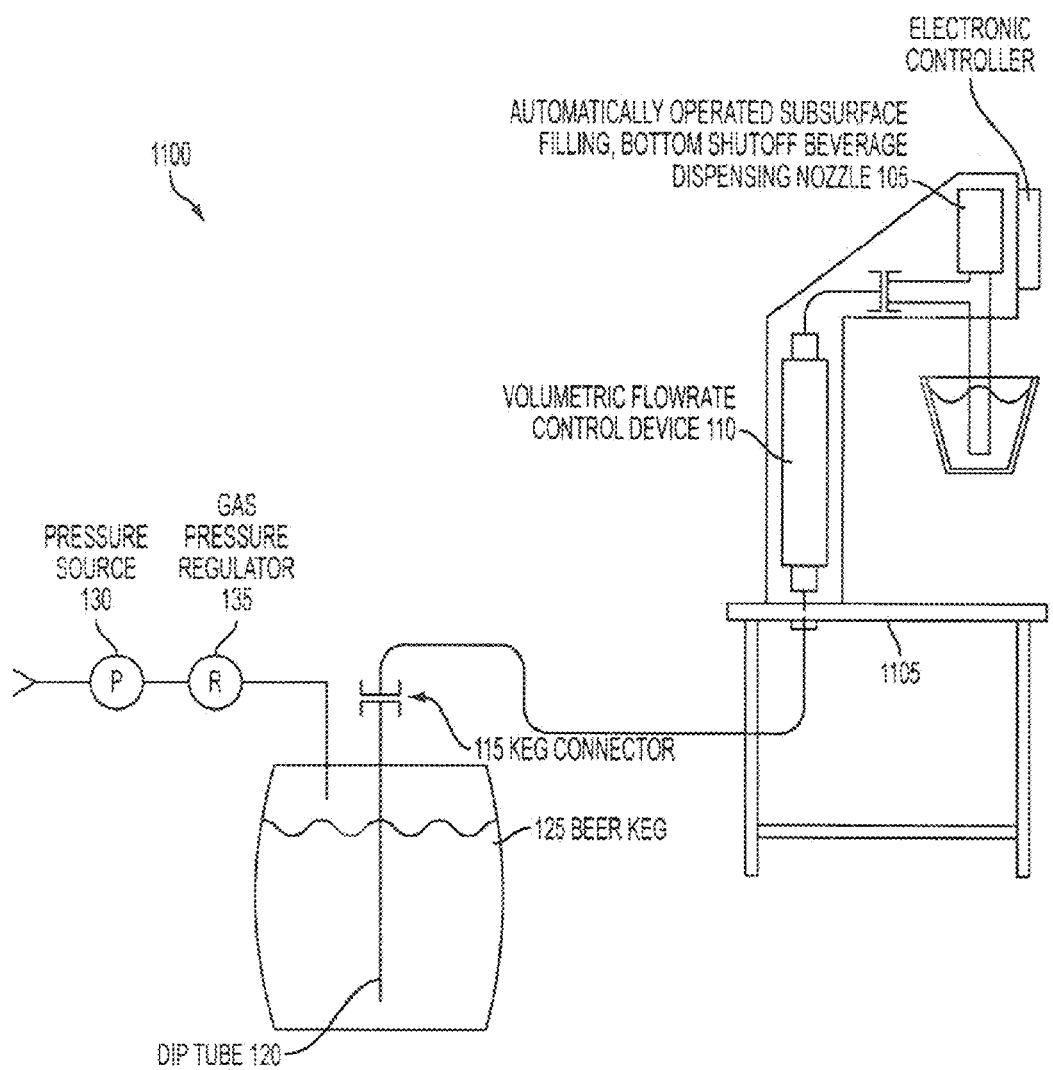
Figure 12:
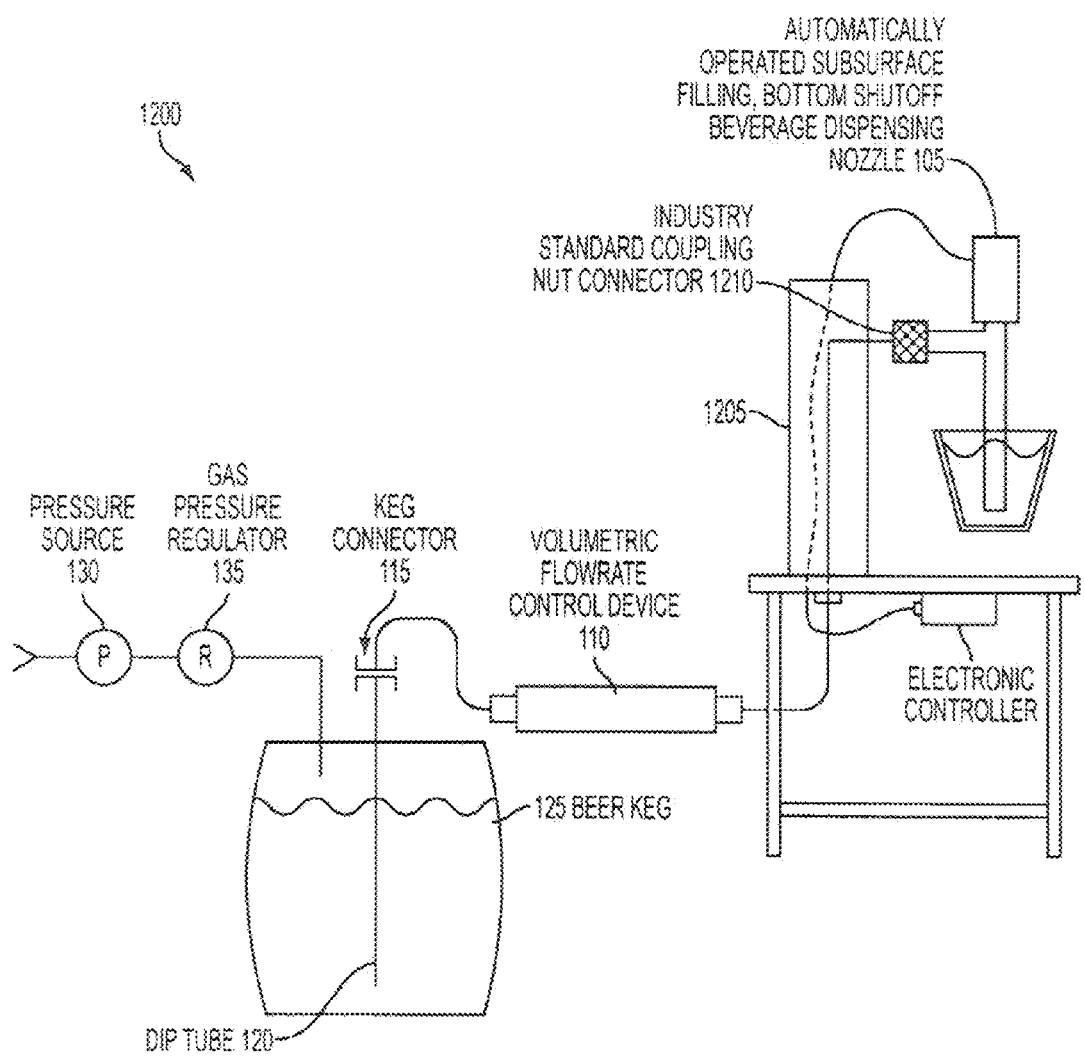
Figure 13:
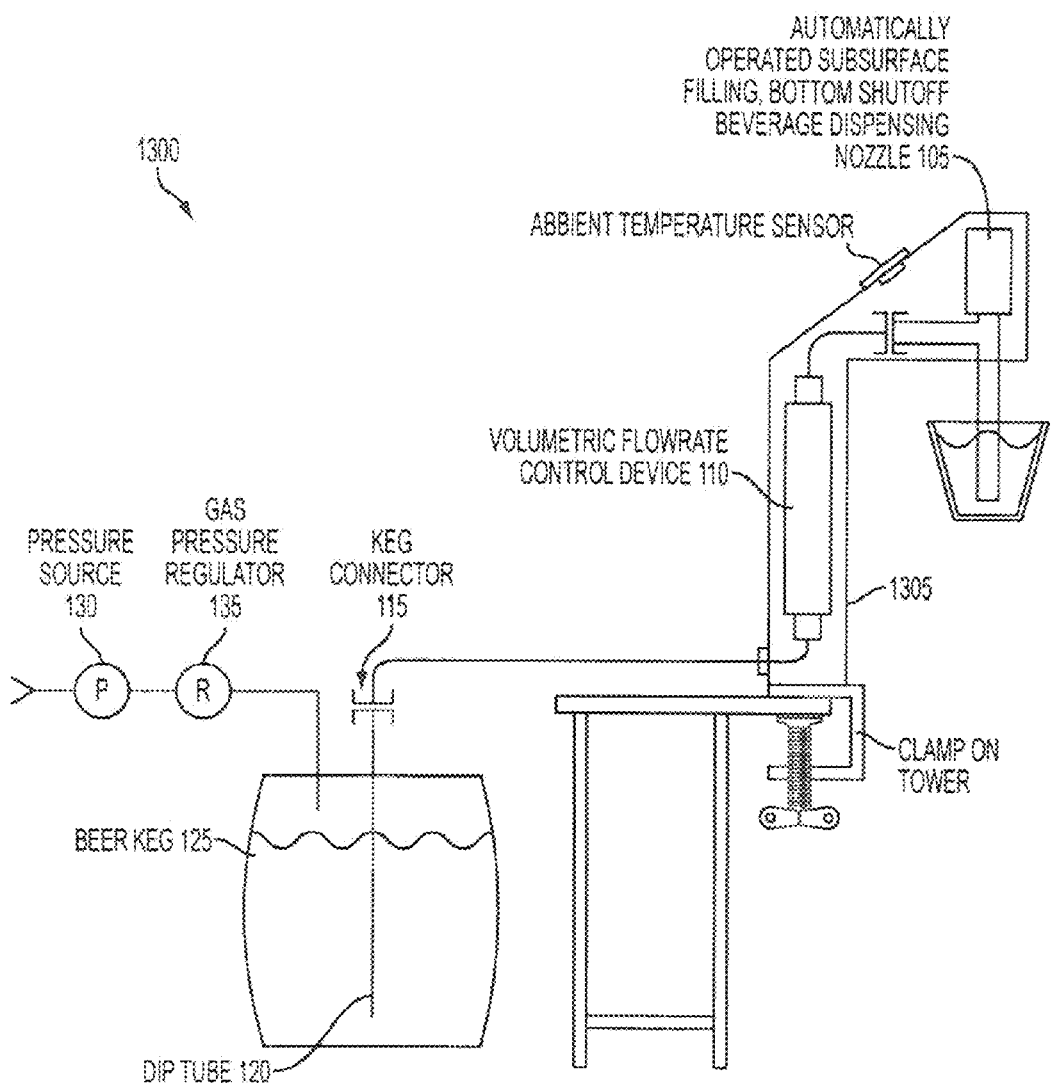
Figure 14:
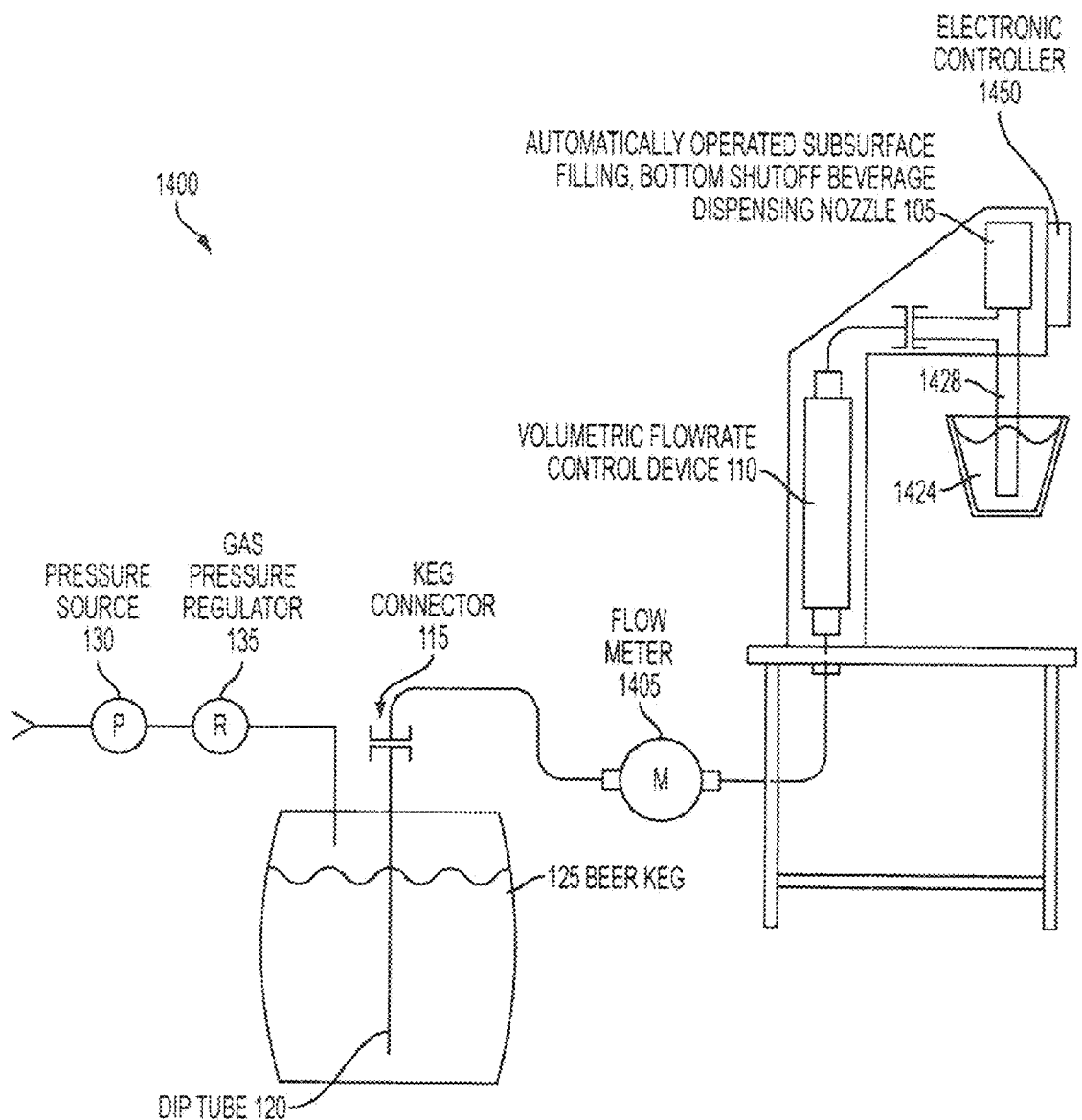
Figure 15:
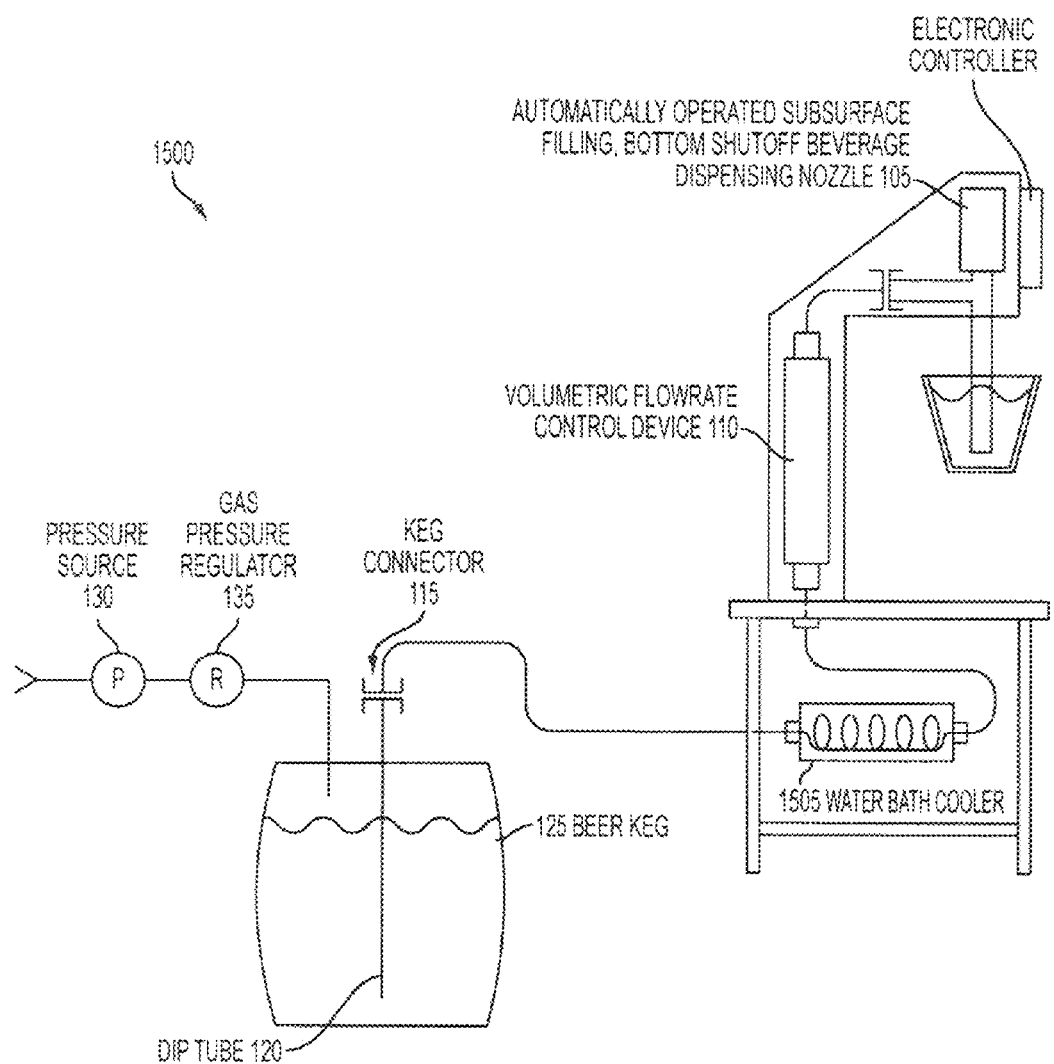

FIG. 5 illustrates a system 500 that differs from the system 100 in that, for example, the nozzle 105 is secured to a vertical mount surface 505. FIG. 6 illustrates a system 600 that differs from the system 100 in that, for example, nozzle 105 is manually operated. FIG. 7 illustrates a system 700 that differs from the system 100 in that, for example, nozzle 105 and volumetric flow control device 110 are secured to a vertical mount surface 505. FIG. 8 illustrates a system 800 that differs from the system 100 in that, for example, nozzle 105 is secured to a vertical mount surface 505 and is manually operated. FIG. 9 illustrates a system 900 that differs from the system 100 in that, for example, volumetric flow control device 110 is disposed in nozzle 105. FIG. 10 illustrates a system 1000 that differs from the system 100 in that, for example, volumetric flow control device 110 is disposed in nozzle 105 and nozzle 105 is manually operated. FIG. 11 illustrates a system 1100 that differs from the system 100 in that, for example, volumetric flow control device 110 and nozzle 105 are secured to the top of a flat mounting surface 1105. FIG. 12 illustrates a system 1200 that differs from the system 100 in that, for example, nozzle 105 is secured to a mounting structure 1205 via a coupling nut connector 1210. FIG. 13 illustrates a system 1300 that differs from the system 100 in that, for example, volumetric flow control device 110 and nozzle 105 are disposed within a claim on tower 1305. FIG. 14 illustrates a system 1400 that differs from the system 100 in that, for example, a flow meter 1405 is disposed upstream of volumetric flow control device 110 and nozzle 105. FIG. 15 illustrates a system 1500 that differs from the system 100 in that, for example, a water bath cooler 1505 is provided upstream of the volumetric flow control device 110 and nozzle 105 to provide cooling to the fluid.

One grouping of dispenser systems is that in which the volumetric flow rate control or controller is physically separated from the subsurface positive shut-off dispensing nozzle, as shown in FIGS. 1, 5-8 and 11-15. Specifically, the volumetric flow rate control device is located upstream of the nozzle structure, and can be functionally located anywhere in the beverage flow pathway between the beverage source (most typically a beer keg) and the nozzle itself and in some practical cases can be well removed from the vicinity of the dispensing nozzle. However, the volumetric flow rate control device is typically located immediately adjacent to the dispensing nozzle beverage flow inlet. This allows for integration and packaging of the volumetric flow rate control device into a housing which, along with associated controls and the dispensing nozzle, constitutes a complete dispenser assembly. Thus, the volumetric flow rate control or controller typically is specified to be small enough to fit inside of a rectangular or tubular enclosure of dimensions that are relatively similar to those found in conventional beer dispensers, and particularly dimensions associated with the vertical dispensing nozzle support housing located on the bar or serving counter, and known generically as a beer tower, or dispense tower.

As one specific example of the general sizing and layout of a complete beer dispenser apparatus embodying a volumetric flow rate controller, associated actuation structure, internal fluid conduits, controls, and subsurface filling bottom shut-off beverage dispensing nozzle mount and attachment structure, such an apparatus can be contained in a vertical, surface mounted housing which is a square structure measuring no more than 12 centimeters on a side, or within a cylindrical structure having a diameter of no more than 12 centimeters (see the system 1200 of FIG. 12, for example.)

In particular implementations, the entire beverage dispenser may be specified to be mountable onto a horizontal surface, most typically a drinks bar, in a manner that is conventional for beer towers. In such implementations, the system is entirely contained within the housing with the exception of the beverage dispensing nozzle which necessarily extends horizontally away from the tower with the nozzle barrel extending downward relatively parallel to the tower housing. The system may also include an AC plug-in type power supply to provide electrical service to the dispenser control electronics. The overall purpose of such a form factor is to allow the dispenser to be readily mounted in place of older dispensers without the requirement of significant changes to the existing drink serving layout, and with the new dispenser occupying a space on the bar that is essentially similar to that taken by the replaced tower. In such an arrangement, no functional portion of the dispenser is found below the plane of the bar, with a suitable beer conduit attachment, pass through or hookup fitting being the only integral part of the dispenser protruding below the bar.

In some versions of the dispenser, a bottom mount plate of the dispenser includes a compressed gas pass through or hookup fitting and an electrical supply pass through or hookup connector.

As shown in FIG. 11, the vertical beer tower enclosure of the system 1100 can have an additional enclosing structure which surrounds the upper portion, including the actuator of the subsurface filling bottom shut-off dispensing nozzle, the barrel of the nozzle being exposed for insertion into the beer serving container being filled. Alternatively, as shown in FIG. 12, the nozzle can be directly attached to the tower using a threaded fitting such as typically is used to attach beer faucets to beer supply lines on beer towers.

FIGS. 16 and 17 illustrate an implementation of a user interface 1600 which in conjunction with an electronic controller allows for the system to accommodate varying characteristics associated with beverage dispensing. User interface 1600 typically includes one or more keypads 1605, 1610, and 1615 that include one or more indicia that signifies, for example, different sized containers, beverage selections, serving sizes and the like. Keypads 1605, 1610, and 1615 are coupled via ribbon cable 1620 to a circuit board, which is further coupled to an input/output connector that is coupled to a processor (not shown). In this configuration, when a user selects one of the keypads 1605, 1610, or 1615, the user interface sends data or information to the processor that indicates a particular characteristic of the beverage dispense cycle, such as, the size of the receptacle.

User interface 1600 may also include additional keypads, such as keypad 1640, which as illustrated, when selected begins a priming operation of the dispensing system. In addition, the user interface may provide for additional keypads 1650, 1660 that include additional user-selectable indicia such as increasing or decreasing the amount of beverage dispenses or for causing the device to generate foam in the dispensed beverage by pulsing the beverage dispensing nozzle.

User interface 1600 may also include a number of lights 1670, which can include LEDs or appropriate bulbs, that provide the user with a visual indication if the system experiences a change, for example, in operating conditions, such as low flow rate, near empty condition of the beverage source, or any other user-defined condition. In addition, user interface 1600 may include display 1680 that can provide the user with data concerning the operation of the system.

Figure 18:
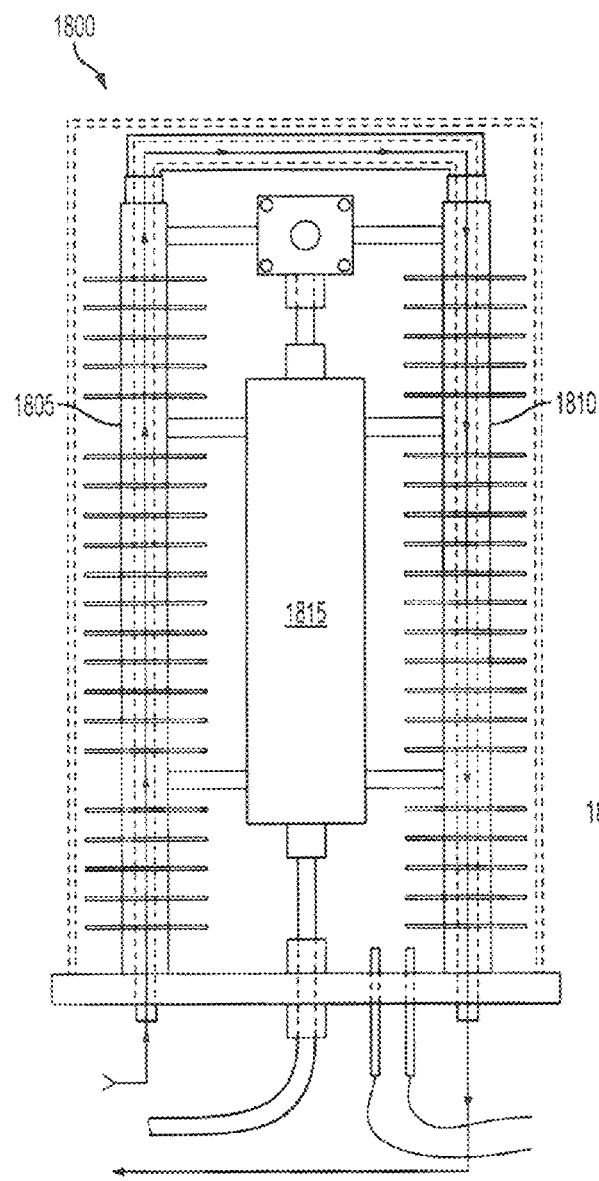
FIGS. 18 and 19 are diagrams of a beer tower including a cooling apparatus.
Figure 19:
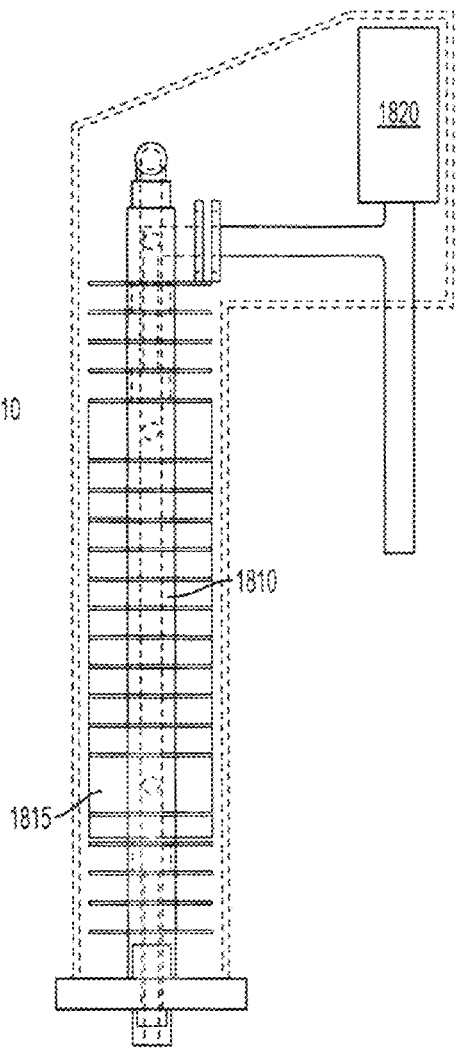
Figure 20:
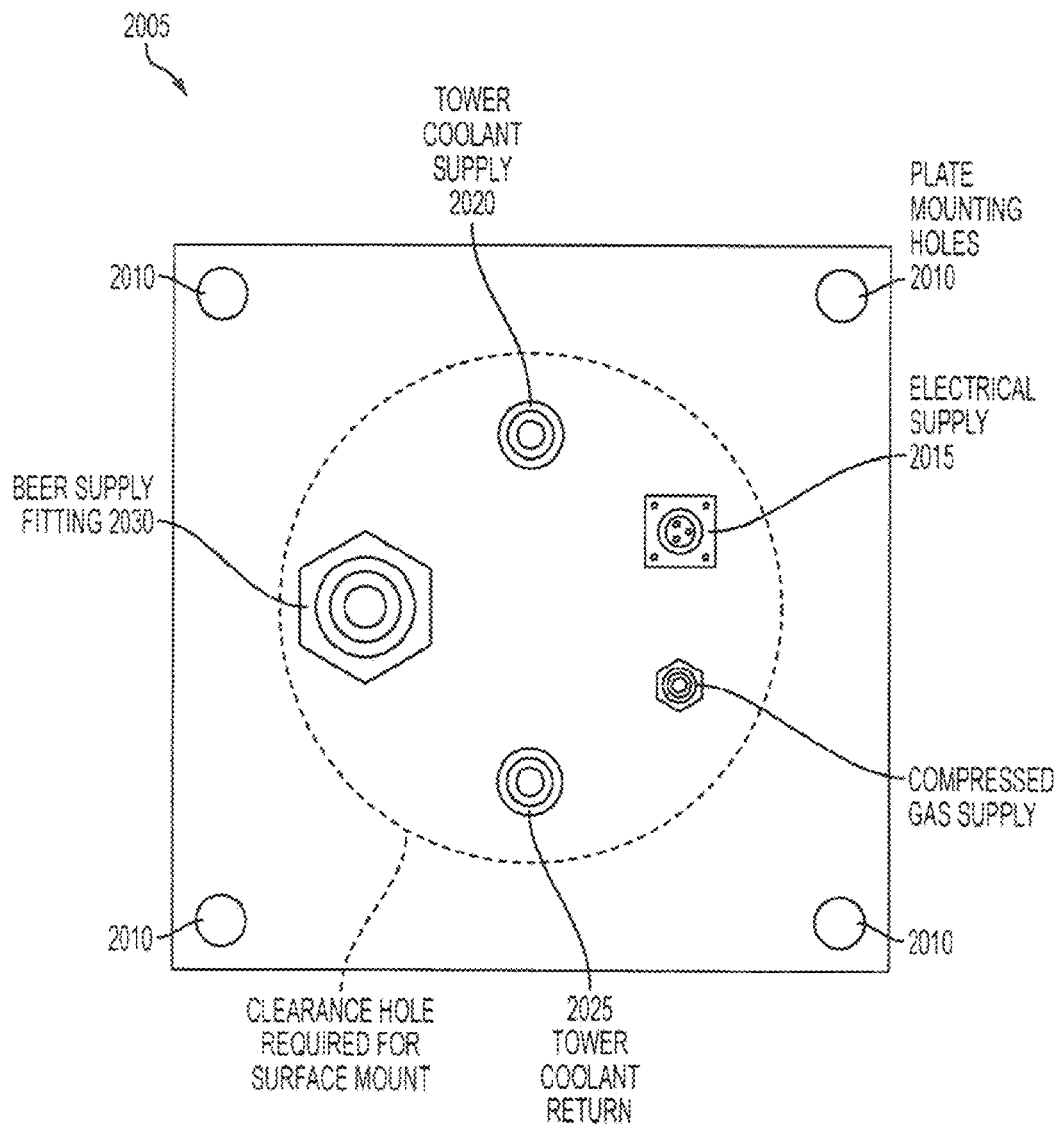
FIG. 20 is a diagram of a bottom plate of the beer tower of FIGS. 18 and 19.

FIGS. 18-20 illustrate a system 1800 that employs another way of structurally mounting the functional components of the system including the beverage dispensing nozzle. As shown, two vertical support elements 1805, 1810 serve as attachment points for the volumetric flow rate control or controller 1815, the subsurface filling bottom shut-off beverage dispensing nozzle 1820, and associated functional elements. This internal mount structure can be referred to as an endoskeleton and offers particular advantages. First, in the case of a dual support element as illustrated, each element can constitute a flow conduit, one suitably connected at the top to the other, such that a fluid tight circuit or flow loop is created. This circuit is particularly intended to allow a coolant to enter and exit the structure as a means of controlling the temperature internal to the tower enclosure. This same flow circuit can actually be employed to warm the interior of the tower in instances where the ambient temperature in which the tower is operating is at or below the freezing point of the beverage being dispensed. As a thermal control structure, the dual internal support element structure can be fitted with thermal radiating fins to increase heat transfer efficiency into the interior space of the tower. In addition, direct thermal conduction is also achievable by physical attachment of internal flow and operating structures to the dual vertical support elements.

The endoskeleton construction structure also provides predefined and dimensional hard points or points of attachment for fitting a decorative external enclosure to the beer dispenser. This provision allows many varied and distinct housings to be designed and fitted to the same internal dispenser structure, uniquely separating dispenser functional elements design from tower enclosure and decoration design.

FIG. 20 illustrates a mounting plate 2005 that may be used for mounting, for example, a beverage dispensing tower to a flat horizontal surface, such as a bar or table. Mounting plate 2005 includes a plurality of mounting holes 2010 that may receive suitable mounting hardware for mounting the dispensing tower to the horizontal surface of the bar. Mounting plate 2005 also includes a number of connection points for receiving and coupling various fluid flow lines and electrical connections used in the dispensing system. For example, mounting plate 2005 includes an electrical supply connection 2015 that may be connected to an electrical line supplying power to various components disposed on, for example the beer tower. In addition, mounting plate 2005 includes a coolant supply 2020 and coolant return port 2025, which may accommodate a coolant line used to provide cooling effects to the beer tower. In addition, mounting plate 2005 includes a supply fitting 2030 that is configured to receive, for example, the supply line coming from the beverage source, such as a beer keg.

As illustrated in FIGS. 5 and 7, the beer dispenser may also be embodied with particular provision for mounting to a vertical surface. Vertical may be particularly suited for bar and other retail dispensing establishments, stadiums, and large venue settings, and the side walls of beer trailers or trucks serving as temporary beer serving points or locations at festivals and other similar events.

Referring to FIG. 4, a number of classifications of the different types of dispenser systems may be defined. Starting with the broad classification 400 of a beverage dispenser having a subsurface filling positive shut-off nozzle combined with a volumetric flow rate control device, the system may be separated into a group 405 that includes systems having the volumetric flow control device disposed within the nozzle and a group 410 that includes systems having the volumetric flow control device separate from the nozzle. Group 405 may be further classified into a group 415 that includes systems employing an automatic pour configuration and a group 420 that includes systems employing a manual pour configuration. Group 415 may then be classified into two additional groups, group 425 that includes a fixed volumetric flow rate during each pour and group 430 that includes an adjustable volumetric flow rate during each pour, while group 420 is further classified into group 425. Each of groups 425 and 430 may then be further classified into group 435 that includes operations where the pour dynamics are varied with a change in beverage temperature and pressure and group 440 that includes operation where the pour dynamics are not varied with a change in beverage temperature and pressure.

Likewise, group 410 may be further classified into a group 460 that includes systems employing an automatic pour configuration and a group 455 that includes systems employing a manual pour configuration. Group 460 may then be classified into two additional groups, group 465 that includes a fixed volumetric flow rate during each pour and group 470 that includes an adjustable volumetric flow rate during each pour, while group 455 is further classified into group 465. Each of groups 465 and 470 may then be further classified into group 435 that includes operations where the pour dynamics are varied with a change in beverage temperature and pressure and group 440 that includes operation where the pour dynamics are not varied with a change in beverage temperature and pressure.

Implementations where the flow rate control apparatus is separate from the subsurface filling positive shut-off beverage dispensing nozzle (410) may be further subdivided into types where the beer pour is volumetrically defined and automatically initiated (as shown, for example, in FIGS. 5 and 12), and types where the beer pour volume is operator determined and operator mediated (as shown, for example, in FIGS. 6 and 8).

In implementations where the pour is automatic, the volume dispensed into the cup is defined by the combined action of the two principle dispenser elements and control electronics.

In addition, systems with automatic pour provisions (e.g., 415 and 460 of FIG. 4) may be further divided into those with only a single fixed volumetric flow rate (425, 465) which is substantially the same throughout the duration of dispensing into a consumer use container (most typically a metal, glass, ceramic, or plastic glass, cup, stein, or pitcher), and those where the volumetric flow rate may be significantly (measurably) altered or varied (430, 470) as desired or required during dispensing in order to achieve the pour performance, effect, or characteristics desired. Details by which these liquid control features and capabilities are achieved are discussed below.

In the systems that employ manual pour, only a fixed volumetric flow rate is typically available during a beer dispense event, since correlation with multiple dispenser defined volumetric flow rates and operator action is generally impractical.

Both fixed volumetric flow rate units and adjustable versions can be provided with the ability to alter the characteristics and attributes of the beer pour as a function primarily of beverage temperature changes and secondarily as a function of beverage source pressure changes as most often defined by beer keg pressure.

As an alternative to dispensers with pour dynamics adjustability for temperature and then pressure, simplified embodiments without provision for such capability are possible as a distinct type.

The second major branching classification 405 includes those where the volumetric flow rate control or controller is located within the beverage flow pathway of the subsurface filling positive shut-off beverage nozzle. In these systems, the volumetric flow rate control device remains a separate and discrete and intended purpose device, but is housed in and operates in conjunction with the nozzle structure, most typically within the barrel of the nozzle.

The nature of the sub-classifications and distinctions of the beverage dispenser systems with flow rate control in the subsurface filling positive shut-off dispensing nozzle are essentially the same as those found in the other primary branch, and can therefore be understood by reference to the comments applying thereto.

Turning to the overall operation of any of the systems, the essential simplicity of the beverage flow pathway of the beverage dispenser is apparent. The basic system with the volumetric flow rate control device located apart from the subsurface filling positive shut-off beverage dispensing nozzle is illustrated in FIG. 1, and the basic system with the flow rate control device located within the barrel of the dispensing nozzle is shown in FIGS. 9 and 10.

When the volumetric flow rate control element 110 is separate from the subsurface filling bottom shut-off dispensing nozzle 105, a suitable beer flow conduit generally referred to as a beer line, trunk line, or beverage hose connects the beer keg 125 to the flow input port of the volumetric liquid flow rate control or controller 110. This beer line may be cooled by cold air or circulating liquid coolant in a completely conventional manner such as in an insulated feed known as a python. Beer flows into and through the volumetric flow rate control device 110 and exits from a flow output port into a second flow conduit which, in turn, connects to the flow input port of the dispensing nozzle 105. The second flow conduit may be structurally the same as or similar to the keg-to-volumetric flow rate control device conduit, or it may simply be a suitable single lumen tube. This distinction depends on the placement of the volumetric flow rate control device 110. In the case where the device is located intermediate between the keg 125 and the nozzle 105, the input conduit and the output conduit may be insulated or cooled as just described. In these cases, the volumetric flow rate control device 110 itself may be insulated or cooled as well, all in order to maintain the beer temperature at a desired value.

Where the volumetric flow rate control device is housed in a beer tower structure as previously described, the volumetric flow rate control device-to-nozzle conduit is likely to be the simple single lumen type since the tower is generally insulated and often actively cooled to maintain beer temperature therein.

When the volumetric flow rate control device 110 is placed within the barrel of the subsurface filling bottom shut-off dispensing nozzle 105, the beer flow conduit conforming to the previous description couples directly from the keg 125 into the flow input of the dispensing nozzle 105, or into a short single lumen feed conduit located within a beer tower. The short feed conduit may be rigid or flexible and serves as a transition hookup from the base of the tower to the flow input of the dispensing nozzle 105, and most typically spans only between the base of the beer tower such that a bottom entry of the beer flow pathway is provided from underneath the bar or counter upon which the tower is mounted.

As noted, the two principle beverage flow pathway elements are the liquid volumetric flow rate control device 110 and the subsurface filling bottom shut-off beverage dispensing nozzle 105. However, other flow pathway elements incidental to the operation of particular implementations in a particular installation are contemplated and understood to be possible, without affecting or altering in any fundamental way the nature, character, or attributes of the underlying system. By way of example, many draft beer installations feature a cold water or ice water cooling bath in the vicinity of the point-of-dispense beer faucet, the bath generally located under the counter or bar (see FIG. 15). Such a cooling device represents part of the flow pathway or flow conduit of beer to the disclosed dispenser, but does not alter or impede the function or character of the dispenser system. Another common example is a foam stop device that is typically inserted into the beer flow pathway near a beer source in order to stop flow of foam into the main length of the primary beer feed tube to the dispenser when the beer source is depleted or emptied.

For operation, all of the illustrated beer dispensers are completely filled throughout their beer flow pathway with the beverage. The beer is most frequently pressurized at the keg to effect flow. As such, this packed liquid condition is referred to as hydraulic and precludes the presence of gas pockets or inclusions in the flow pathway.

In a hydraulic condition, absent flow through the dispenser liquid flow pathway, the hydraulic pressure in every location of the pathway is the same, and is essentially the gas pressure applied to the surface of the beer in the keg (rack pressure). Holding the beer at rack pressure within the dispenser assures that, over sustained and extended periods of inactivity, the beer remains unchanged without deterioration in quality, flavor, or gas content, and is thus able to be dispensed on demand without compromise in beer quality or characteristics.

When flow through the dispenser liquid pathway is allowed, the pressure falls below rack to various different values at various locations within the dispenser apparatus, all dependent upon and defined by well understood liquid flow properties and principles. For example, during flow, the pressure at the outflow port of the volumetric flow rate control device is lower than the pressure at its inflow port and the pressure at the beverage flow outlet of the subsurface filling bottom shut-off dispensing nozzle during flow is at or near atmospheric pressure. After beverage flow through the system is stopped, the various pressures in the system all rapidly return to the stasis condition of rack pressure.

In all implementations, beverage flow through the dispenser is mediated only by the opening and closing of the subsurface filling positive shut-off nozzle 105.

No other element or structure controls or determines if beverage flow into a serving container occurs. In particular, the volumetric liquid flow rate control device 110 does not control whether flow occurs, but serves only to restrict, reduce, and thus define and regulate volumetric flow rate once flow is allowed by the dispensing nozzle 105. Essentially, if the volumetric flow rate of beer from the keg at a given pressure were measured without the volumetric flow control device 110 in the beverage flow pathway, and compared with the volumetric flow rates possible with the volumetric flow control device inserted into the same pathway, the volumetric flow rate will always be lower or reduced in the latter case.

In the illustrated systems, the beverage flow pathway elements, including the volumetric flow rate control device 110, the subsurface filling bottom shut-off dispensing nozzle 105, and all associated flow tubes and fittings and connections, ideally are specified to be designed or chosen to be free of the threads, recesses, or crevices that are typically found in contact with the beverage conventional draft beer dispensing equipment. The use of sanitary connectors where threads are isolated from beverage contact by use of seal rings (typically O-rings), where directions in flow change are gradual and smooth rather than abrupt, and where internal structures intruding into the beverage flow pathway are avoided, all contribute to a low turbulence flow pathway. A low turbulence flow pathway reduces formation of gas in the beer as a function of flow and thus improves the controllability of beer dispensing in terms of pour characteristics and in terms of repeatability of these characteristics.

Figure 21:
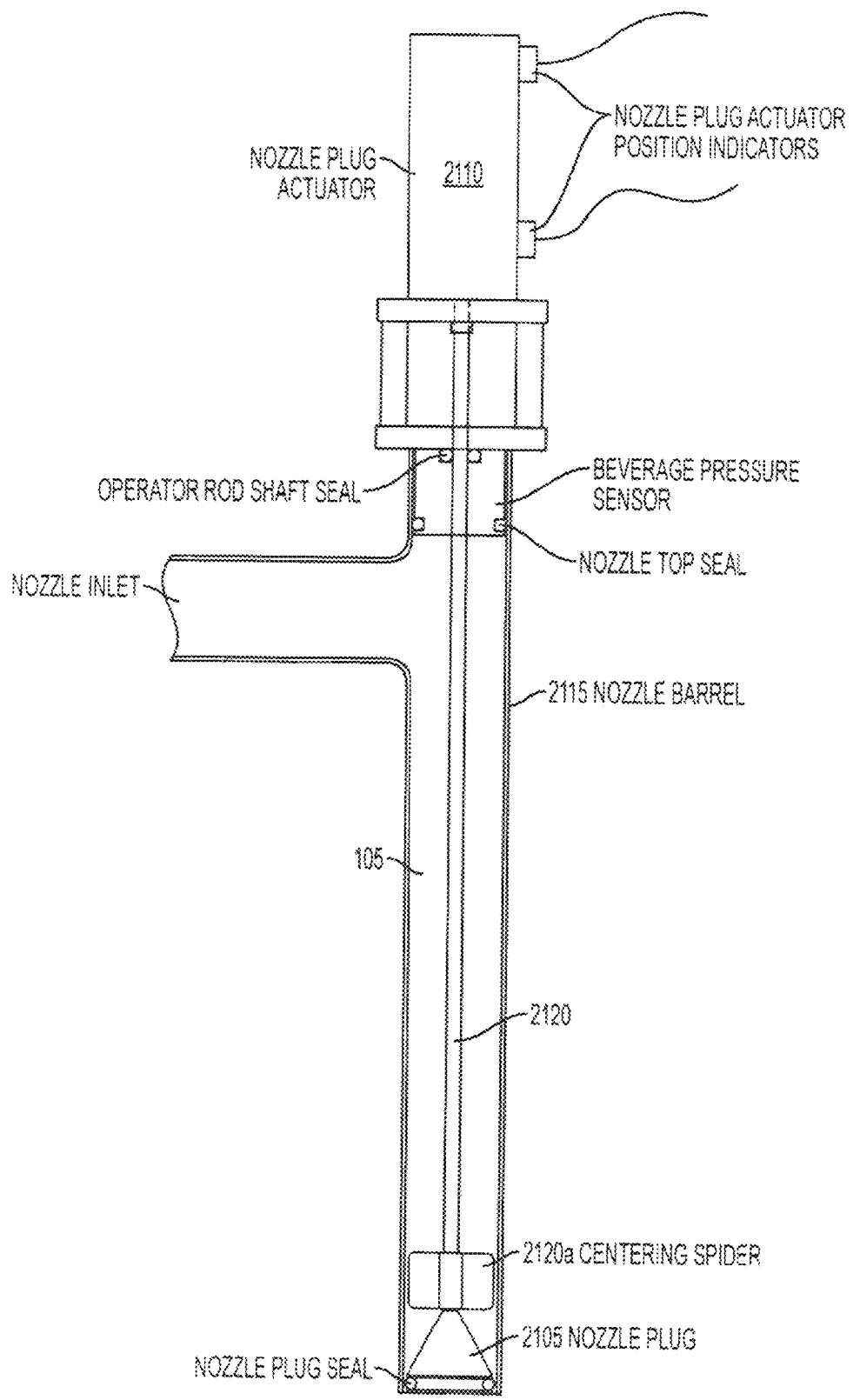
FIGS. 21 and 22 are diagrams of a beverage dispensing nozzle assembly with a beverage dispensing shut-off valve in a closed position in FIG. 21, and an open position in FIG. 22 in accordance with some embodiments of the invention.
Figure 22:
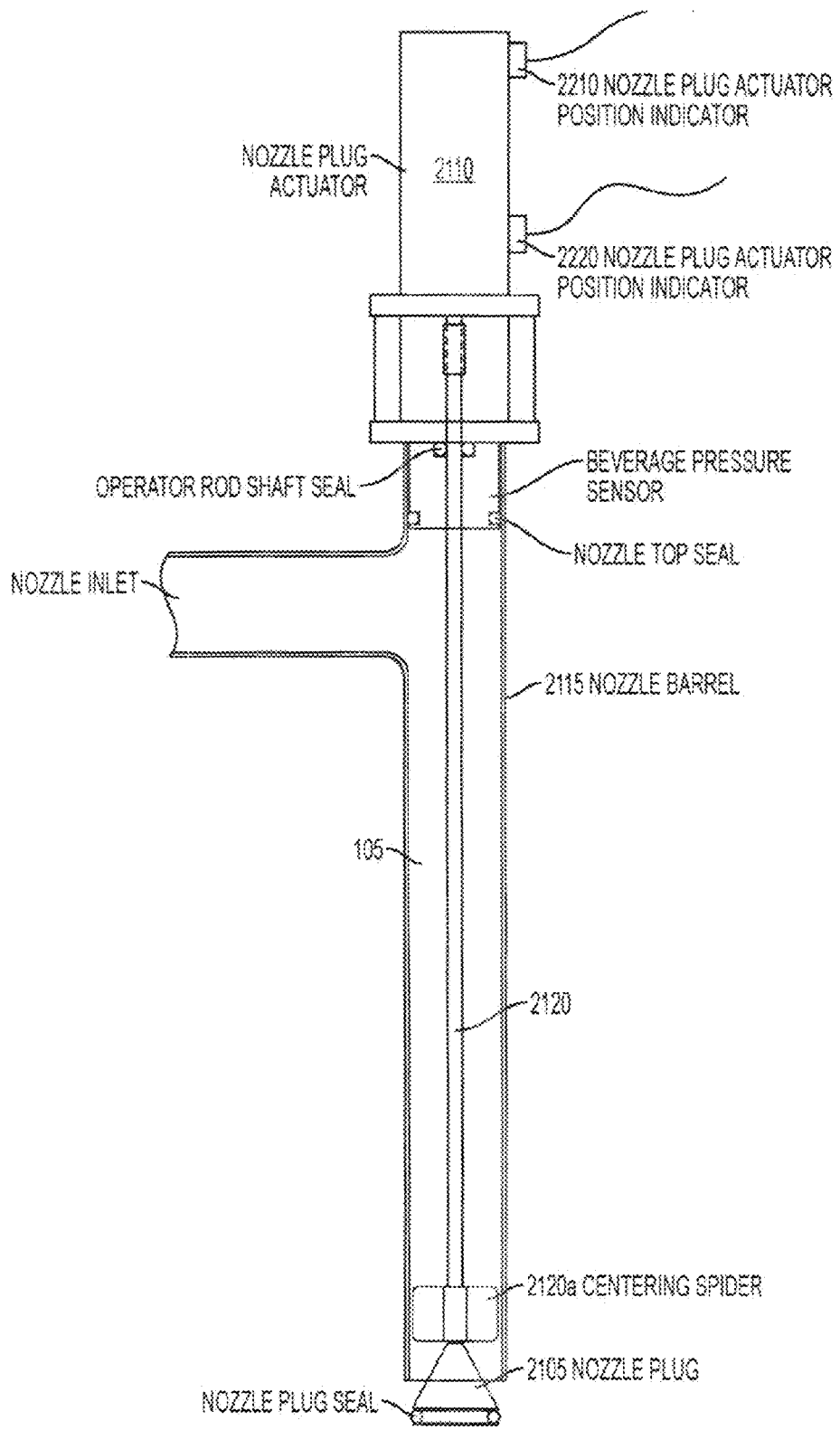

A general reference dispensing nozzle assembly suitable for use with the illustrated systems is shown in FIGS. 21 and 22, wherein FIG. 21 shows the nozzle in a closed configuration and FIG. 22 shows the nozzle in an open configuration. The portion of the nozzle below the tee structure where beverage enters the nozzle assembly from a generally horizontal port is termed the nozzle barrel or dispensing tube. The nozzle barrel ends at its lower end in a nozzle tip comprising the nozzle plug or shut-off valve and its operator rod. A centering spider conventionally serves to maintain the plug in a concentric location when opened away from the nozzle barrel is also pictured.

The total internal volume of the nozzle barrel from the nozzle beverage entry port to the bottom tip of the barrel is stipulated to always be less than the volume of the draft beer serving being dispensed by the dispenser. More particularly, this defined volume may be specified to be less than thirty percent of the dispensed volume. In general, the specified total barrel volume most typically ranges between twelve and twenty percent of the dispensed volume serving produced by the beer dispenser.

The actual displacement volume of the subsurface filling bottom shut-off nozzle structure may be less than ten percent of the draft beer dispense volume. Actual displacement volume is defined as the net volume of displacement of the solid nozzle structure with the nozzle tip placed at the bottom of the serving container. Thus, this volume comprises the displacement of the nozzle plug and its operating rod when open, and the cylinder volume between the inner wall of the barrel tube and the outer wall of the barrel tube. The volume does not include the nozzle barrel lumen volume.

At less than ten percent volume displacement, with the described nozzle placed at and remaining at the bottom of a given beer serving container being filled, the proscribed full measure of beer appropriate for that container as determined by the dispenser operator or by regulation can be dispensed without overflow of beer out of the container as a function of the volumetric displacement of the dispensing nozzle.

Figure 25:
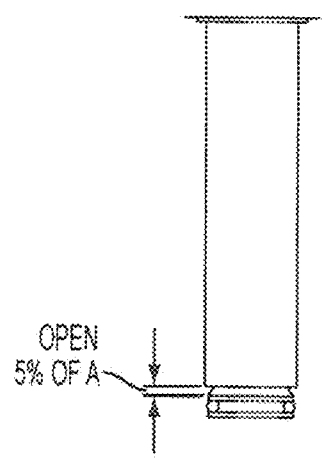

In general, to dispense beer using the illustrated systems, the nozzle barrel is placed completely into the cup so that the nozzle tip is at or close to the bottom of the cup, and to leave the nozzle in this position throughout the entire dispense event. This allows the simplest and lowest skill technique to be used. During dispensing using this method, a defined amount or volume of beer is dispensed into the beer container. During dispensing and instantaneously at the end of dispensing, the nozzle is open (see FIG. 23) and the beer inside the nozzle is in fluid communication with the beer outside of and surrounding the nozzle. Thus, at the moment just prior to closing the nozzle at the end of the dispensing (see FIG. 25), the beer inside of the nozzle can be thought of as being part of the volume of beer within the cup, and the displacement of beer in the cup is only slightly higher due to the structural displacement of the nozzle itself, which is quite small (generally less than 3 percent of the beer dose volume). However, when the nozzle closes, matters change. In particular, upon closure, the beer inside of the nozzle barrel is physically isolated from the beer outside of the nozzle in the cup. At the moment when nozzle closure is completed, the level of beer in the glass is little changed, except as a result of the change in nozzle plug location which is so small as to be ignored. However, upon withdrawal of the nozzle from the cup, the entire volume of the nozzle is withdrawn to exactly the volume equivalent to a solid cylinder having the particular outside diameter of the nozzle barrel, and defined by the depth to which the nozzle was immersed into the beer cup. At this point in the dispense sequence, nozzle withdrawal will result in a measurable and readily observable drop in the level of beer in the serving container.

Said differently, a substantial volume of beer is removed from the beer glass upon nozzle closure and removal from the glass such that the glass may be overfilled with a volume greater than the desired volume after nozzle removal. This, in turn, requires a rapid pour dispenser capable of overfilling without overflow of beer or beer foam. Nozzle sizing and geometry is critical to this capability.

The subsurface filling bottom shut-off beverage dispensing nozzle plays a crucial role in allowing a comparatively rapid dispense of draft beer with a high degree of control over the amount of foam formed on the beer as a result of the pour.

Figure 23:
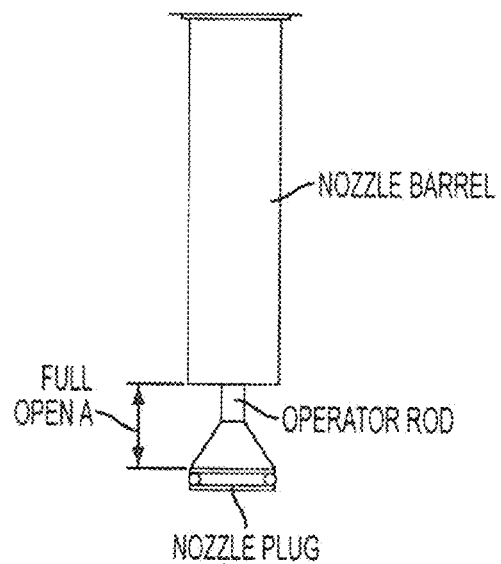
FIGS. 23-25 are schematic illustrations of different nozzle plug or shut-off valve positions.
Figure 24:
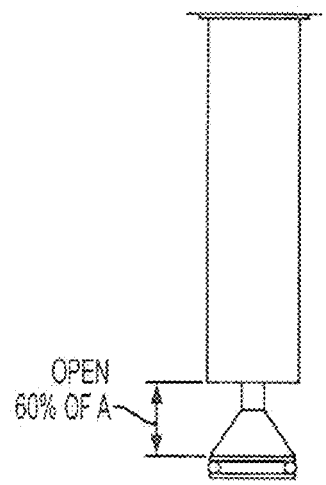

Thus, with the opening of the dispensing nozzle, beer flow begins as soon as an actual unsealed flow pathway begins to form as the nozzle plug or shut-off valve moves outward and downward from the discharge end of the nozzle barrel (FIGS. 23 and 24). As the nozzle plug opening distance increases, the square area of the cylindrical flow pathway or aperture formed increases. Further, the speed of the opening motion of the nozzle plug will define the rate at which the cylindrical square flow area is established. Thus the speed of motion creating a beverage flow outlet at the nozzle and the size of the flow area of the beverage flow outlet have a direct bearing on the performance of the beverage dispenser.

In particular, with a given motive force applied to the draft beer as previously described, and with volumetric flow rate determined by the volumetric flow rate control device, the velocity of the beer flowing from the nozzle orifice (also termed the beverage flow outlet) is a direct function of the square area of flow available. Thus, at the earliest stages of nozzle opening, beer flow velocity is relatively high, resulting in a high degree of flow turbulence. This high flow turbulence is responsible for a comparatively large amount of outgassing of the beer and thus substantial foam formation. Therefore, to minimize this phenomenon, the beverage nozzle is specified to open at a high speed in order to expand or increase the square area of flow as rapidly as possible, thus reducing the velocity of the draft beer flowing from the nozzle barrel (of a given diameter) and thus minimizing the amount of beer foam produced at the start of a beer dispensing pour.

The speed of nozzle opening can be stated in quantified terms. In particular implementations, nozzle plug travels from a position of initial flow to an open and extended position representing sixty percent of its total opening distance in 30 milliseconds or less.

Equally important to minimizing the amount of draft beer foam created as a function of beer flowing into the consumer container during dispensing from the disclosed beverage nozzle is to minimize turbulent flow by minimizing flow velocity for a given diameter nozzle. This is accomplished by assuring that the nozzle beverage flow outlet area is substantially greater than the cross sectional square area of the particular nozzle barrel. It can be empirically shown that for a given nozzle barrel diameter and a given beer volumetric flow rate, the amount of beer foam is minimized when the barrel cross section square area at the barrel flow outlet is less than the area of the cylinder of the flow aperture formed between the bottom of the extended nozzle plug and the bottom of the nozzle barrel.

Stated empirically, beer foam is minimized at a given volumetric flow rate where the ratio of the cylindrical square area formed between the nozzle plug bottom and the discharge end of the nozzle barrel over (as a numerator) and the cross sectional area of the nozzle barrel at its flow outlet end (as a denominator) is at least 1.5 or greater.

In discussing the open-to-flow characteristics of the nozzle, it is appropriate to consider the role of the beverage flow outlet of the nozzle in determining the volumetric flow rate of the draft beer entering a beer container. The volumetric rate of flow of beer from the dispensing nozzle at its early stages of opening motion are defined and limited by the limited area of flow available. As previously discussed, because high velocity turbulent flow leads to unwanted foam, the duration of volumetric flow and velocity flow being defined by the nozzle beverage flow orifice is kept to a minimum interval of time. In fact, this critical interval can also be defined as typically being less than one percent of the total beer pour time as measured from start of beer flow to the end of beer flow.

What is important to state in this matter of volumetric flow rate, is that the open nozzle flow orifice plays no role in this flow rate except briefly upon opening and closing of the dispense nozzle. Thus, it can be shown that the volumetric flow rate from a fully opened dispense nozzle as determined by the volumetric flow rate control device, is not materially different from the flow rate of the same nozzle with the nozzle plug entirely removed from the apparatus. As a result, the rate at which beer flows into the beer glass is volumetrically defined by the volumetric flow rate control device (to be specified further in this disclosure), while the velocity and directional aspects of flow, substantially defining the nature of the dynamic interaction of the beer and the container it is flowing into, are principally determined by the subsurface filling positive shut-off beverage dispensing nozzle.

The closing of the disclosed beverage nozzle presents essentially the same or similar problems to those associated with nozzle opening. Thus, as the fully opened nozzle closes, the square area of the defined flow aperture begins to decrease. As the area decreases, the velocity of flow begins to increase, eventually resulting in highly turbulent flow of beer into the beer already dispensed into the beer mug. This, in turn, causes dissolved gases in the beer (typically carbon dioxide) to leave solution and contribute to the formation of beer foam. Thus, the closure of the nozzle is stipulated to be rapid and complete in order to minimize this foam making phenomenon.

Nozzle closure speed can be quantified in two particular ways akin to nozzle opening. Thus, in particular implementations, the nozzle may be closed and sealed against flow in 30 milliseconds or less as measured from the point of sixty percent of the full open position of the nozzle plug. Alternatively, it can be stated that the time for nozzle closure should generally constitute one percent or less of the total beer dispense time.

Figure 26:
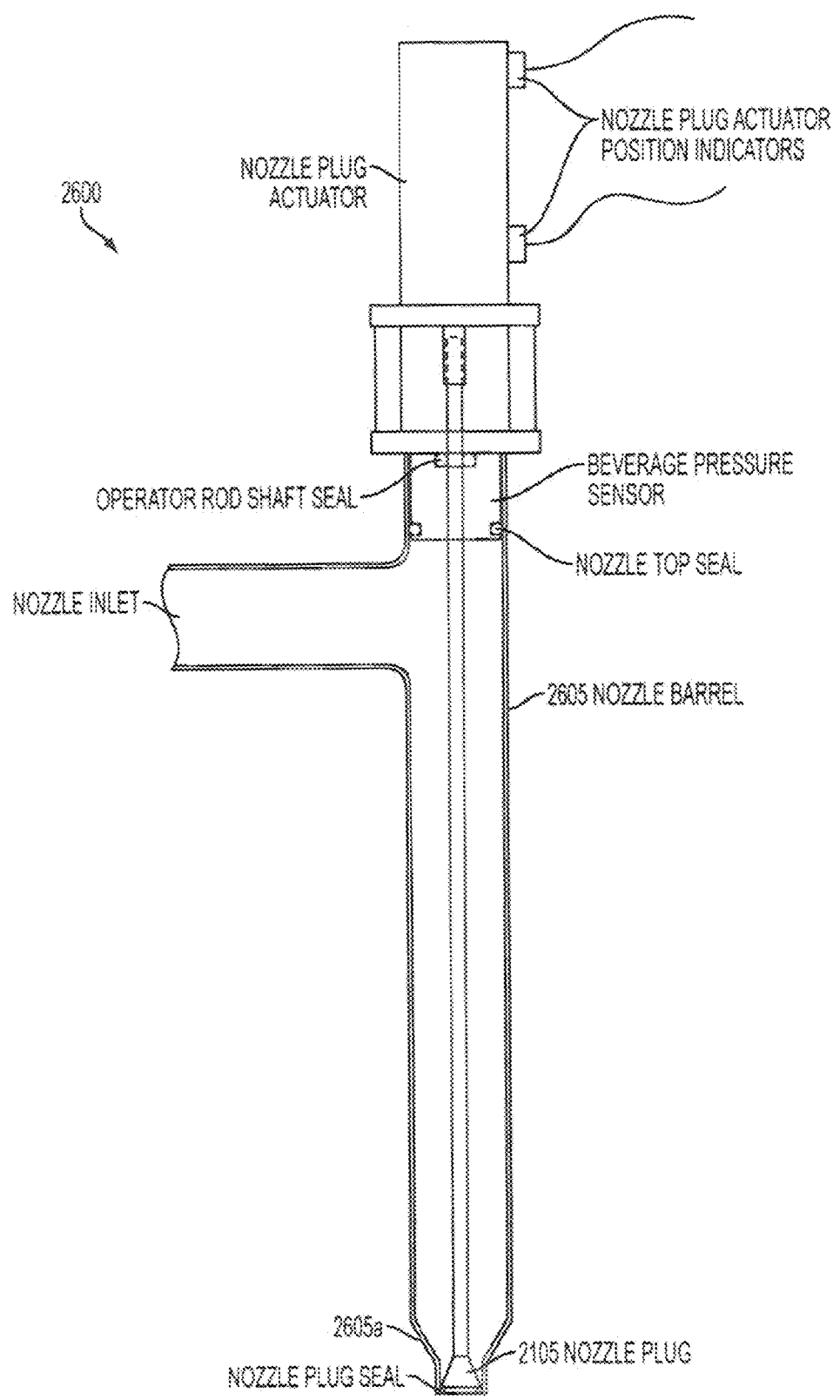
FIGS. 26 and 27 are diagrams of an alternative beverage dispensing nozzle assembly with the beverage dispensing shut-off valve in a closed position in FIG. 26, and an open position in FIG. 27.
Figure 27:
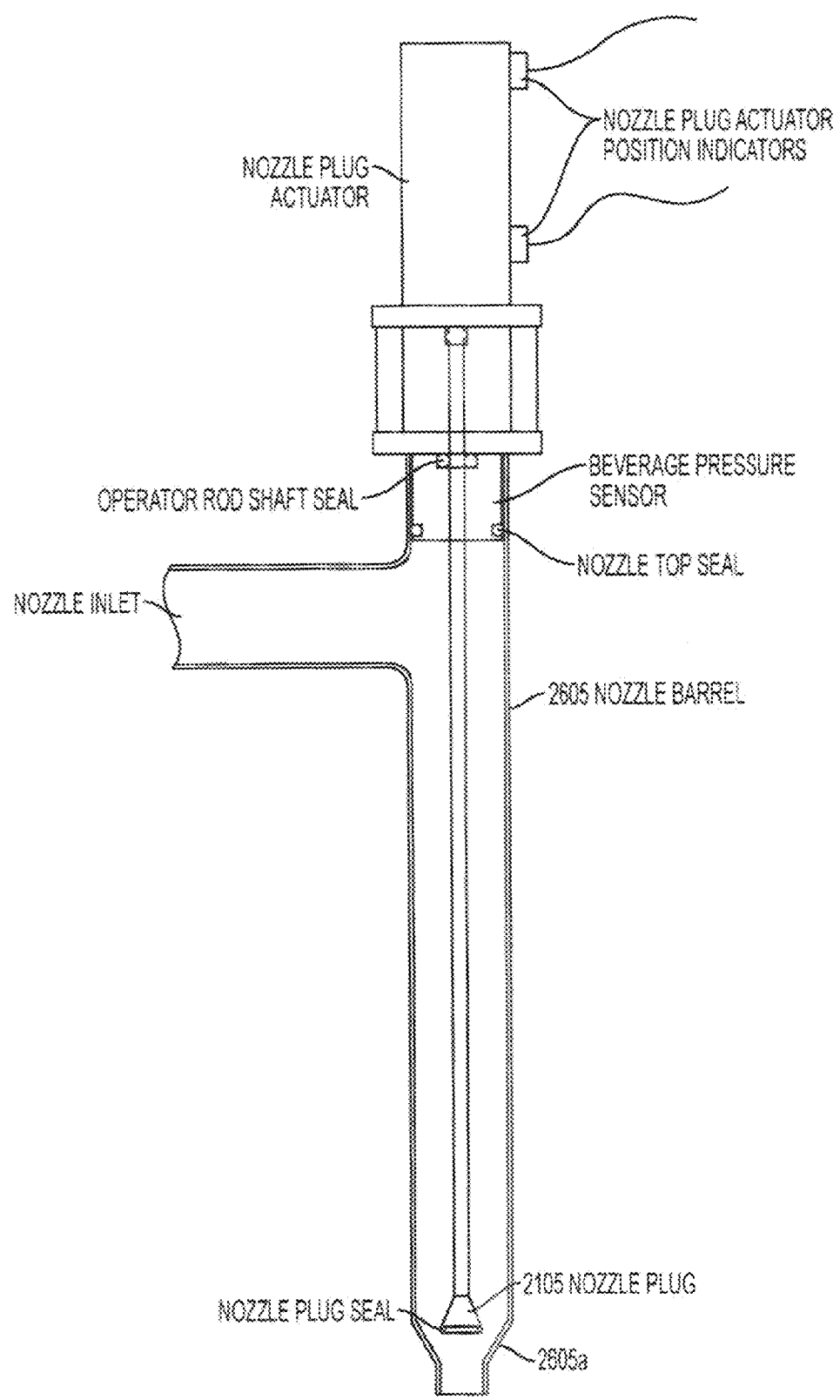

FIGS. 26 and 27 illustrate an alternative nozzle arrangement 2600. As shown, the discharge end of nozzle barrel 2605 tapers from a first diameter to a smaller diameter at the outlet of the nozzle tube. The smaller diameter is chosen to allow the nozzle plug of the nozzle valve to sealingly engage the wall of the nozzle outlet.

Figure 28:
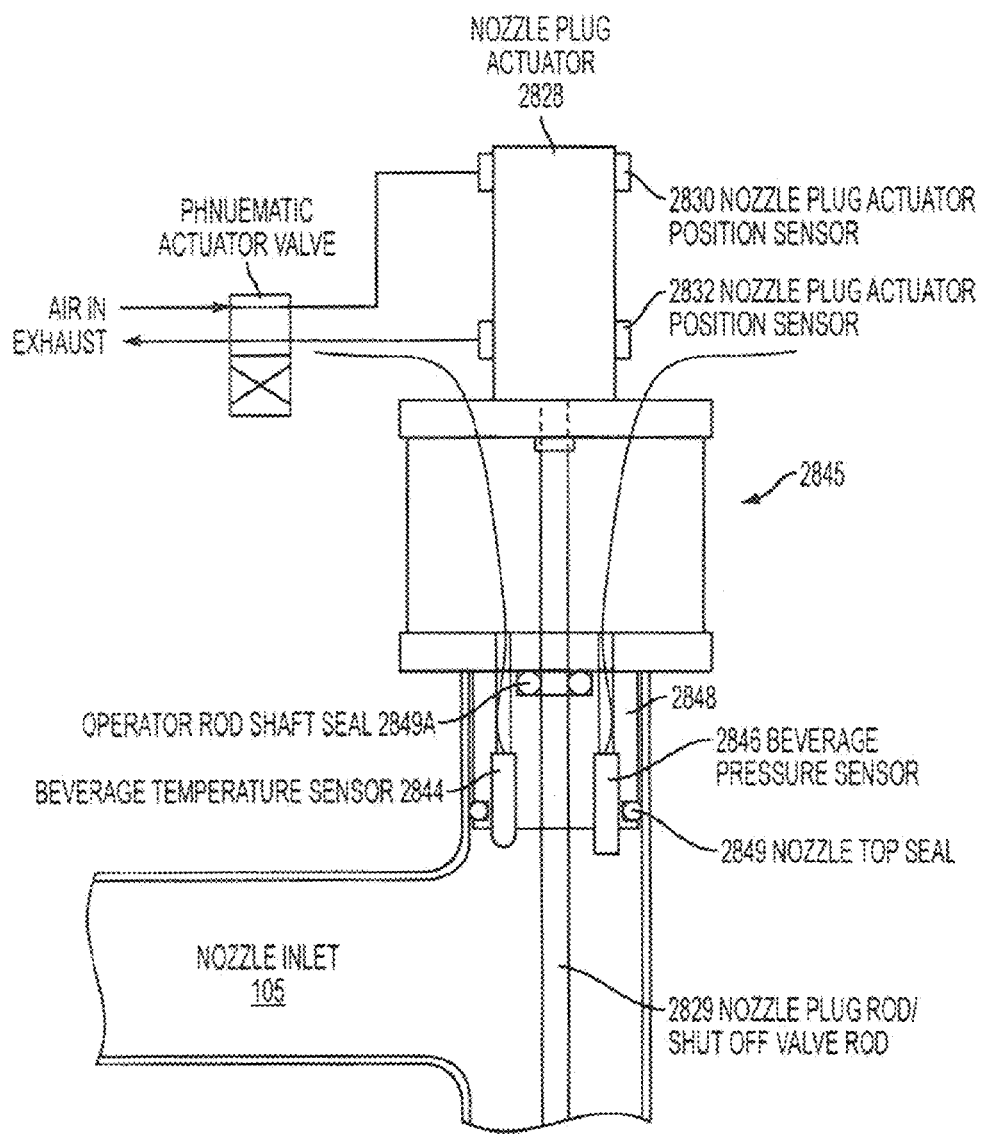
FIG. 28 is an enlarged view of a mechanism used to move the shut-off valve between the open and closed positions.

FIG. 28 illustrates control aspects of the illustrated nozzles. A pneumatic actuator 2845 is used as a motive force to move the nozzle plug in a linear motion in order to initiate and end flow through the nozzle. The actuator 2845 may include two position sensors 2830 and 2832 that indicate the open and closed positions, for example, of the nozzle plug within the nozzle body. In addition, a temperature sensor 2844 and a pressure sensor 2846 are disposed within the fluid flow pathway of the nozzle and configured to provide temperature and pressure data to, for example, the controller. The controller may then use this data to adjust operating parameters such as time of pour, opening of the nozzle, and control of the volumetric flow controller. The nozzle further includes various seals, 2849 and 2849A that prohibit fluid from the nozzle from entering the actuator.

As noted above, the nozzle opening and closing speed may be critical in creating a flow aperture sufficiently large as to not define volumetric flow and to allow flow velocity to be minimized. To this end, the illustrated nozzles are position encoded. This means that at least the full closed and full open positions of the nozzle flow aperture are sensed and that these two positions are detected by nozzle plug actuator position sensors. With this arrangement, the time from the start of nozzle actuation for opening to the time of completion of actuation to a fully open condition can be defined. This is accomplished by electronically measuring the time interval from the loss of signal of the full close position sensor, to the detection of a signal from the full open sensor. The nozzle close to open time can be compared with a predefined and engineered time interval, with this comparison allowing each nozzle opening actuation to be checked to verify that the nozzle actuator and opening function are operating correctly.

The time interval for comparison to the actual opening time can be of three distinct varieties. A default time can be checked with each actuation, with this interval being fixed and equivalent to or slightly longer in duration than the worst case full stroke nozzle opening actuation time anticipated. A variable actuation comparison time equivalent to or slightly greater than a computed one percent of the pour time duration entered into the dispenser electronic controller can also be used. The third time-motion analysis value is a specific interval associated with a particular dispensing nozzle size or type. As will be further disclosed, many nozzle shapes and sizes and lengths can be beneficially combined and used with the volumetric flow rate control device. These various nozzles can present different actuation times as a function of their characteristics and thus a nozzle specific actuation time comparison standard can be determined and utilized.

The system also may be configured to immediately terminate a particular beer dispensing event in the case where the measured actuation time is too long. This is done in recognition that a pour event where nozzle opening is measured to be slow will likely result in a pour with excess foam, and container overflow, and that such a pour should therefore be stopped prior to completion. Alternatively, the pour time can simply be reduced to accommodate the expected increase in foam, for example to 90 or 95 percent of the predefined pour time.

Measuring dispenser nozzle opening time also allows for the creation of a functional alarm. The electronics design can allow an error band to be chosen (for example, T+10%, or T+20%, etc.) and a last in-first out (LIFO) average of opening time can also be utilized in order to limit or eliminate erratic alarming.

Because the full open position of the disclosed dispensing nozzle is sensed and encoded into the control electronics, it will be appreciated that the nozzle can be monitored throughout the beverage dispensing period to assure that the nozzle orifice remains fully open, as is critically required to assure a controlled, predictable, and repeatable pour behavior of the beverage. Should the full open signal be lost as the beer pour progresses, the nozzle can be immediately closed ending beer flow, and an alarm function can be activated.

Using the sensing and comparative arrangements described above, it will be understood that the time interval of nozzle flow aperture closing can also be measured and analyzed for correct operation with each dispensing event in order to assure that an understood, desired, and repeatable nozzle closing motion is assured. The means of analysis and alarming in the case of the nozzle closing motion are essentially similar to those for nozzle opening.

The bottom shut-off subsurface filling beverage dispense nozzle is an actuated device. That is, its opening and closing functions are implemented using an actuator to apply motive force to the nozzle operator rod for nozzle opening and closing motions. The actuator may be a pneumatic cylinder operating using the pressurized carbon dioxide available as the beer keg pressurizing gas, and can be of any other suitable type, including linear and rotary electric motors, solenoids, voice coils, permanent magnets, thermal actuators, and the like. Whatever actuator type or form is used, encoding the nozzle motion as described allows continuing monitoring of the status of the actuator. This is done by measuring the time from initiation of an open nozzle drive or start signal applied to the actuator and the loss of the nozzle full close sensor signal. This method measures and characterizes the time required for the actuator to actually induce a defined nozzle motion and this time can be analyzed as previously described. An increase in this time beyond an understood increment can be used to predict excessive actuator wear or imminent actuator failure, thus providing early warning of malfunction or wear of this important beer dispenser component. An excess actuation time can also diagnose nozzle sticking due to a problem with the nozzle actuation rod or plug seal.

As with all function checks, operating analysis, and functions available and implemented in the operation of this invented beer dispenser, the nozzle motion and alarm checks are made with or throughout each dispense event and are logged as accessible data within the nonvolatile memory of the dispenser electronic controller and can be accumulated on a last in-first out (LIFO) basis.

In the generally vertically oriented dispensing nozzle, the entire nozzle lumen is filled (that is hydraulic) with the liquid beverage to be dispensed, including the nozzle barrel (also termed the nozzle tube or shank). Upon opening the bottom sealing nozzle plug of the nozzle, and for purposes of discussion absent any propulsive flow of liquid through the nozzle, the beverage contained within the nozzle will fall out under the influence of gravity. When this occurs, the liquid beverage vacuum cavitates and is then replaced by or exchanged with atmosphere entering into the nozzle lumen up through the beverage flow outlet. In the particular case where the beverage contains a dissolved gas such as carbon dioxide, this gas may contribute to replacing the liquid flowing out of the nozzle due to gravity. This form of flow is herein termed gravimetric flow or gravity flow and the movement or flow of liquid out of the nozzle as described is termed gravimetric fallout or beverage fallout or simply fallout.

In actual operation of the beer dispenser disclosed herein, a propulsive flow of beverage is always available upon beverage dispense nozzle opening. Thus, the key issue in this regard is the relative effects of volumetric and velocity flow rates through and out of the nozzle versus the always present gravimetric fallout phenomenon.

In the dispensing of beverages, and particularly carbonated beverages such as beer, the effect of turbulent liquid flow in the presence of gas bubbles is well understood as being a major cause of uncontrolled and excessive beverage foaming. Some discussion of this and the need to reduce flow velocities and flow turbulence at the nozzle beverage flow outlet has already been presented. Extending this discussion, it can be understood that beverage fallout contributes adversely to gas generation and turbulent beverage flow (and thus foam) during beverage dispensing and is thus to be prevented or minimized. Accordingly, the dispensing nozzle and volumetric flow control device combine to minimize or prevent fallout.

Discussion of fallout of beverage from a bottom shut-off dispensing nozzle can be subdivided into prevention and into minimizing cumulative effects of any occurrence. Opening the nozzle results in immediate flow of beverage out of the nozzle, and the internal nozzle volume is stipulated to be less than the volume of the drink portion being dispensed. Immediate flow largely prevents gas from entering the nozzle, and purging the entire lumen of the nozzle with each dispense cycle can prevent accumulation of any gas in the nozzle, minimizing the effects of dispensing the beverage with gas entrained.

In reviewing the means and methods used to prevent beverage fallout, it is important to return to the concepts of volumetric flow rate and flow velocity. In the illustrated dispenser, beverage volumetric flow rate is the exclusive province of the volumetric flow rate control device. The flow velocity of beverage in the nozzle tube and at the beverage nozzle flow outlet is a function of their relative geometry at a given volumetric flow rate. Thus, at a given nozzle diameter, a velocity must be established within the nozzle barrel which is adequate to eliminate or nearly eliminate gas from traveling up the nozzle tube as liquid flows down the nozzle tube. However, as noted previously, the velocity of beverage flow into the glass at the nozzle tip must be limited to limit foam formation. Thus, two opposing constraints must be accommodated in order to provide a highly controlled flow beer dispenser capable of rapid flow rate dispensing.

In terms of fallout within the nozzle tube, the volumetric flow control device may be defined such that in a nozzle of given internal barrel diameter, the volumetric flow rate is high enough to produce a flow velocity in the nozzle barrel which is fast enough (barrel cross section area dependent) to prevent or largely prevent gas bubbles in the beverage flow or bubbles entering the nozzle from its bottom orifice from rising up into the barrel or remaining in the barrel during dispense flow. By the same criteria, any gas bubbles that do remain in the nozzle lumen at the end of dispensing may be swept out of the nozzle with the next dispense event.

Preventing gravity mediated beverage fallout within the nozzle lumen as described also eliminates or minimizes generation of gas bubbles in the beverage as it flows through the nozzle. This is because a carbonated liquid which remains essentially hydraulic, because atmospheric gas is not entering the nozzle, has fewer nucleation centers from which to generate additional gas bubbles. Even more critically, at a volumetric flow rate adequate to cause a flow velocity in a given diameter nozzle adequate to prevent fallout, there is almost no vacuum cavitation or separation of the flowing liquid. This is important because a differential pressure approaching one bar (atmosphere versus vacuum) causes extreme outgassing of the dissolved gas in a typical carbonated beverage such as beer. This vacuum or low pressure mediated outgassing causes excessive beer foaming in many known beer dispensers, and is essentially eliminated in the present system.

Preventing beverage fallout from the nozzle barrel during dispensing flow would be largely negated in benefit if not also accommodated in terms of flow at the nozzle dispensing orifice (also termed the beverage flow outlet, the point of dispense, and the flow aperture). It can be empirically demonstrated that there is a significant overlap of volumetric flow rates adequate to prevent beverage fallout from the nozzle and flow rates suitable for rapid and controlled dispensing of beer in terms of beverage behavior at the point of dispense.

From the perspective of fallout at the nozzle orifice, because the initial flow aperture is small, flow velocity early on in nozzle opening is relatively high. This has the effect with beer of effectively preventing atmosphere or beer gases from entering the nozzle lumen. As the nozzle opens fully, flow velocity decreases rapidly and dramatically, by design, and a different flow dynamic becomes dominant. Fully open, early flow should bury the nozzle tip below the surface of the beer and so for a brief period beer from the nozzle is flowing into atmosphere or a mixed phase of beer and gas. This is the period of maximum foam generation during the pour and it is where the nozzle lumen is most vulnerable to gas uptake or upflow into the nozzle interior. The flow velocity in the barrel as established by the volumetric flow rate control device prevents such gas inclusion.

As flow continues, the level of beer rises up over and above the nozzle beverage outlet (termed subsurface flow or subsurface filling). At this point, the conically shaped nozzle plug is particularly designed to direct flow out and radially away from the nozzle orifice. This radial flow also directs gas bubbles originating from the beer and from turbulent inclusion of atmosphere away from the nozzle flow orifice, thus significantly reducing the probability of bubbles attempting to enter into the nozzle barrel. During the period of subsurface flow, flow velocities and flow turbulence are minimized as beer flows from the nozzle orifice into a liquid reservoir of beer within the drink vessel.

As the beer pour concludes at the end of a volumetric dose period, flow velocity again increases as the square area of flow from the nozzle orifice decreases with nozzle plug retraction into the nozzle barrel. From the perspective of fallout, these conditions are akin to those found at the beginning of the pour. Higher flow velocities largely prevent atmosphere or beer gases from entering the nozzle lumen even as the velocity of beer flow in the nozzle barrel is rapidly reduced by the closing nozzle orifice. In terms of foam generation, this portion of the pour is also analogous to nozzle opening in that foam is formed and the amount of foam correlates directly with the volumetric flow rate of beverage through the nozzle as established by the volumetric flow rate control device.

Using the described beverage dispenser, it is possible to directly test for, measure, prevent, and predict the presence and magnitude of beverage fallout from the subsurface filling bottom shut-off beverage dispensing nozzle. This capability, in turn, leads to the ability to directly define the minimum allowable volumetric flow rate to be established by the volumetric flow rate control device with a given size beverage dispensing nozzle. Thus, if a nozzle code or sizing description is entered into the electronic controller of the dispenser, a minimum volumetric flow rate value adequate to prevent fallout can be defined either manually or automatically. This uniquely constitutes a minimum safe volumetric flow rate value which will allow satisfactory operation of the dispenser.

In the previous discussion of the classification of dispenser systems, it was disclosed that certain versions of the beverage dispenser operate on a manual basis, where a pour (beer flow) is initiated by an operator and is stopped by an operator. In these manually operated devices, the nature of flow from the beverage outlet of the subsurface filling positive shut-off beverage dispensing nozzle is as previously explained and described. Particularly, the need for complete and rapid nozzle opening and nozzle closing as disclosed is as essential in manually operated dispenser systems as in automatically operated systems. Hence, in manual systems, while the manual flow actuator can have the appearance of the traditional beer handle associated with known beer faucets (as one example), the actual physical action of the beverage nozzle is mechanically or electronically defined to be limited to complete and rapid opening or complete and rapid closing, without operator ability to alter or manipulate or control the nozzle flow aperture to any intermediate position or actuation speed. Thus, as with the automatic versions of this beverage dispenser, the flow and actuation properties and characteristics of the subsurface filling bottom shut-off nozzle can be referred to as digital, where flow is either on or off and the change in state is rapid and defined, and where these properties and characteristics are intentionally and purposefully embodied in the apparatus.

The use in draft beer beverage dispensers of a volumetric liquid flow rate control device in combination with a subsurface filling bottom shut-off dispensing nozzle helps to prevent excessive or uncontrolled or uncontrollable beer foaming which is directly associated with the comparatively rapid (that is, flowing at volumetric flow rates significantly greater than are found in conventional beer dispensers) dispensing of all types of beer. Moreover, the described systems employ a hydraulic beverage flow pathway including these combined elements, which is comparatively simple and can thus be constructed in a way that allows deployment of these systems at an affordable and economically justifiable cost within known draft beer physical and pricing environments.

A volumetric liquid flow rate control device that is suitable for defining, controlling, manipulating, or varying the volumetric flow rate of a carbonated beverage, and particularly draft beer, through a beverage dispenser beverage flow pathway should meet and satisfy an extensive list of attributes and characteristics. However, the most fundamental attribute of such a device is that its volumetric flow rate control action should not cause, directly or indirectly, or the formation of gas bubbles within the beverage flowing through it. To be clear, a bubble free beverage flowing into such a volumetric flow control device should also emerge from or flow out of the device free of bubbles. This requirement is crucial to the functionality of any volumetric flow rate control device to be utilized in described dispenser systems.

Dissolved gases at or near saturation levels in hydraulically confined beer remain in solution (where the body of liquid is relatively bubble free) at typical beer temperatures and pressures unless substantially agitated or subjected to turbulence or reduced in pressure or increased in temperature. Thus, a key attribute of the volumetric liquid flow rate controller is the requirement that over a range of conventional beer dispensing temperatures and pressures it be capable of widely modulating volumetric flow rates without creating any localized or cumulative differential pressure drop sufficient to induce or cause dissolved gases in solution in the beer to leave solution and enter gas phase. This attribute is significant in that most known liquid flow control devices are point control devices where the differential pressure drop required to effect any change in volumetric flow rate is defined by a specific and comparatively abrupt restrictive structure. These point control devices are known to readily cause bubble and foam formation in beer flowing through them, and are best thought of as bubble or foam making devices, rather than as flow controls suitable for no bubble flow control in beer dispensers.

These local point control volumetric flow controls typically create highly turbulent flow at the discharge of the device. Beers and other carbonated beverages are not tolerant of turbulent flow in terms of keeping gas in solution. Thus, a particular attribute of a volumetric flow rate control device is the requirement for low or minimal flow turbulence across a flow control range, both fixed and dynamic, that is sufficient in volumetric flow range to be useful in the controlled and rapid dispensing of beer.

By way of perspective and further characterization of the volumetric liquid flow rate control or controller, it can be stated that, within the range of general volumetric flow rates and other conditions previously discussed, a particular design has a beverage contact or beverage bearing pathway that is no longer than 25 centimeters from point of beverage entry into the device to point of beverage exit from the device. Ideally, the device is capable of modulating these volumetric flow rates at will without causing or inducing the formation of gas bubbles in the beer flowing through it.

In general, hydraulic flow rate control devices typically are not constructed for sanitary operation and easy and thorough cleaning as is required for service in a beverage dispenser. Thus, another particular attribute of a suitable volumetric flow rate control device is that it complies with sanitary design and cleaning standards. An example of these standards are those promulgated in the United States by the National Sanitation Foundation (NSF).

It is also useful to quantify the volumetric flow rate performance required. For example, a volumetric flow rate control device capable of establishing, defining, controlling, and/or regulating volumetric flow over at least a range of 8:1 may be suitable.

Further to quantifying a suitable volumetric flow rate control device for altering or setting a draft beer volumetric flow rate through the draft beer dispenser flow pathway, a device operable inclusive of all noted criteria over a range of 0.75 ounces (approximately 22 milliliters) to 6.0 ounces (approximately 180 milliliters) per second may be suitable. Using such a device in combination with the disclosed beverage nozzle allows the draft beer dispenser to produce a US 20 oz. pour (approximately 600 milliliters) in 3.5 seconds or less with complete control of all liquid flow characteristics and parameters and including an ability to intentionally define the amount of beer foam comprising the head on the poured beer, and including an ability to reproduce the defined pour over and over again.

As noted, volumetric flow rate control devices are typically point control devices, where their structure limits and alters flow as a function of a single point or location of restriction. Orifice plates, needle valves, ball valves, plug valves are all widely used fixed or adjustable flow orifice devices. Each of these devices has in common a fixed location or point of restriction, which serves to entirely define the pressure drop (the differential pressure between the pressure measured at the input and the pressure measured at the output) across the device. With a given flow motive force, this restriction then causes flow at the output to be reduced.

Although widely used, these single point volumetric flow rate control devices have significant limitations, including a high degree of non-linearity of flow versus orifice dimensions, high sensitivity to large flow changes with small orifice changes, a lack of rational and predictable adjustability, comparatively slow response to external control signals, analog response behavior and very poor dynamic range of adjustment, among many others.

Another well known general form of volumetric flow rate control device consists of a restrictive reduced diameter flow tube, having an internal diameter and length selected to create a defined pressure drop at a particular applied flow pressure. These devices, generally referred to as flow limiters, flow restrictors, or flow chokers are inherently not adjustable or controllable within their own structure, and can be thought of as long axis of flow orifice plates. They are typically used as straight tube lengths, but can be coiled or formed into a serpentine shape for use in more compact settings.

Another limitation of known hydraulic volumetric flow rate control devices is their inability to control volumetric flow rates of beer and other gas solvated beverages without causing substantial quantities of gas to leave solution as a function of their use to reduce and control flow rates. Essentially, the very nature of these conventional point control flow rate devices causes their use to generate outgassing in beer (foam) that makes their use unworkable. This is because a pressure change in a gas saturated or gas solvated liquid alters the solubility and saturation curves, which can cause the gas to leave solution and enter the gas phase. Thus, when conventional devices are "turned down" or restricted in their internal flow pathway adequate to create useful and usable volumetric flow rates in a draft beer dispenser, gas entrained flow at the device output is the result. These phenomenon are empirically demonstrable.

The flow control devices described below offer a solution to the volumetric flow control problem in beer dispensing in that a useful range of control is readily provided, free of gas generation as a function of use. This is generally possible because the volumetric liquid flow control devices are integrated multi-point series pressure dropping devices, which limit liquid flow in a manner where each point or node creates a discrete resistance to flow which can be series summed within the discrete device to limit overall flow through the complete element to some desired value. Because each node, by design and intent, only creates a modest and limited pressure drop, it is possible to widely and rapidly vary the flow rate of a carbonated beverage such as beer without causing any gas breakout or in line foam or bubbles whatsoever. This can be empirically demonstrated.

In this regard, it is important to understand that reducing carbonated beverage flow turbulence within the flow pathway of the multi-point or digital series pressure control in order to prevent or reduce foaming in conjunction with beverage flow rate reduction is not a primary purpose of the device. Rather, the shape of each flow rate reducing node is principally for reducing flow. The no foam performance capability of the disclosed device is found in gradual, sequential, step like reduction in flow such that the velocity changes and pressure drops across each node or point are low or moderate enough that gas breakout from solution (foaming) does not occur. This capability exists to a large degree regardless of the node shape, not because of the node shape. That said, refining node shaping to reduce flow turbulence can increase the range of flow reduction possible with a given number of nodes, and, in particular, increase effective volumetric flow rate control range of beer with varying (especially increasing) temperatures.

The described flow control devices also allow digital control structure, rational and predictable behavior, fast response, broad dynamic range of use (bubble free), low or controlled turbulence flow characteristics, and structure amenable to sanitary construction necessary for use in a beverage dispenser. Because each flow restricting node is discrete and can be individually addressed and controlled, the volumetric flow rate control devices herein disclosed are referred to as "digital flow rate controls" or "digital flow rate controllers."

Three volumetric liquid flow control devices used in the beer dispenser are shown in FIGS. 28-36. These devices are intended for use in the beverage flow pathway external from the subsurface filing bottom shut-off beverage dispensing nozzle. FIGS. 31, 32, 35 and 36 depict a manually adjustable flow control version which will serve to explain its basic functions and structure.

Figure 36:
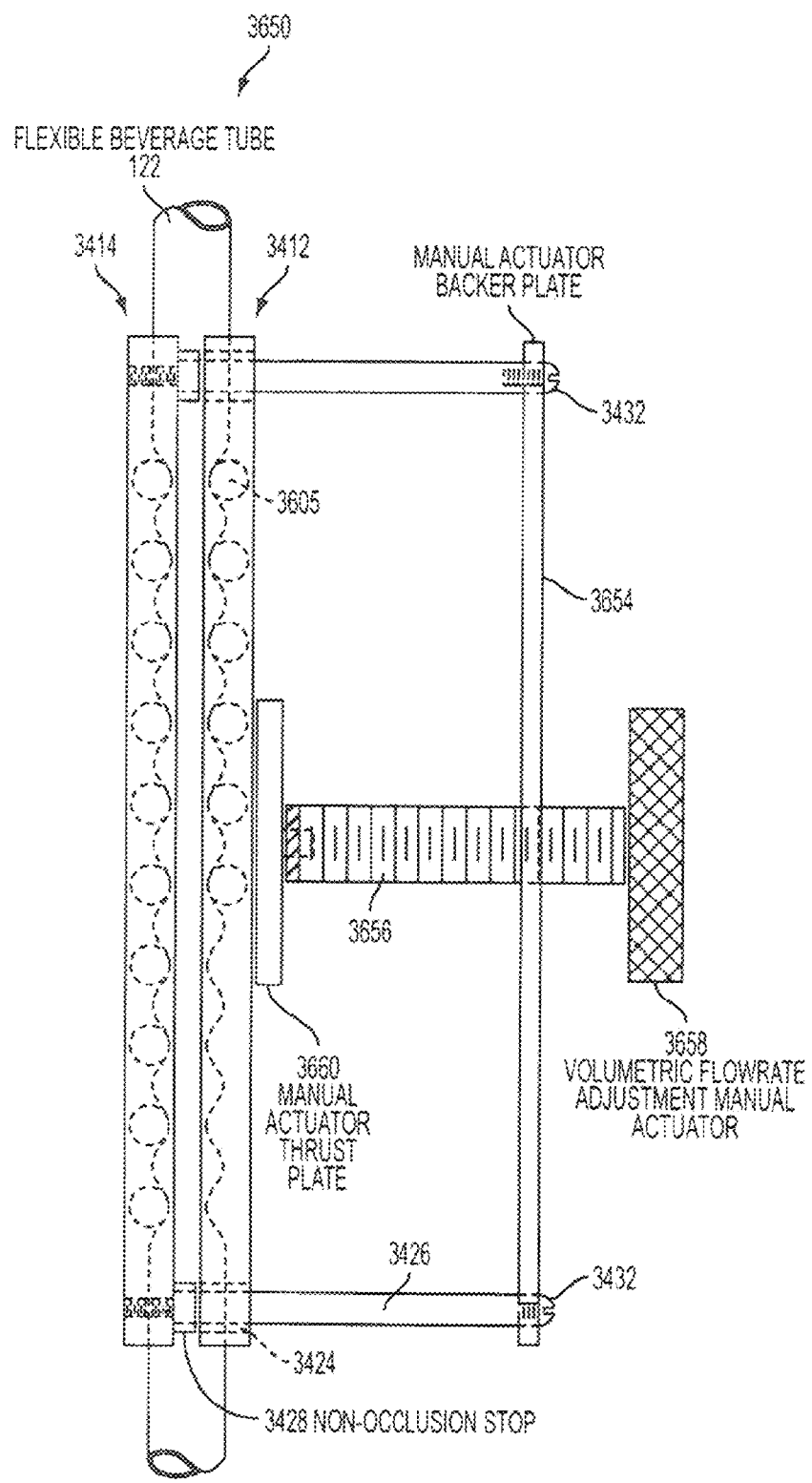
Figure 37:
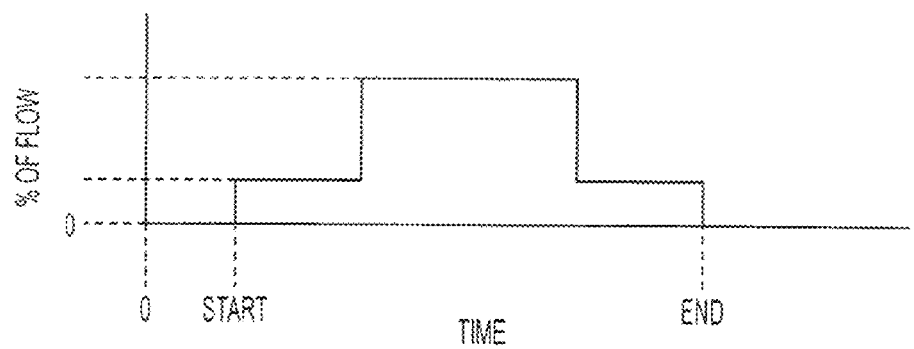
FIGS. 37-40 are digital graphs showing flow action as a function of nozzle motion in accordance with some embodiments of the invention.
Figure 38:
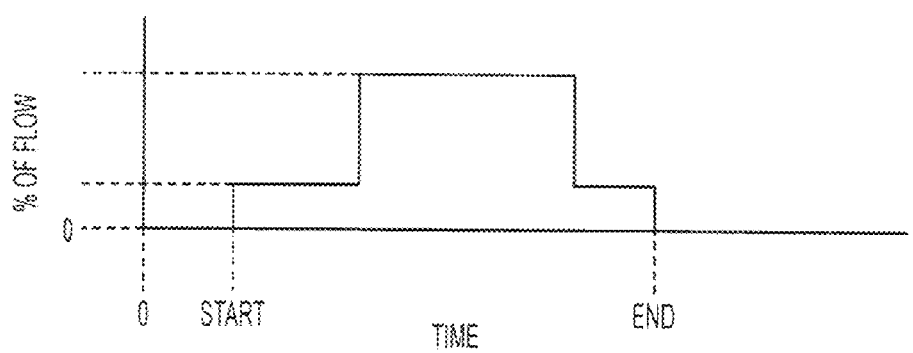
Figure 39:
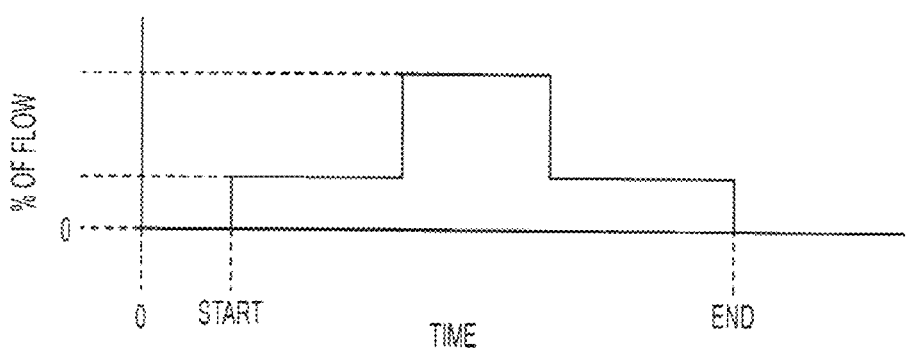
Figure 40:
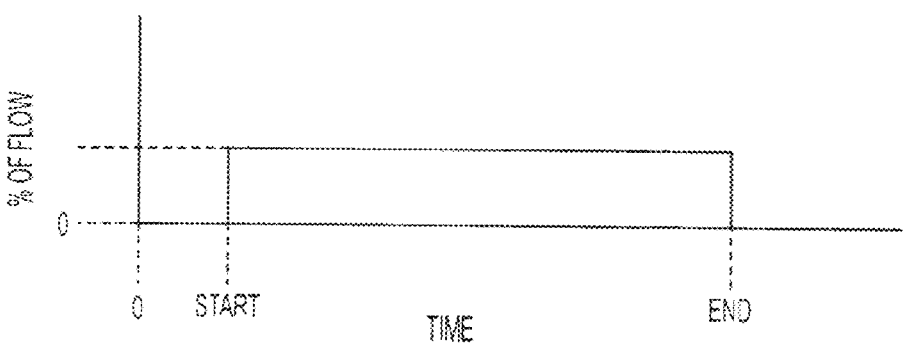

As shown in FIG. 32, beer flow through the device 110 is contained within the flexible beer flow tube 3205, which is a straight run from the input to the output of the unit. This allows a noninvasive sanitary design to be easily embodied. Rigid tube designs are also possible. In FIG. 32, ten flow control nodes 3205 are shown. Each node 3205 serves to partially restrict the volumetric flow of beverage through the device and the nodes sum to create a defined flow at the flow control output. Although there is a large array of control means associated with the device, the most preferred is to alter the flow aperture or gap between adjacent restricting anvils of each node in unison and to essentially the same increment of change. Hence, the manual adjustment knob 3610 shown in FIG. 36 is used to increase or decrease the amount of compression or restriction (occlusion is not permitted by use of four stops as desired, a reduced dimension between adjacent anvils 3605 serving to restrict flow, and an increased dimension serving to increase it. A vernier dial indicator and position reference is preferably provided on the adjustment knob and the actuator backer plate, respectively. Functionally, the adjustment knob 3610 applies force to the actuator thrust plate 3620 which, in turn, distributes this force symmetrically across the node array, as supported by the four support posts 3630 shown.

Figure 33:
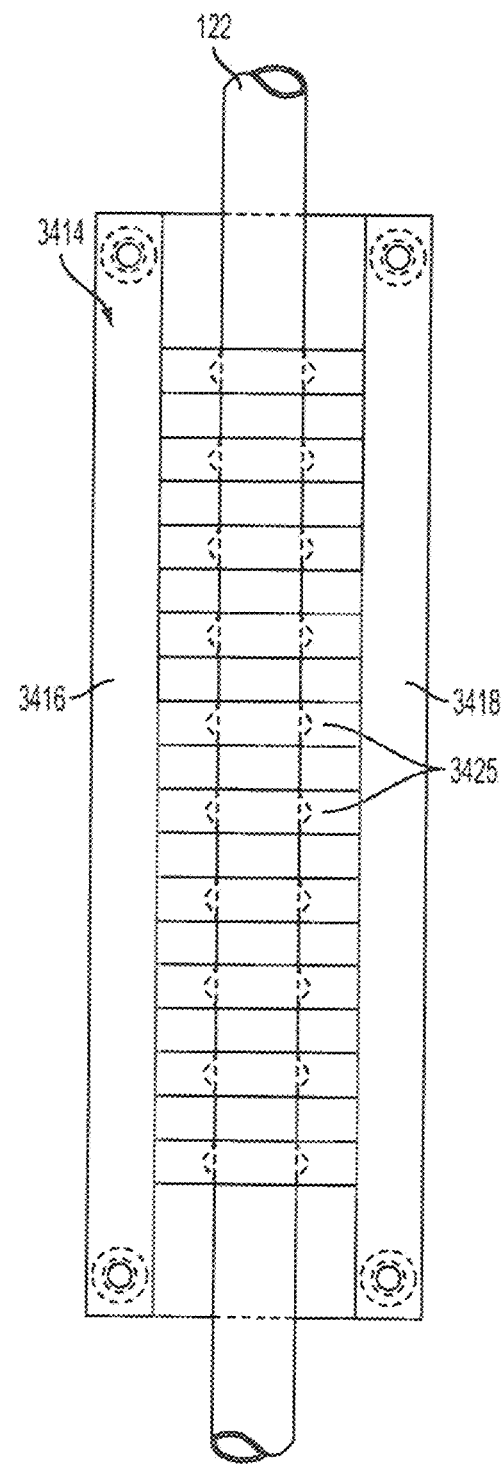
FIGS. 33 and 34 are front and side views of an alternative volumetric liquid flow rate control device that is separate and apart from a shut-off valve and is adjustable during a pour.
Figure 34:
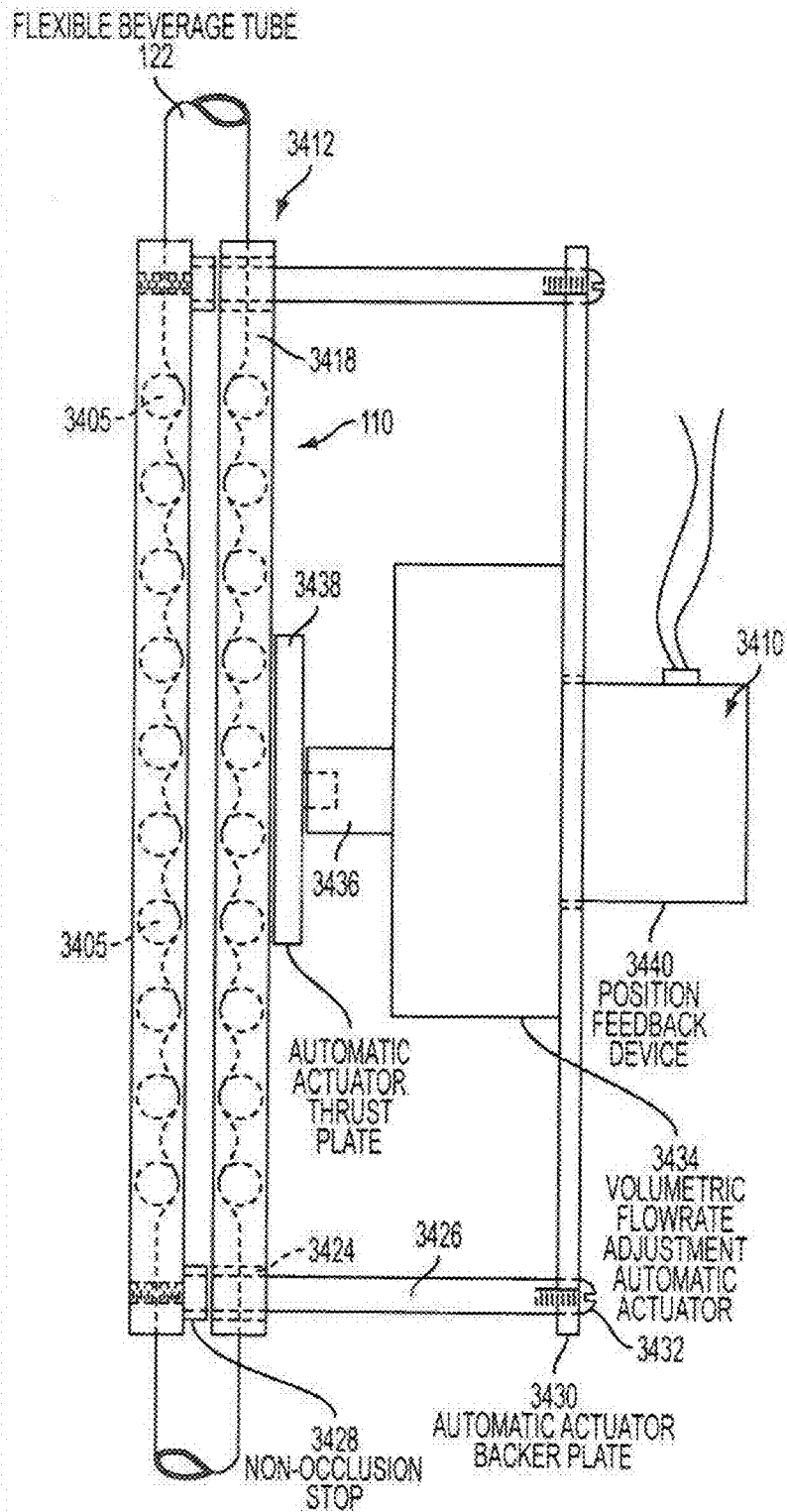

FIGS. 33 and 34 show a flow controller version of the volumetric flow control device 110 that is suitable for automatic adjustment and use in the beer dispenser in a beverage flow pathway location apart from the beverage nozzle. This device is substantially similar to the manual device previously described, but uses an actuator 3410 to allow rapid, precise, and repeatable adjustments to volumetric flow rate under the control of the dispenser electronic controller.

The control device 110 includes first and second ladder assemblies first and second ladder subassemblies 3412, 3414, respectively, which ladder subassemblies are functionally identical. Each of the ladder assemblies has side rails 3416, 3418, and "rungs" in the form of cylindrical rods 3420. The ladder subassemblies are secured to each other for movement towards and away from each other, the ladders at all times bearing on a beverage flow conduit in the form of a resilient compressible tube 122 which will normally return to a shape having a circular cross section when not compressed. While a resilient tube of circular cross section is illustrated, other cross sections may be employed.

The rails 3416, 3418 of the first ladder subassembly 3412 are provided with spaced apart apertures adjacent the end of the rails, which apertures receive bushings 3424. A cylindrical rod 3426 passes through each of the bushings 3424. One end of each of the threaded rods is provided with a screw thread, which threaded end is received in a threaded bore adjacent the ends of the rails 3416, 3418 of the second ladder assembly, the rods being screwed into position until a shoulder on the rod abuts the corresponding rail. A non-occlusion stop 3428 is carried by each of the rods 3426 as can best be seen from FIG. 34, the stop preventing the tube 122 from being occluded when the ladders 3414 and 3416 are moved towards each other.

The rods 3425 when bearing against the tube 122 form a series of flow restrictive nodes in the flow conduit 122. As can be seen from FIG. 34, these nodes are arranged in series and integrated together into a single discrete and adjustable or controllable device.

As can be seen, each integrated flow node is adjustable ranging from a minimum flow orifice setting in the tube 122 to a maximum flow orifice setting. Orifice and aperture are used herein interchangeably to refer to, for example, the cross-sectional area of the tube 122 within the nodal restriction. Thus, in FIG. 34 a control device is shown in which a single actuator acts upon series integrated flow limiting nodes formed from in the flexible tube 122. This device can alter flow very quickly, on the order of less than 50 milliseconds to move from lowest to highest flow or the reverse. To this end, a backer plate 3430 is secured to the rods 3426 by screws 3432. A device 3434 for volumetric flow rate adjustment is carried by the backer plate 3430. The device may be an air cylinder assembly having a piston 3436 which bears on a thrust plate 3438. While a piston is illustrated, other variations of force applying structures include steppers, servos, linear motors, ball screw drives, solenoids thermal actuators, a flat tube type pneumatic actuator, etc. In order to facilitate control of the device 3434 a position feedback device 3440 is provided. Accordingly, all integrated flow nodes are commonly actuated to allow electronically controlled adjustment of the flow rate through the device ranging from a minimum flow setting to a maximum flow setting.

The actuator 3410 ultimately creates a force applied to the thrust plate 3438 in the same manner as previously described. It should be noted also that the motion for gapping the nodes to a more open condition involves reversing the actuator thrust rod with opening force supplied by the elastomeric properties of the beer flow tube 122 and the applied beer pressure within the tube 122. The actuator 3410 may also be position encoded as shown in FIG. 34 to define the flow aperture gap or position of each flow controlling node, the encoder or position sensing being of any known encoder or sensor type. Alternatively, sensor arrays can determine various pre-defined flow rate positions, or mechanical stops can determine two or more desired flow rates.

Figure 35:
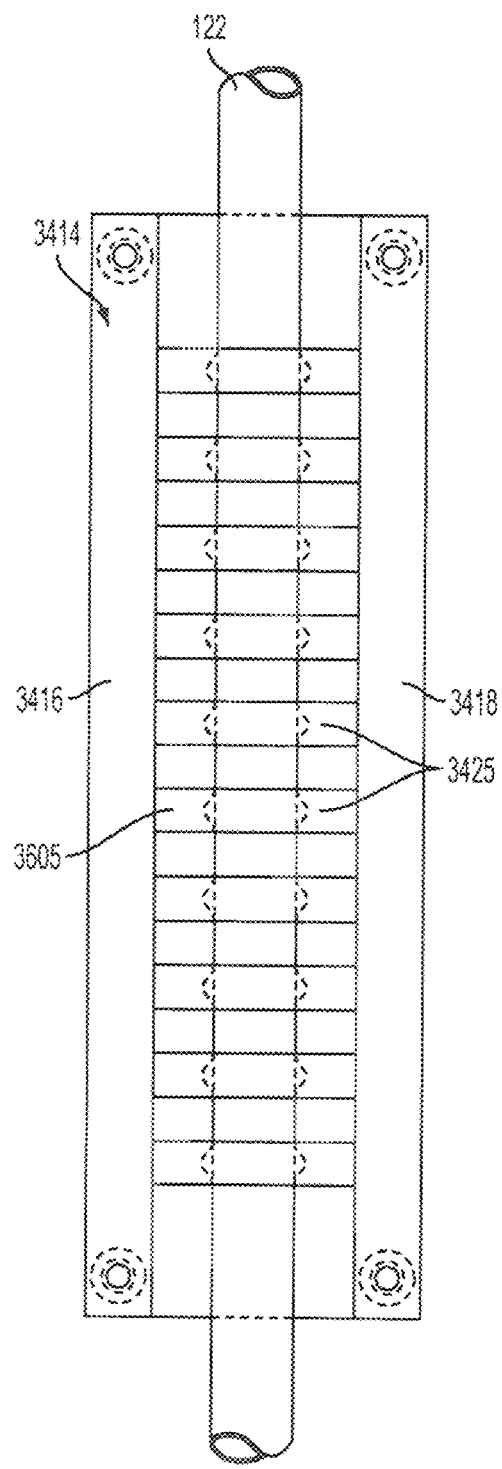
FIGS. 35 and 36 are front and side views of an alternative volumetric liquid flow rate control device that is separate and apart from a shut-off valve and is manually adjustable.

FIGS. 35-36 show another control device that is indicated generally at 3650, in which an adjustment knob allows manual adjustments of all flow limiting node creating elements simultaneously in a non-invasive flexible tube. This device includes the dual ladder construction 3412 and 3414 which have side rails 3416, 3418 and cylindrical rungs 3425 which bear upon a resilient flexible tube 122 which serves as a beverage conduit. As in the device of FIGS. 33-34, the rungs act as flow restrictive elements or node creating elements and their action on the compressible tube 122 can be varied. In the FIGS. 33-34 embodiment, the nodes created by the rungs 3425 was varied by device for flow rate adjustment 3434 which was not manual, but here a manual adjustment is provided. Thus, a manual adjusting apparatus is provided, the manual adjustment apparatus being supported on a backer plate 3654, which like the backer plate 3430 of the FIGS. 33-34 design is supported on rods 3426 which are screwed into the side rails 3416, 3418 of the second ladder-like assembly. The manual adjustment apparatus includes a threaded shaft 3656 which passes through a threaded aperture (no number) in the backer plate 3654. A knurled knob 3658 is secured to one end of the shaft, and a manual actuator thrust plate 3660 is secured to the other. As shown in FIG. 36, rotation of the knob 3658 in one direction will cause the thrust plate to force the rungs together, and rotation of the knob in the other direction will permit the resilient tube to move the rungs away from each other. This flow rate adjustment methodology can be calibrated using a mechanical dial indicator, a mechanically incremented digital shaft position indicator, or by an electronic digital readout ("DRO") or other suitable methods.

FIGS. 31-32 show another embodiment of the control device that is indicated generally at 3170. The digital flow control assembly 3170 includes a plurality of nodes formed in a flexible tube that are controlled by volumetric flow-rate adjustment fasteners. This device has the dual ladder construction 3412 and 3414 with side rails 3416, 3418 and cylindrical rungs 3425 which bear upon a resilient flexible tube 122 that serves as a beverage conduit. The rungs 3425 act as flow restrictive elements or node creating elements and their action on the compressible tube 122 can be varied. The side rails 3416, 3418 of the second ladder assembly is provided with threaded apertures. Studs 3272 are threaded into these apertures until a should abuts against the side of an associated rail. A non-occlusion stop 3428 is carried by each stud 3272 adjacent the rails of the second ladder assembly. A threaded fastener 3274 is carried by a threaded portion 3272.1 of each stud, which fastener bears against the side rails of the other ladder assembly 3412 to move the ladder assembly 3412 towards the resilient flexible tube when turned in one direction. If the fasteners are turned in the other direction, the tube will move the ladder 3412 away from the other ladder assembly, thus varying the nodes formed in the tube.

Figure 82:
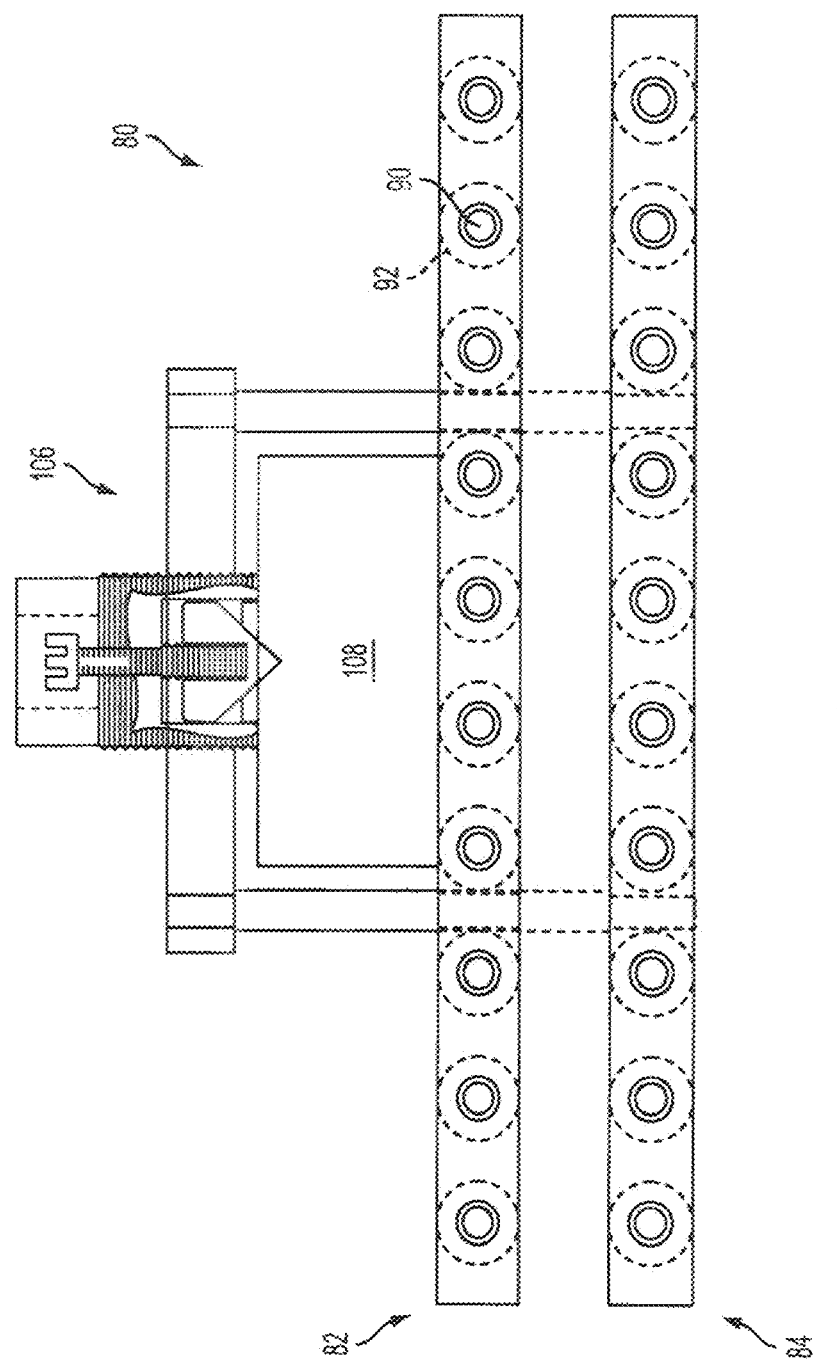
FIGS. 82 and 83 illustrate a common manual actuator that is adjustable during flow.
Figure 83:
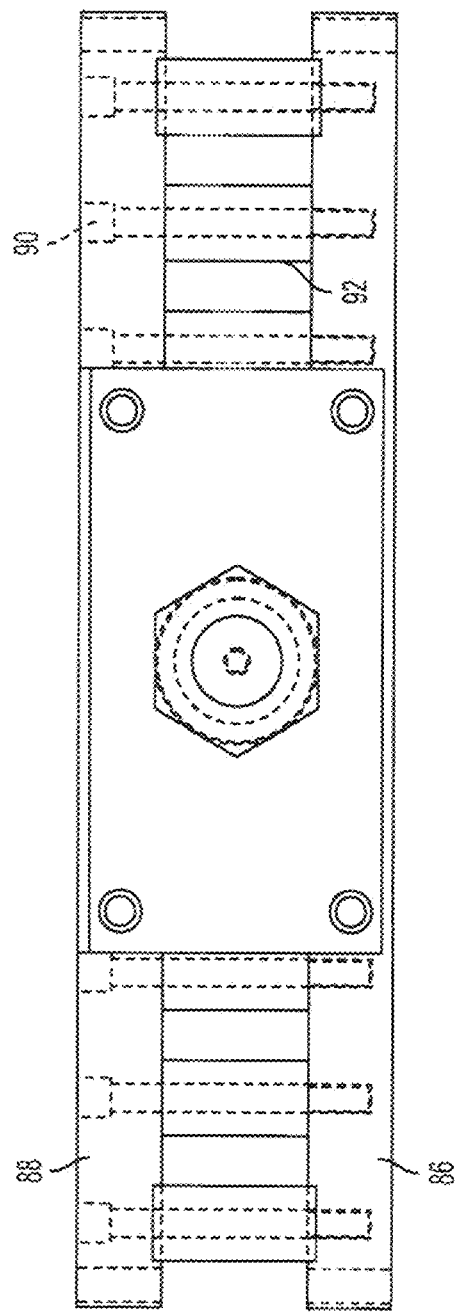
Figure 84:
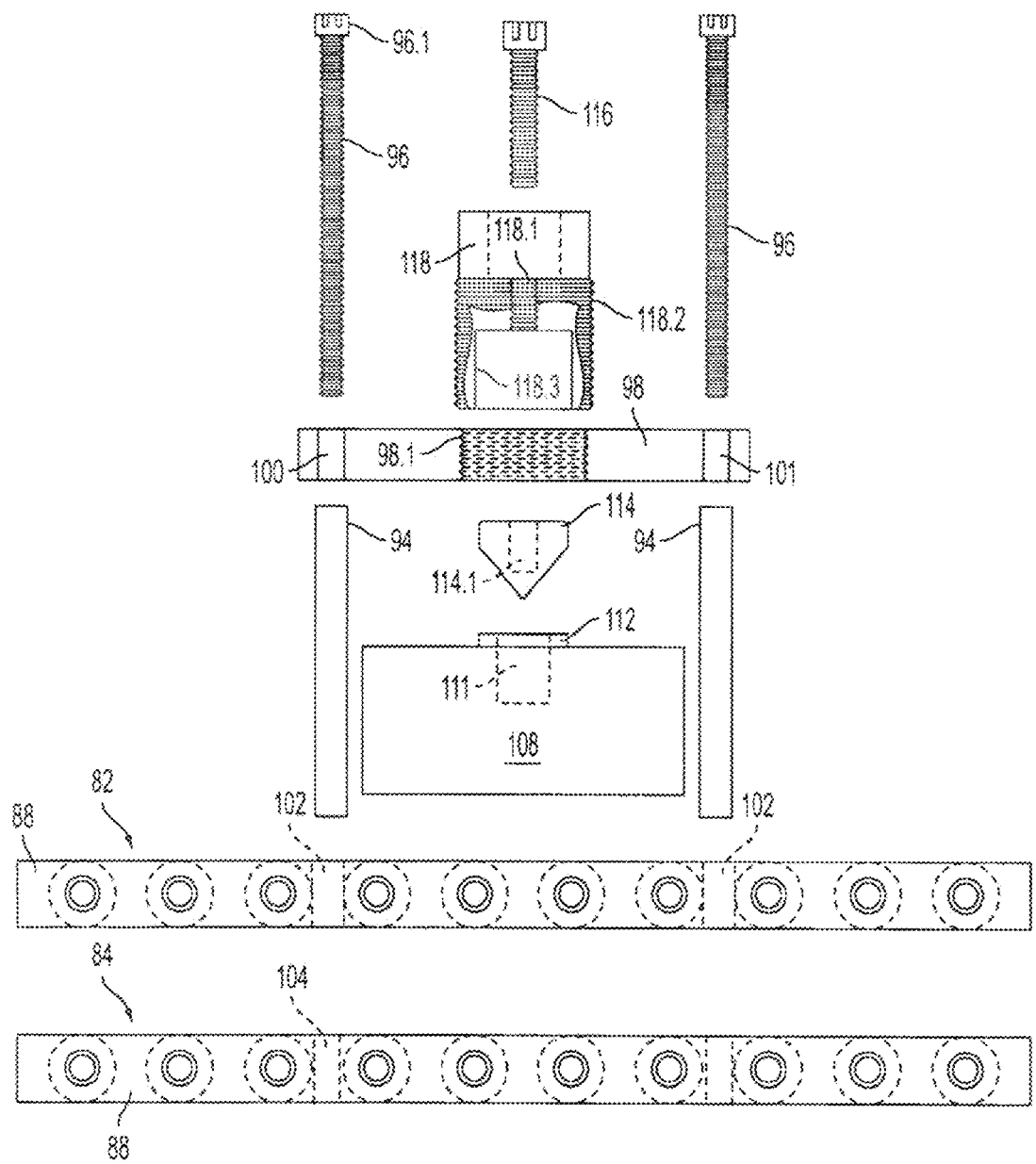
FIG. 84 is an exploded view of FIG. 82.

The implementation shown in FIGS. 82-84 differs from the first three in that it has a different ladder assembly construction, for example. In this design each of the ladder assemblies 82, 84 has side rails 86, 88 which are secured to each other by studs 90 that carried rollers 92. The rails of the ladder assembly 82 are provide with spaced apart apertures (no number), two on each rail, which apertures receive a sleeve 94 and an elongated stud 96. One end of each of the elongated studs is received in a threaded aperture (no number) in the rails of the other ladder assembly 84. The assembly of the various parts can best be appreciated from a comparison of FIGS. 82 and 84. Thus, the elongated studs are passed through apertures 101 in the backer plate 98, through the 94, apertures 102 in the rails 88 and 86 of the first ladder assembly, and are then secured into the threaded apertures 104 in the rails 86 and 88 of the second ladder assembly 84. The head 96.1 of the stud 96 will bear against the backer plate when the parts are assembled. In order to vary the node in the resilient flexible tube (which is not shown in FIGS. 7-9) an adjustment mechanism indicated generally at 106 is provided. The adjustment mechanism includes a thrust block 108 provided with a cylindrical aperture 111 surrounded by a bearing ring in the form of a hardened washer 112. A conical bearing member 114 having a cylindrical aperture 114.1 on the surface opposed from the conical surface. A threaded stud 116 bears against the bottom of the aperture 114.1 when the parts are assembled, the stud 116 being threaded through a threaded aperture 118.1 in a special adjustment nut 118, a threaded portion 118.2 of the nut is adjustably received in a threaded aperture 98.1 in backer plate 98. The conical bearing member 114 is received in a cylindrical recess 118.3 of the nut.

When the parts are assembled as shown in FIG. 82, a single common actuator and a separate micrometer-like adjustments for minimum (low) flow and maximum (high) flow can readily be achieved, both adjustments being designed to be conveniently placed in a common location and in close proximity to one another. In particular, the minimum flow rate and the maximum flow rate adjustments do not interact. In other words, adjusting one does not affect or alter the other setting.

First considering adjustment for the maximum flow rate, as illustrated in FIG. 84, threaded nut 118 is screwed in or out of its threaded engagement with plate 98 and is brought to bear rotatably against the top of the actuator 108. The nut 118 has an internal bore 118.3 sufficient to circumferentially clear the actuator rod 112. The opposite side of the actuator away from the rod bears directly against the actuator side flow node anvil array. Thus, as the threaded nut 118 is screwed farther toward and against the actuator 108, the flow node anvils are forced closer together thus further compressing the flexible flow tube 112, restricting flow. The reverse rotation has the opposite result. Accordingly, in the case of maximum flow, the actuator 108 serves only as a physical spacer for engagement of compressive force from nut 118 to the flow nodes. The actuator rod 112 is kept substantially centered geometrically within the four support posts 98 by its position within the closed fitting inside bore 118.3 of nut 118, the rod extending beyond the actuator body under all conditions of assembly and operation. As a result of this arrangement, the force exerted by nut 118 is exerted symmetrically upon the ladder-like array of flow nodes. The adjustment of the flow controller for maximum flow, as described, is typically completed prior to adjustment for minimum flow (also terminable as high flow and low flow).

The high flow nut 118 may also by provided with a vernier or dial indicator (mechanical or electronic) so that rotation and positioning of the nut results in a definite location indicator. The indicator allows for simple high flow rate calibration of the flow controller within its own structure, and also the ability to return directly to a desired flow node aperture setting as desired. A particular indicator for use in this system is a hollow shaft dial readout device that can be engaged to the nut 118 and to the thrust plate 98. The readout of this device can be mechanical and rotary dial calibrated, mechanical with a digital number display, or electronic where a numerical location is electronically displayed. The resolution of adjustment of the high flow setpoint can be directly controlled over a broad range as a function of the thread pitch used to engage with the thrust plate 98.

In addition, the shape of the high flow engagement nut 118 can be widely varied as can its means for rotation. For example, it can be provided with an operating knob or grip, outside diameter wrench flats, rotating bar holes and the like, and it can also be automatically positioned by belt, friction, or gear engagement with a rotary motion actuator of any suitable type.

Independent adjustment of the low flow setting is controlled using bolt 116, which can be of any suitable type with a knob end, a hex head, a socket head, and the like, and can have any thread pitch as a function of position resolution required. In many cases, this bolt is contained partially in a recess 118.1 in the top of nut 118 (see FIGS. 82 and 84). This allows a compact assembly where space is an issue. The bolt 116 may also be fitted to a second position readout, generally as described for the high flow adjustment, thus allowing the flow rate calibration and setpoint definition within the device's structure.

The threaded end of bolt 116 is lockably engaged with centering cone 114, which can be fashioned form any suitable material such as a metal or plastic. As bolt 116 is rotated or moved toward the actuator, the centering cone 114 engages into a bore in the actuator operating rod, causing thrust from the actuator to be applied symmetrically to the thrust plate 98 and thus via posts 94 to the flow control nodes. Thrust is applied in this operating example by applying compressed air or other suitable gas to the non-rod side of the piston via a suitable fitting and pneumatic line. When this occurs, the piston within the pneumatic cylinder and its connected rod is forced against the centering cone, forcing the entire body away from engagement with the face of nut 118, thus acting upon the actuator side of the flow node anvils 102 causing them to move toward the opposed array 104, this reducing the dimensions of the flow apertures within the flow conduit 112. This reduces flow to a second and defined flow rate. It is typically the body of the pneumatic actuator that moves toward the flow conduit causing flow node compression, rather than the usual motion of the piston rod that is, in this instance, firmly forced against the immovable centering cone 114. Thus, the extent of the compression motion and thus the flow rate of flow at the low flow setting is determined by the cylinder piston reaching the end of its travel within the actuator as a result of the motion of the actuator cylinder. This dimension of motion is, in turn, determined by the low flow adjustment screw 116 as it forces the piston farther from its end of travel limit or allows it to be closer thereto, thus defining the usable stroke of the actuator. The total possible actuator stroke is selected to be sufficient to allow the range of adjustment desired, which is typically the full range from fully closed flow apertures at all flow nodes, to fully open flow.

With regard to the volumetric flow rate control and controller depicted in FIGS. 31-36, it is also noted that the Laval Nozzle shaping of each flow node and the interval of spacing of one node to the next and the number of nodes used are all significant to the no gas breakout flow control performance of the device with beer.

In particular, the multimodal flow controller or compensator is a device that generates a desirable and substantially repeatable head loss within the fluid flow conduit. The head loss creation, or fluid flow restriction, is the rate defining head loss component in the entire system and allows for robust system balancing, or compensation, over a wide spectrum of application parameters in the beverage dispenser system. All other contributors of head loss are substantially smaller in magnitude than the head loss through the multimodal flow compensator.

For carbonated beverage applications, such as beer, it is ideal to achieve head loss in a smooth distributed manner so as not to induce gas breakout during fluid flow. The multimodal flow compensator does this by distributed nodes (e.g., nodes 3405 in FIG. 34) that each represent a small differential producer with subsequent downstream fluid flow detachments and associated highly turbulent recirculation zones. In particular, the presence of form drag associated with each node causes the fluid passing over the node to separate and form a wake or recirculation zone which is marked by a decreased static pressure in the flow field as well as a head loss.

Figure 85:
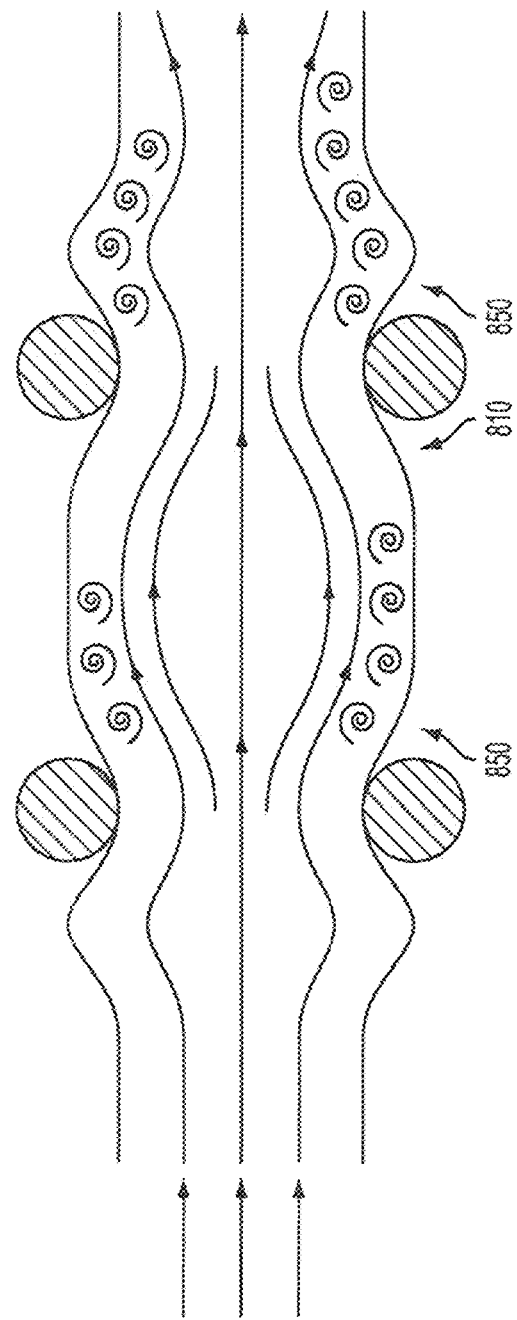
FIG. 85 is a schematic representation of flow of fluid through a volumetric flow control device.

Indeed, as represented in FIG. 85, as the fluid passes over each node, the form drag caused by the nodes causes the fluid to separate and form wakes or recirculation zones (denoted by 850) downstream of the nodes in the flow pathway. In an optimized implementation, the recirculation zones would diminish prior to the next set of nodes such that the flow would reattach before entering the next node set. This low pressure zone downstream of the node results in a net drag force as the stagnation pressure upstream of the node has been unchanged. Thus, the serially-integrated discreet nodes create fluid separation and thus a net drag force, via form drag, or more correctly a head loss creation. Head loss thus becomes the compensation or balancing of the beverage dispensing system.

As the nodes are moved closer together there is a spacing where the flow rate increases, i.e., the head loss or fluid restriction decreases. This is due to the fact that the vena contracts of the first node passes directly through the contraction of the second node, and so forth with subsequent nodes. If the nodes are placed too closely together, the result is that the fluid recirculation zones are removed, as the flow separation is not achieved. This results in a substantially reduced head loss, as well as the ability to achieve the desired flow compensation within the system.

The geometry and spacing of the nodes may be critical in that the multi-nodal flow compensator relies on the flow separation and associated recirculation zones immediately downstream of each node. The recirculation zone flow structures created are achieved by utilizing a plurality of nodes as the size of the recirculation zone is defined by the nodal spacing. Sufficient nodal spacing ensures that the detached fluid flow within the recirculation zones can sufficiently reattach before encountering the subsequent nodal flow restriction.

Further characterizations can be made of the flow rate controls and flow rate controllers shown in FIGS. 31-36, as these are intended for use in the beverage flow pathway external from the subsurface filling bottom shut-off beverage dispensing nozzle. These devices can also be characterized as having an internal flow diameter as measured at the flow input or output that, in ratio to the length of its liquid flow pathway, has a ratio that does not exceed 20:1. By way of comparison of the bubble-free flow reducing efficacy of the disclosed flow control structures, a reduced diameter tube, often used for the purpose of restricting beer flow and thus reducing the volumetric flow rate of the beer to a traditional beer faucet, would require a ratio of overall flow length to internal flow diameter ranging from 60:1 to 160:1 at typical beer keg pressures and temperatures.

These ratio comparisons clearly show the much enhanced efficacy of the disclosed flow control and flow controller over previously known beer flow restricting tubes or other restricting flow path geometries. In practical terms, all of the versions of the flow controls and flow controllers for use external to the nozzle can effect a bubble-free volumetric flow rate reduction of at least 8:1 with beer (at customary keg pressures and temperatures) in a 20:1 ratio device where the actual overall length of the beer flow pathway of the flow rate control device is 20 centimeters or less. This is in contrast to a length of reduced diameter flow tubing which, to effect the same bubble-free volumetric flow rate reduction under the same conditions, could typically range in overall beer flow pathway length of 70 centimeters to 100 centimeters or more.

Figure 29:
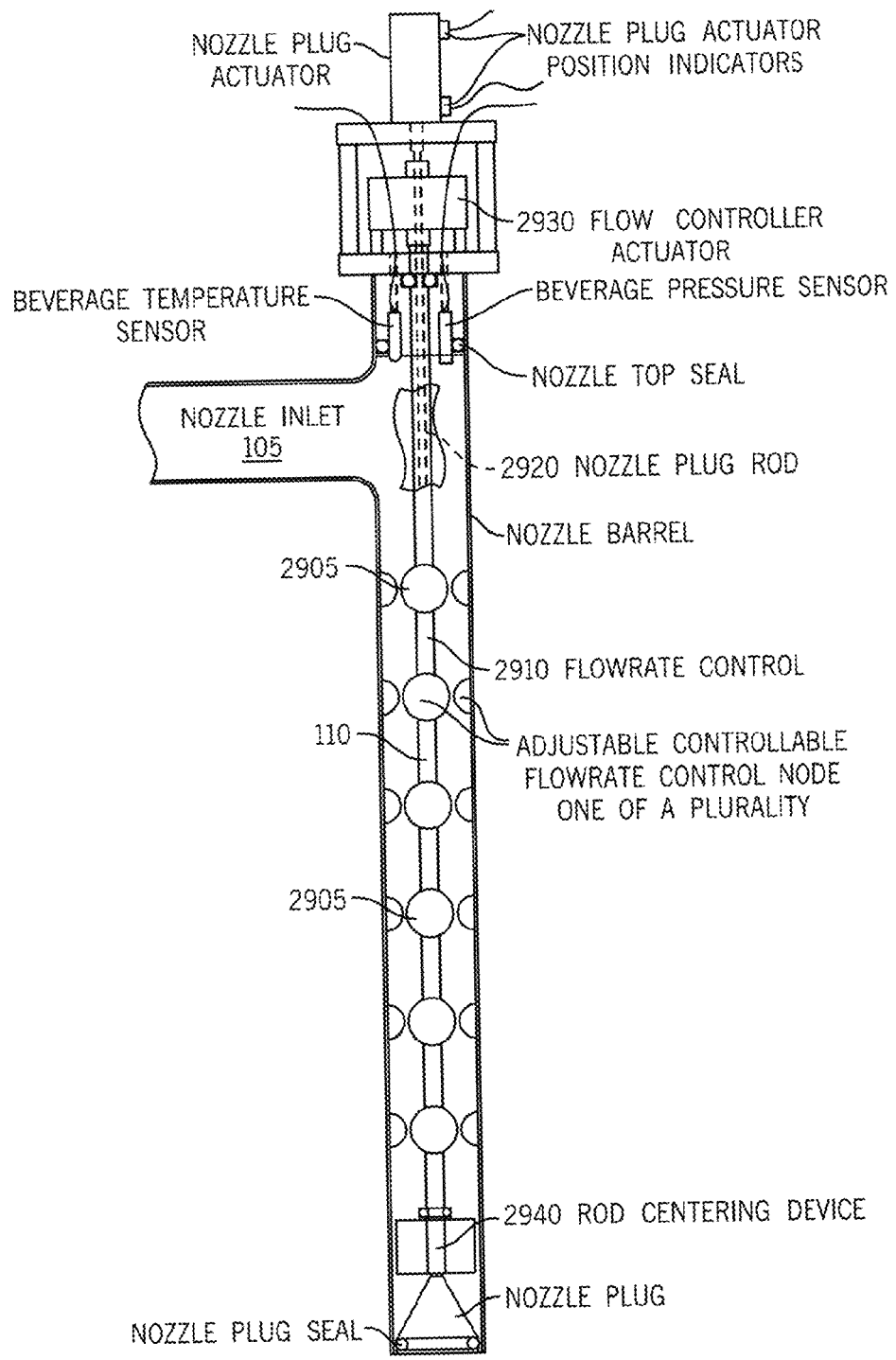
FIG. 29 is a schematic representation of a volumetric liquid flow rate controller integrated into a subsurface bottom shut-off beverage dispensing nozzle.
Figure 30:
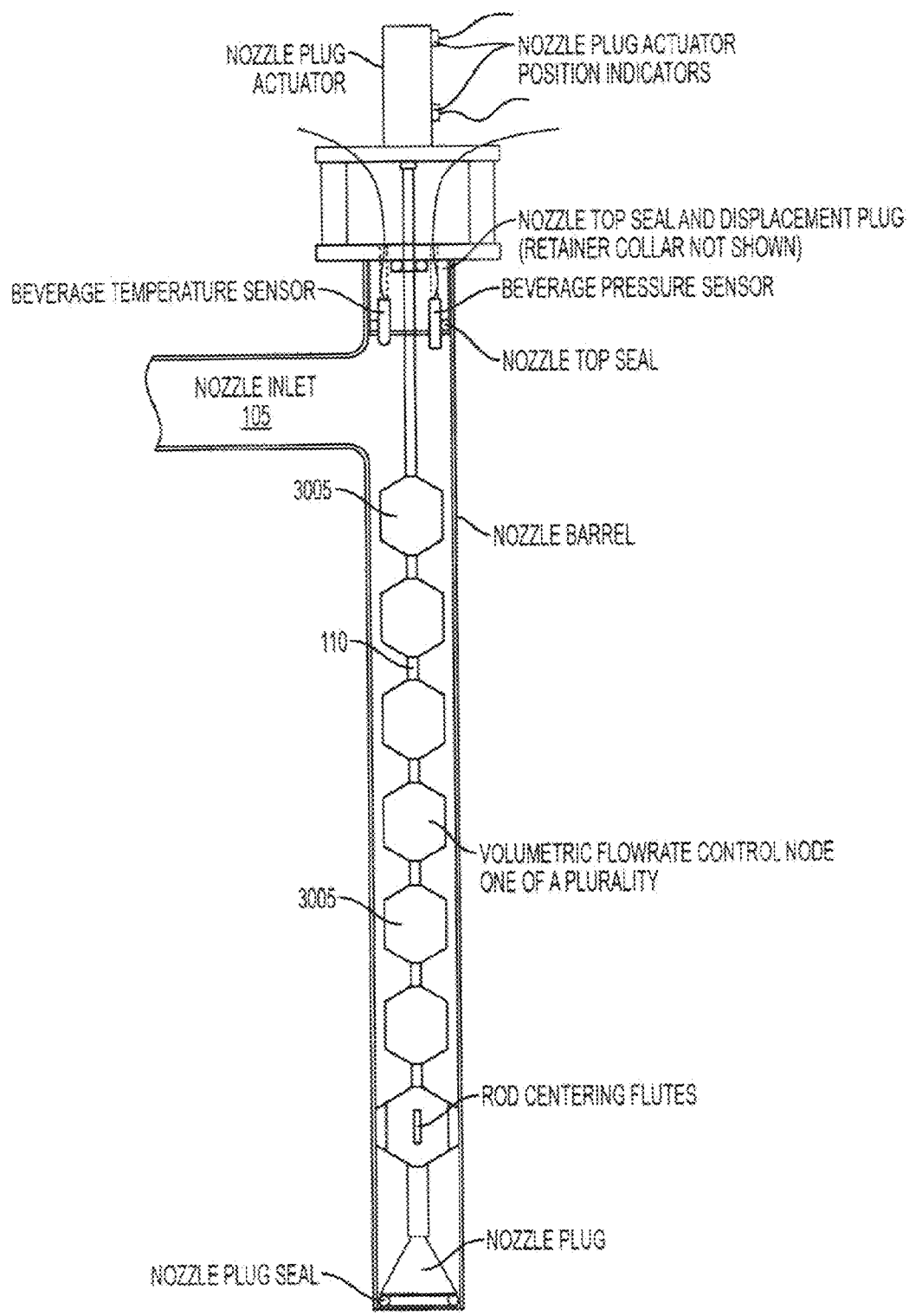
FIG. 30 is a schematic representation of an alternative volumetric liquid flow rate controller integrated into a subsurface bottom shut-off beverage dispensing nozzle.

FIGS. 29 and 30 depict adaptations of rigid structure versions of the series node volumetric flow control devices 110. These figures are somewhat schematic in nature but exactly adequately convey the essential elements of the designs. FIG. 30 depicts a passive flow control adapted for service inside of the barrel of the subsurface filling bottom shut-off beverage dispensing nozzle 105. As depicted in FIG. 30, this barrel lumen is typically hollow where a volumetric flow rate control or controller 110 is used external to the dispensing nozzle. In this beer dispenser embodiment, this available space is simply used to good advantage to house the volumetric flow rate controller 110 as shown in FIG. 30. Thus, a typical nozzle assembly is shown generally in cross section with the barrel, shut-off valve or nozzle plug operator rod, and the shut-off valve or nozzle plug. Fitted coaxially to the nozzle rod are a series of discrete volumetric flow rate reducing, restricting, and limiting nodes 3005 which may be discrete and stackable or embodied as a single part. When stackable, spacers may be used to define the relative spacing of the nodes. Each node 3005, while highly variable in possible shapes, is shown as a roughly diamond shape in cross section with a flatted portion in relative proximity to the nozzle barrel interior wall. The barrel is circular in cross section as is the cross section of each volumetric flow rate control node. Thus, the interval between the circumference of the node and the nozzle barrel inner wall defines a flow controlling node which can sum with all of the other nodes in the barrel to limit volumetric flow to define a volumetric rate of flow through the nozzle. Thus the theory of operation of this version of the flow control is essentially the same as with the externally located devices. As shown, the gap between the barrel and the flow control nodes is the same in each case, but can be varied one to the next. The number of nodes and their precise shape and spacing one to the next are significant to efficacy and can be varied widely to alter the performance range and capabilities of the dispenser.

In operation, when the nozzle is opened to flow by the actuator, the array of volumetric flow rate controlling nodes moves coaxially with the operator rod and plug, and flow of beer ensues circumferentially around the circumference of each node, with each node contributing to establish a desired and intended volumetric flow rate of beer through the nozzle barrel. The flow rate controlling node nearest to the beverage outlet of the nozzle can be provided with three or more flutes intended to maintain the coaxial centering of the nozzle lumen flow controlling nodes and the nozzle plug.

The nozzle shown in FIG. 29 schematically depicts a flow controller 110 capable of dynamically varying the volumetric flow rate of beer through a subsurface filling bottom shut-off beverage dispensing nozzle 105, the control being possible without causing gas bubbles to form in the flow stream. The theory and means of operation are the same as discussed regarding the volumetric flow rate controller shown for use outside of the nozzle.

In operation, two coaxial operating rods, one for providing separate motion and control of the nozzle plug or shut-off valve 2920, and one for providing separate motion and control of the volumetric flow control nodes 2910 respectively. The larger outer rod 2910 is connected to the flow control actuator 2930 shown, which can be of any suitable type as previously discussed. Its motion is independent of nozzle flow as allowed by the nozzle plug operator rod 2920, as previously described. As in the fixed volumetric flow rate version, centering flutes 2940 can be fitted to the last in series flow node for centering purposes.

The flow controller actuator 2930 acts in a linear motion to alter the spacing between each rod mounted flow control half node and its respective circumferentially positioned half node. Together, each comprises a node 2905, the flow aperture of which can be adjusted as shown.

Positioning and integrating a digital volumetric flow rate control or controller into the barrel of the beverage dispensing nozzle as shown in FIGS. 29 and 30 displaces a significant volume of the lumen of the nozzle barrel, often exceeding fifty percent. This, in turn, means that the volume of beer in the nozzle that can increase in temperature between pours is substantially reduced when compared to the volume of beer held in a closed dispensing nozzle with only a plug operator rod in its lumen. Thus, with an ensuing beer pour after a substantial period of dispenser inactivity, the relative fractional volume of beer in the beer serving vessel that originated from the nozzle lumen is reduced, with the remaining volume coming from the colder upstream portion of the beer flow pathway. Thus, the net temperature of the beer pour after a dispense event following the period of inactivity is lower than a comparable case with a fully open nozzle lumen. This is a favorable attribute of the in-nozzle flow control device structure in terms of the effects of beer temperature on the characteristics of the beer pour.

In addition to the volumetric flow rate control and controller devices disclosed, other forms of flow controls may also be usable. Thus, for example, a section or length of rigid or flexible tubing installed anywhere in the beer flow pathway having a significantly reduced diameter from the primary or main beer flow supply conduit will restrict, reduce, and limit the flow of beer available to a subsurface filling bottom shut-off beverage dispensing nozzle. The use of such restrictive or flexible tubes to reduce the volumetric flow rate of beer available to a traditional beer faucet is relatively common practice in known draft beer dispenser systems, where the reduced diameter tube is often referred to as a "choker".

Moving from a discussion of the physical embodiment and performance requirements of a suitable for use liquid volumetric flow rate control device, the basic use and functionality of a flow control and a flow controller version in establishing and defining and controlling draft beer pour characteristics will now be disclosed. Further on, using the volumetric flow rate control device to alter and control beer pour parameters with changing conditions such as temperature and flow pressure will be reviewed.

Suitable volumetric flow rate control devices can be subdivided into two types, one of which offers a defined rate of volumetric flow based on manual adjustment of the device, and is referred to as a volumetric flow rate control, and another of which is termed a volumetric flow rate controller, and can be automatically altered or adjusted and offers more than one rate of volumetric flow without manual readjustment.

From the perspective of use and action during a beer pour from the dispenser, either the flow control or flow controller may be used to establish a volumetric flow rate prior to the start of a pour which is maintained for the entire duration of the pour. The flow controller may also be used to establish a particular volumetric flow rate prior to a pour, and then to alter this pre-pour defined flow rate to establish one or more additional volumetric flow rates during the pour time.

Regardless of whether a passive flow control or an active flow controller is used, or whether volumetric flow rates are changed or altered during a pour time, the initial volumetric flow rate that first can be measured at the beverage nozzle outlet is defined by the particular type of volumetric flow rate control device prior to the opening of the beverage dispensing nozzle, and thus prior to any beer flow through the dispenser beverage flow pathway and into the serving vessel. Further, in the case of the use of a volumetric flow rate controller, its adjustment prior to a dispense event to define a particular and desired volumetric flow rate at the start of a pour does not affect or alter the static system or rack hydraulic pressure of the beverage in any measurable or intended or significant way.

In the instance where a flow control or a flow controller having the attributes herein noted is used to define a single and fixed volumetric flow rate of beverage during the beverage dispense pour time, and is not subsequently adjusted, it can be empirically demonstrated that at a given beer temperature and beer keg or rack pressure, a 600 milliliter dose of a test liquid such as water is repeatable at least to within plus or minus two percent of the beverage dose mean as defined by the dose data sample group. Further, it can be empirically demonstrated that this repeatability within a test sample data group is possible over long time periods such as days, weeks, or months without a requirement to adjust the volumetric flow rate control device.

In the instance where a flow controller of the type delineated by this specification is used to define two or more volumetric flow rates of beverage during the beverage dispense dose time, it can be empirically shown that at a given beer temperature and beer keg or rack pressure, a 600 milliliter portion of a test liquid such as water is repeatable at least to within plus or minus two and one half percent of the beverage portion mean as defined by the dose data sample group, and that such repeatability within a given test sample data group is stable over periods similar to those for the volumetric flow control.

As earlier noted, a volumetric flow rate controller can alter volumetric flow rates of beer into a serving container from pour event to pour event, or the flow rate of beer during a given pour can be altered as needed or desired. Both modes of operation, when used with the disclosed subsurface filling bottom shut-off nozzle, allow rapid pours of beer with a prescribed and desired and repeatable amount of foam formed on top of the beer.

In the case of a single fixed volumetric flow rate throughout the beer pour which can be established using either an active flow controller or a passive flow control, flow begins with the nozzle placed at or near the bottom of the beer glass (here synonymous with all other serving container types), and the opening of the nozzle in the particular manner previously described. Beer flow ensues immediately with nozzle opening and its flow results in the formation of a definite and relatively limited amount of foam, which can be observed to be determined principally by nozzle size and the volumetric flow rate of beer as established by the volumetric flow rate control, and to diminish sharply in rate of formation as the level of beer flowing into the glass reaches and then rises above the flow aperture of the nozzle. As beer flow continues, constituting most of the delivered volume of beer defined to be the pour (typically 90 percent or more), very little additional foam is formed in the beer since the beer flowing out of the nozzle flow outlet is largely free of bubbles, and the flow turbulence induced by nozzle outlet flow is at comparatively low velocity and widely dispersed away from the entire circumference of the nozzle and is occurring on a subsurface basis such that no atmospheric gases are churned or folded into the beer. In fact, under these conditions the rising surface of the beer can be seen to typically be essentially still. At the end of the pour period, the desired portion of beer has been dispensed and the nozzle is rapidly and completely closed as previously detailed. The nozzle remains at or near the bottom of the beer glass throughout the pour, and as it closes a definite and short duration flash of foam is observed. This quantity of foam is directly associated with closing of the nozzle as previously explained and, with a given set of nozzle motion parameters, can be empirically demonstrated to vary directly as a function of the volumetric flow rate of beer from the nozzle at closing, such that the higher the volumetric flow rate allowed at nozzle closing, the greater the amount of foam formed.

This mode of pour is described here in this detail because it allows a clear understanding that three separate events cause three separate quanta of foam to be formed and defined, each of which is highly quantifiable and repeatable from pour to pour to define the total amount of foam formed on the beer poured.

With this single volumetric flow rate pour method, the height of a foam layer or cap formed on top of a given beer under stable conditions of temperature and keg pressure can be empirically shown to be highly repeatable such that one beer will look essentially the same as the next. This high degree of repeatability is greatest when dispensed volume is automatically defined, but even in a manual dispense mode, the amount of foam generated is highly repeatable thanks to the digital open-close motion of the beverage nozzle.

With this single volumetric flow rate pour method detailed here, the amount of foam to be generated on top of the beer at the end of the pour can be directly controlled. This is done by simply adjusting the volumetric liquid flow rate control or controller, thus altering the volumetric flow rate of beer flowing from the beverage nozzle outlet such that higher flows give more foam, while lower flows give less foam.

To help to quantify the direct correlation between foam formation and volumetric rate of dispense flow in this invented beer dispenser, it can be shown that, with a typical United States or European lager, a US 20 oz. beer (approximately 600 milliliters) can be dispensed into virtually any shape beer glass in six seconds with the generation of a foam head insufficient to completely cover the top surface of the beer at the end of the pour. Further, progressively greater amounts of foam can be generated as desired as volumetric flow rates are increased until, by example, a foam head equivalent to one centimeter is achieved repeatably on the surface of the beer at a dispense time of on the order of 4.5 seconds. By way of comparison, a typical US 20 oz. pour of a draft lager from a conventional tap typically takes anywhere from 12 to 20 seconds and the foam head is not defined or definable from beer to beer by any known means. Thus, with a pour based upon a single volumetric flow rate, the task is completed two to three times as fast, even at a volumetric flow rate that is relatively slow for this invented beer dispenser.

In the case where the volumetric flow rate of beer during a pour is varied or variable through the use of a suitable volumetric flow rate controller, a more sophisticated dispensing methodology using the combination of a volumetric flow rate controller and a subsurface bottom shut-off beverage dispensing nozzle allows further dispensing performance improvements and enhancements.

The use of a volumetric flow rate controller allows the volumetric flow rate, as measured at the beverage nozzle outlet, to be varied, profiled, or subdivided. FIGS. 37-40 illustrate the effects of this volumetric flow rate variability capability. Essentially, many different flow rates can be achieved during a beer pour, but as a practical matter typically only two or three are necessary to optimize the characteristics of a beer pour to achieve a fast, highly controlled and repeatable result with any desired amount of foam.

The manner of flow rate change during a beer pour effected by the volumetric flow rate controller is referred to as flow partitioning, in recognition that flows are altered at a rapid rate resulting in clear boundaries between successive selected volumetric flow rates.

In operation, with a flow controller being used to define volumetric flow rates measured at the beverage nozzle outlet, a typical pour begins with nozzle opening at or near the bottom of the beer glass as previously described. Typically, however, prior to nozzle opening the volumetric flow rate controller has been automatically configured in such a way as to initially produce a comparatively low volumetric flow rate of beer upon nozzle opening. Recall that there is a direct correlation between volumetric flow rate and the amount of beer foam generated at the start of a pour, as has been extensively documented above. Thus, a low volumetric flow at the start of a pour generates a minimal amount of foam, but an amount that can be completely controlled and defined as desired by the user specified configuration of the dispenser.

Typically, the start of pour volumetric flow rate is maintained until the beverage flow outlet of the nozzle is subsurface or below the level of the beer. After this has been accomplished, the volumetric flow rate controller automatically changes the volumetric flow rate of beer from the nozzle, most typically to a substantially higher flow rate. This substantially higher flow rate allows the largest volumetric fraction of the beer dispense portion to be achieved in a comparatively short period of time, thus speeding up the entire pour by compressing the time required for dispense. By example, 80 percent or more of the total beer dispense volume may flow into the glass at this second flow rate. As the transition in flow occurs from the first stage to the second stage, the change is comparatively rapid and abrupt, but does not cause foaming or gas breakout in the beer flowing through the apparatus.

At the end of the beer pour, the nozzle is rapidly and completely closed, and in preparation for closing, a third volumetric flow rate may be defined by the flow controller. This third flow rate is most typically a rate significantly below the second, and it may be equivalent to the first initial flow used at the start of the pour, but can be discretely and separately established as desired.

Thus, with this third and typically lower flow rate established, the nozzle is closed and the pour completed. As previously explained, the amount of foam generated in the beer glass as a function of nozzle closing is dependent upon the volumetric flow rate at closing and thus completely controllable using this flow manipulation method.

The particular flow partitioning explained above is only an example of what may be achieved as necessary or desired to define the pour characteristics of a particular beer. The number of flow rate partitions, their flow rate value, and their duration can all be independently established using a volumetric flow rate controller and the electronic controller associated with the dispenser. In the example given, by way of reference and illustration, a typical lager can be dispensed as a US 20 ounce serving (approximately 600 milliliters) in 3.5 seconds or less with a foam head approximately one centimeter in height.

Whether the single volumetric flow rate pour method, or the multiple flow rate pour method is used, it is important to note that beer foam is not made or pre-made or formed within the beverage flow pathway during dispensing for the purpose of depositing such foam into the beer glass with the poured volume of beer, as is the case with many known beer dispensers. Rather, the foam head on the top of the beer at the end of the pour is defined and made only within the glass itself using the volumetric flow rate control techniques disclosed, and the dispenser is particularly designed not to generate bubbles or foam in its beverage flow pathway during beverage flow.

Another important attribute of the disclosed beer dispenser concerns the location of formation of the bubbles within the beer glass that ultimately constitute the foam cap on a beer pour from the apparatus. During a beer pour as conducted using the invented dispenser, the beverage dispenser nozzle remains at or near the bottom of the glass for the entire pour. The merits of this have been substantially discussed, but keeping the nozzle outflow at the bottom of a beer glass yields an additional benefit. With the nozzle subsurface during nearly the entire pour (typically for 90 percent or more of the dispense volume), and particularly at the end of the pour, almost all of the bubbles contributing to the foam head are formed subsurface and near the bottom of the glass. As a result, the bubbles are smaller and uniform in size, and remain smaller and uniform even when they reach the top surface of the beer. This, in turn, contributes to the formation of a foam head with small tightly packed bubbles. This provides a creamy and uniform foam appearance which is often prized among draft beer experts, and the small bubbles are more resistant to rupture and dissipation, thus allowing the foam head to persist for a longer period of time, which is also considered meritorious among draft beer drinkers.

The volumetric flow rate controller can be used to alter the volumetric flow of beer from one pour to the next. This is most typically done in response to changes in the beverage dispense conditions, most frequently and most critically changes in beverage temperature and beverage pressure.

Changes in the dispense temperature of draft beer are a reality of the dispense environment. For example, beer is often kept cold in walk-in coolers that are also used for other purposes such as food storage. Thus, frequent and unpredictable entry into these coolers changes the beer temperature.

Further, known draft beer flow lines and dispense towers and faucets all increase in internal temperature as ambient temperatures increase or simply as a dispenser sits idle between pours. Thus, these sorts of temperature changes in draft beer may be accommodated by a draft beer dispenser.

As with temperature, changes in the gas pressure applied to draft beer kegs, which is most frequently the propulsive force in draft beer dispenser flow, is a fact of present draft equipment reality. For example, the mechanical analog pressure regulators used to establish and maintain the gas pressure on a keg are generally adjustable only to within one or two PSI of desired setpoint, and the gauges used are only accurate to within one or two PSI. These pressure regulators are limited in their regulation capability by mechanical hysteresis, temperature induced changes, mechanical wear, mechanical contamination, liquid contamination, corrosion, plumbing, orientation and layout issues, to name only some of the limitations. Thus, these changes in flow pressure may be accommodated by a draft beer dispenser system.

Changes in draft beer temperature are well known to change the pour characteristics. As temperature increases, the solubility of gases in the beer, particularly carbon dioxide, decreases. Thus, for a given volumetric flow rate and/or flow velocity, the amount of foam generated as a consequence of dispensing the beer increases as temperature rises. Because this is true, and because the described draft beer dispenser is able to manipulate volumetric flow rates and hence flow velocities, techniques for accommodating beer temperature changes may be implemented in the described dispensers.

Adjusting for increases in beer temperature, on the simplest level, can be done by electronically recording the elapsed time since the last pour occurred, and reducing the net volumetric flow rate of beer on the next subsequent pour accordingly. This volumetric flow rate adjustment versus time adjustment may be formatted in several ways. While the dispenser remains inactive, the beer held within the dispenser itself tends to increase in temperature, particularly within the lumen of the subsurface filling bottom shut-off nozzle. This rate of rise, absent active cooling provisions, is predictable based upon generally expected ambient temperatures in which the dispenser will operate. Thus the electronic controller of the dispenser marks the time from the last dispense event to the next dispense start signal and adjusts the volumetric flow rate controller to reduce the volumetric flow rate as beer temperature increases and then, in the case of a timed flow defined dose, adjusts the pour duration time. Where a flow meter is used to define the beer pour dose size, the pour size is maintained by the flow meter with the change in volumetric flow rate. These adjustments can be done in increments, such as at one minute intervals, five minute intervals, and so on. The changes in volumetric flow can be non-linear or incremental, as can the time interval markers, all of which can be defined by experimental measurements and software design. When this simplified method of beer temperature compensation is used, two additional adjustment features can be included. First, because the dispenser beverage flow pathway will cool back down toward the beer source temperature with each dispense event following a prolonged standby period, provisions are made to readjust the volumetric flow rate back upward as dispensing pours resume, and this can be formatted in a way generally similar to that used with rising temperatures. Second, an alarm function can be implemented where a dispense is not allowed after a period of dispenser inactivity exceeding a certain duration. It is understood that beyond a certain upper temperature, draft beer can become so foamy that a satisfactory pour from a particular nozzle is not possible regardless of volumetric and velocity flow rate adjustments. Thus, in this case, such a condition is inferred as a function of time. This approach prevents a bad pour and the waste and mess that could result. When such a time based alarm is used, the dispenser electronic controller forces the operator to conduct a brief re-prime of the system to re-cool the dispenser or the electronic controller allows a reduced volume dispense dose for the same purpose. In this second case, overflow is prevented, and the short pour can be manually topped up to a full measure.

Adjusting the volumetric flow rate of the beer pour as a function of time since the last pour as a means to maintain a desired set of pour characteristics with increasing beer temperature can be simply and economically improved by sensing the ambient temperature in which the beer dispenser is operating. It is understood that the warmer the ambient temperature in which the dispenser is operating, the more rapid the increase in beer temperature when it is in a standby condition. Thus, knowing the ambient temperature allows the dispenser system electronic controller to alter the amount of adjustment of volumetric flow per unit of elapsed time between pours with greater precision than when relying on elapsed time only.

A refinement of either time based method of beer temperature compensation, and of the several additional methods to follow, improves flow parameters compensation further. In this refinement, the beer volume of the lumen of a particular size nozzle is known to the electronic controller, as is the set pour volume to be dispensed. This allows a ratio to be struck that is indicative of the amount of warm beer that will enter the beer glass as a fraction of a total pour dose. Essentially, the beer in the nozzle warms more quickly and to a higher temperature than the beer in the beverage flow pathway upstream of the nozzle. Thus, the average temperature of the beer poured after a prolonged dispenser standby period is a function of nozzle size and the electronic controller can adjust the magnitude of volumetric flow rate or other pour parameters compensation for temperature accordingly, including the pour duration required to define the correct pour volume at the changed flow rate.

The volumetric flow rate of the beer being dispensed with changing beer temperature can most accurately be defined as a function of direct sensing of beer temperature. This can be accomplished using a suitable temperature sensor to directly measure the temperature of the beer in the subsurface filling bottom shut-off beverage dispensing nozzle as shown in FIG. 28. As shown, the sensor is mounted into the dispensing nozzle top seal and displacement plug. This sensor location allows immediate sensing of inflowing beverage temperature effects, and, in a prolonged standby condition, the location gives an internal nozzle volume beer temperature that is uniquely indicative of the actual temperature gradient of the beer in the vertical nozzle barrel. Another advantage of this location is that, in the event of sensor failure, the entire top seal plug can easily be removed and replaced, effecting a simple change out procedure for maintenance personnel.

With in-nozzle temperature sensing, an accurate temperature reading can be taken prior to each pour. This reading, processed by the electronic controller, can be used to alter the volumetric flow rate of the beer flowing into the glass as the beer temperature changes. This alteration may be up or down, depending on the direction of temperature change. As in the previous cases, the alteration in volumetric flow rate allows the pour characteristics, including the amount of foam on the poured beer, to be maintained.

In implementations where the pour volume is defined by timed flow of beer at a set rack or system pressure, and the volumetric flow controller has altered the volumetric flow rate as a function of beer temperature, a new pour time may be established by the electronic controller. This is accomplished since the incremental change in flow rate can be known by the controller such that the time of flow adjustment directly follows from the volumetric flow rate adjustment following from the temperature measurement. Essentially, the volumetric flow rate controller offers a predictable flow rate for each physical increment or position of adjustment. Thus, the electronic controller can alter pour time to maintain pour volume by direct measurement of the flow position of the flow controller (by any suitable feedback mechanism, such as an encoder, resolver, potentiometer, or position sensor or the like), or by knowing the flow rates at various pre-defined flow controller positions, which can be entered as calibration variables into the controller, by example, or established mechanically. In this case, it is also readily possible to construct a series of data tables wherein the change in beer temperature measured causes a new beer pour setup, consisting of all necessary pour parameters, to be entered into the electronic controller. This is done incrementally so that the number of pour setups needed is relatively small and easily managed.

By way of illustration, consider a simple beer pour setup wherein an initial flow controller defined low volumetric flow rate is used during nozzle opening, followed by a high flow rate, followed by a nozzle closure low flow rate the same as the first low flow rate, all in the manner previously detailed. With an increase in temperature, the low flow rate at nozzle opening can be maintained for a longer period for more gentle flow prior to the high flow portion of the pour. Since warmer beer is more foamy, the longer period of low turbulence flow makes less foam. Since the total foam cap is the sum of the foam generated at each flow rate, the total foam is reduced to a level desired and influenced by the beer temperature. Following this example further, with further warming of the beer, the nozzle opening first low flow period gets incrementally longer, further offsetting the higher foam characteristics of the still warmer beer, holding the foam cap within acceptable limits. More sophisticated versions of these volumetric flow changing combinations also may be employed. With each change in volumetric flow rate or rates, the dose flow time is readily altered to maintain the correct portion, based upon a previously defined keg pressure. In the instance where a flow meter is used in the beverage flow pathway to define the pour size, the dose is automatically maintained using the flow meter based flow rate signal, generally consisting of a variable frequency pulse train.

With the use of a temperature sensor, an over-temperature alarm function also may be implemented.

FIG. 28 illustrates a second in-nozzle sensor, for measuring the hydraulic pressure of the beer in the nozzle. This pressure, which is measured when flow through the beer dispenser is not occurring, will vary directly as a function of variations in the gas pressure applied to the beer at the keg, which can vary frequently and unpredictably as previously discussed. Knowing the actual pressure of the beer from pour to pour provides a powerful tool in keeping the desired beer pour characteristics constant, and in assuring beer pour volume setpoint stability as pressures vary. Because this disclosed beer dispenser uniquely has the ability to rapidly and precisely alter volumetric flow rates, the pressure sensor allows the electronic controller to directly alter flow rates to maintain the desired volumetric flow into the beer glass, even as the motive force for that flow, keg pressure, varies. This, in turn, assures that the time flow defined volume remains correct and that the desired flow rate into the glass gives the desired foam finish on the completed pour.

It is, of course, possible to sense beer pressure as described and then to alter only the pour time with changing pressure and not volumetric flow rate in order to maintain a correct pour volume, leaving the volumetric flow rate control unchanged in its volumetric flow defining configuration. Indeed, this approach may be used when a manually adjusted volumetric flow control is used.

As previously discussed in regard to temperature changes, beer pressure changes can be subdivided into increments with a lookup table or grouped data set for each increment, allowing simplified "digital" automatic adjustment of beer volumetric flow rate or pour time as a function of pressure.

Figure 41:
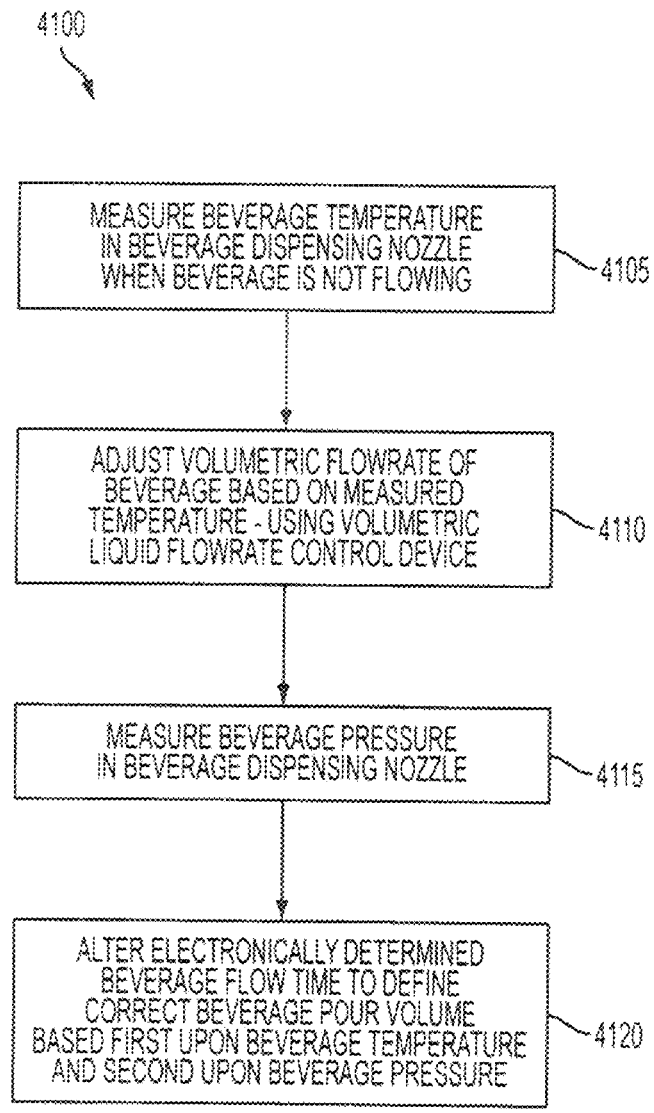
FIGS. 41 and 42 are flow charts of pour procedures.

Referring to FIG. 41, in a dispenser that combines a temperature sensor, a pressure sensor, a volumetric flow rate controller, and an electronic control, a beer dispensing compensation sequence 4100 may be performed. Prior to the start of each commanded pour, beer temperature is first measured (4105) and the net volumetric rate of beer for the upcoming pour is adjusted (4110). Then, the beer pressure is measured, and the dose time is adjusted to assure that the correct pour volume measure is delivered (4120). All of these data, and particularly the temperature, pressure, and volumetric flow rate data, can be used to construct pre-defined flow rate and flow time combinations structured as sequential use lookup tables.

The use of temperature and pressure sensors allows the electronic controller to supervise and manage an alarm function for these variables. In both cases, minimum and maximum values can be set, reflecting a band width within which beer can be dispensed with satisfactory results.

When beer temperature is alarmed as too high, a continuous flow function can be annunciated to prompt the operator to flow beer through the system to cool it down to an operable temperature. When this occurs, the amount of beer volume allowed to flow through the system is tracked. If a satisfactory temperature is not reached after an entered flow volume is reached, the beer source is deemed to be too warm and a "check keg temperature" message can be displayed. A temperature alarm condition can also be selected to allow reduced volume pours, most typically at half the correct pour size, for a selected number of pours. Again, the system will send the "check keg temperature" message if the sensed temperature is not reduced to a usable value.

When beer pressure is alarmed, a message is annunciated or displayed indicating whether it is too high or too low. In either case, it signifies that the flow controller cannot further compensate for the pressure change in order to hold the volumetric flow rate stable to maintain pour and dose size parameters, or alternatively that pour time cannot be further adjusted to hold a correct pour volume.

As with all dispenser alarm functions, temperature and pressure events can be time stamped, logged, and retrieved for analysis.

Figure 42:
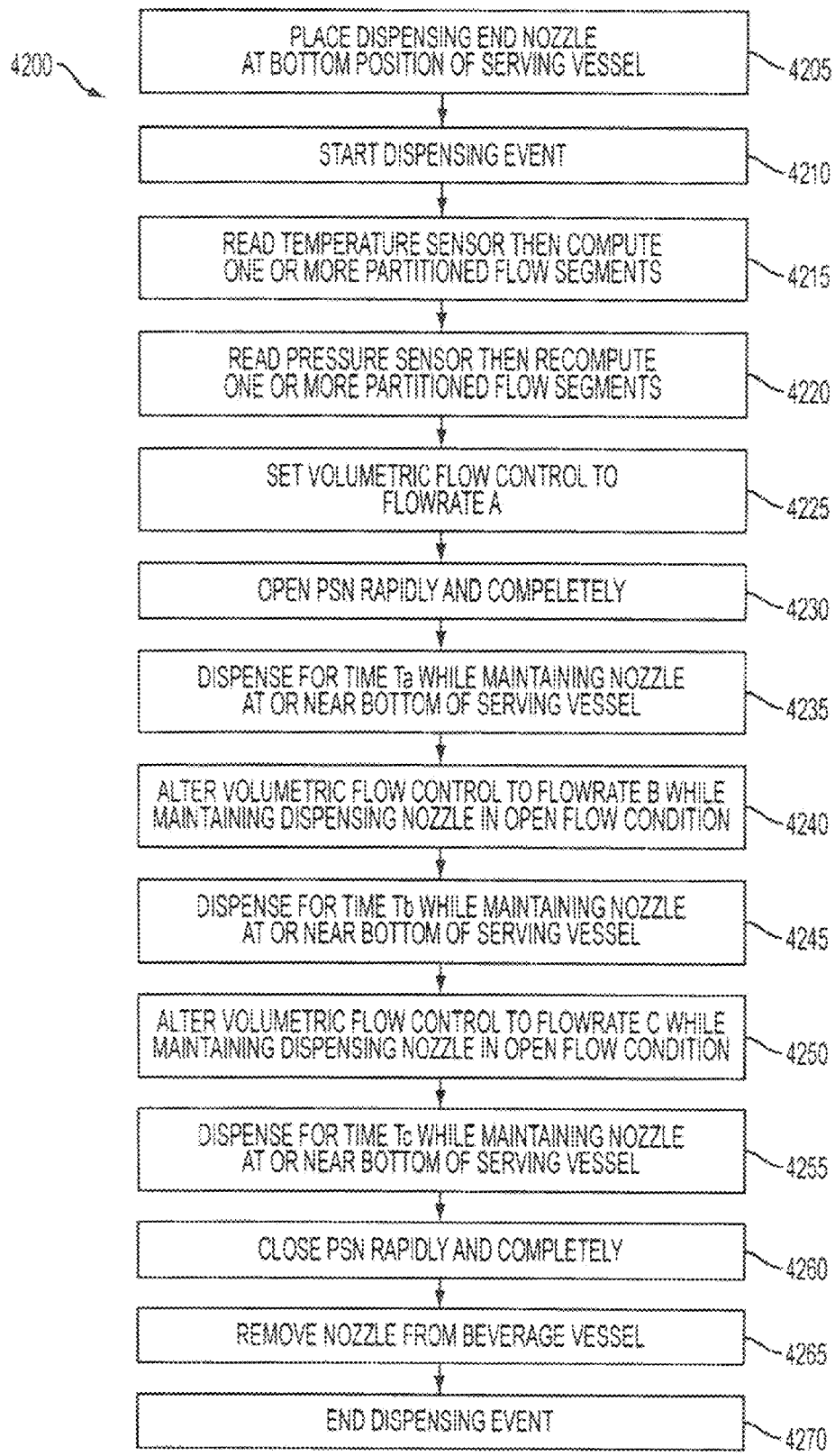

Referring to FIG. 42, in a dispenser that combines a temperature sensor, a pressure sensor, a volumetric flow rate controller, and an electronic control, a beer dispensing compensation sequence 4200 may be performed. A pour is initiated by placing the dispensing end of the nozzle at the bottom position of a serving vessel (4205). This starts the dispensing event (4210). The temperature is then read and the temperature data is used to compute one or more partitioned flow segments (4215). Likewise, the pressure is read from the pressure sensor and is used to recomputed one or more partitioned flow segments (4220). The volumetric flow rate is then set to flow rate A (4225). Next, the positive shut-off valve is opened rapidly and completely (4230). The beverage is then dispensed for a time Ta while maintaining the nozzle at or near the bottom of the serving vessel (4235). Next, the volumetric flow control is altered to flow rate B while maintaining dispensing nozzle in an open flow condition (4240) and beverage flow is continued for time Tb (4245). Next, the volumetric flow control is altered to flow rate C while maintaining dispensing nozzle in an open flow condition (4250) and beverage flow is continued for time Tc (4255). In the next step, the positive shut-off valve is closed rapidly and completely (4260), the nozzle is removed from the vessel (4265), and the dispensing event is ended (4270).

Throughout this specification, numerous references to the function, nature, and operation of the beverage dispenser electronic controller have been made, and various aspects of its features and capabilities have been discussed and explained.

The electronic controller has control functions, data grouping functions, data logging functions, computation functions, input-output functions, alarm functions, and maintenance functions.

The electronic controller can configure the beer dispenser for operation based on all of the diverse variables associated with the installation and operation of a draft beer dispensing tap. Configuration may constitute automatic electronic entry of control functions and parameters, automatic adjustment and configuration of the volumetric flow controller, and motion configuration of the beverage nozzle to provide desired volumetric flow rate or rates, as well as a series of prompts with correct values or instructions for manual configuration.

The electronic controller configures the dispenser based upon the brand or type of beer to be dispensed and the portion size, the type of volumetric flow control device and nozzle size being used, and the specific geometry of the beer flow pathway and associated flow components.

All of the pre-defined or operator determined functional parameters needed to dispense a particular beer at a particular dispense volume, at a particular speed, and with a particular foam finish, can be grouped by the operator as a "CMOS" or Complete Machine Operating Solution which can be stored into the non-volatile memory of the controller for use at any time. A large number of the CMOS setups can be stored, dependent upon the memory size specified for the controller.

In any draft beer tap installation, the size of the beer supply line, distance between the keg and the point of dispense, relative changes in elevation, and altitude of the installation, among many variables, can be defined and entered into the electronic controller. When this is done, the dispense parameters can be defined and optimized based upon these data. A major benefit of this data based setup is the ability of the dispenser to optimize the priming or "line packing" function where hydraulic operation of the dispenser is established. Because system volume from the keg is known, and because volumetric flow rates through the beer flow pathway are defined by the dispenser, the minimum volume of beer required to prime the system, as installed, is known. Thus, the dispenser, placed in prime mode by the electronic controller, allows only enough beer to flow to achieve a ready to operate hydraulic status. Because beer flowing through the dispenser when packing the lines is generally wasted and discarded, this control is useful. In this regard, it is important to also note that removing the amount of beer flow during priming from the discretion of the operator can be shown to reduce draft beer waste.

In addition to the numerous alarm parameters and functions previously discussed, the electronic controller can monitor power supply voltages, battery supply conditions in portable applications, and it can track the operating cycles of the machine and store these totals such that proper maintenance intervals and life cycle replacements can be scheduled and conducted. A real time clock can also schedule and annunciate time based events, such as calendar based maintenance schedules.

The electronic controller, in combination with the volumetric flow rate control device, provides a capability of tracking and recording beer usage for report and analysis purposes. In particular, because the volumetric flow rate of beer through the dispenser is known at all times, and because the controller can distinguish between serving pours and priming flow, the total beer available for serving pours is known after priming of any particular beer keg is completed. Thus, because the dispenser tracks and controls serving portion size, the number of beers servable and served from a keg are recorded. Further, because the volume of beer lost to priming is know, the beer depletion point of the keg can be computed. This is annunciated when the keg is within a defined number of pours of "blow out". The number of pours remaining at the warning can be user defined, generally among a list of choices ranging from two to ten pours. When a keg prime mode is again entered, the controller tracks the prime volume and dispense count on the next beer keg. Optimally, the dispenser can set a "new keg" message that requests a confirmation that a new keg has been fitted, thus marking a new usage tracking and computation sequence.

The electronic controller also has the ability to accumulate and store inventory and point-of-sale data. It communicates bidirectionally to point-of-sale (POS) software systems and thus can be pre-pay enabled by such systems. It can also report each dispense including dispense size to the POS system. Thus, the beer dispenser herein disclosed becomes a sales activity and revenue data mode within the serving establishment.

The electronic controller enables bidirectional communication using all data transmission modes and media to PC's of all types, local area networks, server based systems, handheld and portable digital assistants (PDA's), as well as dedicated handheld devices.

An important aspect of the beer dispenser is the ability to operate the beer dispensing nozzle using a mechanical manual override control in the event of an electronic controller or power failure. This is an important feature in that it provides a functional assurance of continuing beer pour capability even with a failure of the automated functions of the dispenser. Cleaning and sanitation of the beverage dispenser is also a critical issue.

When an external flow control or flow controller is used, only the interior of the beer flow tube connectable to the beer keg and the dispensing nozzle comes in contact with the beer, which provides an optimal cleaning capability, with a minimum of connection transitions and absent beverage exposed threads, or bacteria trapping recesses, crevices, or sharp elbow-like bending radius fittings.

Also as evident, the non-invasive beverage flow tube within the digital volumetric flow rate controller can be manually or automatically opened to its full interior diameter. This capability allows a suitably sized cleaning element to be hydraulically or pneumatically forced through the beer flow pathway with minimum restriction or obstruction by the elements of the flow pathway of the dispenser herein disclosed. The cleaning element used may be variably termed a cleaning patch, a cleaning swab, or a cleaning pig.

The beer flow pathway of each of the described systems is designed to allow self-draining of cleaning, sanitizing, and rinsing liquids. This provision reduces the residual volume of cleaning liquids, and thus the volume of beer required to elute these residuals from the beer flow pathway after cleaning Two provisions are made to reduce the rate of bacterial growth on the exterior surface of the subsurface filling bottom shut-off beverage dispensing nozzle. First, the nozzle can be polished to a "mirror finish" high RA finish. This degree of smoothness promotes liquid (beer) runoff and reduces bacterial microgrowth sites. Second, the nozzle can be coated with one of several available antibacterial coatings which are suitable for food and beverage contact.

Another important aspect of dispenser cleaning is the role of the electronic controller. The controller can measure and define cleaning intervals based on operating cycles or elapsed time. It can also control and automate the cleaning function, including control of flow sequences, flow durations, and flow patterns. This capability is unique and novel through the actuator based control of the beverage dispense nozzle which can directly control flow of cleaning liquids through the system. Also uniquely, the volumetric flow rate control device allows the volume of cleaning liquids used in a cleaning sequence to be defined, thus assuring cleaning effectiveness. The sequence(s) of actuations, durations, and volume of flow that constitutes a clean-in-place sequence can be stored in the electronic controller for use with each cleaning event.

Finally, the beer dispenser is easy to operate. It is understood that the quality of retailing of draft beer varies greatly, and that there is often a rapid turnover of the serving personnel pouring draft beer, especially in stadium and festival settings. Thus, the ability of a server to place the subsurface filling bottom shut-off beverage dispensing nozzle at or near the bottom of the beer glass before the start of a pour and to simply keep it at the bottom to the end of the pour without any need to partially withdraw it or to move the glass such that the nozzle tracks with the increasing level of beer, comprises the simplest and least complicated draft beer pour technique known. This simplicity allows a demonstrable one beer pour training session before the server pours perfect beers.

A refinement to the systems discussed above is to control the systems to rapidly make a defined and desired amount of beverage foam finish associated with a serving of a dispensed beverage, especially draft beer, either immediately after completion of the dispense of the primary beverage pour volume or sometime after completion of the primary pour but before the beverage is served.

The foam making techniques allow a highly repeatable amount of foam to be made from pour to pour, or to be varied as desired on a custom foam finish basis from pour to pour. Manual or automatic adjustment is provided for as a function of changing beverage properties and changing conditions such as temperature, dispense pressure and volumetric flow rate.

The foam making techniques make use of the discovery that total foam formed on a beverage pour can be the sum of smaller, discrete quanta of foam formed by subsurface injection of relatively small sub-doses of beverage purposely formed by small increments of flow mediated by a comparatively fast acting beverage flow control valve of suitable type and form. Using those techniques, relatively small and separate on-off flow cycles constitute one or more defined pulsed flow turbulence inducing events or cycles, resulting in the subsurface formation of a defined and repeatable amount of foam with each cycle which rapidly rises to the top liquid-air surface of the beverage, thus forming a foam cap. The total foam accumulated on the top of the beverage from the pulsed flow method is the sum of the foam made with each on-off flow cycle, resulting in formation of a defined and highly repeatable total amount of foam. The amount of foam formed with this method is a direct function of the number of cycles that are applied to the beverage.

Figure 43:
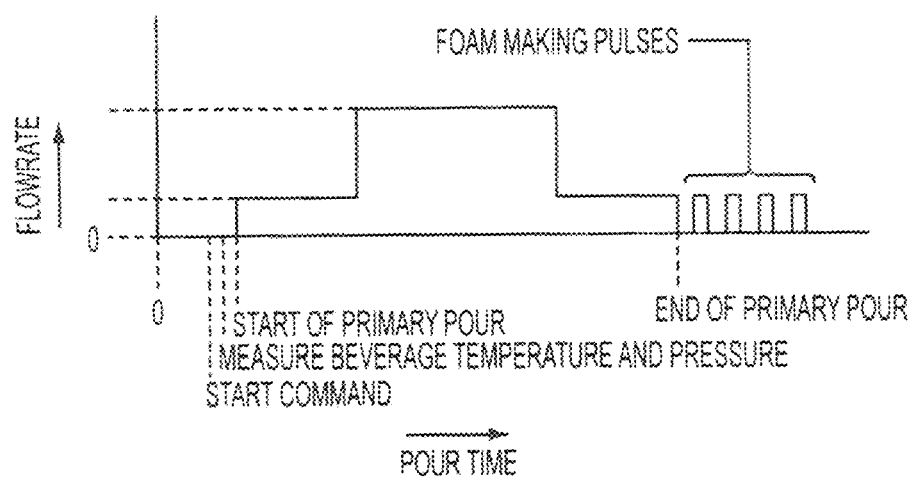
FIGS. 43-45 depict graphically the digital nature of the flow relative to a typical pour of draft beer.

Because each flow pulse constitutes a defined and repeatable event or cycle, this technique of making beverage foam is referred to herein as the digital pulsed flow method, or the digital flow method, or simply as the digital method. The digital nature of the flow relative to a typical pour of draft beer is depicted graphically in FIGS. 43-45, which show different flow rate to pour time relationships.

Figure 46:
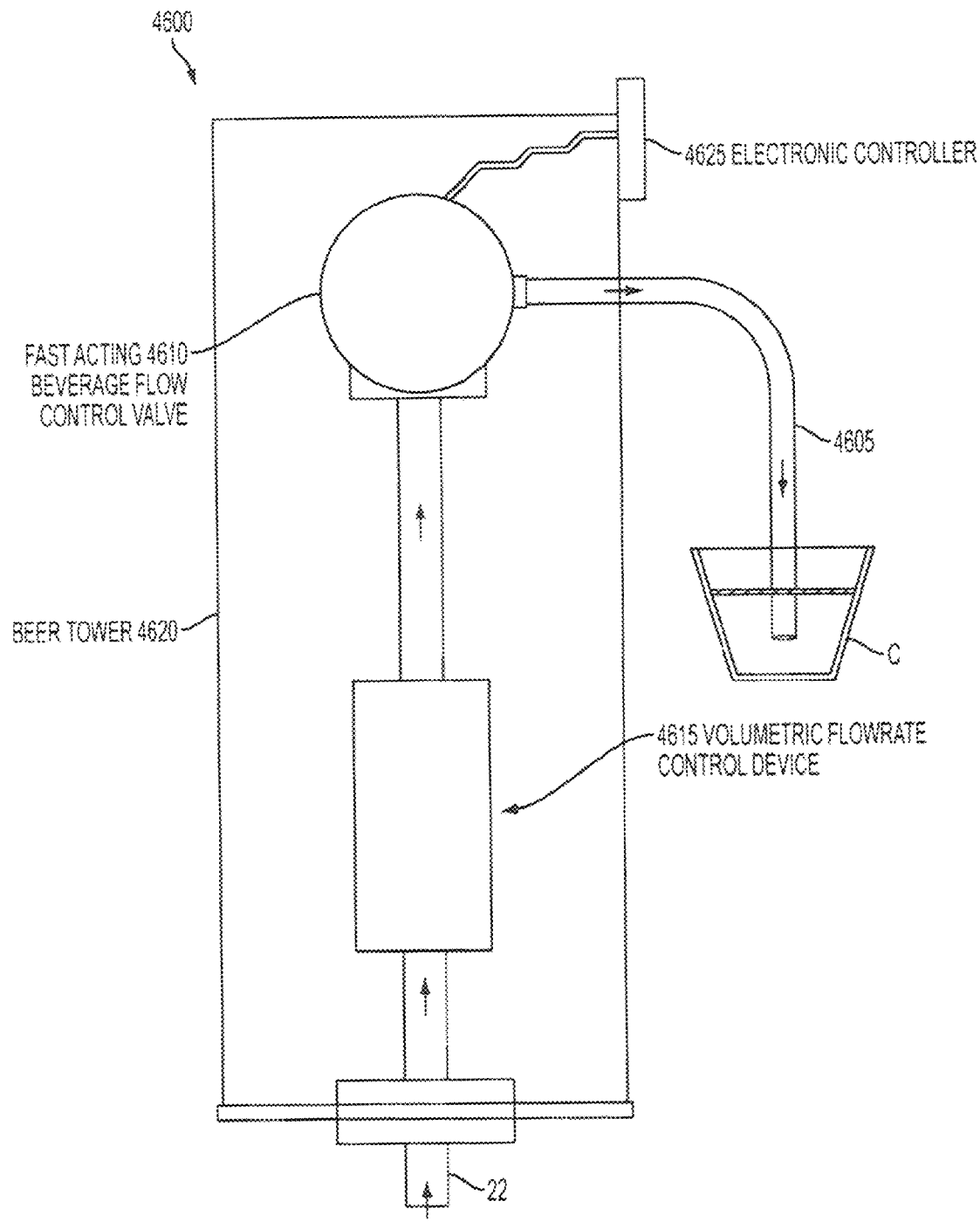
FIG. 46 illustrates a beverage dispenser with a fast acting flow control valve and a subsurface dispensing nozzle.

Initially, it may be observed that the digital flow method may be employed by the beverage dispensers discussed above, as well as other beverage dispensers, such as the dispenser 4600 shown in FIG. 46. In the systems discussed above, the subsurface filling bottom shut-off beverage dispensing nozzle assembly is rapidly cycled between open and closed positions to produce pulsed flow cycles, and the nozzle bottom shut-off constitutes the beverage flow control valve.

In the system 4600, the nozzle barrel 4605 is not provided with a nozzle barrel seal plug at its tip. Instead, a beverage flow control valve 4610 controls beverage flow through an open tube filling nozzle of sufficient length to allow subsurface beverage flow. As shown, the fast acting beverage flow control valve 4610 and the volumetric liquid flow rate controller 4615 are mounted in a beer tower 4620. The valve 4610 is controlled by an electronic controller 4625.

Dispensing of draft beer by conventional means most typically involves use of a manually operated beer valve or faucet to allow the flow of beer into a serving glass or cup via a short directional spout associated with and generally a part of the valve body. Use of such conventional draft beer dispensing gear often results in pours with excessive foam and also frequently in pours where more foam should be added to achieve a desired foam finish or cap on the beverage. In the latter case, it is common and customary for the serving person operating the beer faucet to briefly and manually open and close the valve to place small foamy or frothy quantities of beer directly onto the top of the beverage previously filled into the serving glass in order to increase the amount of foam deposited onto the top of the draft beer serving to an aesthetically desired or pleasing quantity or level.

The desired or preferred amount of foam cap on a poured draft beer serving can vary widely as a function of the beer type, the beer brand, and the customs or culture, traditions, or preferences of the serving location. For example, the foam cap sometimes referred to as the "Belgian Finish" (or "Belgium Finish") calls for a robust foam head that can represent as much as half of the total height of the pour in the serving glass, and is poured with such vigor that some of the foam is often scraped away from the top of the glass prior to serving. At the other extreme, often draft beer drinkers in Scandinavian countries prefer a serving of draft beer with no more than a thin foam cap, frequently so thin as to not cover the entire surface of the beer.

As such, it is useful to be able to create foam as part of a pour of draft beer, to control the amount of foam precisely and from pour to pour, to be able to customize the foam head as desired, to produce foam rapidly and efficiently without need for individual skill, and to adjust foam making from essentially none to very large amounts.

As discussed above, FIGS. 21 and 22 show a sectional view of a bottom shut-off (bottom valved) subsurface filling beverage dispensing nozzle in the open to flow and closed to flow positions, respectively. This nozzle 105 represents the key apparatus for implementation of the digital foam making technique. The nozzle 105 is an outward opening device where the nozzle seal plug 2105 is extended outward by nozzle plug actuator 2110 from the bore of the nozzle barrel 2115 to allow flow. The nozzle plug actuator 2110 may be an air cylinder being connected to the plug via a rod 2120 that carries a centering spider 2120a. An alternative form where the nozzle seal plug 2610 is retracted inward into the nozzle barrel 2605 is shown closed to flow and open to flow in FIGS. 26 and 27, respectively. In this design the centering spider is not required and the tapered end 2605a of the barrel will center the plug 2105.

It is the motion of the bottom valved nozzles shown in FIGS. 21, 22, and 26 that allows the pulsed flow foam making method to be effective. To create a foam pulse, most typically the nozzle is rapidly opened to flow by actuator 2110 and, upon the seal plug 2105 reaching the fully opened position, it is immediately reversed in direction and closed to flow as rapidly as possible. Thus, the basic motion is cyclic in nature, with each opening and closing constituting a pulsed flow foam cycle, or digital foam making cycle.

Figure 47:
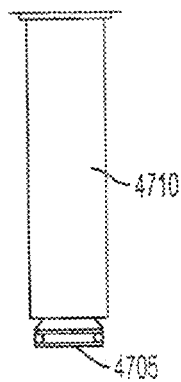
FIGS. 47-49 illustrate the nozzle flow aperture vs. foam per pulse relationship.
Figure 48:
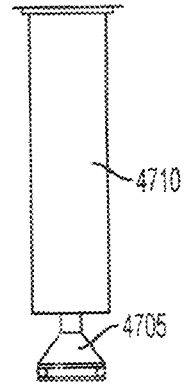
Figure 49:
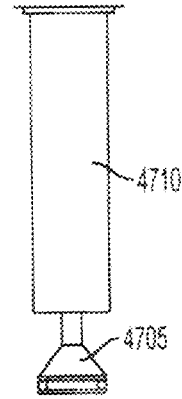

With reference to FIGS. 47-49, there are major and minor contributors to the foam making mechanisms associated with the cyclic flow described. In the described dispenser systems, the beverage is usually continuously pressurized such that flow ensues immediately upon nozzle orifice opening. As the nozzle opens, as shown in FIG. 47, the velocity of beer flow is determined by the instantaneous geometry of the annular nozzle orifice. Thus, initially the flow velocity is relatively high through a relatively small square area orifice, with the velocity diminishing rapidly as the orifice dimensions increase with the continuing opening of the nozzle. Thus, the first major foam generator mechanism is the comparatively high velocity flow upon the initial and early motion opening of the nozzle. This high velocity flow is relatively directional and extremely turbulent. Thus, substantial foam is generated for the very brief period (a few to perhaps 25 milliseconds in a typical system) during which this nozzle opening geometry persists.

As the nozzle plug opens further, flow velocity drops rapidly until, at about 60 percent of full open, as shown in FIG. 48, and full open, as shown in FIG. 49, the annular orifice of the nozzle is sufficiently large to diffuse flow and minimize flow turbulence. This is in keeping with the primary intent of the nozzle, which is to pour the primary volume of beer at a given volumetric flow rate through the nozzle with as little foam as possible. Thus, the foam made as a result of flow from the fully opened nozzle is a minor contributor to overall foam quantities.

Typically, upon reaching the full open position, nozzle plug motion is immediately reversed and closure begins. As the plug retracts, the flow characteristics and foam making implications essentially reverse from opening. Thus, little additional foam is made until the plug is nearly closed, and then foam is made in progressively greater amounts as flow velocity increases. Thus, the second major foam contributor is the complement of the first, and may be termed high velocity flow upon late and final closure motion of the nozzle. It should be noted that among the major and minor foam making mechanisms described or to be described, nozzle closure accounts for the majority of foam formed with each pulsed flow cycle. This is because the kinetic energy of a moving flow stream is fully established upon nozzle plug closure, which is not the case when the plug is in a similar location in the nozzle opening part of the cycle. Accordingly, flow turbulence is greater upon closure even though the instantaneous physical dimensions of plug closure are symmetrical with opening and closing. Therefore, with greater established flow energy as turbulent flow, more foam is generated upon nozzle plug closure.

The third and comparatively minor contributor to foam making is the motion of the nozzle plug itself moving through the beer. Pulsed flow foam making occurs after the beverage has been dispensed. Thus, as the nozzle plug moves to its open position and then back to its closed condition, it is rapidly moving through the beer. This motion induces cyclonic liquid motion radially about the circumference of the plug-nozzle tube area, thus causing a comparatively modest amount of gas to come out of solution as bubbles. Essentially, this phenomenon might be thought of as similar to vigorously but very briefly stirring the beer with a small spoon.

Each of the major and minor foam making mechanisms disclosed herein can be empirically demonstrated and imaged. From the above explanations, it can be understood that there is a direct correlation between the volumetric flow rate of beer through the beverage nozzle and the amount of foam formed with each pulsed flow cycle. Thus, it can be empirically shown that, as the available volumetric flow rate is increased, each digital cycle results in the formation of a larger absolute amount of foam. This relationship allows a calibration method in dispensers where the volumetric flow of beer through the nozzle can be controlled or adjusted independent of the nozzle orifice size such that more or less foam per cycle can be made. Beer dispensers suitable to this calibration method are shown, for example, in FIGS. 1, 5, and 46.

There are nozzle motion based methods to alter the calibration or amount of foam generated per digital cycle to be found in the control of the motion and geometry of the bottom shut-off subsurface filling beverage dispensing nozzle. In a first method of foam quantity calibration, the opening of the nozzle for foam making may be limited to less than a fully opened condition, thus creating higher flow velocities for more, or even most, of the open-close cycle. The result is that more foam is generated per pulse, thus reducing the number of cycles required to make a defined and desired foam finish. With a reduction in cycle count, the duration of the summed cycles is shortened, advantageously speeding up the foam making process, which improves overall beverage dispensing efficiency. The reduction in cycle motion in this case also means that each cycle is inherently faster, thus also allowing a faster overall foam making sequence. On the other side, any digital system carries the concept of resolution and in this instance, each foam pulse results in a larger foam quantity being made. Thus, the difference between X pulses and X+1 pulses is greater and the precision with which the foam cap can be formed as desired is reduced. This foam-to-nozzle flow aperture dimension relationship can be further understood by reference to FIGS. 47-48, which depict three nozzle open conditions where plug 4705 is fully opened relative to nozzle barrel 4710 for the least foam per cycle in FIG. 49, partially and intermediately opened for an intermediate amount of foam per cycle in FIG. 48, and only restrictively opened for the highest amount of foam in FIG. 47.

In a different method of foam cycle quantity calibration, the nozzle plug may be opened to its full extent, but closed at a motion rate that is reduced from its maximum. When this occurs, the total period of beverage flow and the total flow turbulence increase, but the period of high turbulence near the end of the closing motion is increased, leading to a marked increase in the quantity of foam made per cycle. With this method, resolution is degraded, and the total time for foam making is not clearly shortened since digital pulse times increase, but the number of foam cycles required decreases.

Providing control over nozzle motion for digital foam making can be done mechanically or electronically. Electronic encoding of the nozzle allows precise motion control for foam defining purposes. Referring to FIG. 22, electronic sensors are provided for electronically detecting the fully closed and fully opened positions of the subsurface filling bottom shut-off beverage dispensing valve flow orifice to sense and define a complete pulsed flow cycle. This includes a nozzle plug closed actuator position sensor 2210 and a nozzle open actuator position sensor 2220. These sensors can be of any suitable type including, for example, magnetic, optical, mechanical, or capacitive. Whatever the sensor technology, they generally detect nozzle flow full open and nozzle flow full closed conditions. Thus, they are useful in the primary dispense mode to assure correct and proper nozzle function and precision of operation, but they can then be used to define a foam making flow pulse cycle where the same nozzle motion used in the primary pour is also used to delineate a foam making flow pulse. This allows the foam pulses to be counted on a definite completion or closed loop basis thus assuring correct function and cycle count. Encoding as shown also allows alarm functions including comparing cycle count completed to the programmed count, comparing nozzle motion transit times to a defined or averaged time, and comparing the combined times of all commanded pulses to an expected cumulative time.

Figure 50:
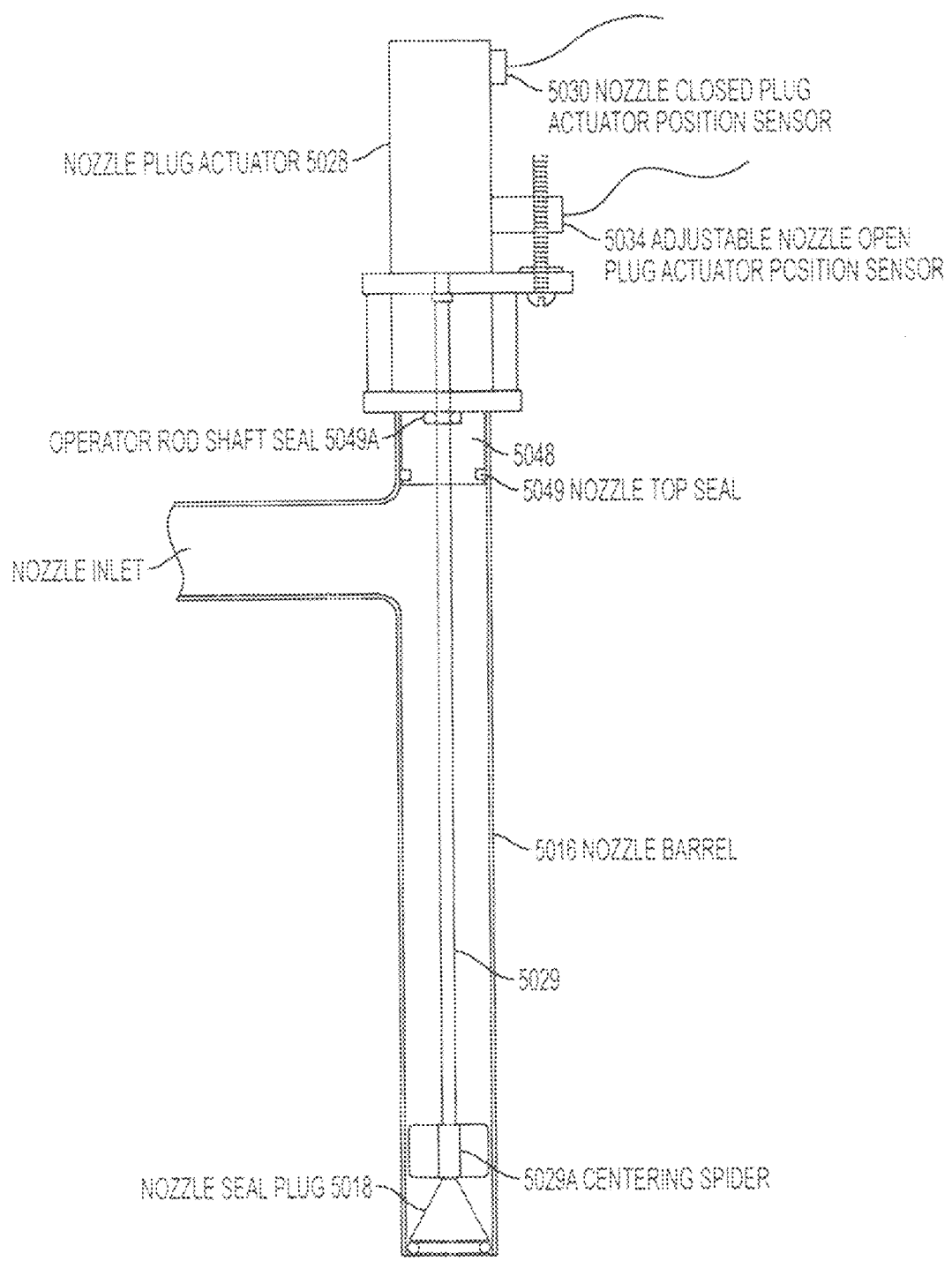
FIG. 50 shows a bottom shut-off nozzle with an adjustable open position.

In an important variant of the encoding method above, the sensor detecting the opening position of the nozzle can be physically moved such that detection upon opening occurs at a stroke or opening dimension reduced from maximum. Thus, in FIG. 50, as nozzle 5018 is opened to flow, the travel position of the actuator and hence the nozzle plug 5018 is detected and the motion immediately reversed to closed. The open position sensor is adjustable using the screw mechanism 5034. This allows electromechanical calibration of the amount of foam made with each digital flow pulse.

Figure 51:
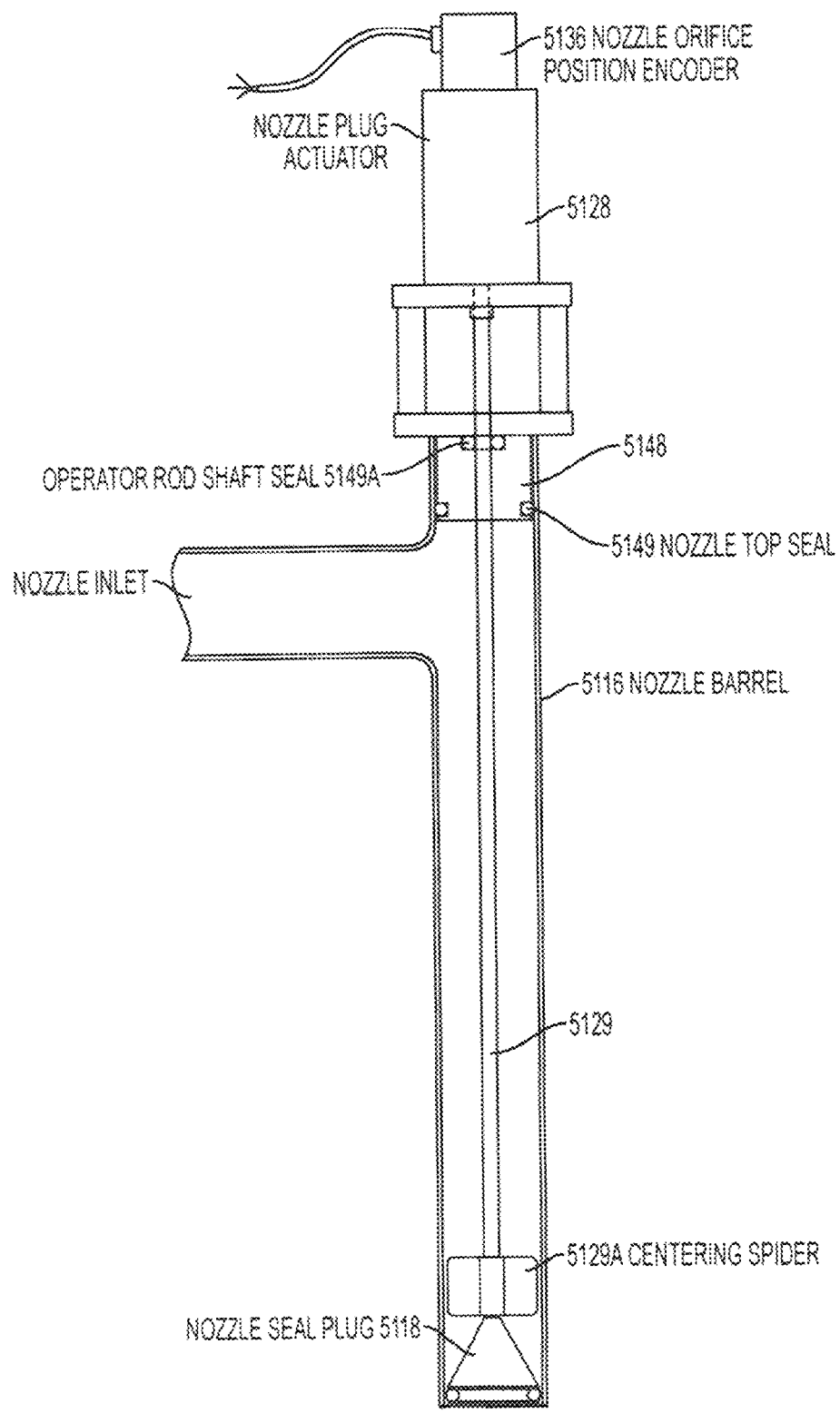
FIG. 51 shows a nozzle having a nozzle position encoder.
Figure 52:
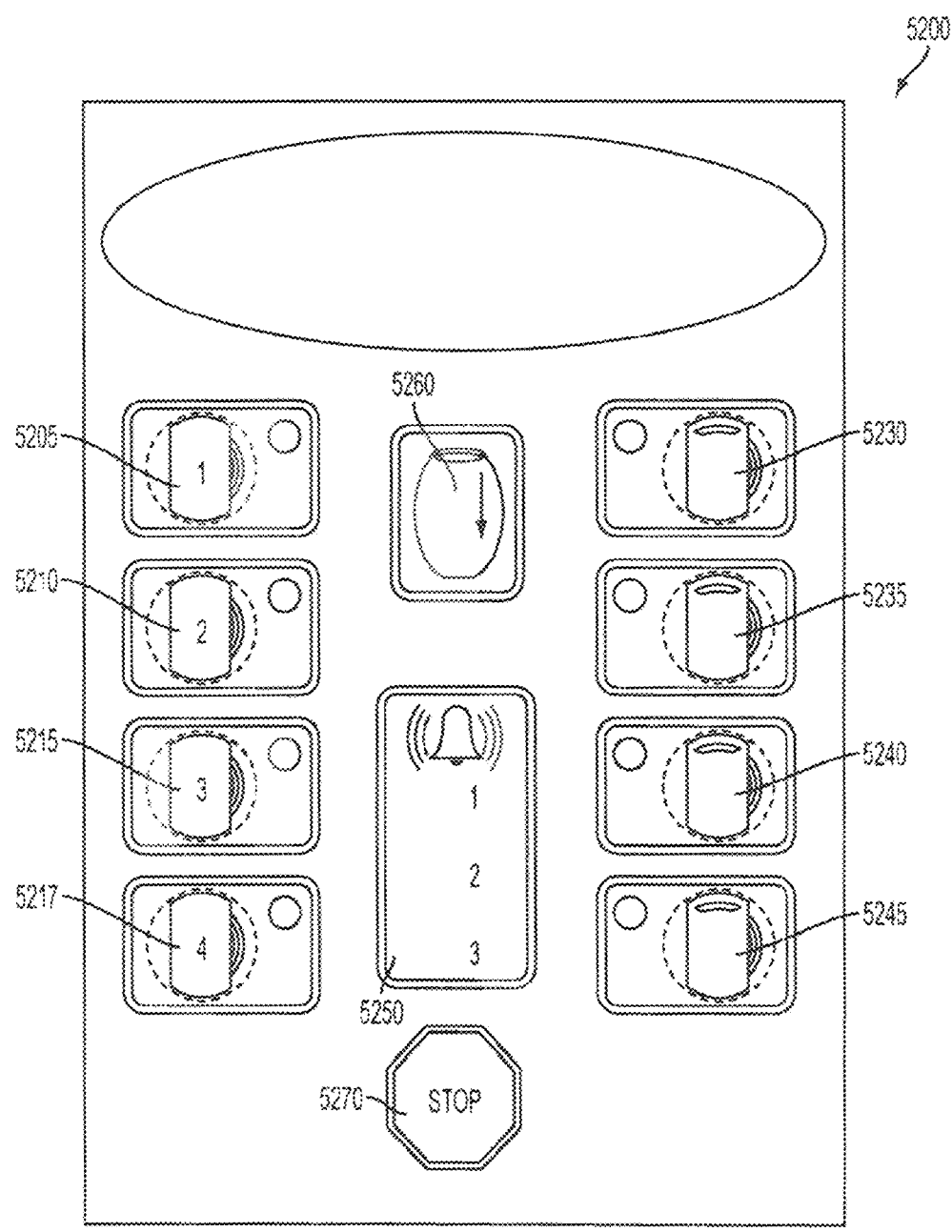
FIG. 52 illustrates the icons that may be on a touch control panel.

In another encoding variant, nozzle stroke and hence foam making calibration can be completely adjustable electronically. Thus, in FIG. 51, a nozzle orifice position encoder 5136 is shown mounted to the nozzle plug actuator 5128. In this method, the encoder provides position information for the actuator, and hence the nozzle plug, from fully closed to fully open. Thus, via electronic control, the stroke can be mechanically altered and defined. In passing, it should be noted that the encoder can be of nearly any known type and mounted in any suitable way to the nozzle, and can be analog or digital in output. A touch pad electronic controller 38 is illustrated in FIGS. 16 and 52. Also in passing it can be noted that the nozzle actuator can be of any suitable type capable of the speed, stroke, and force required by the application, such as pneumatic, hydraulic, solenoid, voice coil, permanent magnet, linear or rotary motor and the like.

FIG. 52 illustrate another implementation of a user interface 5200 which in conjunction with an electronic controller allows for the system to accommodate varying characteristics associated with beverage dispensing. User interface 5200, like the previous implementation illustrated in FIG. 16, typically includes one or more keypads 5205, 5210, 5215 and 5217 that include one or more indicia that signifies, for example, different sized containers, beverage selections, serving sizes and the like. Keypads 5205, 5210, 5215 and 5217 are coupled to a circuit board, which is further coupled to an input/output connector that is coupled to a processor. In this configuration, when a user selects one of the keypads 5205, 5210, 5215 or 5217, the user interface sends data or information to the processor that indicates a particular characteristic of the beverage dispense cycle, such as, the size of the receptacle.

User interface 5200 may also include additional keypads, such as keypads 5230, 5235, 5240, and 5245, which as illustrated, when selected can appropriately set the amount of foam to be created during the dispense cycle. In addition, these keypads may be appropriately programmed to provide for additional user-selectable indicia such as increasing or decreasing the amount of beverage dispenses or for causing the device to generate foam in the dispensed beverage by pulsing the beverage dispensing nozzle.

User interface 5200 may also include a number of visual indicators or alarms 5250, 5260, which can include LEDs or appropriate bulbs, that provide the user with a visual indication if the system experiences a change, for example, in operating conditions, such as low flow rate, near empty condition of the beverage source, or any other user-defined condition. In addition, user interface 5200 includes a manual stop override switch 5270 to provide the user with the ability to stop the operation at any time.

The digital foam making method herein described should be relatively fast in its action in order to not add substantially to the time it takes to pour a draft beer. Thus, in a beverage dispenser of the two general types discussed herein, a complete digital flow pulse cycle can be completed in 100 milliseconds or less and more typically in around 60 milliseconds. By way of perspective, it can be shown that in nearly all cases, a draft beer serving can be foam finished using twelve or less cycles in serving sizes up to at least one liter. Thus, the total pulses duration in this example would be 720 milliseconds. Thus, it can be generally stated that the total duration of the digital foam making process is most typically less than one second (1000 milliseconds) in duration.

Digital foam can be formed by the open-close cycle action of a bottom valved outward opening subsurface filling beverage nozzle without beverage flow through the nozzle. However, foam making more generally involves flow of beverage occurring through the nozzle. This is particularly the case in bottom valved dispensers where beverage flow is only controlled or valved by the nozzle bottom shut-off as is shown in FIGS. 21 and 22. Thus, generally each foam making pulse results in the dispensing of a small volume of beer into the serving glass, thus ultimately increasing the total volume of beer dispensed. Fortunately, this does not present a problem since the volume dispensed with each foam cycle can be known and electronically deleted from the primary pour volume such that the total volume of the served beer is correct. Accordingly, as foam pulses are added or deleted from the pour, either automatically or manually, the pour volume can be automatically adjusted so that a full measure of beer is served. By way of example, if beer is flowing at the volumetric flow rate of 3.5 ounces (105 milliliters) per second from the dispenser nozzle, a readily known value since the pour time and serving size are always known, a 60 millisecond digital foam pulse cycle will dispense 6.3 milliliters of beer. Thus, if the total foam pulses were six in number, the total amount of beer dispensed as a result would be 37.8 milliliters and the total pour would be decreased by this amount. Alternatively, with dispensers that have a pour size trim or adjust capability, the volume can readily be adjusted visually to any desired or required level. Such an adjustment is shown at 5034 in FIG. 50.

Although particularly suited immediately at the end of a primary pour to establishing a defined foam cap that can be reproduced consistently from one pour to the next, the digital pulsed flow foam making method is also adroit in use to refresh the foam on a pour, to custom foam finish a pour, and to create the desired finish as a function of beer glass shape.

In the case of refreshing the foam cap, a properly poured beer with a desired foam finish will not remain perfectly presented if not served promptly. The reality of many serving environments leads frequently to serving delays. When this occurs, the digital foam method uniquely allows the nozzle to be placed subsurface and the desired number of foam cycles administered to the previously dispensed beer, such that the foam cap can be re-established to the desired form and presentation for serving. Referring to FIG. 52 the icon 5240 can be keyed to administer foam cycles, one at a time until the desired foam head is created, or any of the icons 5230, 5235, 5240, or 5245 can be programmed to initiate a pre-defined number of pulses.

Similarly, the same control feature can be used to allow any desired number of flow cycles to be applied to a pour to create any foam cap that might be desired by a customer. Thus, foam finish customization of one draft beer to the next is permitted.

With regard to manually applied foam making flow pulses for customization or refreshing the foam cap, it is important to remember that the motion rates and repeatability of motion of the bottom valved nozzle or flow valved open tip nozzle are crucial to obtaining repeatable and satisfactory foam making results. Thus, manually applied here really refers to the mode of operator action to cause a foam pulse event rather than to true manual access or direct physical control of beverage flow valve motion. Essentially, a command for a single or manual flow pulse causes a nozzle or valve actuator mediated action that is defined and automatic in nature as previously described. It does not provide for partial or undefined flow valve or nozzle orifice opening.

Pouring the same amount of beer at the same flow rate into two differently shaped beer glasses can result in very different results relative to foam. When dispensed using the beer dispenser providing for a volumetric flow rate control device combined with a subsurface filling bottom shut-off beverage dispensing nozzle, or with a dispenser including a rapid cycling flow control valve, a volumetric flow rate control device, and an open spout subsurface dispensing nozzle, a relatively rapid and measured pour may be produced with a minimal amount of foam formed as a function of the primary pour, regardless of the shape of the glass. This, in turn, allows the digital foam to create the desired head on the beer, independent of the primary pour. The key notion here is that the number of flow pulses required to produce the same depth or height of foam on a pour of the same volume in two beer glasses of substantially different shape varies widely because the shape differences cause very different amounts of foam to be formed with the turbulence caused by flow pulsing. Further and uniquely, flow pulsing allows the desired foam head to be formed independent of the serving glass or cup shape.

Figure 44:
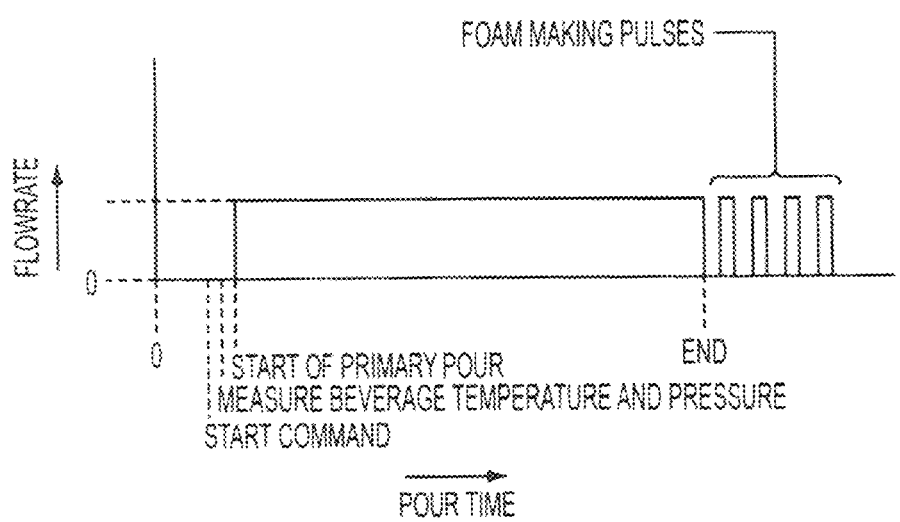

The digital foam method is also usable in draft beer dispensers with more complex volumetric flow rate capabilities beyond a simple primary pour at a defined flow rate. Thus, referring to FIG. 53, the operating sequence 5300 of a dispenser may provide for three flow rates. Digital pulsed flow foam making cycles are usable at the completion of the primary pour volume, which is at the completion of the third (flow rate c) volumetric flow rate. This relationship is depicted graphically in FIGS. 43 and 44. Note that FIG. 44 depicts the single flow rate pour previously described.

Figure 53:
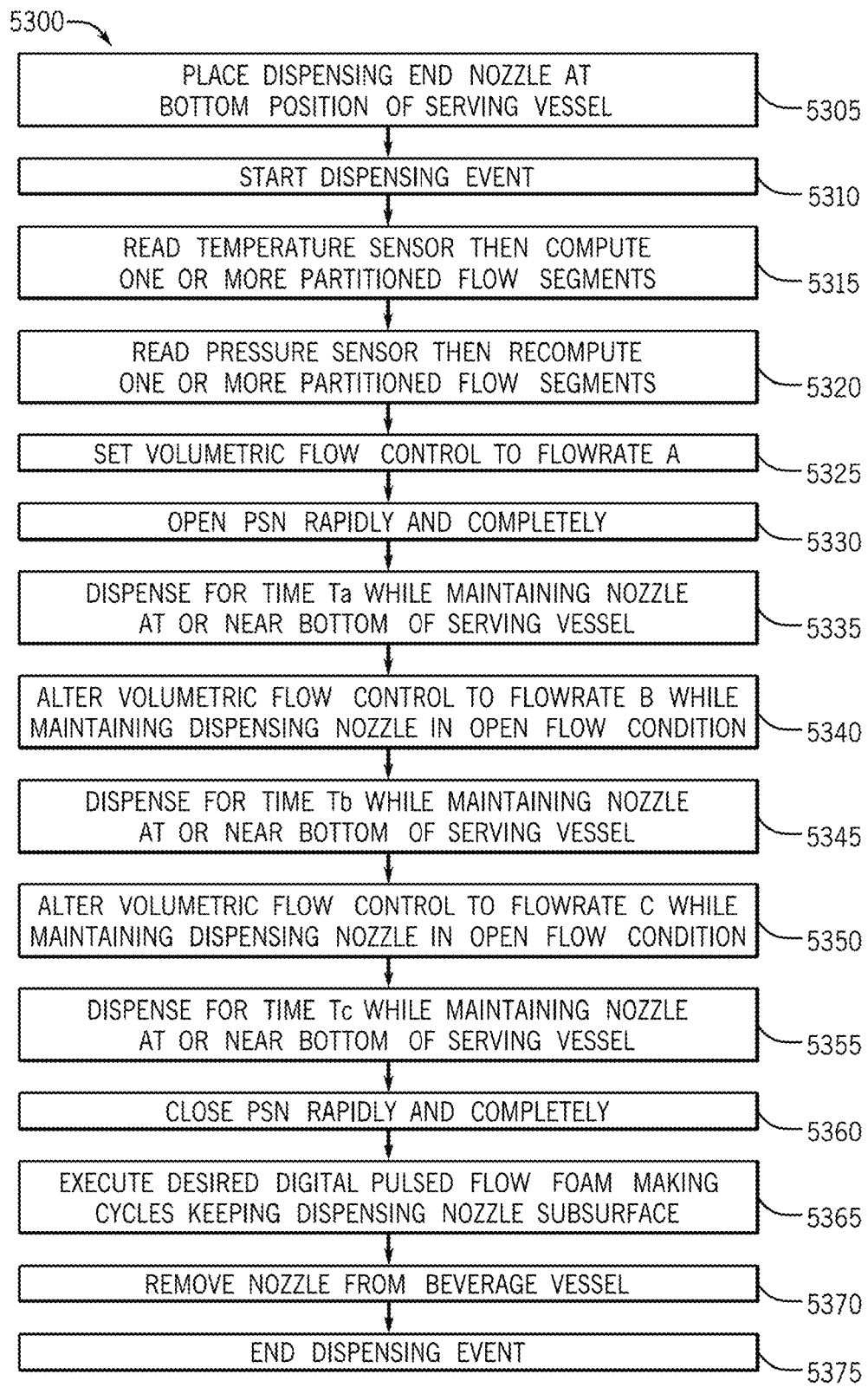
FIG. 53 is a flow chart illustrating the operating sequence of a dispenser providing for three flow rates, and the digital pulsed flow foam making cycles usable at the completion of the primary pour volume which, is at the completion of the third (flow rate c) volumetric flow rate.

Referring to FIG. 53, in a dispenser that combines a temperature sensor, a pressure sensor, a volumetric flow rate controller, and an electronic control, a beer dispensing compensation sequence 5300 may be performed. A pour is initiated by placing the dispensing end of the nozzle at the bottom position of a serving vessel (5305). This starts the dispensing event (5310). The temperature is then read and the temperature data is used to compute one or more partitioned flow segments (5315). Likewise, the pressure is read from the pressure sensor and is used to recomputed one or more partitioned flow segments (5320). The volumetric flow rate is then set to flow rate A (5325). Next, the positive shut-off valve is opened rapidly and completely (5330). The beverage is then dispensed for a time Ta while maintaining the nozzle at or near the bottom of the serving vessel (5335). Next, the volumetric flow control is altered to flow rate B while maintaining dispensing nozzle in an open flow condition (5340) and beverage flow is continued for time Tb (5345). Next, the volumetric flow control is altered to flow rate C while maintaining dispensing nozzle in an open flow condition (5350) and beverage flow is continued for time Tc (5355). In the next step, the positive shut-off valve is closed rapidly and completely (5360), the desired digital pulsed flow foam making cycles are executed while the dispensing nozzle is subsurface (5365), the nozzle is removed from the vessel (5365), and the dispensing event is ended (5370).

Figure 45:
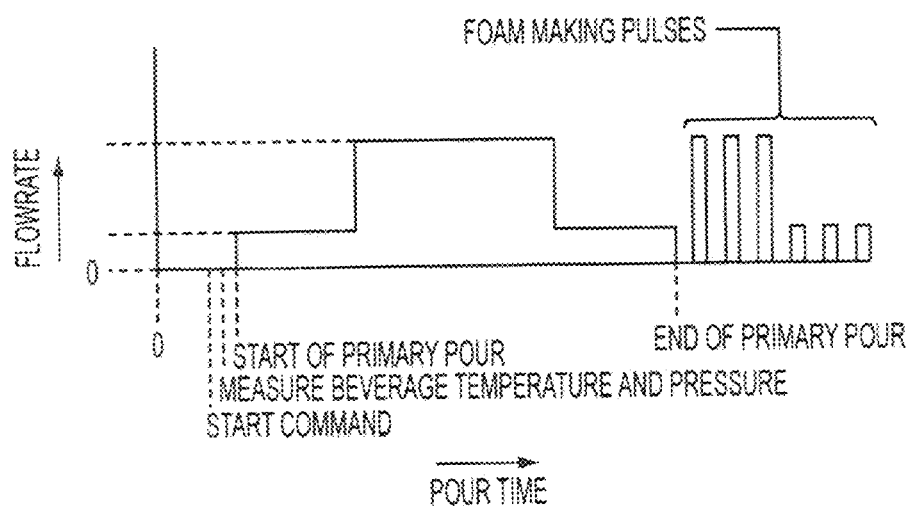

On a still more complex level of operation, when used with a beer dispenser having a volumetric flow rate controller capable of dynamically producing more than one volumetric dispensing flow rate, the digital pulse foam making method may be utilized as shown graphically in FIG. 45. As shown, digital pulses applied at the end of the pour can have more than one flow rate. As noted earlier, because the amount of foam formed with a foam cycle can be directly correlated to flow rate, it is possible to apply one or more pulses causing high foam quantity formation, then to adjust the flow rate, and then to apply one or more pulses at a second and typically lower flow rate. Thus for example, in FIG. 45, the first three pulses are at the higher primary pour flow rate, and the last three pulses are at the lower primary pour flow rate.

When the digital foam making method is electronically controlled, all of its functions and control aspects can be seamlessly incorporated into the electronic controller of the beverage dispenser into which it is incorporated. Thus, parameters including foam pulse cycle count, pulse duration, frequency, and amplitude can all be combined with the other operating parameters of the beverage dispenser. In particular, the desired number of foam making flow pulses can be electronically entered into the control panel of the dispenser, and in addition to this direct numerical method, the number of pulses can be entered using a list of qualitative foam level selections such as small, medium, or large, which can be more convenient for the dispenser operator. In another configuration, a self-teach procedure can be followed where, at the end of a test pour, the dispenser operator applies single foam pulse cycles sequentially until satisfied with the foam level resulting. The operator then can enter this cycle count for use with subsequent pours simply by actuating an "accept" key or "enter" key or the like. This procedure simplifies the process of determining the desired foam cap.

As has been noted, the foaming characteristics of beer are fundamentally affected by the temperature of the beer. This is the case because the solubility of carbon dioxide in the beer (essentially the aqueous solubility temperature curve) is a function of temperature such that as temperature increases, solubility decreases, and thus, at the gross level, as beer warms it becomes more foamy, and as it is reduced in temperature it becomes less foamy. This behavior characteristic of beer has a direct bearing on the digital foam method in that the number of foam making pulses applied to a pour of draft beer to achieve a particular foam cap will be directly influenced by the beer temperature. Because this is the case, the pulse count applied may be varied as the beer temperature changes in order to hold the foam cap relatively constant. As beer temperature goes up, pulse count should go down, or the net foam effect per pulse should be reduced by the several methods previously discussed. As beer temperature goes down, pulse count should go up, or the net foam effect per pulse should be increased as previously discussed. Thus, the setup temperature of the beverage may be recorded when the foam pulses desired are selected, such that temperature tracking can modify the foam count or foam effect as the temperature changes from the setup temperature. For example, the temperature recorded just prior to the start of any given pour may be the reading used to modify the foam pulse count at the end of that pour. The temperature may be measured in close association with the dispensing nozzle where practical. In the absence of a temperature sensor, the elapsed time as measured from the last pour can be used to reduce the foam cycle count on the basis that beer in the dispenser beverage pathway or nozzle will warm over time, causing the net temperature of the next dispensed beer to be higher, and thus foamier.

All of these methods of temperature vs. foam compensation most critically address the "casual drink" problem where a lengthy and irregular period transpires between beer dispensing pours. It is common with known beer dispensers of conventional design that, under these circumstances, the first pour after a lengthy period of inactivity (typically five minutes or more) is foamy and often overflows the serving glass or cup. Thus, the ability of the pulsed flow foam method to correlate foam making with time and/or temperature presents a logical and effective solution to this problem.

As also noted, a second physical parameter that fundamentally affects beer dispensing characteristics is the gas pressure, most frequently carbon dioxide, applied to the beer. This is usually the pressure applied to the beer surface in the beer keg and is generally the propulsive force moving beer from the keg to and through the beer dispenser. Changes in beer pressure are a reality of draft beer dispensing and do influence the solubility of carbon dioxide in the beer. However, far more important, a change in the beer pressure typically changes the volumetric flow rate of the beer flowing from the dispensing nozzle and thus the relative flow turbulence and thus the amount of foam during dispensing. Thus, as beer pressure increases, the amount of foam formed during dispensing goes up, and as pressure decreases, it goes down. As a result, a pressure sensor reading of either the gas pressure applied to the beer or the hydraulic pressure of the beer in the dispenser beverage flow pathway may be used to cause adjustment in the number of digital flow cycles applied to the primary beverage pour for consistent foam making. This pressure may be measured just prior to each dispense event or pour.

Because both temperature and pressure changes alter pulsed flow foam making efficiency, maintaining a consistent foam making result from pour to pour with changes in these parameters may be done by measuring both and adjusting pulsed flow cycle count or flow pulse characteristics accordingly.

As shown in FIG. 28, a beverage temperature sensor 2844 and a beverage pressure sensor 2846 are provided, with both sensors being located at the top of the nozzle 105. As can be seen, the sensors directly measuring the temperature and pressure of the beer are in the subsurface filling bottom shut-off beverage dispensing nozzle 105. As shown, the sensor is mounted into the dispensing nozzle top seal and displacement plug 2848. This sensor location allows a sensing location that is particularly favorable such that inflowing beverage temperature and pressure effects are immediately sensed, and, in a prolonged standby condition the location gives an internal nozzle volume beer temperature and pressure that is uniquely indicative of the actual temperature gradient of the beer in the vertical nozzle barrel. Another advantage of this location is that, in the event of sensor failure, the entire top seal plug 48 can easily be removed and replaced, effecting a simple change out procedure for maintenance personnel. To this end, the nozzle top seal and displacement plug 48 is provided with a nozzle top seal 49. In addition, the operator rod 29 is provided with an operator rod shaft seal 49A.

In the embodiment illustrated in FIG. 28, the actuator is operated by air. However, the actuator may be operated in other ways.

With in-nozzle temperature sensing, an accurate temperature reading can be taken prior to each commanded pour. This reading, processed by the electronic controller, can be directly used to alter the volumetric flow rate of the beer flowing into the glass as the beer temperature changes. This alteration may be up or down, depending on the direction of temperature change. As in the previous cases, the alteration in volumetric flow rate allows the pour characteristics, as previously established, to be maintained, and in particular the amount of foam on the poured beer to be controlled.

Combining sensed changes in both beer flow pressure and beer temperature may employ a series of rules and a weighted computation or formula or algorithm. The magnitude of change in foam cycles as a function of temperature can be empirically understood in a defined system by experimentation. These data can, in turn, be expressed as a numerical relationship which can be stored for implementation in the electronic controller (typically a microcontroller) associated with beverage dispensers of the herein cited types. Similarly, the change in flow pulse count with pressure changes can be understood empirically in a defined system.

Computation rules reflect the relative importance or effect of temperature and pressure changes, their magnitude and their direction of change, with temperature taking precedence. Thus, typically and generally, when magnitude of indicated cycle count or resolution change for temperature exceeds pressure mediated changes, the temperature adjustment can be executed. As a second computation rule, pressure change is generally fractionally weighted to a temperature change. As a third rule, an indicated change in pulse cycle count which is fractional is always rounded up to a full cycle count for implementation.

In every case, operating alarm limits can be set specific to minimum and maximum temperature and pressure levels, and to the maximum allowable alteration to the number of pulsed flow foam making cycles.

FIG. 46 shows a beverage dispenser with a beverage flow control valve determining beverage open to flow or closed to flow condition into and through an open tube beverage filling nozzle which is long enough to allow the flow orifice to be placed near the bottom of the beer glass prior to filling and to be maintained below the surface of the beer throughout the primary pour volume flow period. This arrangement requires the open flow orifice subsurface nozzle described, and a flow control valve capable of the on-off cycle speeds extensively described and discussed previously. At the completion of a primary pour and with the flow control valve closed, the subsurface dispensing nozzle is hydraulic or filled completely with beverage. Under this circumstance, a rapid pulsed flow cycle of the flow control valve will produce the beverage pulsed flow turbulence that, in turn, causes gas to be liberated in a defined and repeatable foam generating way, in essentially the same manner as with a bottom valved subsurface nozzle.

Although not necessarily essential, a dispenser with an open tube nozzle equipped with a volumetric flow rate control device, as shown at 4615 in FIG. 46, allows the pulse foam method to be controlled from a flow rate perspective as in the bottom shut-off version. Also, control of the rates of motion and positioning and sensing of the flow control valve can be equivalent to those described in the bottom valved nozzle systems, and the effects and consequences of these control aspects are equivalent as well.

Figure 54:
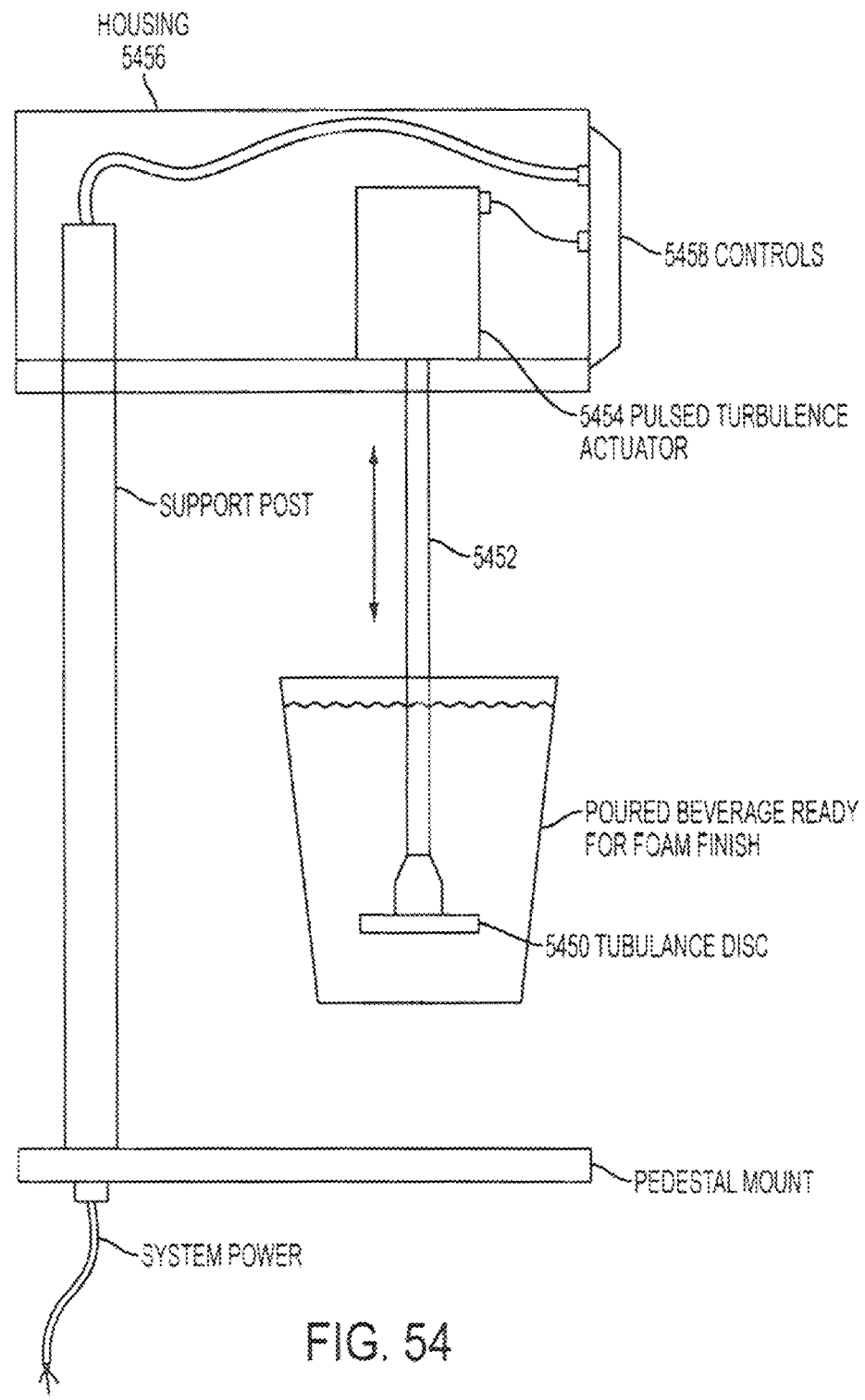
FIG. 54 shows a separate pulsed turbulence device for the sole purpose of creating a defined and controllable and repeatable foam finish in a draft beer serving poured from a separate and discrete beer dispenser.

In another variation, as shown in FIG. 54, the cyclic motions for making foam previously described absent of beverage flow can be implemented with a separate pulsed turbulence device for the sole purpose of creating a defined and controllable and repeatable foam finish onto a draft beer serving poured from a separate and discrete beer dispenser. In operation, the turbulence disc 5450 is placed in the previously poured beer as shown in FIG. 54, and the disc 5450 is reciprocated in the vertical axis rapidly and repeatably to produce a defined amount of foam with each cycle. To this end, as can be seen from FIG. 54, the disk 5450 is supported on vertical shaft 5452 which is caused to be moved up and down rapidly by a pulsed turbulence actuator 5454 supported in an overhead housing 5456. Mounted on the housing is a control pad 5458, which may be a touch screen pad or any other suitable control device. While a separate disk is illustrated for the purpose of creating foam it should be noted that cycling the valve 5418 open and closed when the bottom shut-off beverage dispensing nozzle is positioned below the surface of a dispensed beverage, without beverage flow occurring through the nozzle, causes turbulence within the dispensed beverage, allowing formation of a desired and defined amount of foam.

Although somewhat less efficient in per cycle foam production than the pulsed flow techniques, this pulsed turbulence design is controllable and usable within the same set of concepts, principles, and actions discussed previously. The advantage of the apparatus is that it is separate from and therefore usable independently from the beer dispenser. This allows the digital pulse foam making advantages and benefits to be applied independently of how the primary volume beer pour is accomplished. It also allows the pouring and foam finishing tasks to be separated which can, in some serving settings, confer efficiencies or flexibility of throughput.

Figure 55:
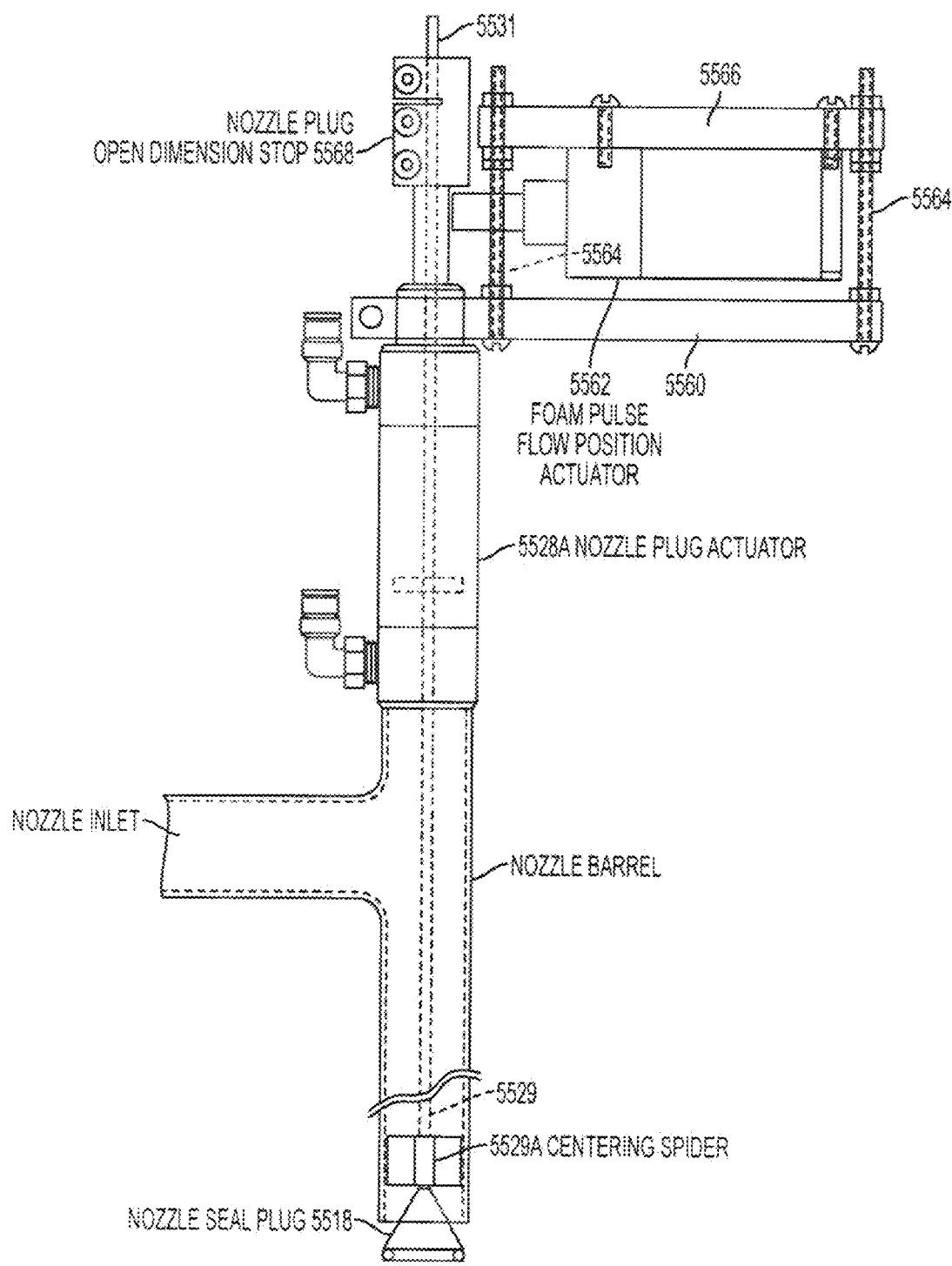
FIG. 55 illustrates a mechanically adjustable pulsed flow actuator.

FIG. 55 shows a version of a subsurface filling bottom shut-off beverage dispensing nozzle with an adjustable mechanism for controlling nozzle stroke or opening dimensions. Thus, a nozzle barrel has a suitable actuator 5528A affixed to its upper section. In this design a double acting air cylinder actuator is employed, having rods 5529, 5531 extending to either side of the cylinder 5528A. A nozzle plug open dimension stop assembly 5568 is carried by the upper rod 5531 and can be secured to the rod in various positions of adjustment. Above the actuator 5528A and mounted to a side plate 5560 is a second actuator 5562, also called a foam pulse flow position actuator, which can be adjusted using the four threaded posts 5564, only two of which are shown. By adjusting the posts 5564, the actuator mount plate 5566 can be moved up or down such that when the second pulsed flow position actuator is extended to the position shown, the nozzle plug open dimension stop 5568 contacts the actuator 5564, thus limiting and reducing the outward opening distance of the nozzle plug 5518. The reverse arrangement can be used in the case of an inward opening version of the nozzle of the type shown in FIGS. 26 and 27. The purpose and effect of this apparatus is to allow adjustment and calibration of the digital foam making process separate and apart from the primary volume dispensing of the beverage, resulting in control as explained previously. Thus, the pulsed flow position actuator is retracted when the nozzle is to be opened completely for a primary volume beverage pour. At the end of the pour, the nozzle is closed. The pulsed flow position actuator rod 5570 is then extended and the nozzle re-opened with the nozzle plug open dimension stop 5568 contacting rod 5570, thus limiting the nozzle opening dimension to some desired interval less than maximum. Many other mechanical means could be used to achieve this described and desired result including stacked actuators, cam stops, and the like.

Figure 56:
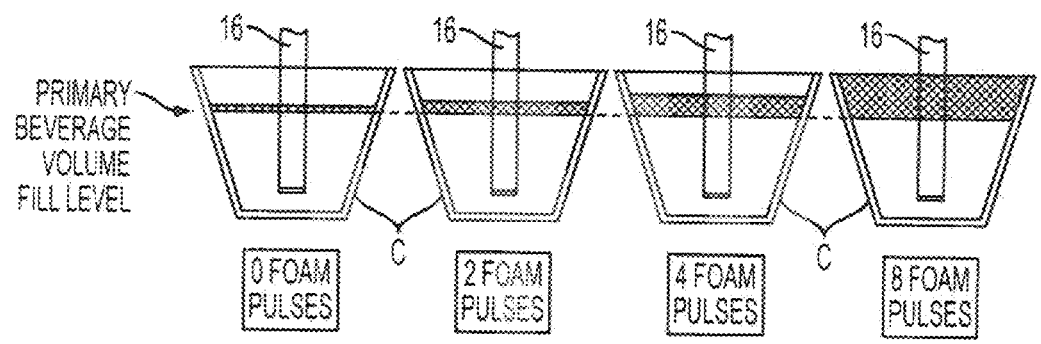
FIG. 56 illustrates the relationship of foam cap to pulse count.
Figure 57:
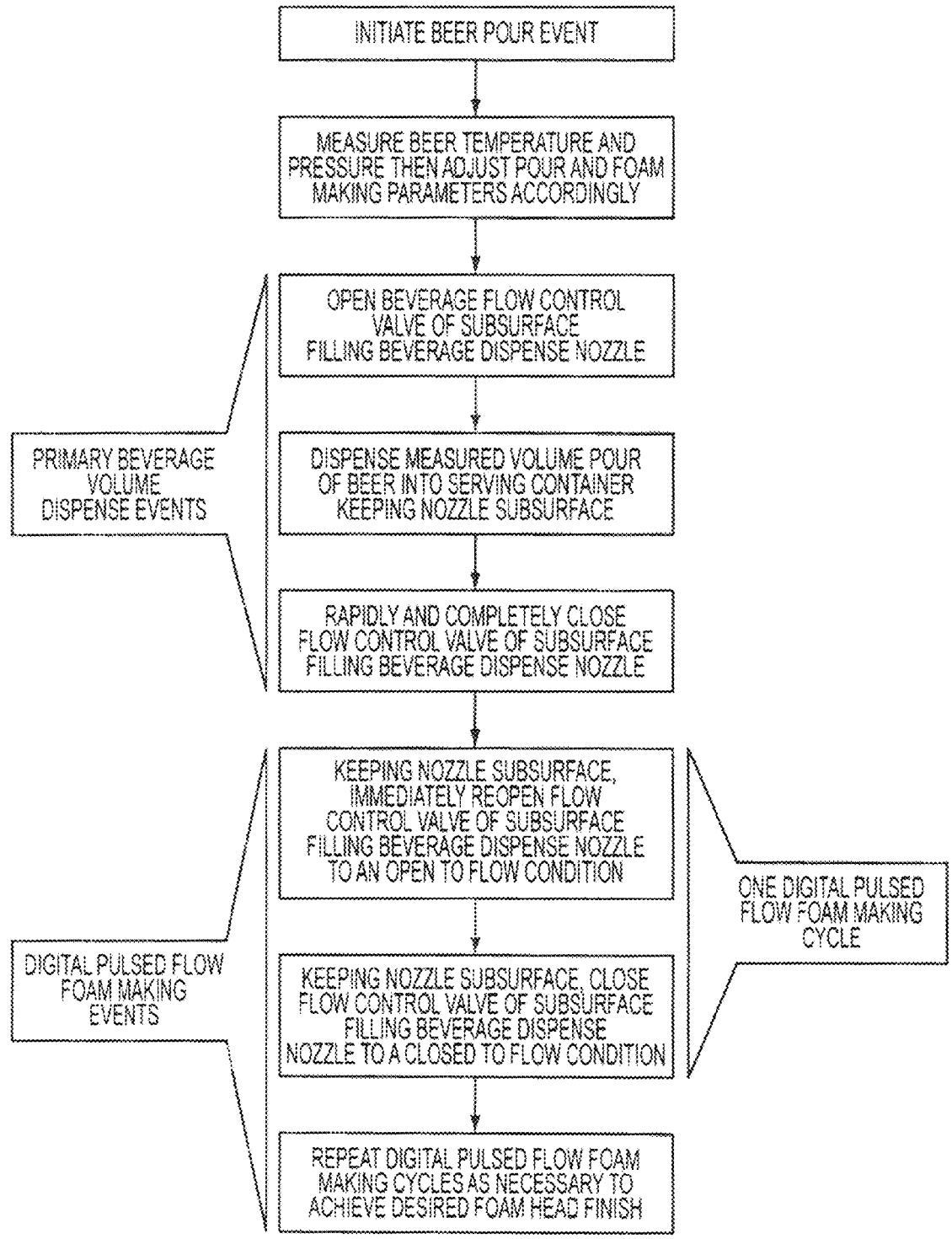
FIG. 57 is a flow chart of a beverage dispensing event.

To reiterate, and with reference to FIG. 56, the digital foam method may be used to control the foam cap by controlling the number of pulses either during the primary pour cycle or upon completion of the primary pour cycle to provide the desired amount of foam in the beverage. As shown in FIG. 56, there is a correlation between the number of pulses and the amount of foam generated (i.e., the larger the number of pulses generally, the larger amount of foam). FIG. 57 illustrates the method described above in flowchart format and shows that the control valve may be opened and closed during the dispensing event to generate the desired amount of foam.

A refinement to the systems discussed above is to provide a mechanism and method to initiate the start of a dispense event using the beverage dispensers described above. The phrases beverage vessel, serving vessel, glass, cup, receptacle, and the like are utilized. These terms all designate the containment into which the beverage flows during dispensing and may be considered to be interchangeable. Where the term "vessel" is used, this term includes serving vessels such as pitchers and the like, and drinking vessels such as cups, glasses, and the like. Likewise, the terms start, initiate, trigger, actuate, and the like are used. These terms all designate the action and apparatus required to cause beverage flow to begin into a serving vessel, and may be considered to be interchangeable.

The methods and apparatus for initiating a beverage dispenser sequence of dispensing events are particularly suited for use in dispensing of draft beer using a subsurface filling beverage nozzle. The apparatus typically apply a generally upward, sideward, or radial force to such a nozzle utilizing the beer glass to be filled, thus causing dispensing to begin. Ideally, there is no element of structure, shape, or apparatus associated with the dispensing end of the nozzle required to start the dispensing event. Thus, the dispensing form, shape, and size of the nozzle are determined by the beverage flow requirements and characteristics sought from the nozzle, the start capability being derived from the nozzle independent of its particular form factor. This provides the beverage dispenser with maximized dispensing performance, a robust and sanitary design of the nozzle dispensing end, and with no complicating dispenser actuating structure, and without compromise in any dispenser trigger characteristics desired. Thus, any nozzle suitable for dispensing a beverage, especially beer, on a subsurface flow basis when unmovably mounted is suitable for use.

Figure 58:
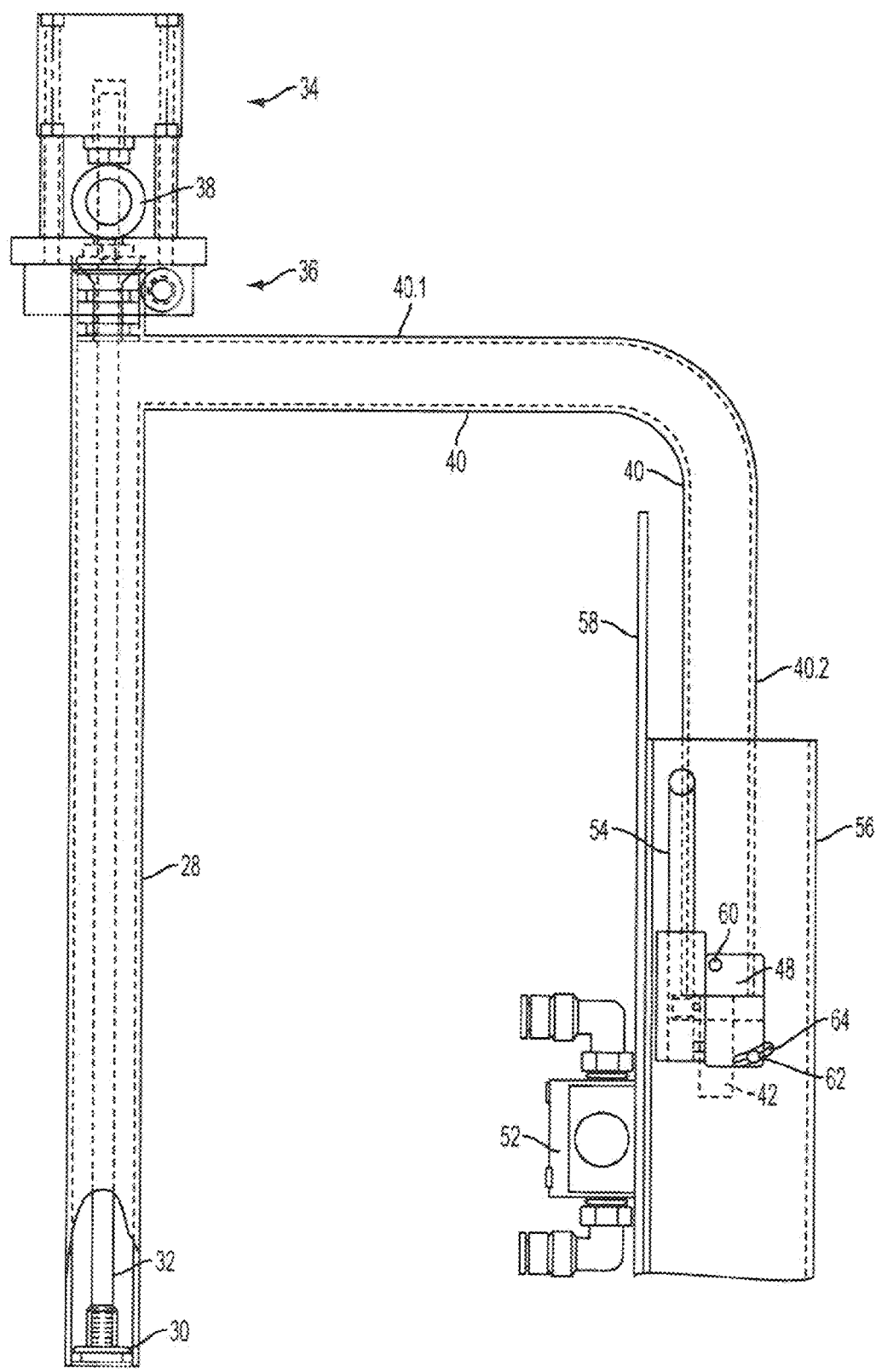
FIG. 58 illustrates a pivot trigger apparatus.
Figure 59:
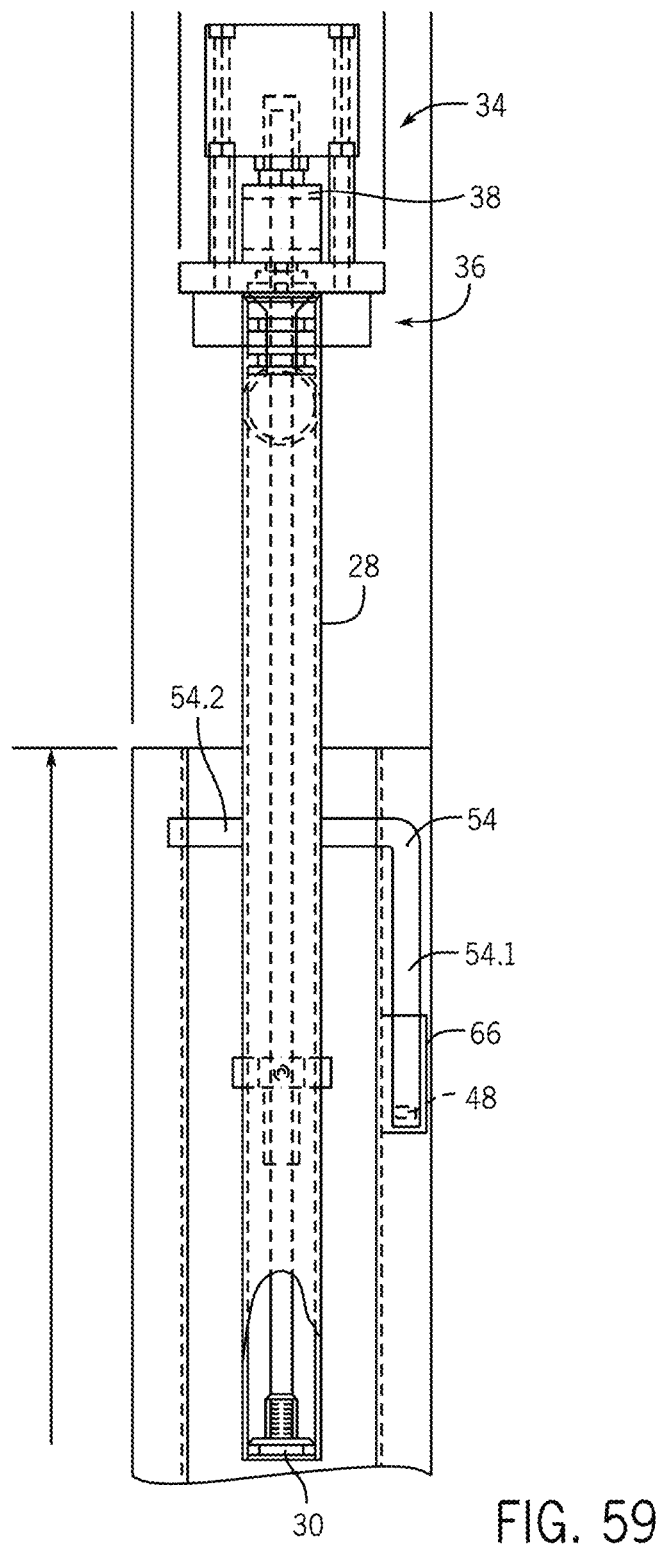
FIG. 59 is a front view of the apparatus of FIG. 58.

Referring to FIGS. 14, 58, and 59, a mechanism for initiating and terminating the beverage flow into a vessel 1424 is indicated generally at 26 in FIG. 58. The nozzle assembly includes a generally vertical dispensing tube 28 which has a fluid outlet at the bottom, the outlet being closed as shown in FIG. 58 by a shut-off valve 30. The valve is carried by the lower end of an actuator rod 32 for movement between its raised closed position sown in FIG. 58, and a lower open position (not shown). Mounted above the tube 28 is a pneumatic actuating cylinder assembly indicated generally at 34, the actuator rod 32 being connected thereto at its upper end. The rod 32 passes through a seal assembly indicated generally at 36, the seal assembly insuring that the beverage in the tube 28 does not leak out. Mounted above the seal assembly and below the pneumatic cylinder assembly is a nozzle actuating rod bumper 38. While a pneumatic cylinder is illustrated as the nozzle actuator, other actuators may be used.

The tube 28 is integrally connected to a further "L" shaped tube 40 that has a generally horizontal portion 40.1 and a generally vertical portion 40.2. A fluid inlet 42 is provided at the lower end of the portion 40.2. The fluid inlet is coupled, either directly, or through a conduit, to a volumetric flow rate controller of the type discussed above.

A beverage dispensing event is initiated when a vessel 1424 (FIG. 14) is brought into contact with the lower end of the dispensing tube 28 or the shut-off valve 30, which moves the dispensing tube 28 slightly. Movement of tube 28 initiates a control signal from a micro switch 48 that is coupled to a controller 1450. The controller 1450 controls operation of a nozzle actuation valve 52. Depending upon the signal received from the controller, the valve 52 will cause the cylinder assembly 34 to move between valve open or valve closed positions. To this end, it should be noted that tubes 28, 40 are rigidly connected to each other and that they are of a generally rigid construction, such as metal. The vertical portion 40.2 is welded to a vertical portion 54.1 of an "L" shaped pivot arm 54, the horizontal portion 54.2 being received in two spaced apart pivot holes (no number) in spaced apart sides of a flanged channel shaped mounting frame 56. A pneumatic valve mounting plate 58 is secured to the flanges of the frame 56. The micro switch 48 is mounted via first and second fasteners 60, 62, the second fastener being received in a slot 64 to position the micro switch 48. A rubber-like sleeve 66 is positioned about the lower end of the pivot arm.

In operation, the controller 1450 is typically programmed with the type of beverage, for example a brand of beer, and also with the type of vessel that will be presented. The beverage dispenser will also be provided with an ambient temperature sensor (not shown) and a pressure sensor (not shown) so that variable data can be processed by the controller. In order to initiate a beverage dispensing operation, a vessel is brought into a position just below the dispensing tube 28, and the vessel is moved upwardly contacting the dispensing tube and causing the tubes 28, 40 to pivot slightly. When this occurs, the micro switch 48 sends a signal to the controller 1450 which will start a dispensing event. The dispensing event includes the commencement and end of the pour. A dispense event will typically take about 3 to 3.5 seconds to fill a conventional beer cup. The apparatus will typically be ready within 0.5 seconds after a dispensing event has been completed for the commencement of the next dispensing event.

While a micro switch has been discussed in view of the initiating apparatus, other devices, like a pressure sensing strain gage can be used to send signals to the controller indicating the start of a dispense event.

Figure 79:
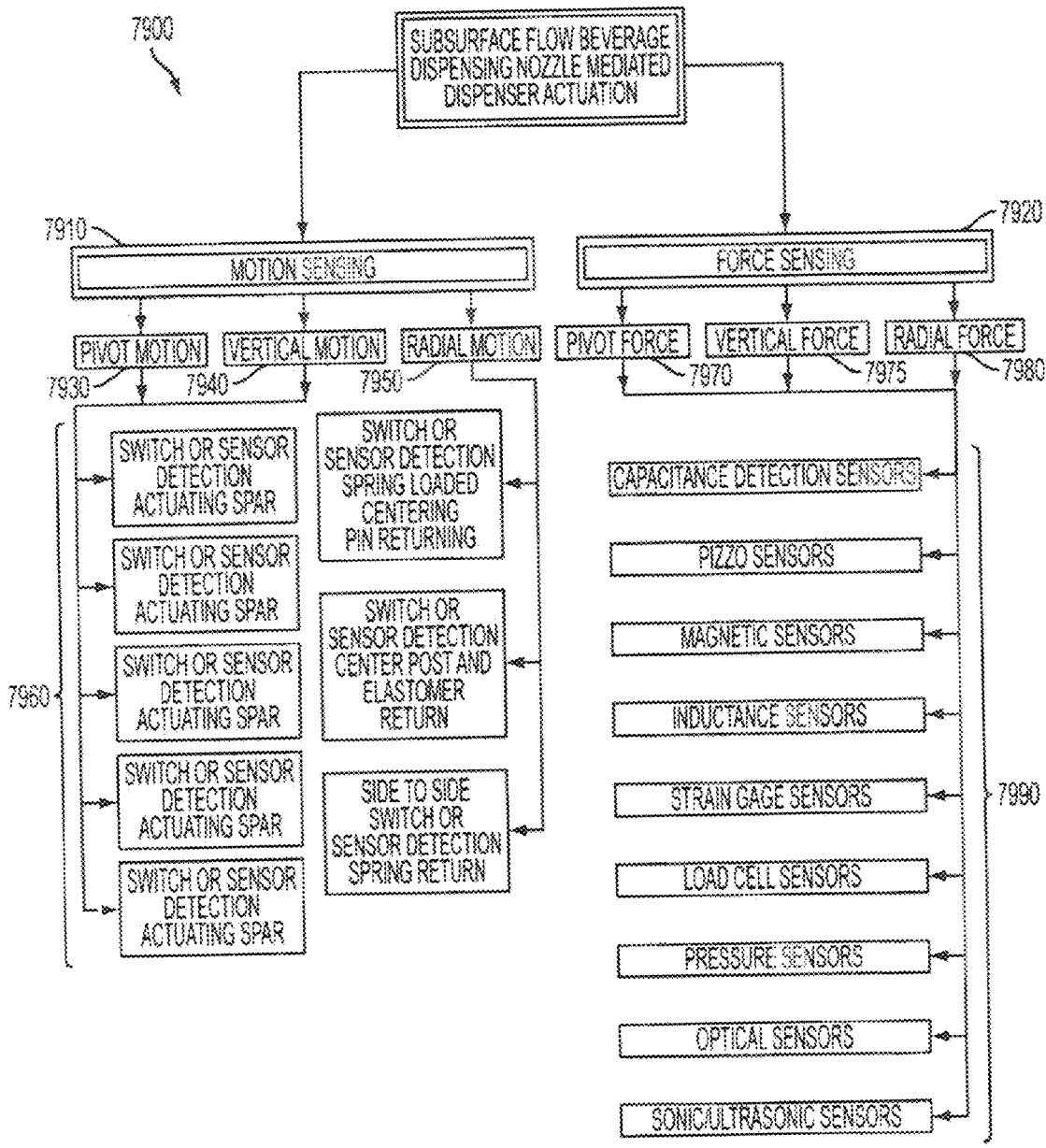
FIG. 79 is a chart illustrating various trigger configurations.

FIG. 79 graphically depicts a classification 7900 of the various trigger configurations used to initiate a dispensing event. As shown, the configurations may be subdivided into two groups. The first group 7910 includes those configurations where the motion of the nozzle is sensed. The second group 7920 includes those configurations where a force applied to the nozzle is sensed. The motion sensing group 7910 may be further subdivided into three groups: pivot motion 7930, vertical motion 7940, and radial motion 7950; and these three into groups by the nature of the sensors or detectors used to sense the various types of motion 7960. Likewise, the force sensing group 7920 may be further subdivided into three groups: pivot force 7970, vertical force 7975, and radial force 7980; and these three into groups by the nature of the sensors or detectors used to sense the various types of forces 7990.

Figure 61:
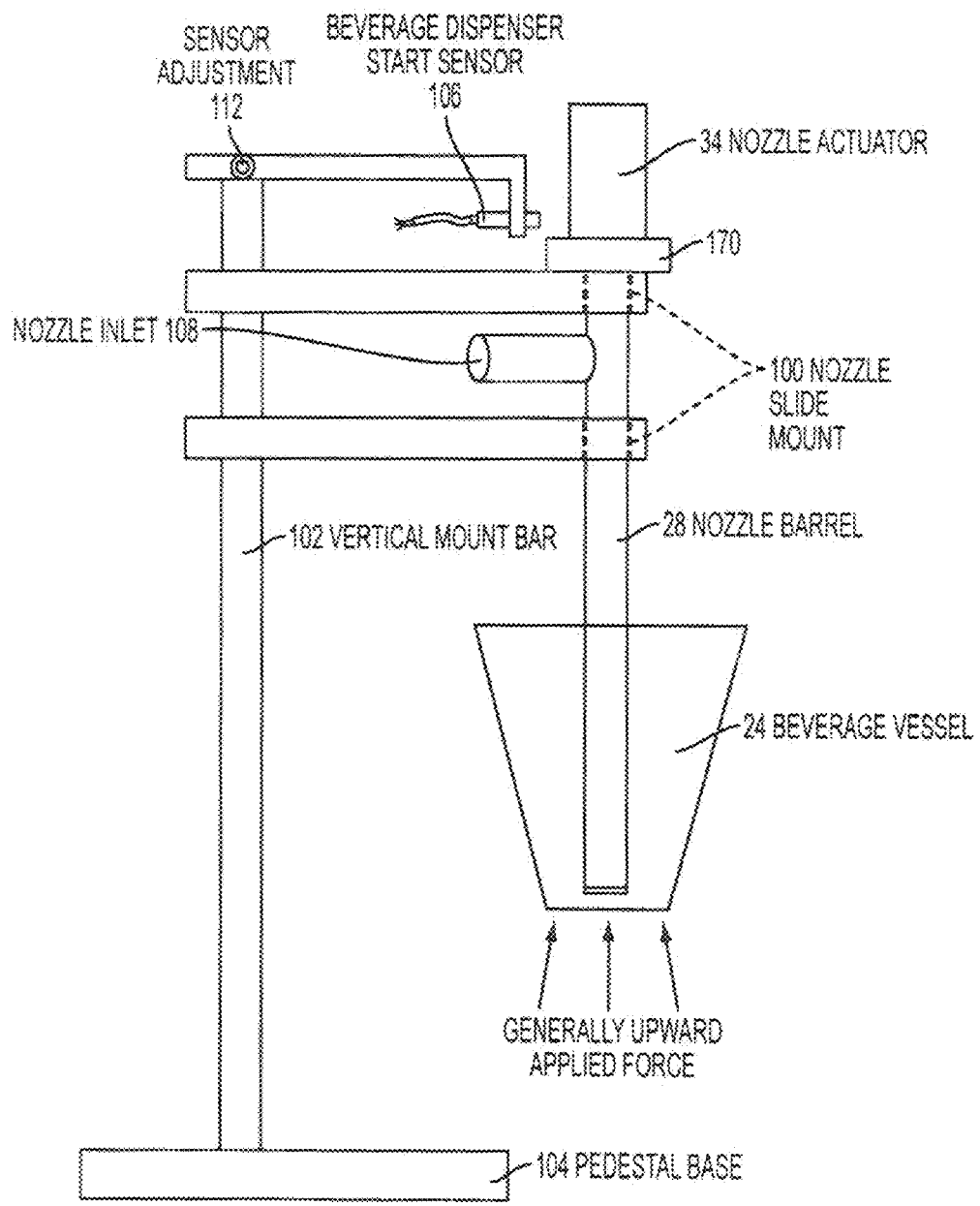
FIG. 61 illustrates a vertical trigger motion.

Referring to FIG. 61, a dispensing tube or nozzle 28 suitable for general placement at or near the bottom of the beverage cup for subsurface filling is shown, supported by suitable structure (nozzle slide mount 100, vertical mount bar 102, and pedestal base 104) to allow convenient placement of the cup or vessel 1424 to the nozzle 28 as generally shown. The nozzle 28 in FIG. 61 is slidably mounted to one or more horizontal support members 100, an upper and a lower support 100 being shown, such that a force applied to the bottom of the nozzle tip, directly vertically or at some angle typically less than 45 degrees from the vertical, will cause the nozzle to move vertically or upward. This upward motion is sensed by the bracket mounted sensor 106 shown in FIG. 61, causing a beverage dispensing event to be initiated, generally by the opening of the bottom flow aperture nozzle as shown in FIG. 61, by the nozzle actuator 34, or in the case of a nozzle with an open bottom, by a beverage flow control valve associated with and controlled by the dispenser (valve shown in FIG. 73). In the case of the bottom shut-off nozzle shown in FIG. 61, the beverage enters the nozzle at the beverage nozzle inlet 108 in such a way that nozzle motion is not impaired. Typically, the vertical nozzle motion as depicted in FIG. 61 is very slight, even to the point of being essentially imperceptible to the dispenser operator, particularly when a shroud is in place thus concealing the working apparatus. Thus, the motion to allow sensor 106 to detect nozzle flange 110 as illustrated in FIG. 61 is exaggerated for clarity and the use of the sensor adjustment 112 is apparent to allow the range of trigger motion desired to be obtained.

After a nozzle lift or displacement has occurred and dispensing is started, or after a pour has been completed, the glass is removed and the nozzle 28 returns to its unactuated position or reseated such that the start sensor 106 no longer senses nozzle flange 110. As depicted in FIG. 61, this is accomplished by the nozzle sliding downward under the influence of gravity and back to its at-rest position as shown with nozzle flange 110 abutting the upper horizontal support 100.

The sensing or detecting element produces a suitable output, most typically electrical or electronic, that is coupled to the electronic controller associated with the dispensers of the type described herein.

Figure 68:
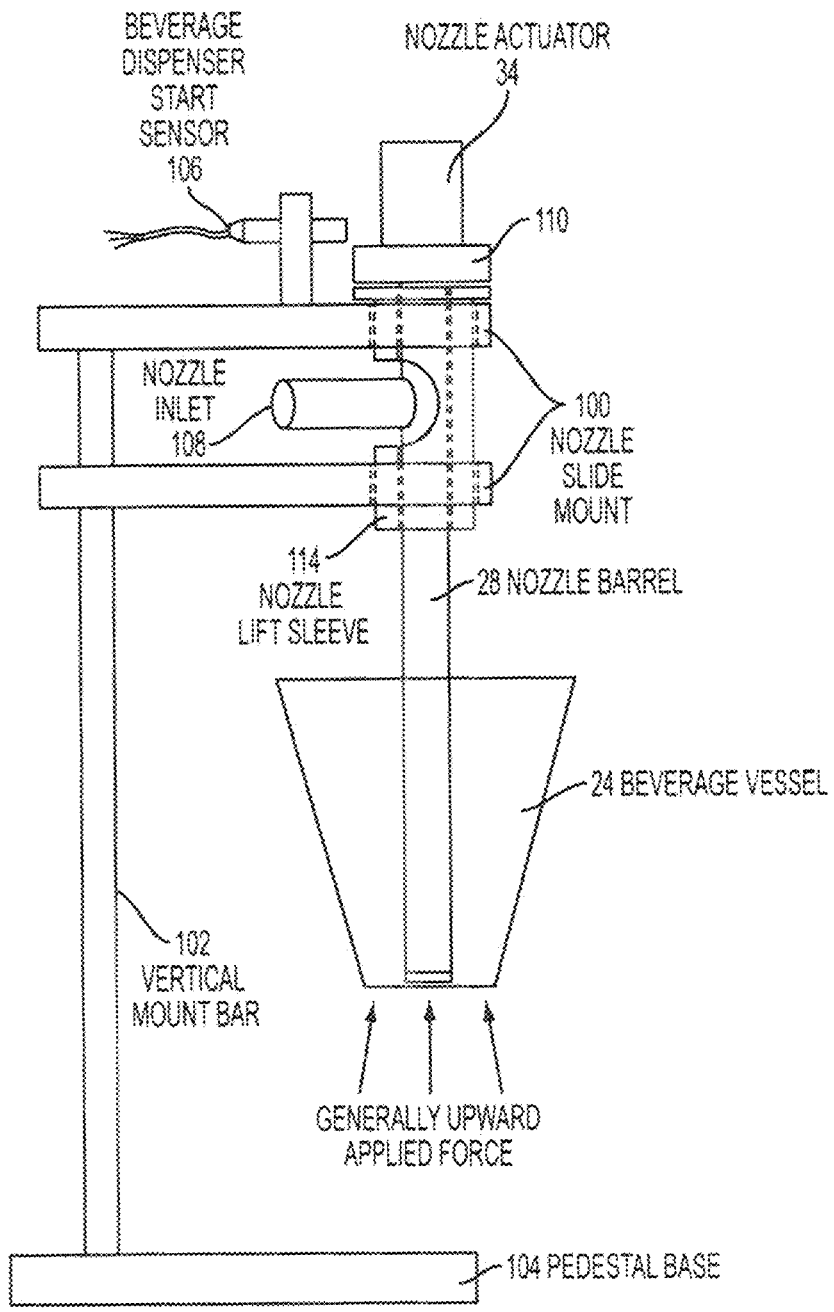

Referring to FIG. 68, another vertical motion with a gravity reseat configuration is shown. In this configuration, the ability of the nozzle to move back downward to a fully seated position (as shown) is enhanced by nozzle lift sleeve 114. This sleeve is essentially a top flanged cylinder through which the dispensing nozzle barrel 28 moves freely. The sleeve is loosely fitted to the upper and lower horizontal nozzle supports 100. In operation, when the nozzle is moved upward, the barrel 28 can move freely in the sleeve, and the sleeve can move freely in its mount 100. The sleeve is typically made of a suitable low friction material such as a plastic like Acetyl, UHMWPE, Teflon, or the like. Thus, it moves freely relative to its mount and the nozzle barrel 28 moves freely relative to the sleeve 114 and this dual sliding motion capability further reduces friction and thus facilitates upward movement of the nozzle, and improves gravity mediated downward motion, improving the reseat characteristics of the nozzle based upon gravity alone.

Figure 69:
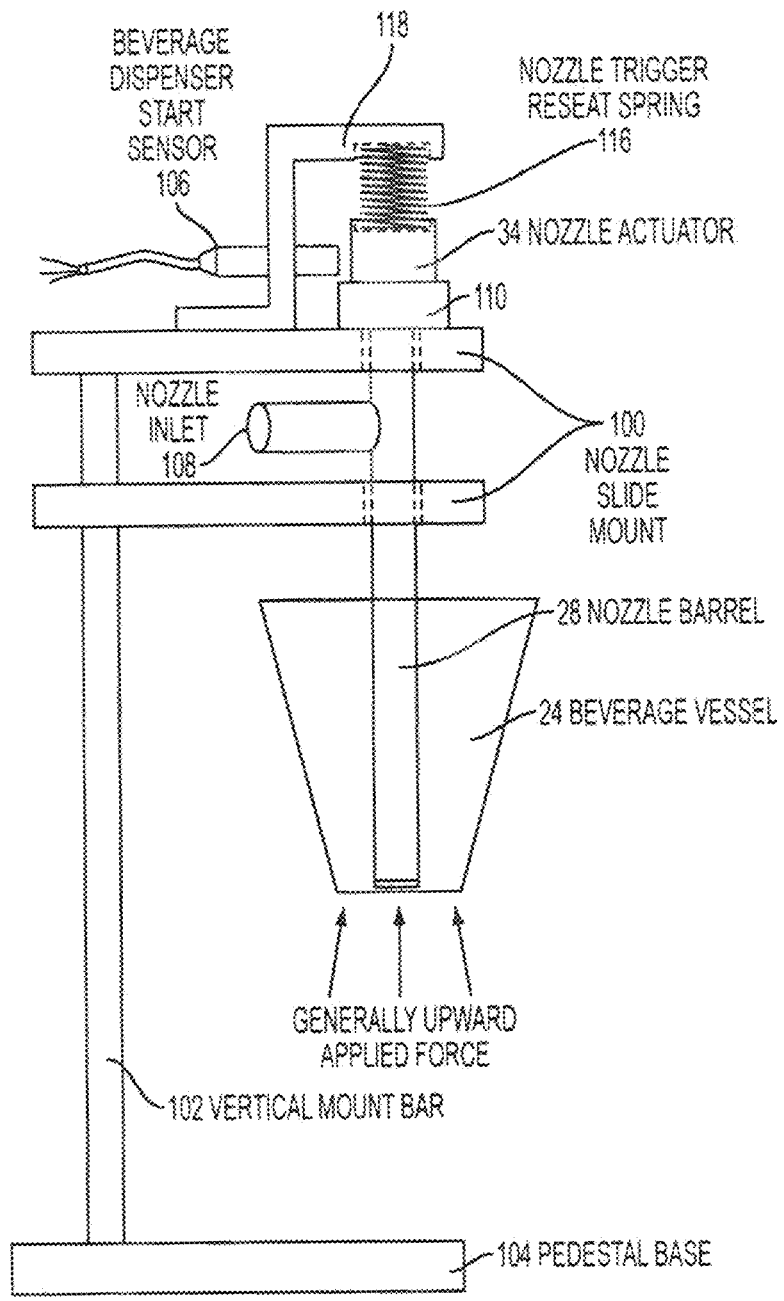

In FIG. 69, a configuration is shown with provision for a nozzle reseat force in addition to gravity, which can be termed a spring assist. Thus, as illustrated, a coil spring 116 of conventional form and suitable compressive force is affixed between the top of the nozzle actuator 34 and a suitable retaining bracket such as shown at 118. When nozzle 28 is moved upward, beverage nozzle start sensor 106 is actuated, and spring 116 is compressed. Thus, when the upward force is removed from the nozzle dispensing tip, the nozzle will move downward until it re-seats against its mount as shown. The spring mount mechanism can be readily modified to be adjustable, thus providing control over the lift force required to trigger the dispenser, and, in the coupled and reverse acting sense, the restorative force applied to return the nozzle to its fully seated position. With this arrangement, the greater the trigger force required, the greater the return force. Other spring forms may be readily and equivalently used, such as wave springs, elastomeric springs, lever springs, and gas filled bladders.

Figure 67:
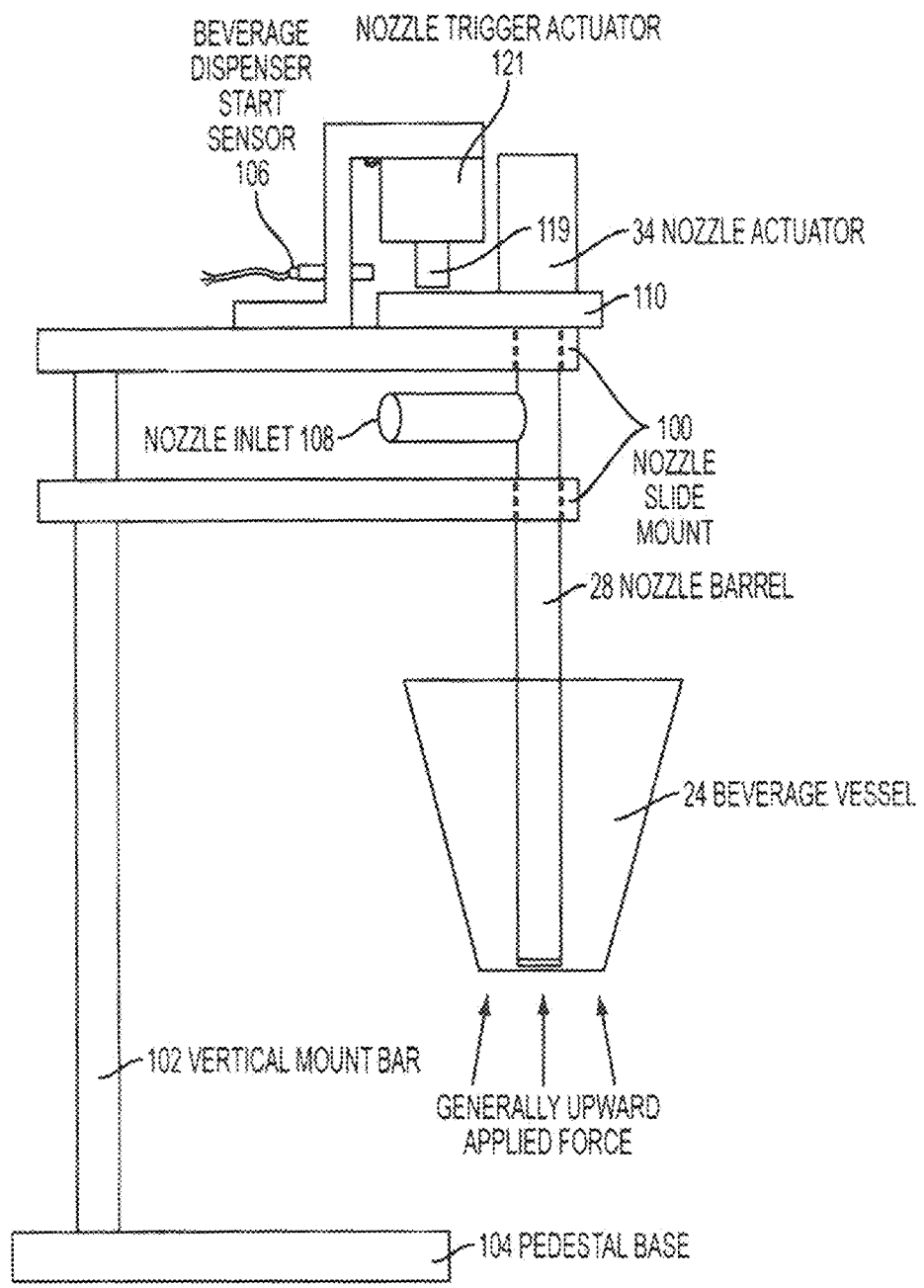
FIGS. 67-73 illustrate additional vertical trigger configurations.

In FIG. 67, a vertical motion configuration is shown that provides for the use of an actuator 34 to reseat the nozzle 28 after a generally vertically applied movement of trigger 119 by trigger actuator 120. The actuator allows a decoupling or division of the upward start force and the downward reseat force. Both may be regulated by the same actuator by causing the actuator to apply two different forces under the two variant conditions. For example, where the actuator is a pneumatic cylinder, two different gas pressures can be applied for this purpose. In the event of a solenoid actuator, the pulse width modulated coil drive can provide direct force control. Generally, however, it suffices to cause the actuator to apply no force opposing the trigger motion, and to actuate only to reseat the nozzle following the trigger event. The actuator can also detect lift trigger motion, since many carry a moveable armature or cylinder rod. Thus, lifting the nozzle can move an element of the actuator which can be detected by a switch or sensor. Use of a sensor also provides a way of encoding the position of the nozzle to assure a reseat position has been reached. In the other configuration previously discussed, the separate start sensor plays this role. After a nozzle lift-trigger motion is sensed, the actuator is energized and the nozzle is rapidly and positively reseated to its standby condition. The active sensor arrangement allows independent control of trigger and reseat motions.

Figure 71:
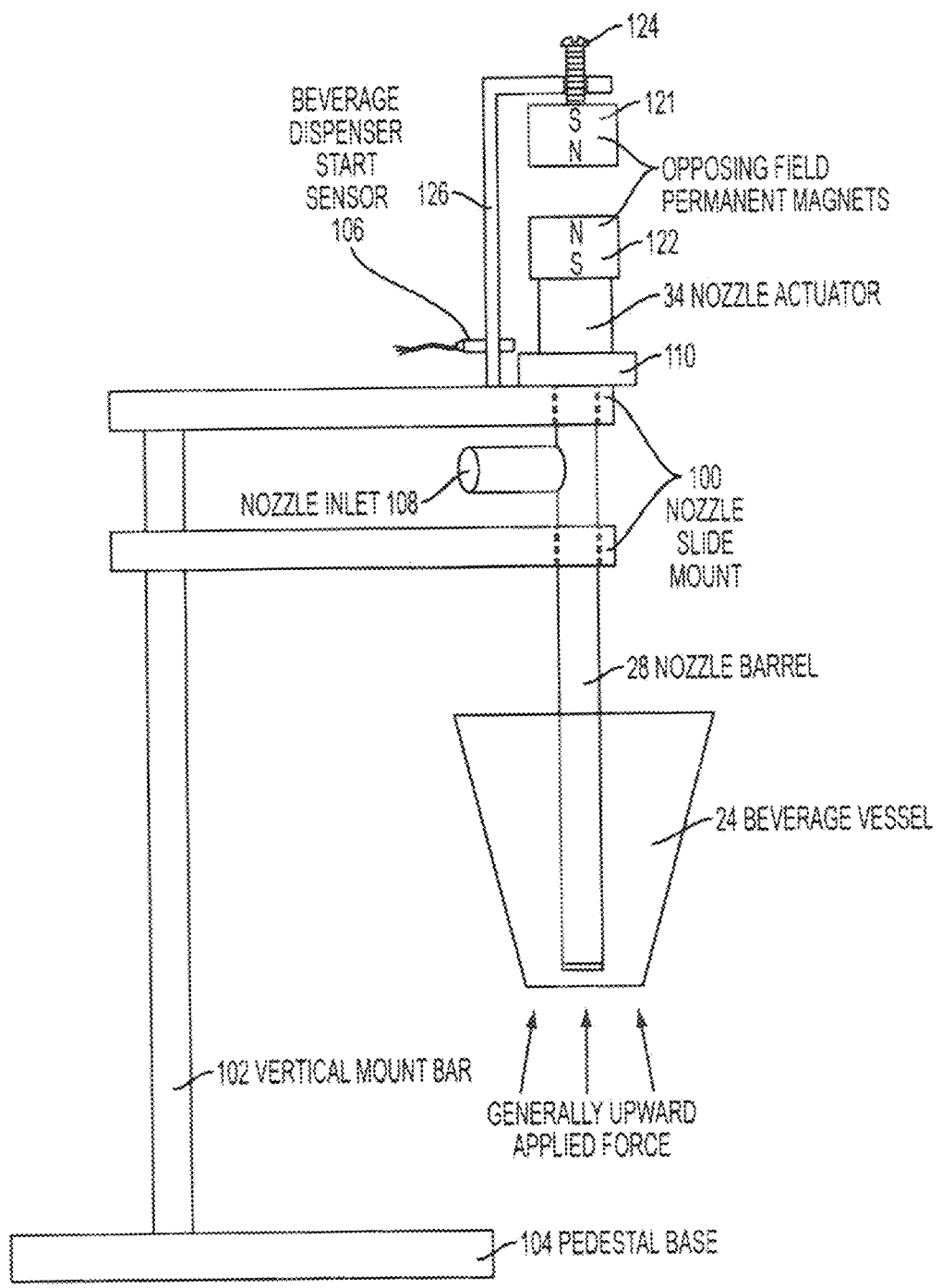

FIG. 71 shows another implementation of reseating the nozzle. In this case, two permanent upper and lower magnets 121, 122, respectively, are arranged coaxially at the top of the nozzle actuator 34, their fields aligned to oppose one another. This results in a continuously applied downward force that can be adjusted via the screw adjustment 124 on the upper bracket 126 mounted magnet 121. As the nozzle is raised up vertically with a beverage dispense actuation, the opposing magnetic force increases as the interval between like poles decreases. Thus, this arrangement provides force progression with motion progression, allowing ease of actuation and a positive force reseat of the nozzle. Other mechanical arrangements may be used for locating the magnets, including a nozzle actuated lever, a nozzle flange and the like.

Figure 72:
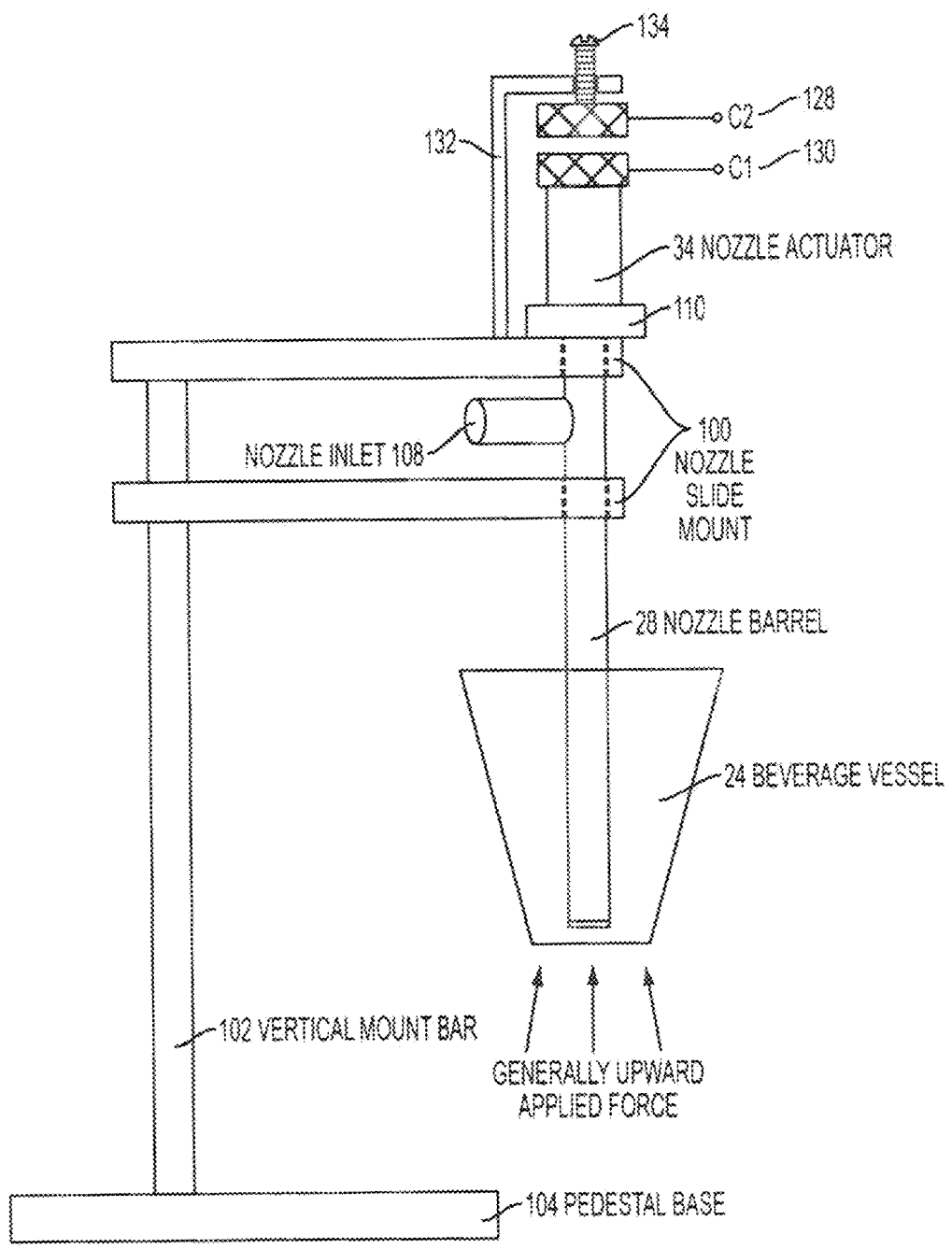

In FIG. 72, an arrangement similar to the magnets shown in FIG. 71 is illustrated. In this case, two conductive surfaces 128, 130 are coaxially arranged, one (130) on the upper surface of the nozzle actuator and the other (128) adjustably on a fixed bracket 132. This allows a direct switch contact upon vertical nozzle lift, with the actual motion distance defined by the upper threaded adjustment screw 134.

It is possible to combine the configurations of FIG. 71 and FIG. 72, allowing the magnets to be integrated with the switch contacts, thus providing the trigger function and the reseat function in one compact design. The magnets can be recessed into the contact surfaces, or, in the case of conductive magnets, the magnets themselves can serve as the contact elements directly.

Figure 70:
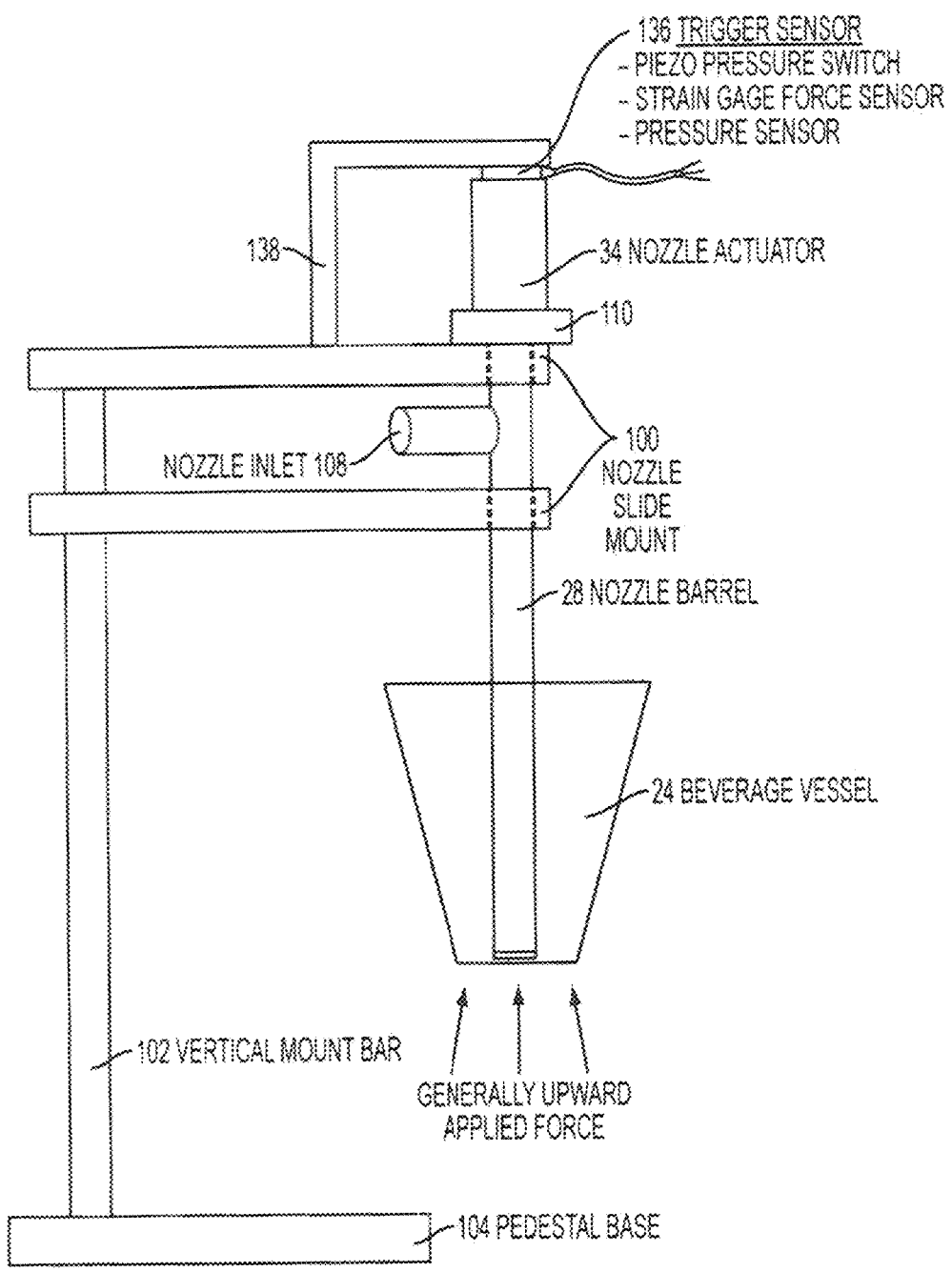

As noted above, it is possible to affect a start signal by applying a vertical force to the nozzle without causing a grossly detectable motion in the nozzle. That is, an upward force can be sensed directly without translation into motion. For example, in FIG. 70, a direct force sensor arrangement is shown where the sensor 136 is coaxial to the nozzle and positioned at the top of the nozzle actuator. Mount bracket 138 locates the sensor precisely such that upward force acting on the nozzle is directly transmitted to the sensor.

Typically, force sensors will exhibit an increment of motion in their function. However, and by example, the increment of motion detectable by a bonded strain gauge sensor can be easily less than one one-thousandth of an inch, and thus not detectable by an individual causing such deflection via a beverage nozzle. Hence, in practical terms, a no-motion actuation is possible. The particular advantage of such a system is most notable in the essentially inherent return of the nozzle to a standby condition when not acted upon. Numerous forms of detection can function in the manner described, including capacitance, piezo, magnetic, inductive, strain gauge, load cell, pressure cell, optical, and even ultrasonic.

Figure 73:
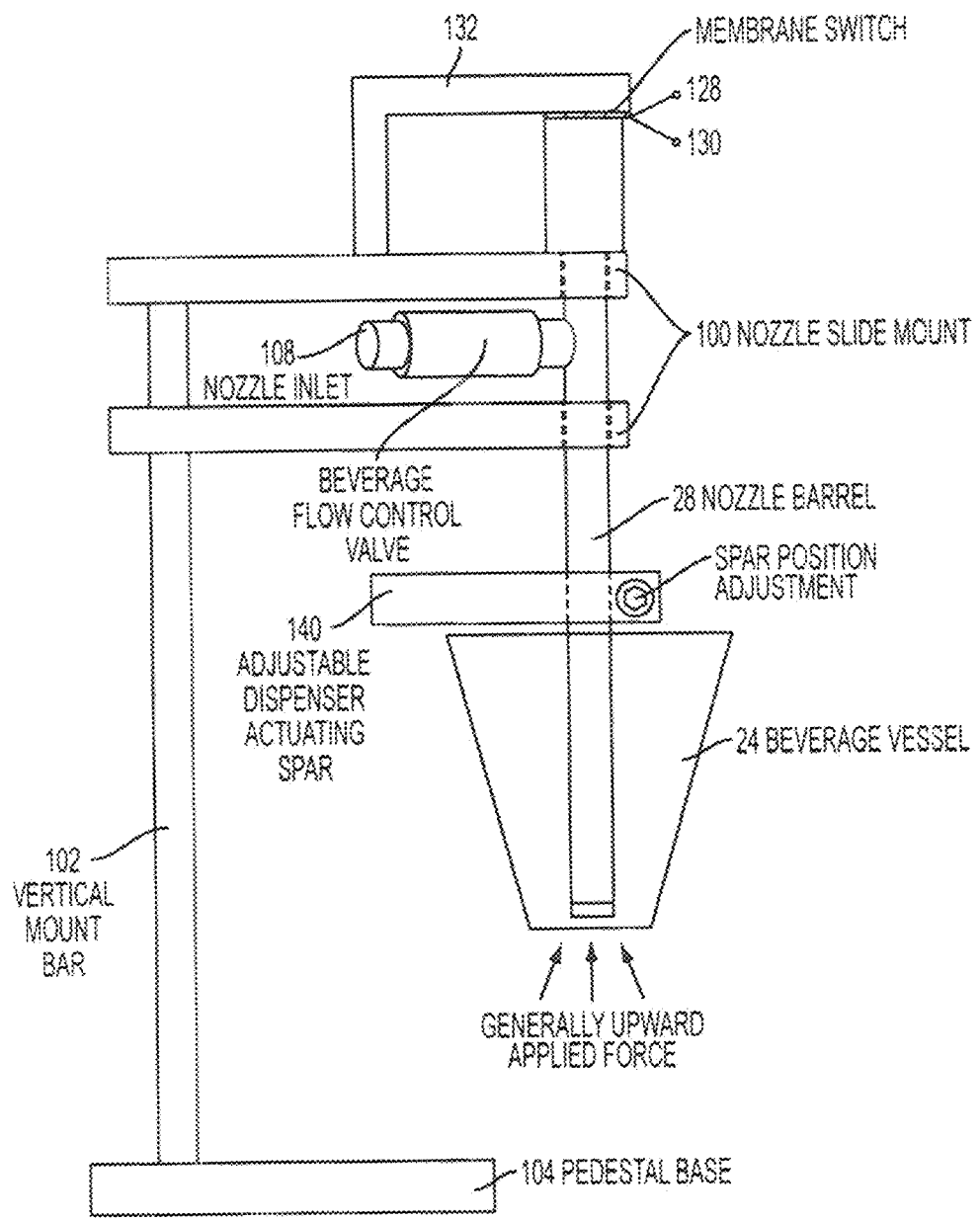

FIG. 73 shows another version of the dispenser start apparatus utilizing a membrane switch. These switches provide a motion that is essentially undetectable and are available in nearly any desired form factor, sealed, rugged, and reliable. As such, they have particular use as shown where a force sensing nozzle trigger design is to be used. Also shown in FIG. 73 is the use of an actuating spar 140 to cause the start of the dispenser. This simply consists of an appropriately shaped bar of any suitable material which is adjustably located on the nozzle barrel 28. The adjustment can be varied, but a split collar form is typical. In use, the spar is brought to bear against the rim of a glass or cup, thus transmitting the upward force necessary to start the dispenser. This form is in lieu of pressing the nozzle tip against the inside bottom of the glass. This method is particularly applicable with dispensing nozzles which are simple tubes with open dispensing tips. In such a case, the spar can be positioned such that actuation takes place with the nozzle dispensing tip near the bottom of the cup, but not touching the bottom. This reduces any blocking, impedance, or interference with the nozzle orifice and the beverage flow from the orifice. The spar can be asymmetrical as shown and disposed in any desired direction, or can be symmetrical to allow glass engagement front or back, left or right. It can also be star shaped, disc shaped, or other suitable form.

Figure 60:
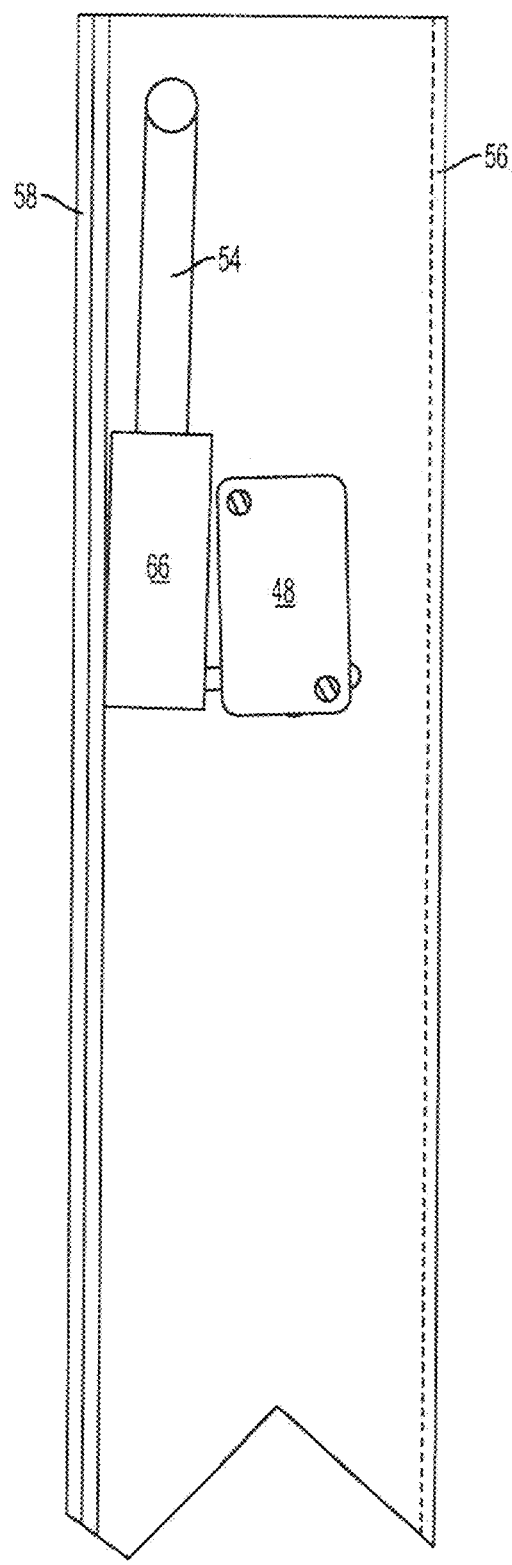
FIG. 60 is a partial view of the apparatus of FIG. 58 after the beverage dispensing event has been initiated.
Figure 62:
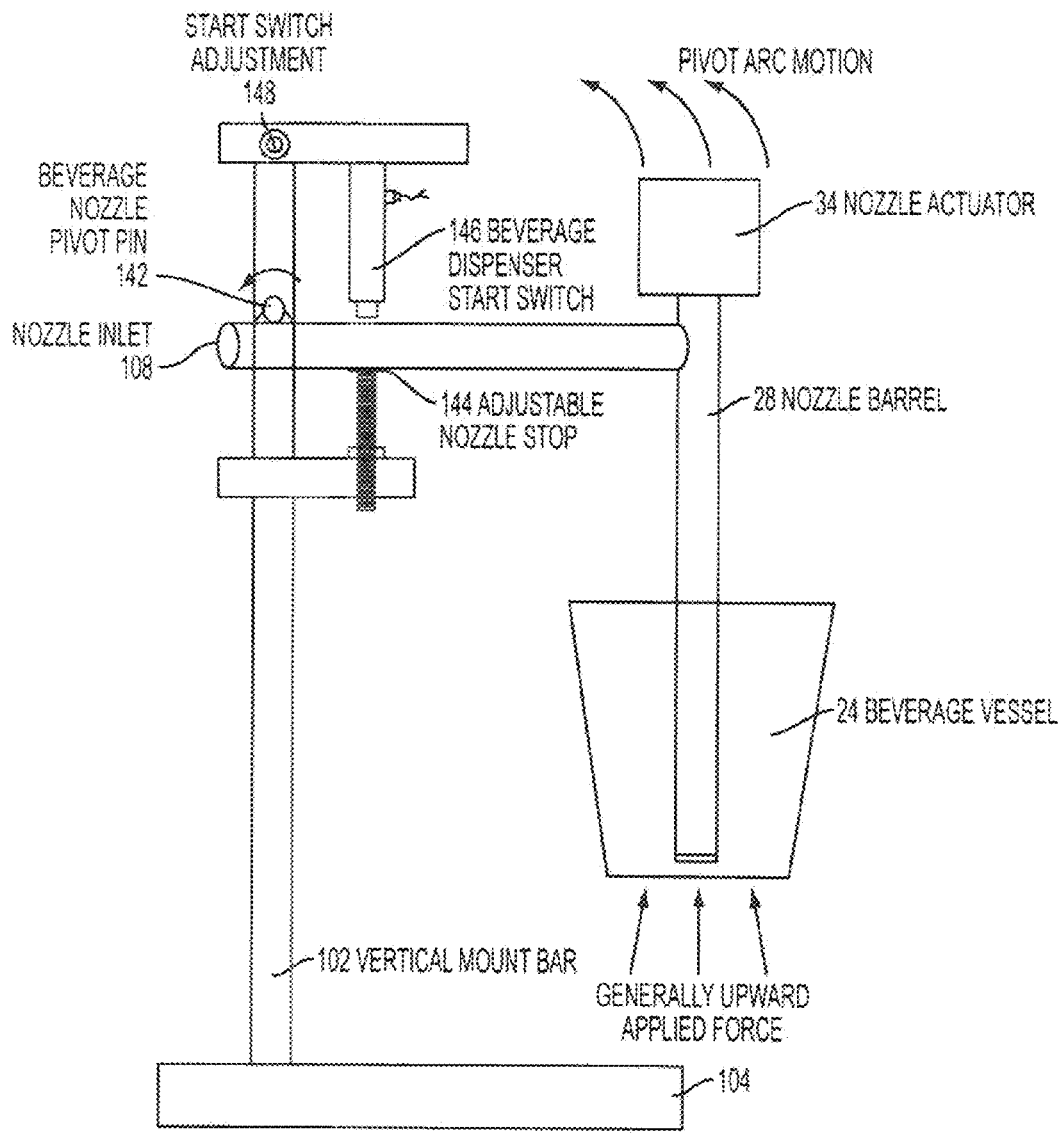
FIGS. 62-63 illustrate additional pivot trigger motion configurations.
Figure 64:
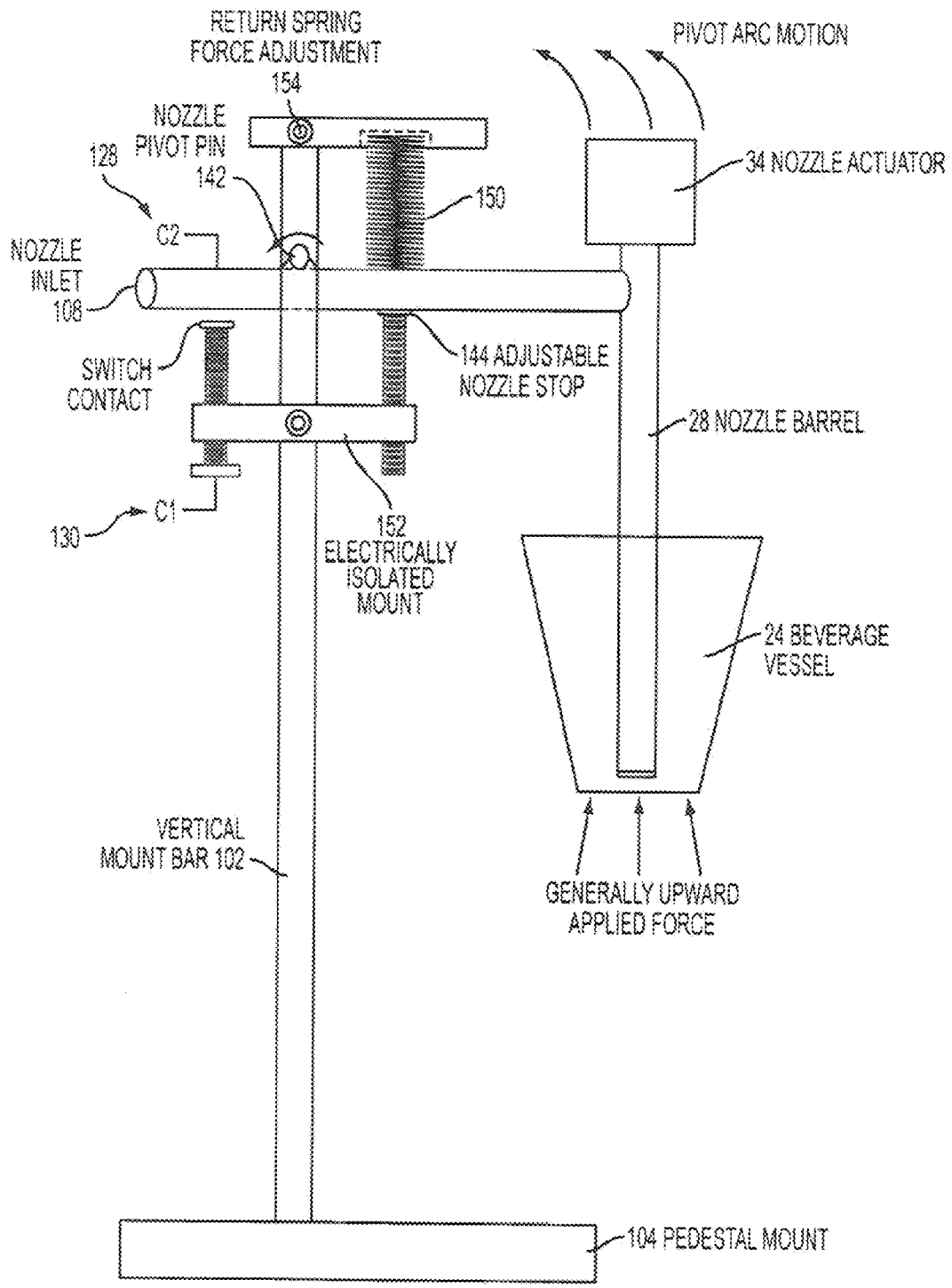
FIGS. 64-66 illustrate additional pivot trigger configurations.
Figure 65:
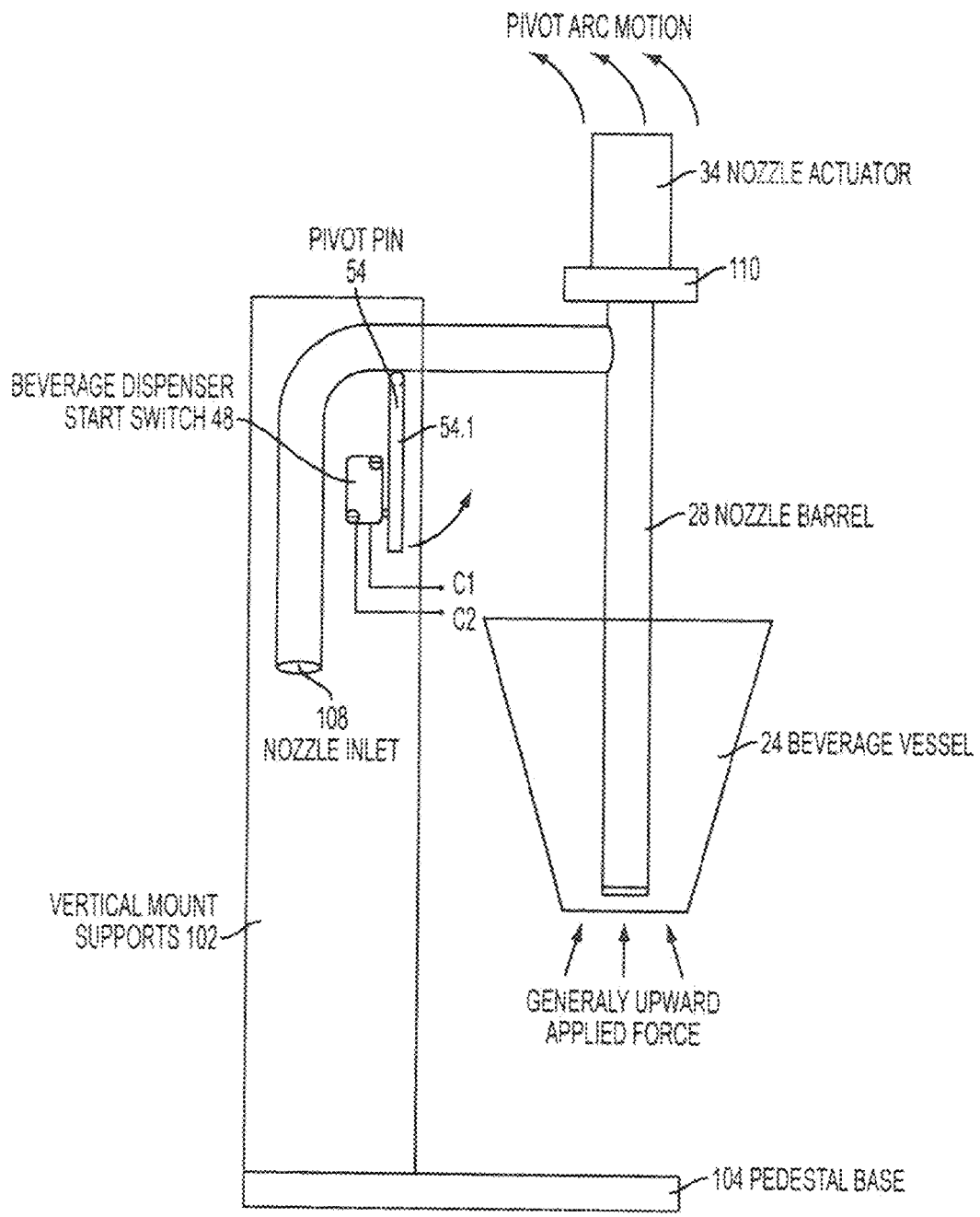
Figure 66:
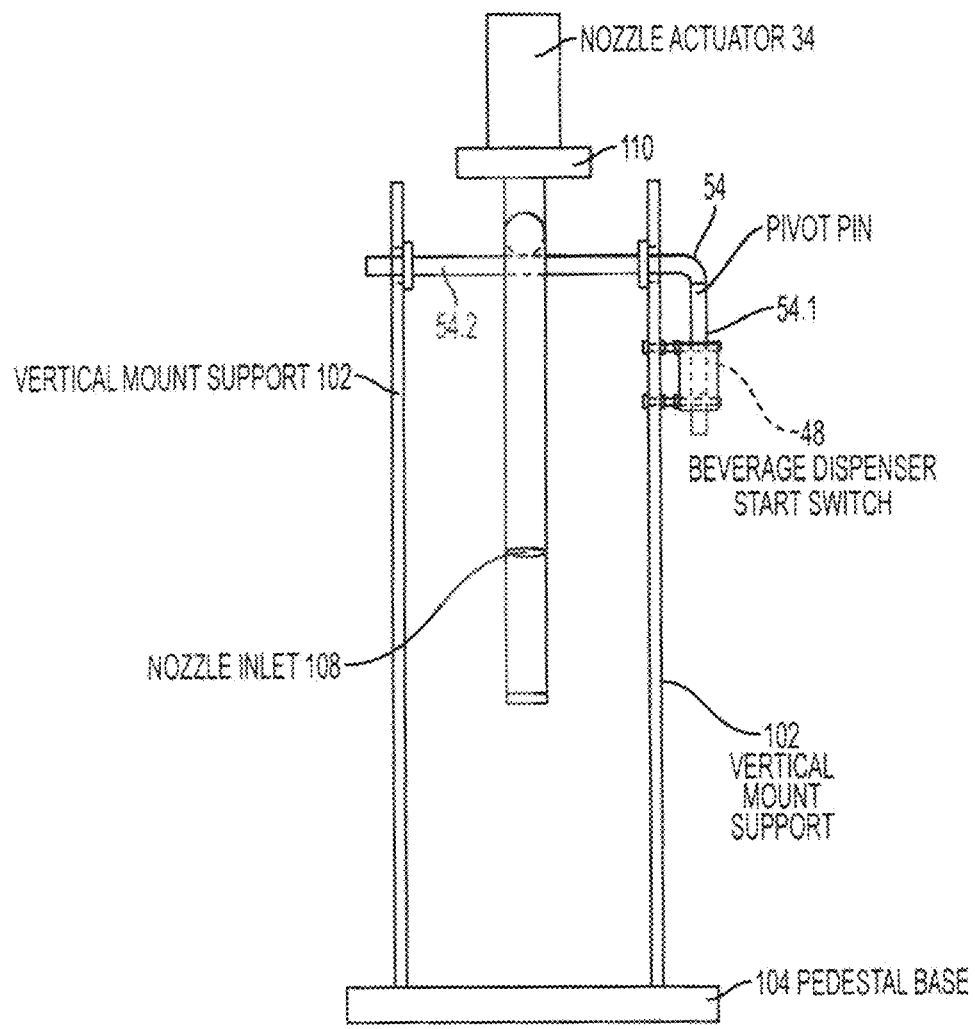

FIGS. 62, 64, and 65, in addition to FIGS. 58-60, depict configurations that utilize a pivot motion of the nozzle to initiate a beverage dispensing event. Each is intended to be actuated by the inner bottom surface of a beverage receptacle being pushed generally upward against the bottom of the nozzle, with force applied to induce nozzle motion at an upward angle of about 45 degrees or less from the vertical.

In FIG. 62, a basic form is shown in which the overhung mass of the nozzle 28 acting on the beverage nozzle pivot pin 142 causes the nozzle to rest securely on adjustable nozzle stop 144. When the nozzle is pushed up, it travels in an arc motion causing the beverage nozzle inlet side feed 108 to pivot upward actuating the beverage dispenser start switch to initiate a dispenser start. The cantilevered weight of the nozzle is adequate typically to return the nozzle 28 to its non-actuated condition as shown. The nozzle stop 144 can be adjusted to assure the nozzle is vertical in its mount. The arc motion shown is typically very slight as the start switch 146 is generally adjusted via its adjustment 148 to actuate almost immediately upon nozzle travel. Accordingly, the typical user senses only a slightly upward motion to the nozzle rather than an arc motion.

Figure 63:
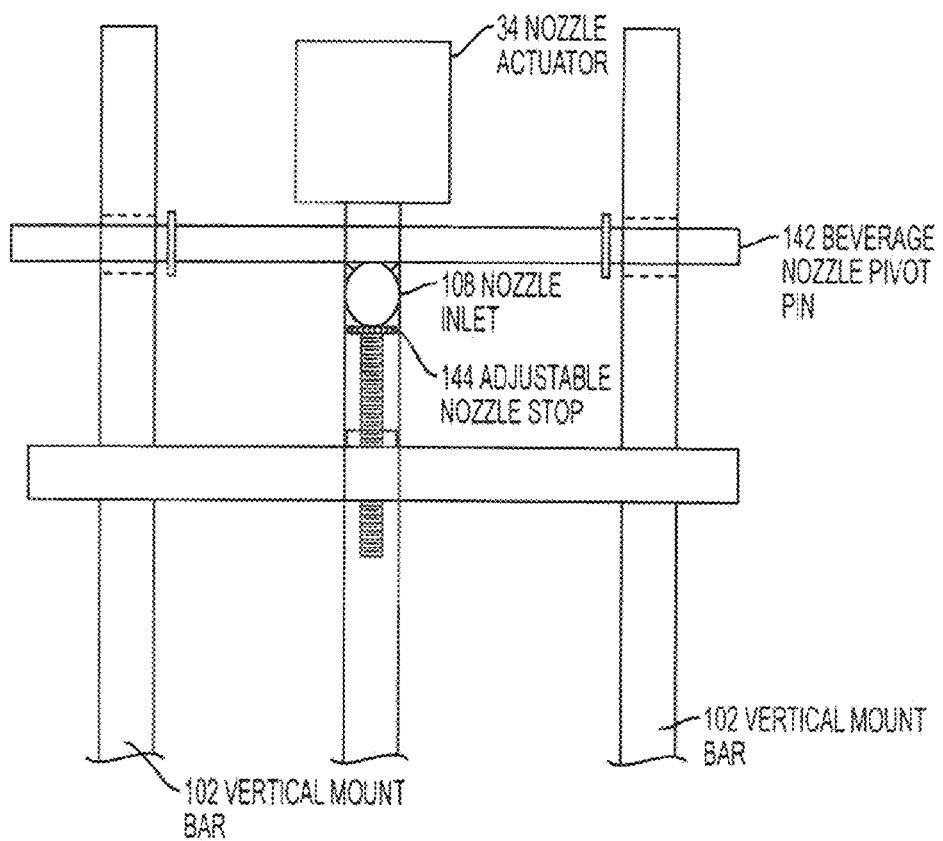

FIG. 63 depicts a typical arrangement at 90 degrees from the side view of FIG. 62. Other arrangements are possible. For example, the stop could be against the top of the nozzle side feed and on the other side of the vertical support, while the actuating switch could be immediately below the nozzle side feed tube on either side of the vertical support and the pivot pin could be on top of the side feed, and so on.

FIG. 64 also shows a pivot nozzle start embodiment, but with a return spring 150 to assure return of the nozzle to its resting position. There are circumstances of the overall construction of the dispenser or of its intended use environment or location that can justify the use of the return spring. The spring can be readily arranged to be adjustable and many spring types and forms are possible as previously discussed regarding the vertical motion implementations. Likewise, the placement of the spring has many possibilities, all resulting in the same outcome. In this configuration, the nozzle inlet 108 is provided with a conductive surface 128 which may be contacted with a further conductive surface 130. The conductive surface 130 is adjustably mounted on the same bracket 152 which carries an adjustable nozzle stop 144. The force applied by the spring 150 may be adjusted by the return spring force adjustment 154 which is similar to the start switch adjustment 148.

FIG. 65 is shows a pivot nozzle arrangement, which is also shown in FIGS. 58-60. In this configuration, the pivot pin 54 is fashioned to have a 90 degree bend resulting in an actuating arm 54.1 that acts directly against start switch 48. The start switch 48 serves also as the pivot stop when the nozzle is at rest. With reasonable precision of fabrication of the various parts shown, the nozzle can be assured to be vertical from one serial example of the dispenser to the next. However, if necessary, the start switch position can be made adjustable easily by conventional means.

FIGS. 74-78 illustrate configurations intended to cause dispenser actuation by applying a force to the dispensing nozzle (typically the barrel of the nozzle) at generally right angles or horizontal to the generally vertical nozzle. This motion can sometimes be easier or more convenient to implement than a vertical and upward motion. It can also be easier to use with serving containers of some shapes. For example, a sideways motion can be easier when dispensing beer into beer bottle shaped serving vessels.

Figure 74:
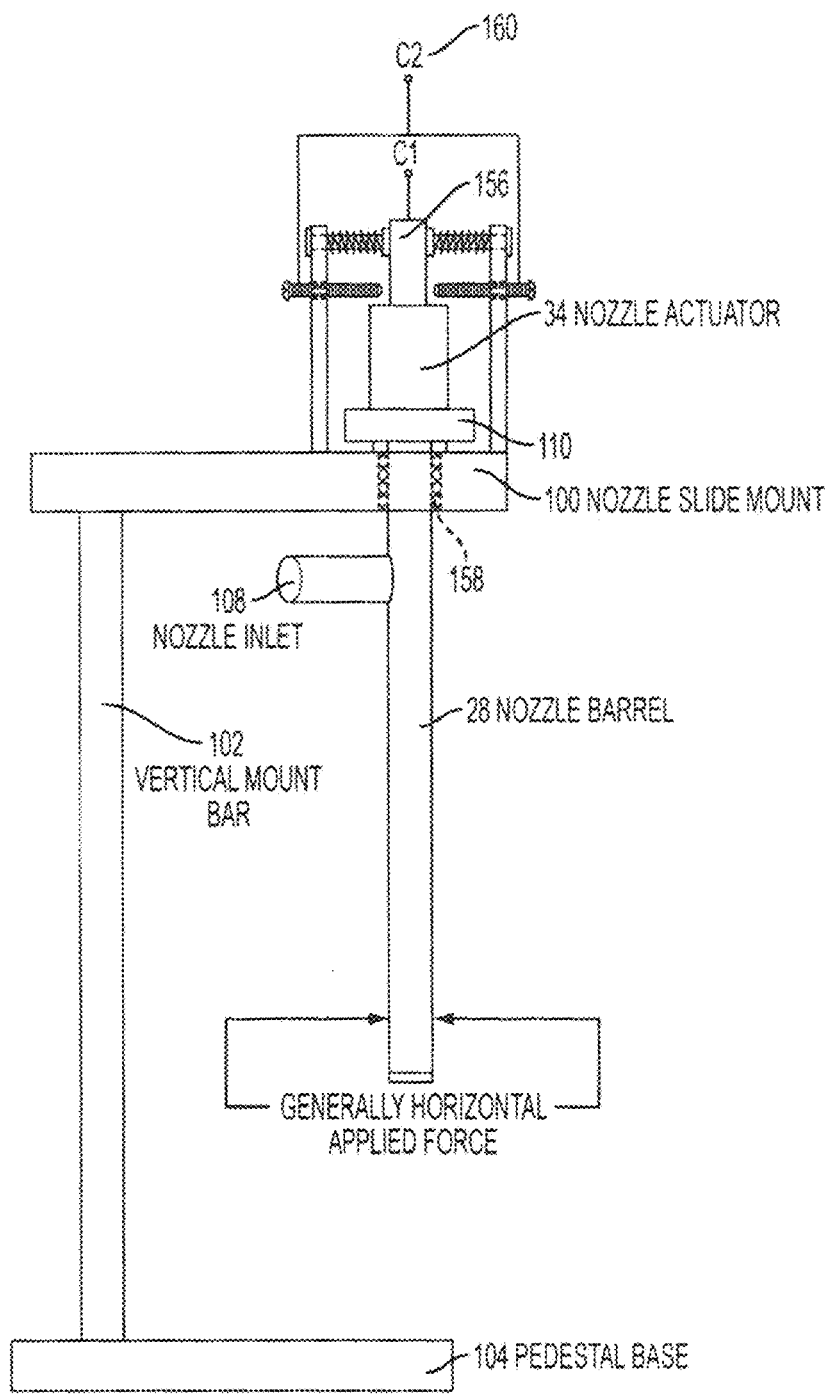
FIGS. 74-78 illustrate how a side motion can be used to initiate a dispense event.

FIG. 74 shows a configuration designed for actuation only at two points 180 degrees apart, such as side to side or front to back. In use, the nozzle barrel 28 is deflected in one of the side motion directions and the contact block 156 affixed on top of the nozzle actuator 34 moves in the opposite direction. The nozzle can be semi-rigidly mounted in an elastomeric mount 158, or in a clearance hole in the horizontal mount 100 adequate to allow motion sufficient to make one of the opposed switch contacts 160. Two spring loaded pins 162 can force nozzle return to a centered position or the elastomeric mount can serve this purpose.

Figure 75:
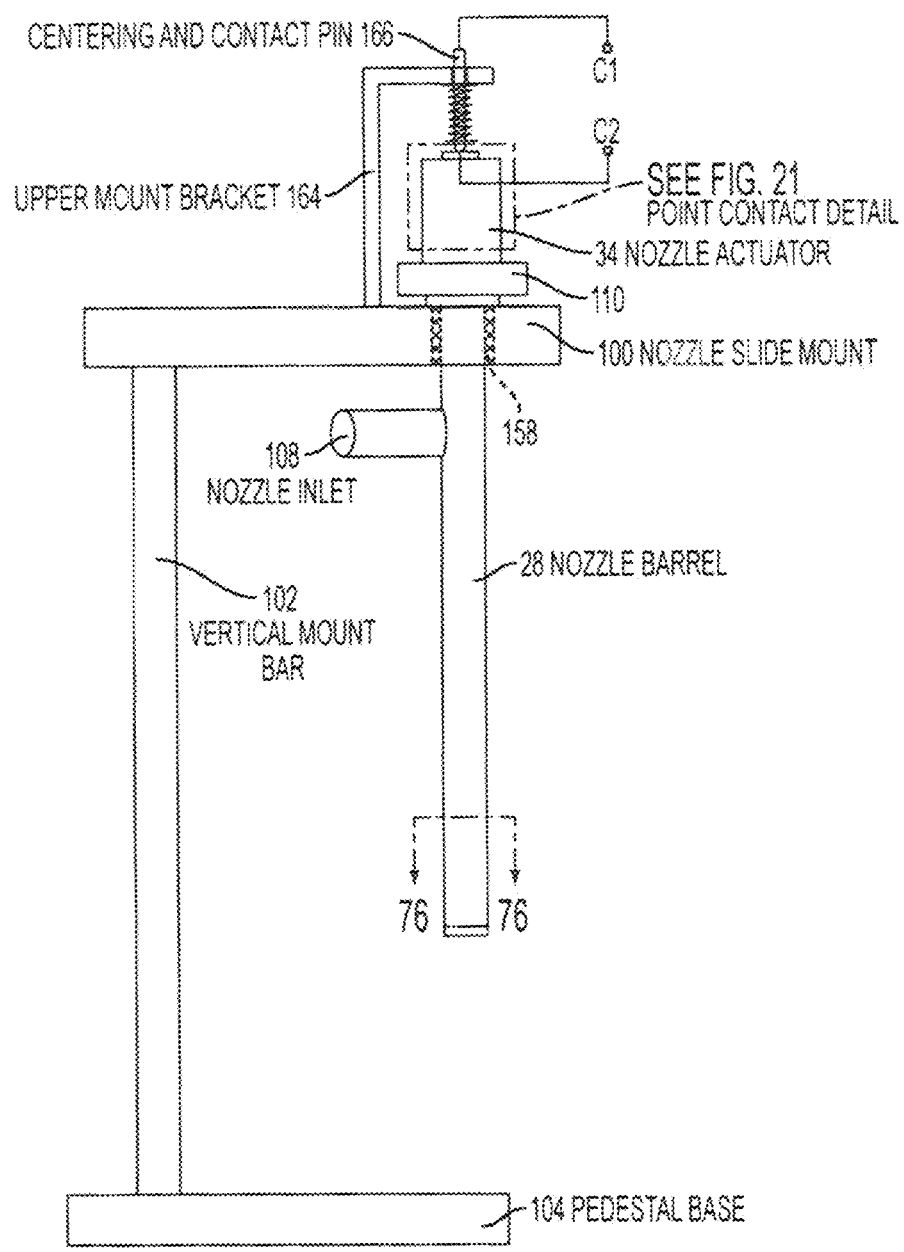
Figure 76:
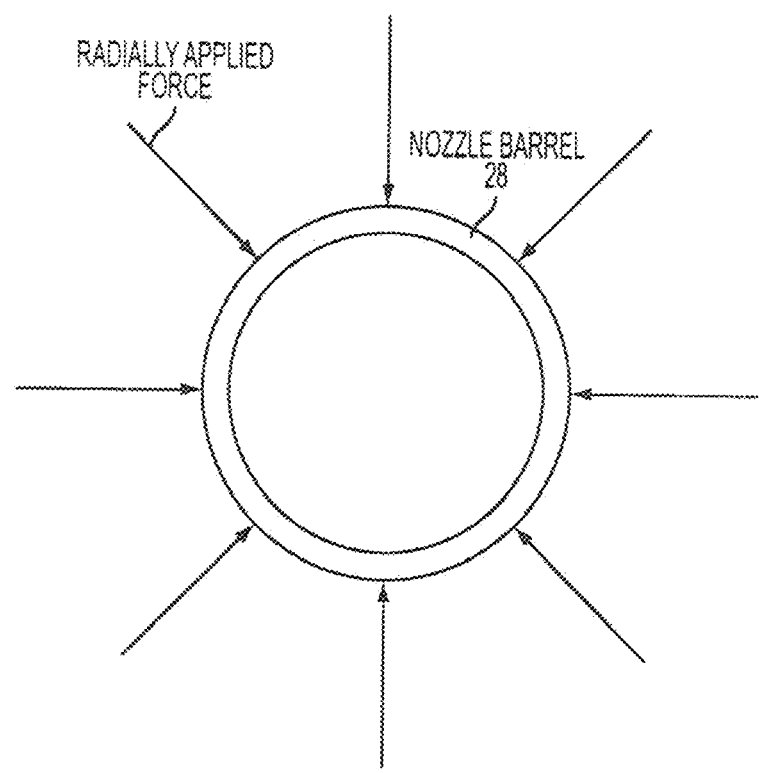
Figure 77:
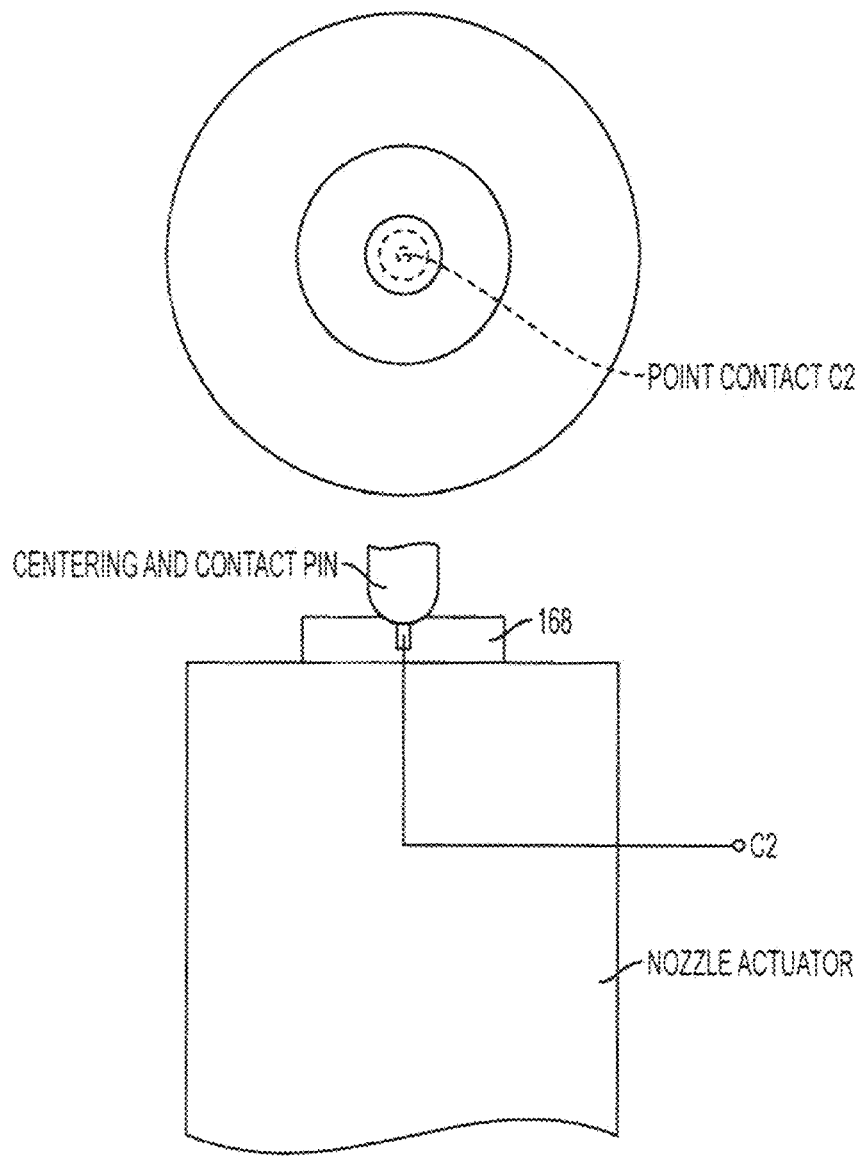

FIG. 75 shows an implementation of the dispenser start apparatus that allows a radial force applied anywhere 360 degrees about the nozzle barrel to initiate a dispensing event. This is accomplished by using an upper mount bracket 164 to position a captured and spring loaded centering and contact pin 166. This pin engages a contact block 168 that has a center depression or dimple containing a comparatively small center contact serving as the second contact of the single pole start switch. The center dimple and surrounding annular area may be conductance reversed. In either case, deflection of the nozzle makes or breaks a contact pathway, the amount of deflection being designable by the pin and recess dimensions. When the side force applied to the nozzle is removed, the concave shape of the contact block forces the nozzle back to center and an off condition, along with any mount provisions for centering as previously disclosed. FIG. 77 shows a top view of the contact block in order to be better able to visualize the switch and centering arrangements.

Figure 78:
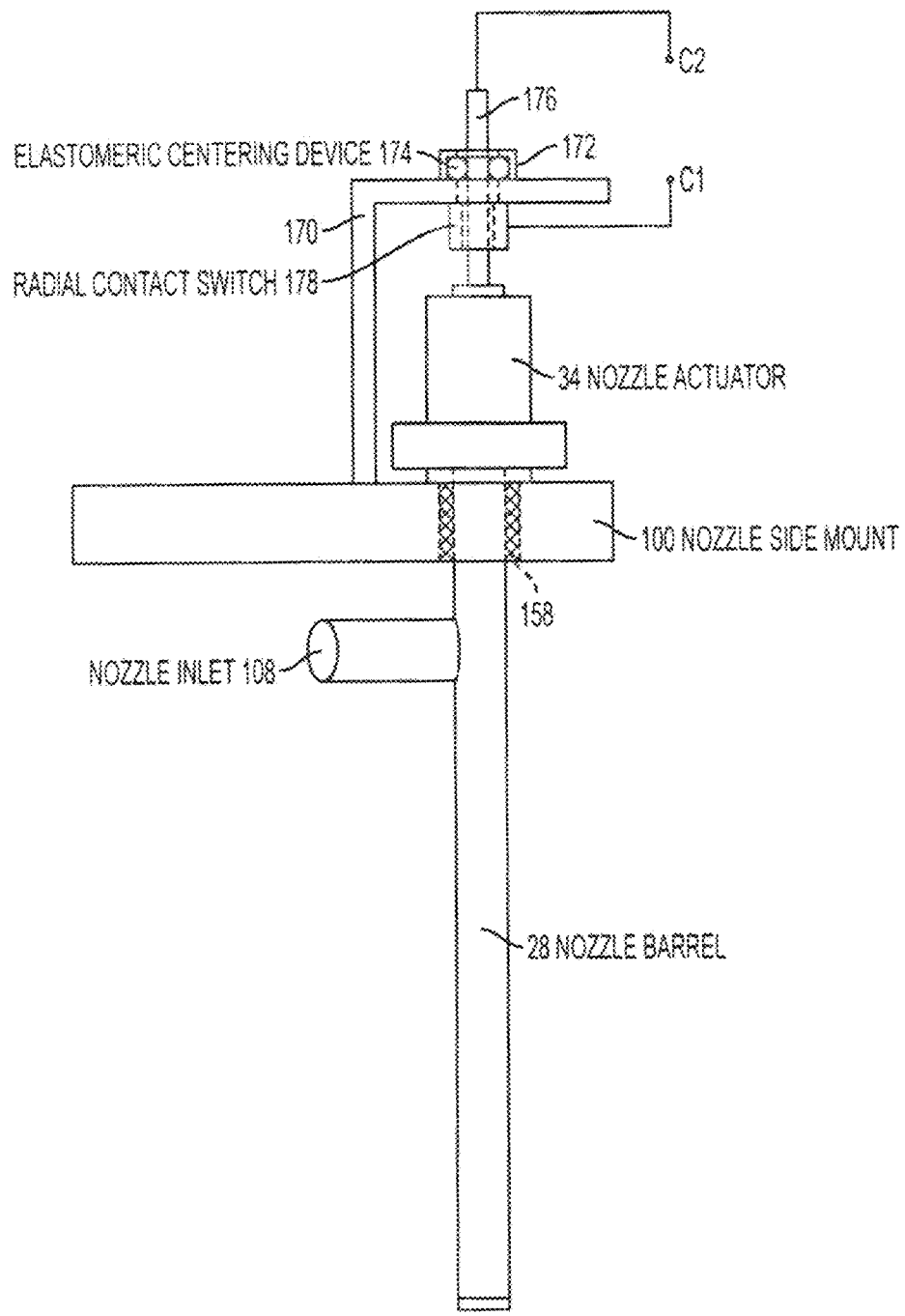

FIG. 78 shows a radial trigger arrangement of dispensing event initiator. An upper mount bracket 170 mounts and positions a gland 172 serving to position an elastomeric O-ring or disc 174 which forces a centering pin 176 concentrically mounted to the nozzle actuator upper surface to a centered position causing the nozzle to center relative to the O-ring when no side force is applied to the nozzle. Upon side actuation, the centering pin 176 deflects and comes into contact with some portion of the bore of the radial contact block 178, causing a switch signal to be made, causing a dispensing sequence start. Upon removal of the side force, the O-ring again forces nozzle centering.

Figure 81:
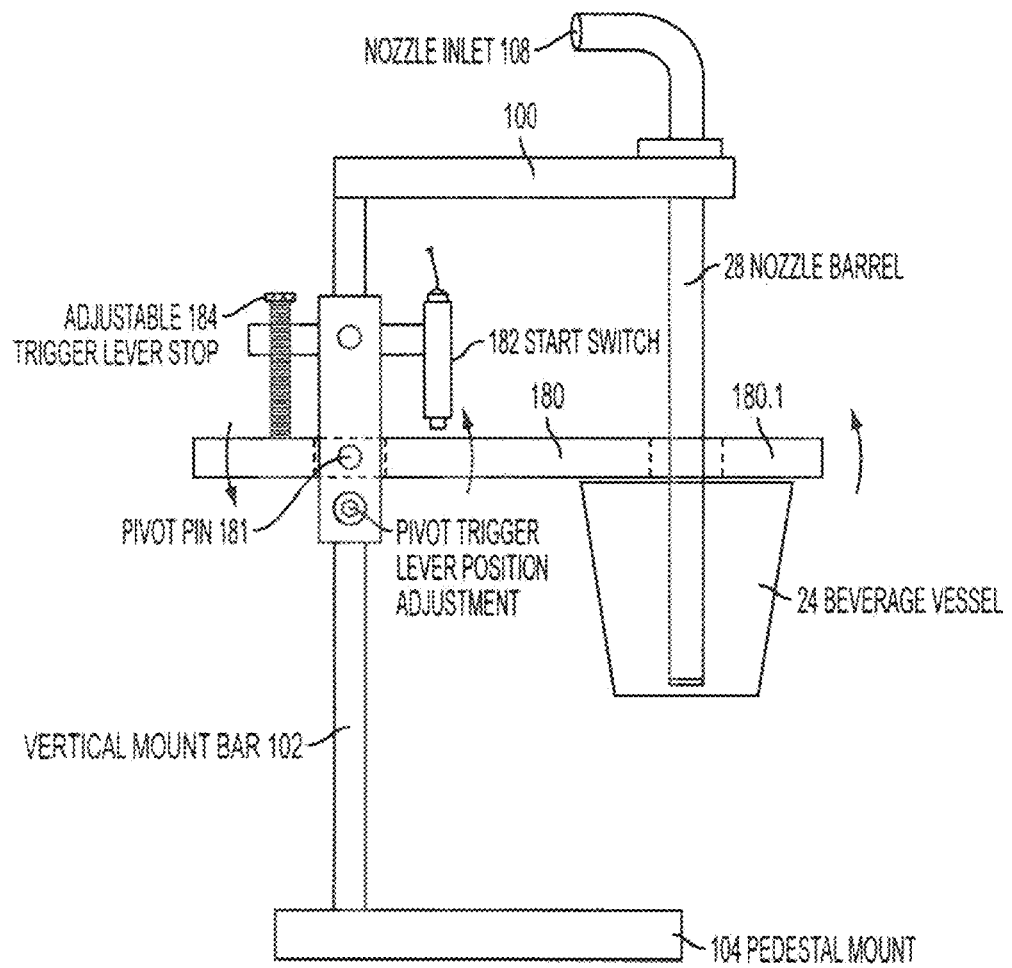
FIG. 81 illustrates the use of a trigger lever to initiate flow of a beverage.

In FIG. 81, another configuration for initiating a dispense event is shown. This configuration relies on a nozzle 28 which is mounted to the dispenser using the horizontal mount 100. An upper lip of a glass or cup acts on a trigger lever 180 arranged to move upward with an arc motion about pivot 181. The trigger lever action is akin to the nozzle pivot configurations previously described, and the lever is vertically adjustable allowing the relationship of the nozzle tip relative to the bottom of the glass to be defined as needed or desired. This method is useful with open tip nozzles as depicted, because the flow of beverage can be away from the bottom of the glass and unimpeded at the start of dispensing. The trigger lever 180 typically has a nozzle clearance hole 180.1 large enough to allow free motion of the lever while allowing it to be symmetrical relative to the nozzle barrel. Also shown is a start switch 182, and an adjustable stop 184.

Figure 80:
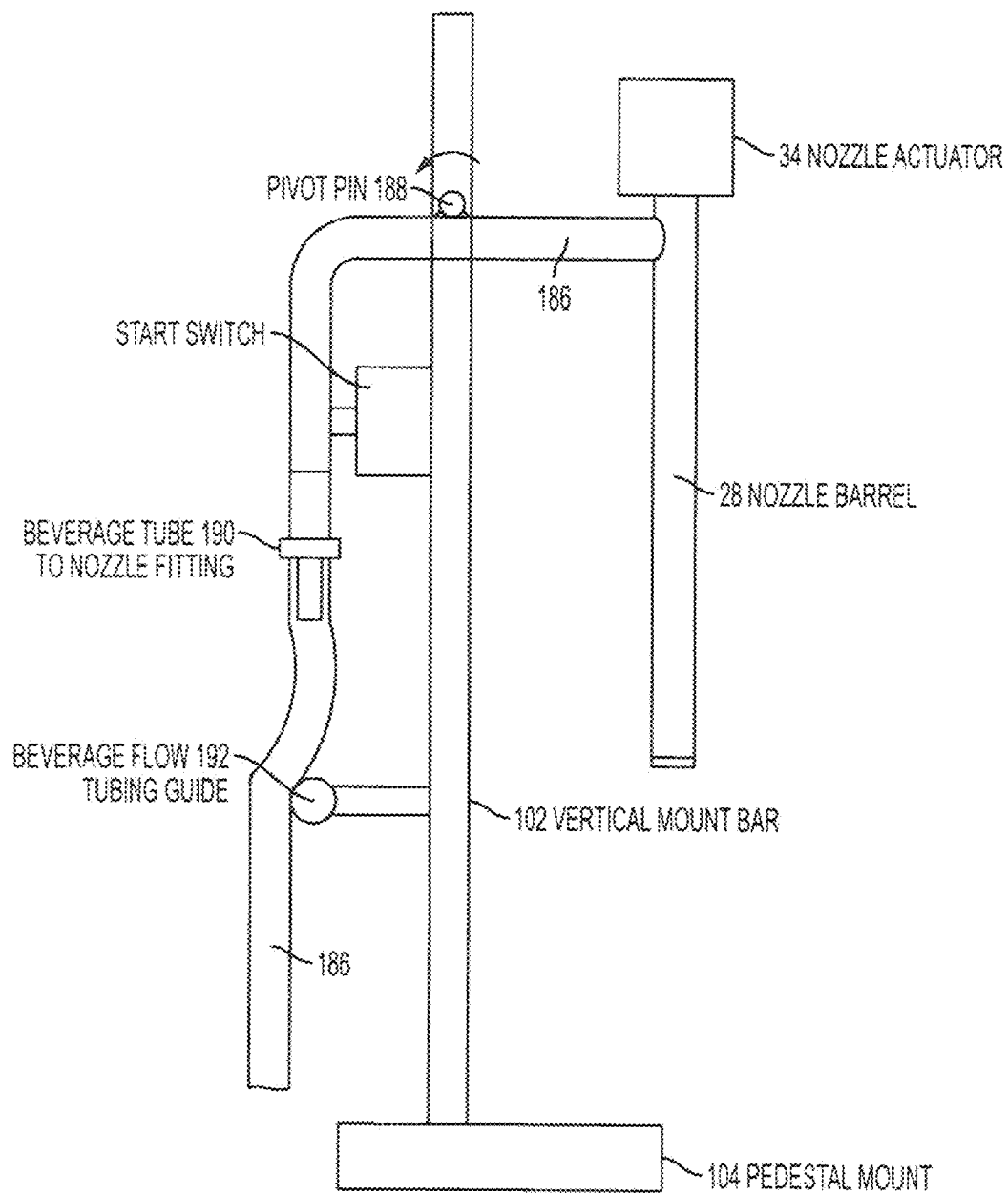
FIG. 80 illustrates another pivot trigger configuration.

FIG. 80 shows an implementation of the beverage dispenser start apparatus that uses an arrangement of the flexible beverage tubing feeding beverage to the nozzle 28 as a nozzle return or reseat spring. Beverage tubing typically has some elastomeric-like resilience and thus attempts to resume its extruded or formed shape after being bent or distorted. This effect is enhanced in tubing that is internally pressurized as is typically the case with dispenser beverage flow pathways, and particularly in the case of draft beer dispenser flow pathways. Further, when the tubing is cold, as is generally the case with beer tubing, the stiffness of the tubing increases. Thus, the tubing can serve as an effective spring, particularly where the range of motion is small as is the case with the nozzle pivot start method and apparatus.

FIG. 80 shows a beverage nozzle having a rigid side feed tube 186 that is horizontal at its attachment to the nozzle barrel, but turns downward at some distance from the barrel. The pivot pin 188 may be positioned as desired on either the horizontal or generally vertical portion of the nozzle feed tube, and the start switch may also be located with considerable freedom. At the termination of the rigid nozzle side feed, a beverage tube to nozzle fitting 190 connects the flexible tube to the nozzle feed itself. Below this connection, a flow tube guide 192 is positioned to cause the flexible beverage tube to curve away from the nozzle barrel while continuing generally downward toward the pedestal of the dispenser, through which it generally travels to connect to the beverage source, most typically a beer keg. The tubing guide creates a force loaded bend in the tubing, creating a spring effect when the nozzle is pivoted, causing it to be returned to the standby position when the pivot force is removed.

The various implementations of the beverage dispense initiation apparatus can be electronically integrated to control simple manual flow from a beverage dispenser. Thus, nozzle mediated actuation can start a pour and actuation typically is maintained for flow to continue, and the operator determines the extent and duration of the pour. This can be referred to as the manual push to pour method. A provision can be made for a loss of start signal debounce such that the operator mediated start signal (a pour signal in this instance) can be lost for a time without causing the manual pour to end. This debounce period is typically short, ranging from 10 to 100 milliseconds. It is imperceptible to the operator and does not cause any overpour when the operator ends the beverage flow. This can be termed the manual push to pour with loss of signal debounce integration method.

A second manual dispense interface method may be termed bump-to-start:bump-to-stop. This method typically requires only that a brief start signal be applied via nozzle mediated force or motion to begin a manual (no portion control) beverage pour. After a signal of suitable duration, no further force need be applied to the nozzle. After the pour has proceeded and a suitable and desired amount of beverage has been dispensed into the glass as determined by the operator, a second separate and brief start signal originating from the same structure (now a stop signal) can be applied via the nozzle, ending the pour. The required duration of these signals can be defined to avoid false starts or stops, and, importantly, an override timer is started with the pour start causing flow to stop if a stop signal does not arrive within an adjustable and appropriate pour time.

A third nozzle mediated start integration into a beverage dispenser can be termed the push to continue method. In this instance, a start signal from applied nozzle force or motion begins a measured or portion controlled or defined volume dispense or pour. For the pour to continue to its automatic termination, the start signal should be maintained throughout beverage flow. Loss of the signal will result in premature termination of beverage flow. This method is primarily and typically used to force the operator to maintain the nozzle at the bottom of the cup or glass throughout the pour. A loss of signal debounce as previously described can be included with this method of interface.

In any instance of dispenser actuation using the nozzle mediated configurations, a pre-start debounce is used. This electronic actuation signal validation requests that the signal persist for a defined duration before being implemented as valid. This practice is akin to the switch or key debounce universally utilized with electronic controls of all types, and is particularly important with the present system in avoiding false dispenser actuations from jarring and trauma, or due to operator error. A typical debounce duration suitable for use with these devices could range from 10 milliseconds to 100 milliseconds, and is essentially imperceptible to the dispenser operator.

Another interface methodology is termed the post-start debounce. The pre-start debounce forces a start signal of some minimum duration to be generated to be considered valid. The post-start debounce is a defined time starting with an accepted start signal. Its purpose is to provide a second layer of analysis immediately after a pour event has begun. The start signal should persist beyond the post debounce period or beverage flow will be terminated. By example, if a pre-start debounce period is 100 milliseconds, and the post-start debounce is 100 milliseconds, the start signal should persist for more than 200 milliseconds in order for a beverage pour to proceed.

Another form of electronic integration is termed the back-off delay and may be utilized with open tip nozzles where beverage flow exits directly from the tubular orifice of the nozzle. In such a case, if the nozzle tip is placed directly against the bottom of the glass for actuation, ensuing beverage flow can be impeded. Thus, the purpose of the back-off delay is to allow a time period for the glass to be moved slightly away from the nozzle tip, thus allowing unimpeded beverage flow into the glass. The radial actuated configurations disclosed herein provide another solution to this problem, but this method is simple and effective and easily mastered by the dispenser operator where used with a vertical nozzle force or motion actuation.

Still another important element of electronic integration into the beverage dispenser controller is termed the end of pour lockout. This feature assures that for a defined period, measured from the end of a pour, another dispenser actuation or pour is not possible. This assures that a full glass or cup of beer can be removed completely from the dispenser without the associated motion accidentally causing the start of another pour. This lockout period is effective and brief, typically on the order of 100 to 200 milliseconds.

A final format of electronic integration is used where a dispenser is configured to provide a measured pour after actuation, and is termed push to stop after start. With this signal formatting, a nozzle mediated motion or force generates a valid start signal and an automatic volume controlled pour begins. Thereafter, any new nozzle mediated signal generated via a nozzle and start sensor is considered to be a stop signal and the pour is terminated. This method allows a fast and easily learned stop method to be applied in an automated dispenser setting. Importantly, it is a one handed maneuver, enhancing ease of dispenser use and reducing operator burden.

All of the electronic integration methods disclosed herein can be fully implemented into the beverage dispenser electronic control structure and can become part of any setup format or operating parameters list. Further, detected operating errors can be detected and alarmed, and repeated improper or incorrect operator motions can be detected and annunciated using distinct audio or visual cues.

Finally, references have been made to utilizing the various apparatus for initiating a dispense event with beverage dispensers having dispensing nozzles capable of subsurface beverage dispensing, and able to be acted upon by the inside bottom surface of the beverage glass. It is also possible and beneficial in many cases, to use this apparatus with beverage dispensers having conventional dispensing nozzles which are top dispensing designs which are comparatively shorter in barrel length and which do not reach to the bottom of the beverage glass. In these instances an actuating spar or similar or equivalent structure shown in FIG. 73 or the actuating pivot lever or similar structure shown in FIG. 81 can be utilized to transmit nozzle force or motion to the dispenser start apparatus.

Figure 86:
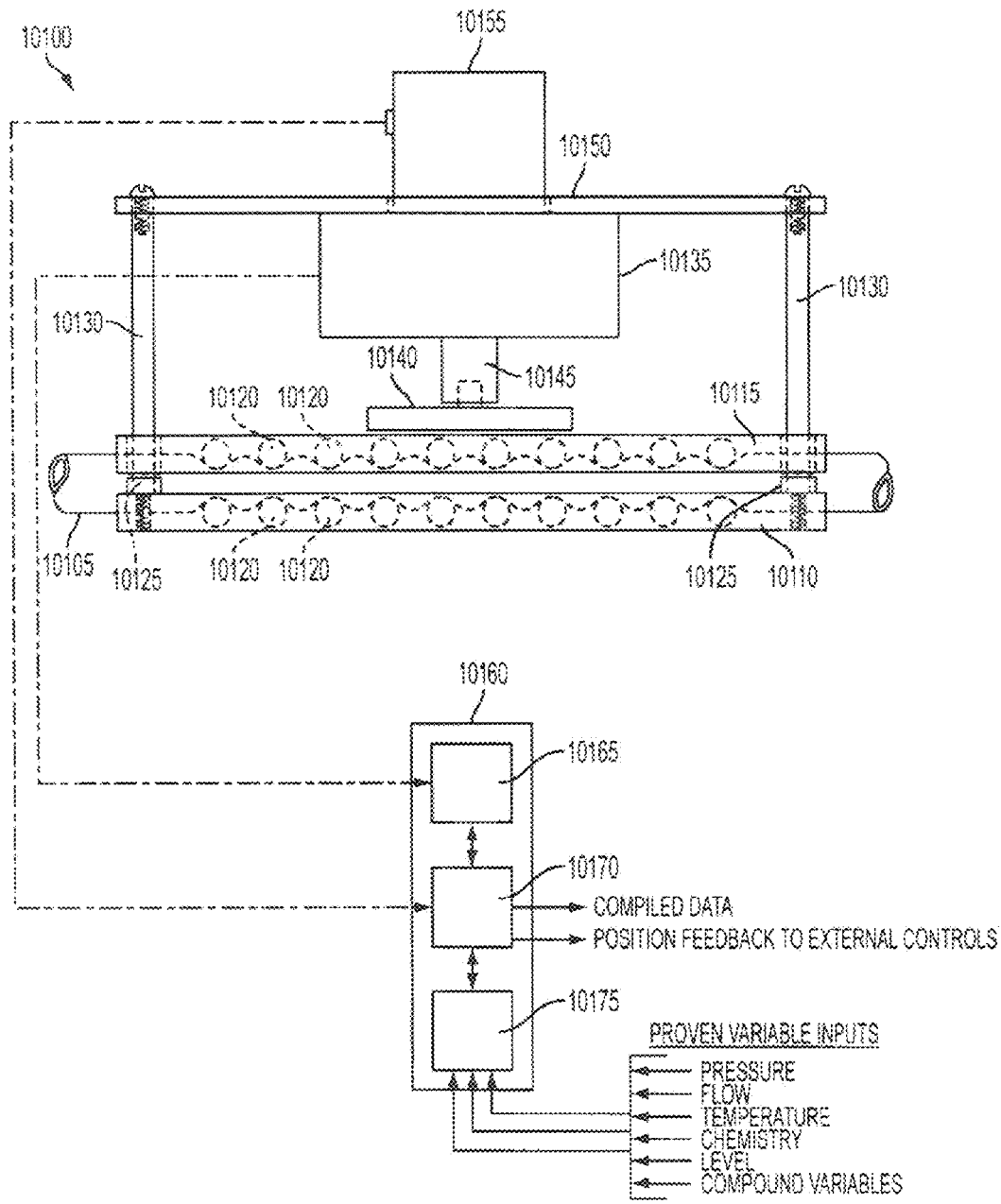
FIG. 86 shows a single actuator digital flow controller associated with an electronic controller.

Referring to FIG. 86, a digital fluid flow rate control device 10100 controls flow through a flexible tube 10105. The tube 10105 extends between a fixed node plate 10110 and a moveable node plate 10115, each of which includes multiple flow restriction nodes 10120. As the plate 10115 moves toward the plate 10110, the nodes 10120 compress the flexible tube 10105. Non-occlusion stops 10125 are positioned between the plates 10110 and 10115 to prevent the plates from coming so close together that the nodes pinch the tube 10105 to the extent that flow is stopped altogether. The movable plate 10115 moves on tracks 10130 that extend from opposite ends of the fixed plate 10110.

A flow rate adjustment actuator 10135 is secured to an actuator thrust plate 10140 through an arm 10145. The actuator 10135 moves the arm 10145 to cause the plate 10140 to push against the plate 10115 and cause the plate 10115 to compress the tube 10105. When the actuator 10135 releases or withdraws the arm 10145, fluid pressure in the tube 10105 causes the tube 10105 to expand, which, in turn, pushes away the plate 10115. The actuator 10135 is mounted on a backer plate 10150 that is secured to the rails 10130.

A position feedback device 10155 is mounted on the actuator 10135 to monitor the position of the arm 10145 and thereby monitor the position of the plates 10140 and 10115, and the corresponding amount by which the tube 10105 is compressed.

An electronic controller 10160 receives an output signal of the feedback device 10155 and generates a control signal to control the actuator 10135. The controller 10160 includes actuator driver control electronics 10165, flow controller position control electronics 10170, and a primary processor 10175. In addition to the feedback signal, the controller 10160 includes variable inputs including measurements of one or more of pressure, flow, temperature, chemistry, level and compound variables. The controller 10160 may generate compiled data and feedback to external controls.

In this arrangement, a single actuator acts upon series integrated flow limiting nodes formed from a flexible tube. This device can be linearized in terms of its flow rate control curve using a digital feedback actuator, and the flow nodes can also serve as redundant sequential control valves in some cases. Particularly when paired with a fast-acting linear actuator, this arrangement can alter flow very quickly, on the order of less than 50 milliseconds to move from lowest to highest flow or the reverse.

More generally, a flow rate control device includes fixed or adjustable flow limiting and flow restricting nodes, with each node having an orifice and two or more nodes being incorporated into a single structure or assembly such that the fluid, most particularly liquids, must flow through each flow node in its movement from an infeed port of the device to an outfeed port of the device. Because each node is discrete in terms of its pressure dropping role, but is integrated into a whole, the device is referred to as a digital flow rate control or controller.

The term digital also refers to the form and mode of control of the rate of liquid flow through the devices. The flow nodes can be fixed, defined and nonadjustable. More commonly, however, the nodes are either manually or automatically adjustable, either individually and independently from one another, or by a common adjustment mechanism. Thus, in this context, digital refers to a discrete and adjustable flow node location or address, and in still another context, to the nature of the automatic controls such that each node can be electronically adjustable using a digitally controlled actuator or using an actuator in conjunction with a digital feedback device or system.

Successive pressure drops in a liquid flow pathway can sum to define a desired liquid flow rate through the pathway. The merits of using multiple series arranged flow restricting nodes instead of one are found in the mathematics of the operation of an adjustable liquid flow control, as well as the physical consequences (and benefits) of such an arrangement.

The performance of multiple nodes can be illustrated by considering a simplified model as a valid analogy. First, consider a 100 ohm potentiometer variable resistor with a center wiper such that its effective resistance can be varied from zero to its full 100 ohm value. The resistance element has an overall tolerance of 1.0 percent, or a worst case variation of 1 ohm. Now, consider 10 center wiper potentiometers, each of 10 ohms resistance, series connected, each with an overall tolerance of 1.0 percent. Each potentiometer in this case has a tolerance of 0.10 ohms and they sum to a 1.0 ohm worst case variation of the summed 100 ohms.

In this comparison it is given that either system can be adjusted to deliver a total resistance to current flow within zero to 100 ohms and each to a certain accuracy of set point.

The chances of the single 100 ohm resistor being below 100 ohms in value is nearly one in two. The other possibility is that it is above 100 ohms in value (the probability of it being exactly 100 ohms being so extremely small as to be irrelevant). The chances of each 10 ohm resistor being above or below the exact value are the same as with the larger value resistor, but it is far more likely that the net total resistance will more closely approximate the ideal 100 ohm value since some of the ten will be above 10 ohms while others will be below. Thus, in this analogy, the inherent accuracy of the ten element system is improved.

Now compare the instance where a particular resistance value is sought with the single 100 ohm potentiometer and it is adjusted to within 2.0 percent error of total span of target value, and the case where each of the ten 10 ohm potentiometers is adjusted to within 2.0 percent of its span to sum to the particular resistance value sought. Since 10×0.02×10 is 2.0 and 100×0.02 is 2.0, there appears to be no difference in the two systems. However, there is one crucial difference, that results from problems in accurately adjusting a single point system. In the single point approach, there is only one adjustment that my be right or wrong. In the ten element system, however, things are more forgiving.

Consider adjusting the 100 ohm unit to within 3.0 percent of span of the desired value instead of the target of 2.0 percent. Then consider the error effect of setting one of the ten series units to 3.0 percent and the rest to the correct 2.0 percent. In the single unit case the actual error is 3.0 percent. In the series units case the actual error is 2.10 percent. If three of the series units are badly adjusted to a 3.0 percent error, the cumulative error across the ten devices is 2.3 percent. If five of the ten units are badly adjusted to 3.0 percent error, the cumulative error across the ten devices is 2.5 percent. If nine of the ten units are badly adjusted to 3.0 percent error, the cumulative error across the ten devices is 2.9 percent, and still better than achieved with the single element device.

This analogy holds up in the case of the multi-node digital flow control device, and is empirically demonstrable. Further, in practice, the set point accuracy advantage is magnified by the understanding that each flow resistance node in the multi-point system is larger in dimension for a given flow rate than the single orifice of the single point system. Thus, with an adjustment apparatus of the same physical resolution in each case, the inherent resolution of adjustment of each node in the multi-node system must be inherently greater, both at a given node and, even more importantly, across all nodes. By example, if each adjustment apparatus has 100 increments, the total resolution of a 10 node system is one part in 1000, while the single node system is total resolution of the one part in 100.

Figure 87:
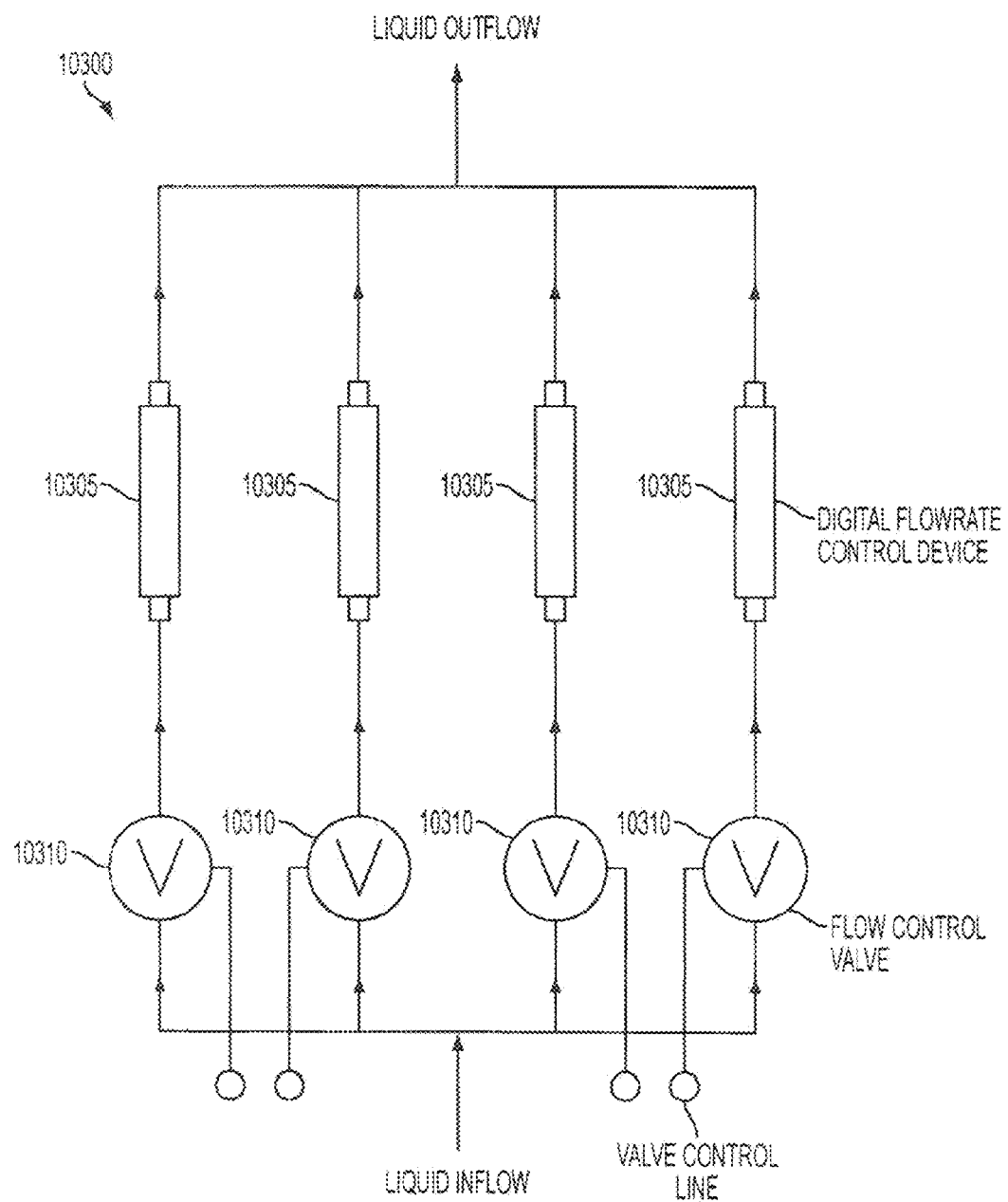
FIG. 87 shows a parallel arrangement of a digital flow control devices with control valves addressing the flow pathways.

Referring to FIGS. 86A and 86B, digital flow controls 10200 and 10205 disclosed herein can be of fixed and invariant flow characteristics based upon forming the integrated flow nodes from a rigid material such as a metal tube. FIG. 86A illustrates a rigid tube 10200 having circumferential nodes 10210, while FIG. 86B illustrates a rigid tube 10205 having nodes 10215 on a single side. This simple control may be employed in a liquid flow system with narrow or predictable variations in flow pressure and/or where predictable variations in flow rate with flow pressure changes are tolerable. Changing the net effective flow allowed by the device requires altering the flow pressure applied to its infeed, which may be readily accomplished since the pressure to flow relationship of these devices is proportionate and free of discontinuities. Additional devices can be added in series to reduce flow (termed a series-series arrangement) or the device can be replaced with one of overall matching dimensions but with differently dimensioned flow orifices. Another important variant is to place these differing devices in parallel with a suitable control valve (manual or automatic) on each parallel branch, allowing different pre-defined flow rates to be valved in and out of the flow pathway. Such an arrangement is illustrated by the system 10300 of FIG. 87, which includes four flow controls 10305 connected in parallel, with flow into each flow control 10305 being permitted or prevented by a corresponding valve 10310.

Figure 88:
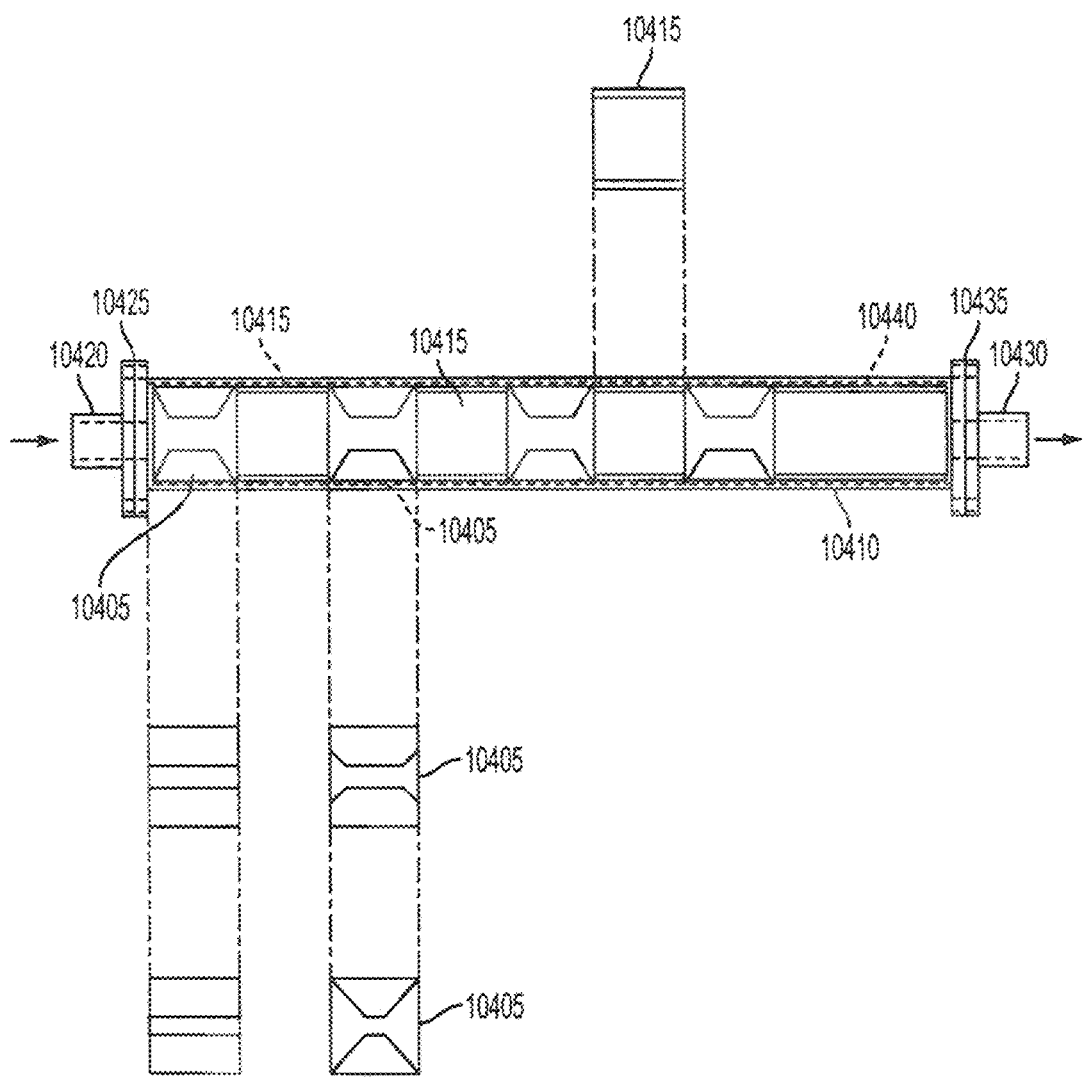
FIG. 88 shows a discrete modular digital flow control assembly.

FIG. 88 shows a nonadjustable flow control 10400 that employs modular flow nodes 10405 of desired flow orifice dimensions stacked inside of a flow tube 10410 with inter-nodal spacers 10415. The flow control 10400 also includes an inflow fitting 10420 extending from a flange 10425, an outflow fitting 10430 extending from a flange 10435, and an expansion spacer tube 10440. The flow control 10400 is flow rate modified by changing out some or all of the nodes for others with different orifice dimensions. The inter-nodal spacers provide intervening reduced turbulence zones and may or may not be required depending upon liquid characteristics. This flow control may also be flow rate modified by adding modular flow nodes in lieu of the expansion spacer tube shown, as well as by deleting nodes.

Figure 89:
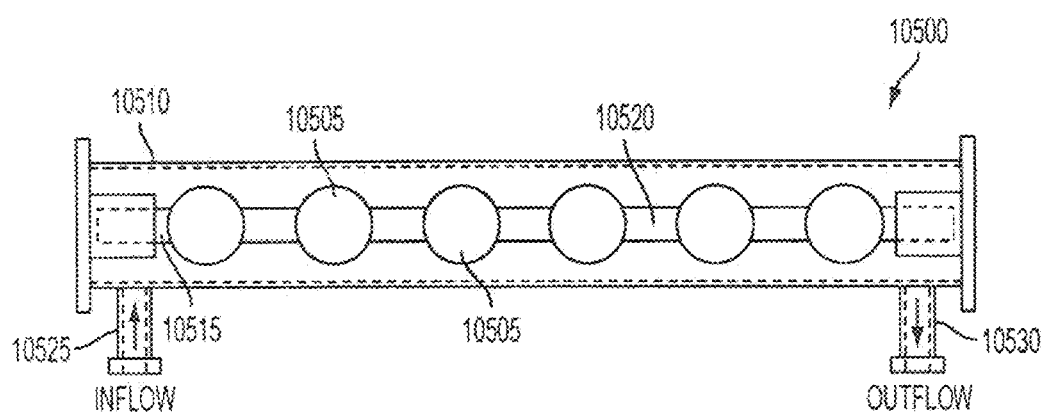
FIG. 89 shows a rigid structure provided with a fixed flow rate digital control.

FIG. 89 shows a fixed flow rate 10500 that includes spherical flow restricting nodes 10505 spaced apart in a flow tube 10510 and supported on a coaxial support rod 10515. The circumferential space between the circumference of each ball and the inner wall of the tube form a flow reducing node. The dimension of the space constitutes the degree of flow reduction and is an annular shaped flow orifice. The spherical nodes 10505 are separated by internodal spacers 10520 and arranged such that flow entering through an inflow port 10525 passes by each of the nodes 10505 before entering through an outflow port 10530.

Figure 90A:
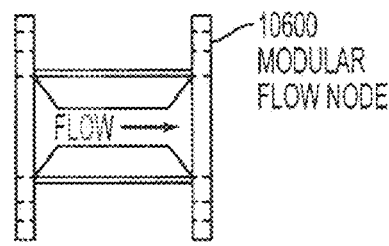
FIGS. 90A and 90B show a cross section of a discrete modular node series digital flow controller with a single unit being shown in FIG. 90A and a series of assembled units being shown in FIG. 90B.
Figure 90B:
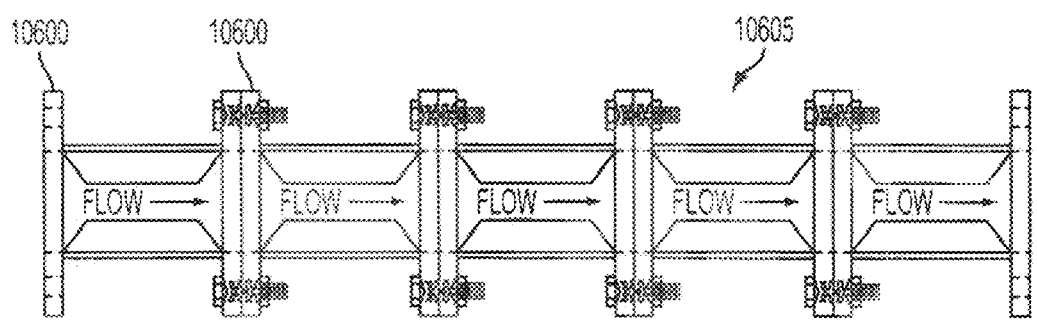
Figure 91A:
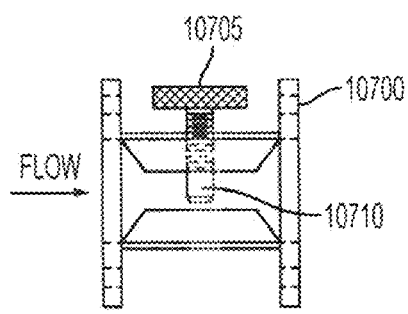
FIGS. 91A and 91B show a discrete manual modular node digital flow controller.
Figure 91B:
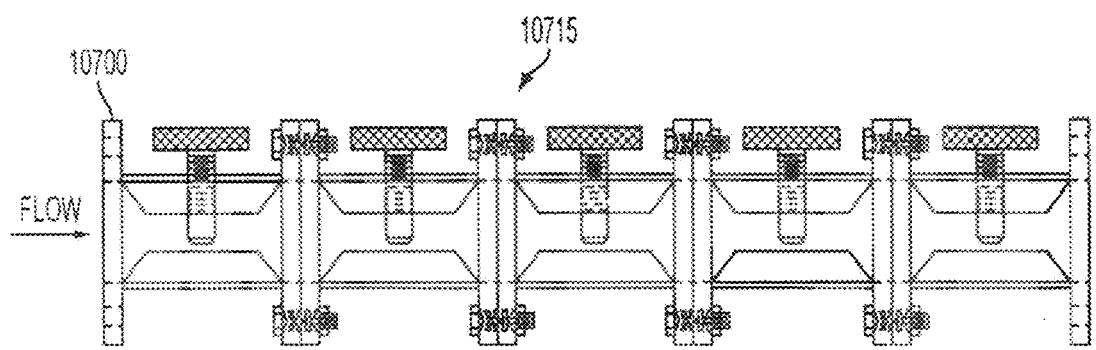

FIGS. 90A and 90B depict still another fixed orifice modular node device 10600 where the nodes 10600 are physically discrete until assembled and integrated together into a multi-node series arrangement 10605. As shown in FIGS. 91A and 91B, a similar flow control device 10700 can include a manually-adjustable control knob 10705 that can be manipulated to extend or retract a post 10710 into the flow path. As shown in FIG. 91B, multiple devices 10700 may be connected in series to create a multi-node flow control 10715.

Figure 92A:
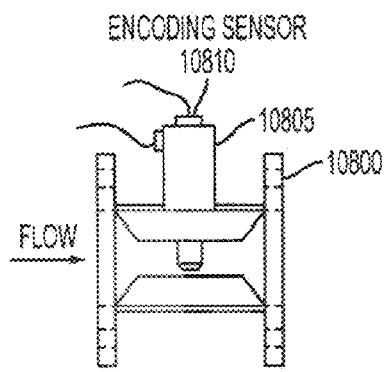
FIGS. 92A and 92B show a cross section of discrete modular node series digital flow controllers provided with encoding sensors with a single unit being shown in FIG. 92A and a series of assembled units being shown in FIG. 92B.
Figure 92B:
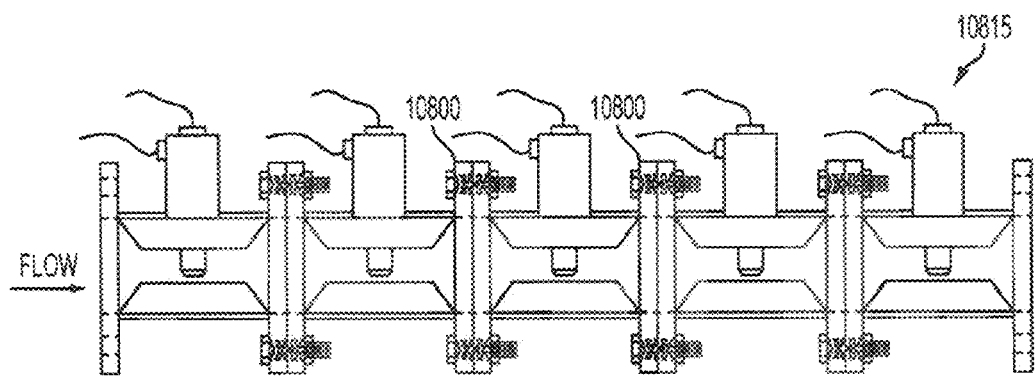

As shown in FIGS. 92A and 92B, another flow control device 10800 may include an automatic actuator 10805 and an encoding sensor 10810 at each node. Each of these actuators may be hydraulic, magneto rheological, thermal, pneumatic, magnetic, solenoid, or motor operated (motors of all types being usable), and any other actuator types suitable to rapid precise motion may also be used. As shown in FIG. 92B, devices 10800 may be connected in series to form a multi-node flow control 10815.

The use of individual actuators allows the maximum flexibility in flow rate control formatting, including combining some nodes for range ability (coarse adjustment) and some for fine increment adjustment. Essentially, the pattern of use and adjustment is constrained only by the versatility of the actuators and their controlling software. The use of individual actuators also allows a straightforward control format for following external flow command signals where the number of nodes responsive to a given signal type constrains and limits the absolute magnitude of the flow change possible. This format also allows multiple signals to be segregated to a discrete flow node or nodes, allowing an unusually flexible flow rate control device scaled to and responsive to mixed or multiple control signals.

Figure 93:
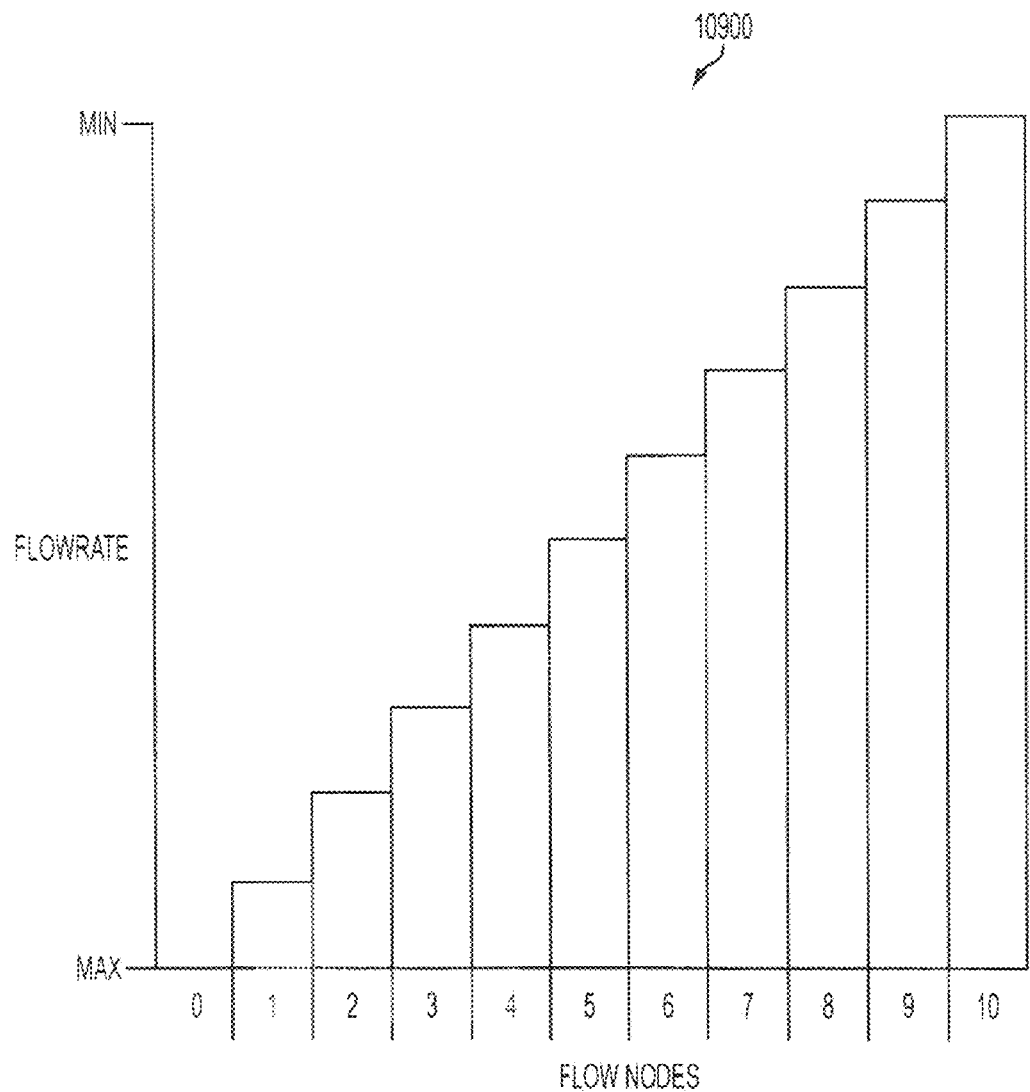
FIG. 93 shows a linearized flow range through separate flow orifice adjustment of each discrete flow node.

The use of discrete automatic actuators also allows a fast digital system to be embodied where flow nodes are fully engaged or fully disengaged into or out of the flow pathway of the flow controller. This use format may be more precisely termed ultrafast in that flow can be altered by any given flow node in twenty one-thousandths of a second or less (20 milliseconds) such that the device is useful for applications such as missile control systems, super critical liquid process environments, and signal tracking systems. The bar graph 10900 of FIG. 93 illustrates the general form of control possible with this "all digital" control format. The graph shows a ten node system and the relative flow rate control pattern possible with this methodology. Although flow rate through these devices is relatively linear in basic form, full linearization as shown in the bar graph is possible with simple discrete definition and calibration at each flow node.

Figure 94A:
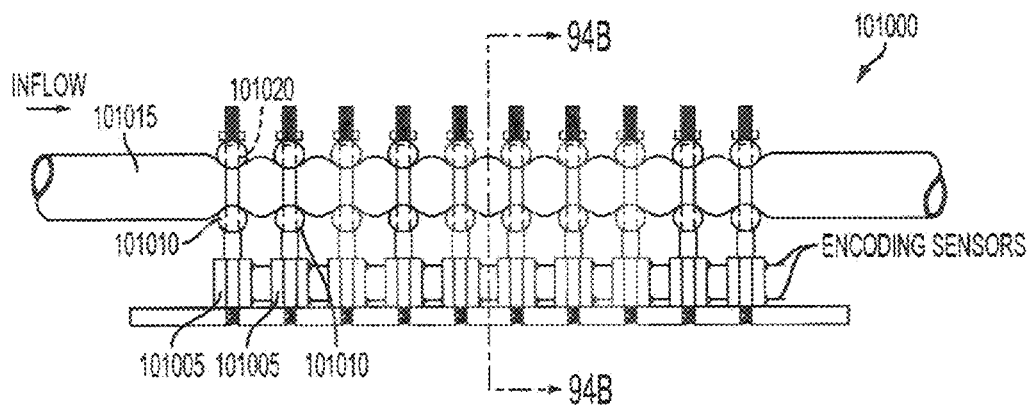
FIGS. 94A and 94B show a symmetrical, dual anvil, digital flow controller.
Figure 94B:
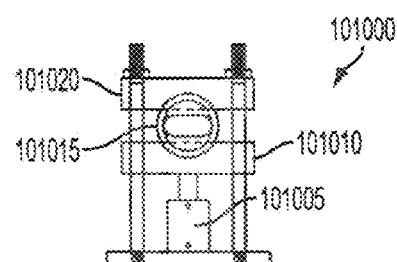

FIGS. 94A and 94B show a flow controller 101000 in which individual actuators 101005 control flow nodes 101010 comprising periodic restrictions of a flexible tube 101015.

Each actuator 101005 includes an integral encoding sensor that monitors the position of the actuator. The controller 101000 is symmetrical, in that nodes 101010 are positioned opposite fixed nodes 101020. The nodes and inter-nodal spacing combine to form well defined Laval shaped flow structures. With spacing of nodes appropriate to the flow rate range of use, flow through this device is relatively non-turbulent. In particular, this arrangement has been empirically shown to be useful in controlling the flow rate of gas saturated liquids. For example, one particular implementation is capable of varying the flow rate of beer over a dynamic range of greater than 8:1 without causing the dissolved CO2 to leave solution. This embodiment also has the particular advantage of being very sanitary in its construction, with its non-invasive flow tube. The tube used in the device can be of a particularly wide variety of chemistries, elastomers, and durometers because it need not be occluded but only restricted. Thus the over-folding or creasing of the tube when pinched to occlusion can be avoided in this device leading to greatly extended and generally indefinite service life. Nevertheless, any given node position can be restricted to occlusion, such that the flow controller 101000 can serve as a control valve. This capability is enhanced where multiple sequential nodes serve also as valves, in that a redundant valve structure is created. Also of note in this regard is the increased sealing pressure or differential pressure possible with these multiple in series valve structures. Also, the occlusive force that is required to seal against a given pressure can be shown to be reduced in this series valve structure. It is well understood that the greater the occlusive force applied to a pinch valve tube, the shorter the tube life.

Figure 95:
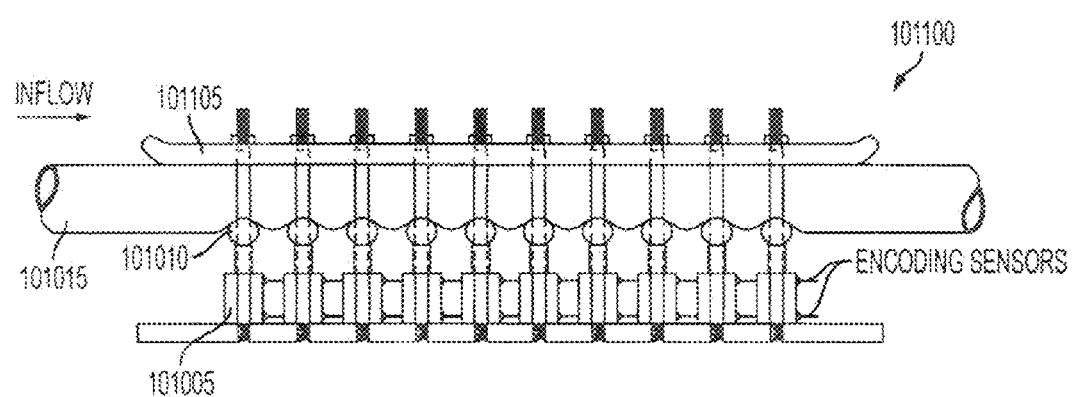
FIG. 95 shows an asymmetrical digital flow controller acting upon a flexible tube in accordance with some embodiments of the invention.

FIG. 95 shows a flow controller 101100 that is asymmetrical and differs from the controller 101000 in that the fixes nodes 101020 are replaced with a flat plate 101105.

As an alternative to individually adjusting the flow nodes, systems may adjust all of the flow nodes in unison. The flow rate control device 10100 of FIG. 86 provides one example of a system that operates in that way.

Figure 96A:
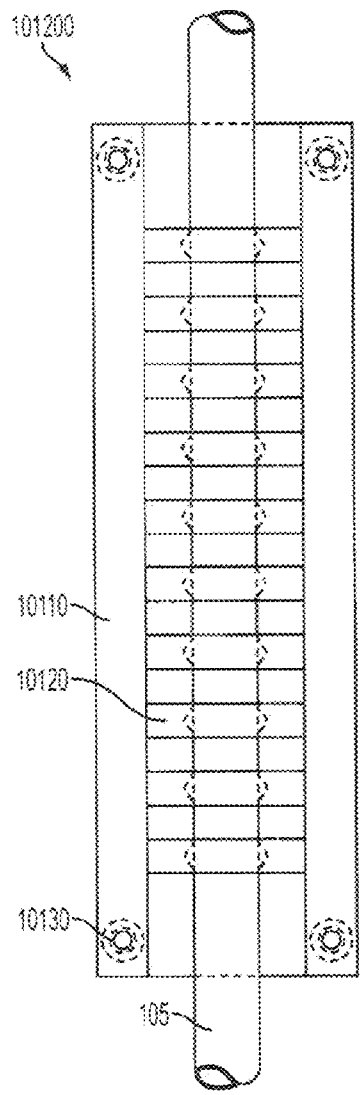
FIGS. 96A and 96B show a side elevational view (FIG. 96A) and a top plan view (FIG. 96B) of a series of digital flow rate controllers acting upon nodes of a common flexible tube, which series have a common manual actuator.
Figure 96B:
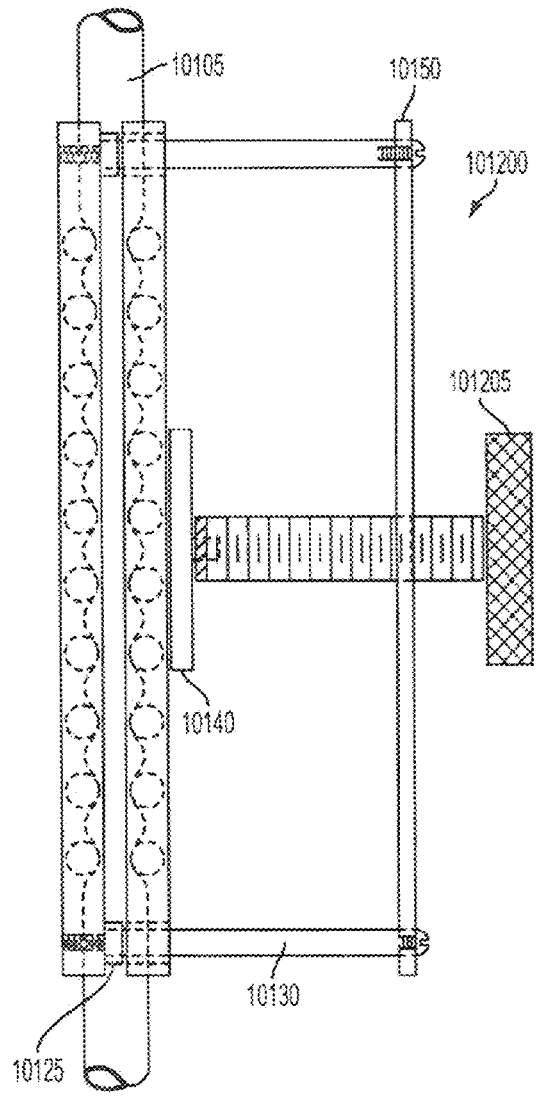

FIGS. 96A and 96B show a flow control device 101200 that is similar to the device 10100 of FIG. 86 but differs in that the automatic actuator 10135 has been replaced with a manual adjustment knob 101205 mounted on the backer plate 10150. The adjustment knob 101205 allows manual adjustments of all flow limiting nodes simultaneously. This simple flow rate adjustment methodology can be calibrated using a mechanical dial indicator, a mechanically incremented digital shaft position indicator, or by an electronic digital readout ("DRO").

FIGS. 97A and 97B show a flow control 101300 that employs symmetrical nodes 101305 to compress a flexible tube 101310. The nodes 101305 are mounted on rails 101315, with the spacing between the rails being controlled by adjustment fasteners 101320. Non-occlusion stops 101325 prevent the rails from moving so close together that flow through the tube 101310 is occluded.

Figure 98A:
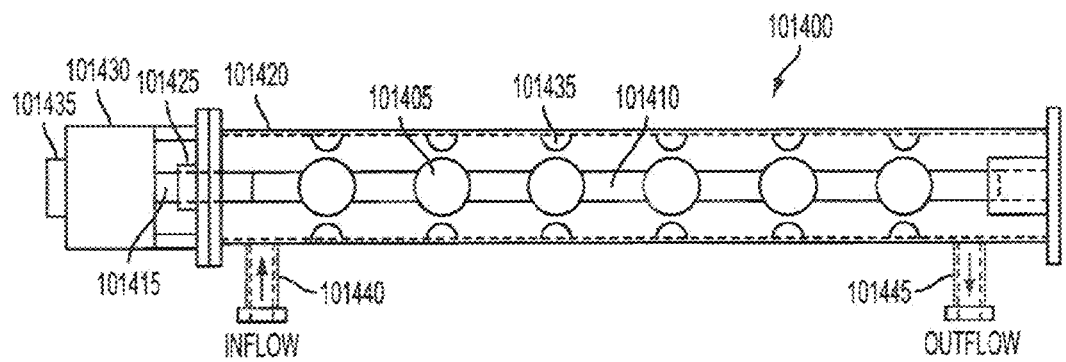
FIGS. 98A and 98B show a variable digital flow control which can be moved between a minimum flow geometry as shown in FIG. 98A and a maximum flow geometry as shown in FIG. 98B.
Figure 98B:
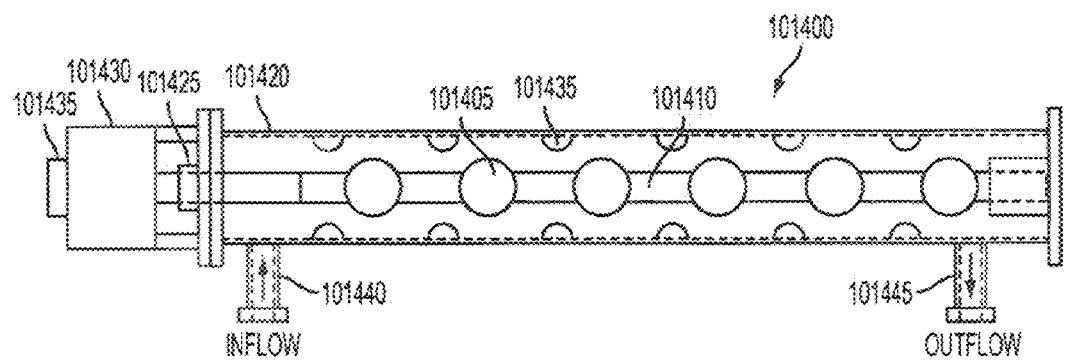

FIGS. 98A and 98B show a variable flow controller 101400 having nodes 101405 that are arranged similarly to the nodes 10505 of the flow control 10500 of FIG. 89. In particular, the nodes 101405 are separated by internodal spacers 101410 and are mounted on a shaft 101415 that is coaxially positioned in a tube 101420. The shaft extends through a shaft seal 101425 at the end of the tube where it is connected with an actuator 101430 having an associated position encoder 101435. The actuator 101430 is configured to move the shaft between a first position (as shown in FIG. 98A) in which the nodes 101405 are aligned with annular rings 101435 on an interior surface of the tube 101420 and flow between an inflow port 101440 and an outflow port 101445 is minimized, and a second position (as shown in FIG. 98B) in which the nodes 101405 are positioned equidistant between neighboring rings 101435 and flow is maximized. Using the encoder 101435, the actuator 101430 also is able to position the shaft in positions between those shown in FIGS. 98A and 98B.

As shown, the range of motion to effect a large and essentially linear flow control range is comparatively small and thus allows a highly responsive and very fast-adjusting device. The physical shape of each flow node can be varied widely as appropriate to the velocities of the particular application.

Figure 99A:
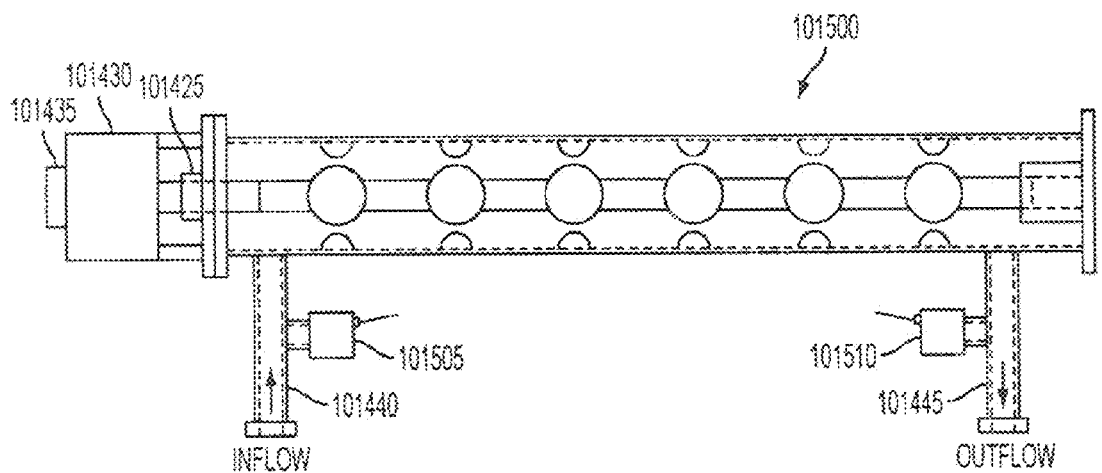
FIGS. 99A and 99B show two views of a series flow node digital flow rate controller with an integrated differential pressure flow meter forming a flow regulator.
Figure 99B:
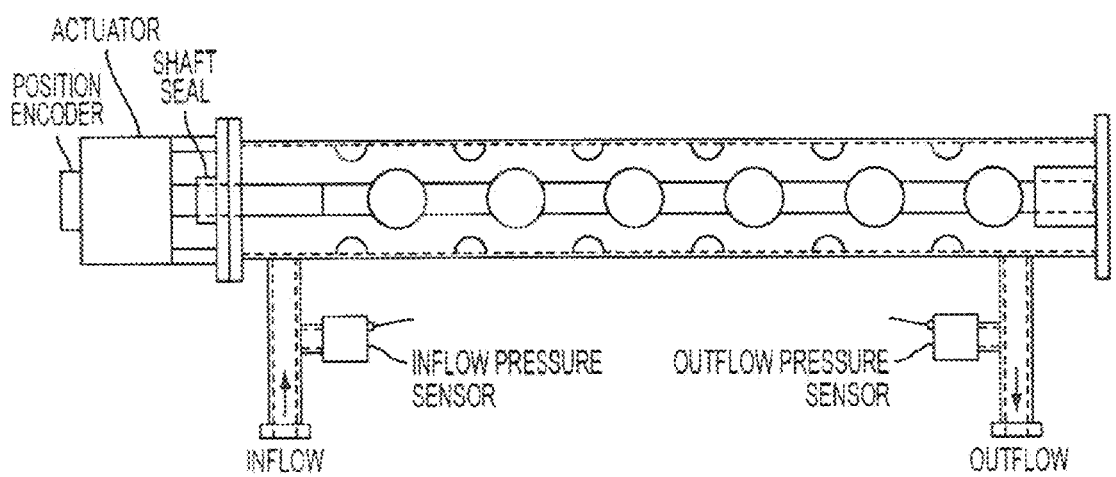

FIGS. 99A and 99B show a variable flow controller 101500 that differs from the flow controller 101400 by including an inflow pressure sensor 101505 at the inflow port 101440 and an outflow pressure sensor 101510 at the outflow port 101445. By placing a pressure sensor on each side of a single flow restricting orifice and reading the pressure differential, volumetric flow rate may be determined. The integration and combination of these sensors into a digital series flow restricting node flow rate controller provides a highly efficient and capable fully integrated flow regulator solution. When combined with a digital flow controller as herein disclosed, the rational and useful range of differential pressure signals from the spaced apart sensors is greatly increased, often by a range of two or three times over conventional configurations.

Figure 100A:
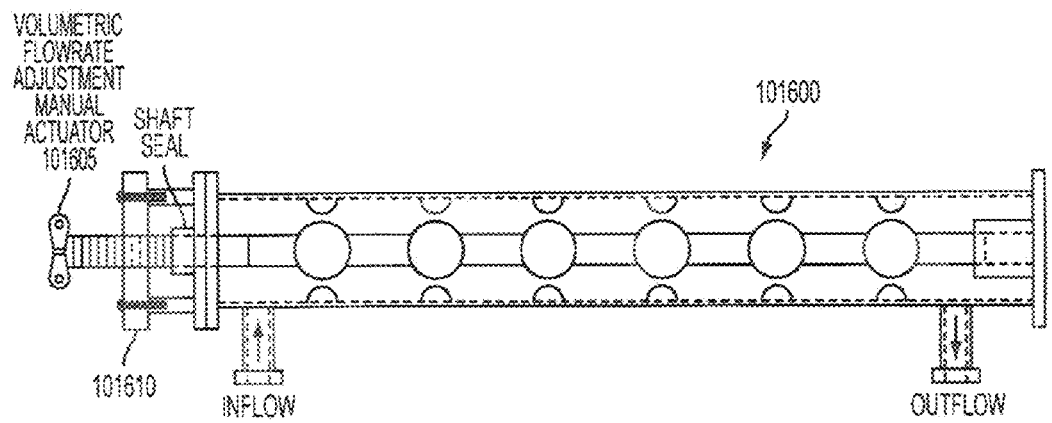
FIGS. 100A and 100B are views similar to those of FIGS. 99A and 99B but showing a manually actuated digital flow control.
Figure 100B:
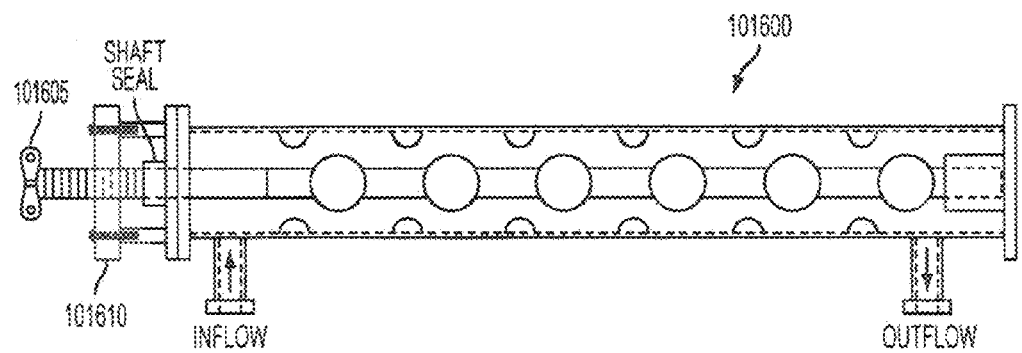

FIGS. 100A and 100B show a variable flow controller 101600 that differs from the flow controller 101400 in that the actuator 101430 is replaced with a manual actuator 101605 that extends through a threaded thrust plate 101610.

Figure 101:
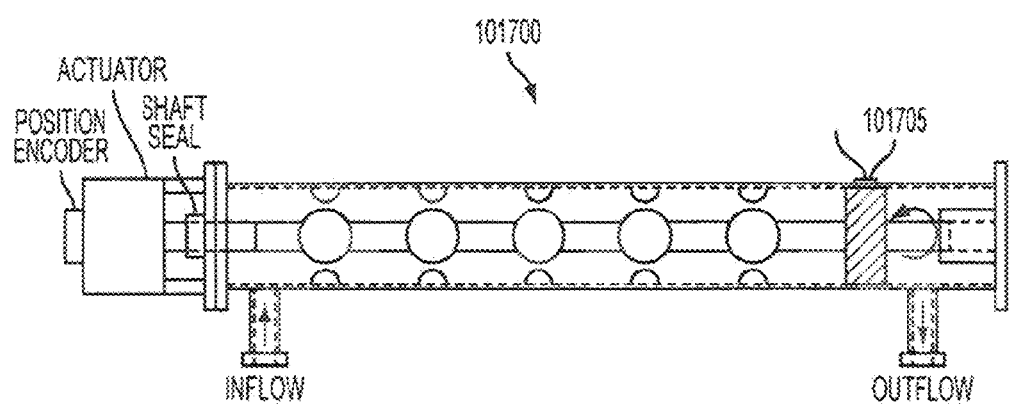
FIG. 101 shows a digital flow control with an integrated turbine flow meter forming a flow regulator.
Figure 102:
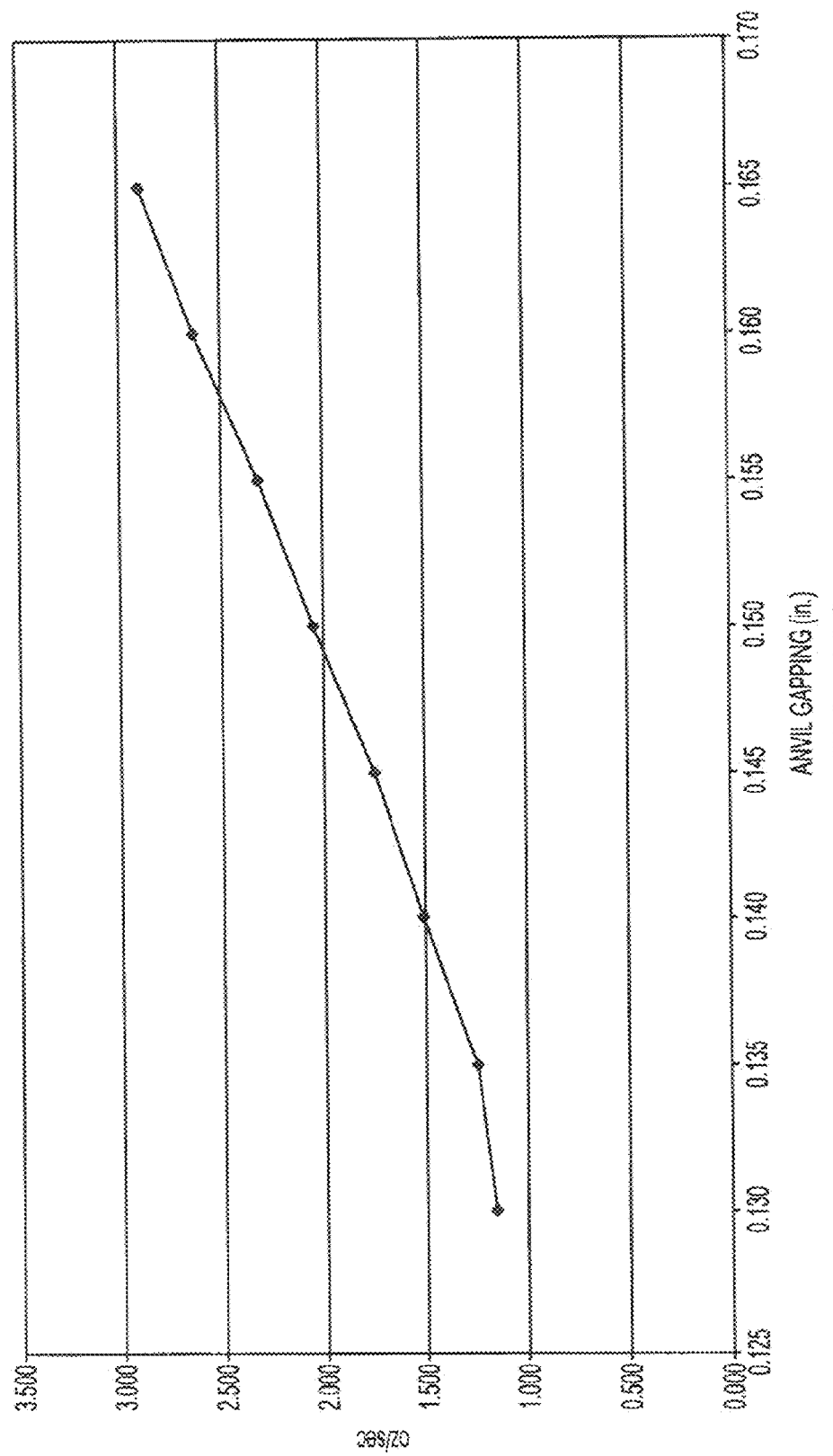
FIGS. 102-128, in the various flow plots show the empirical behavior of various arrangements.
Figure 103:
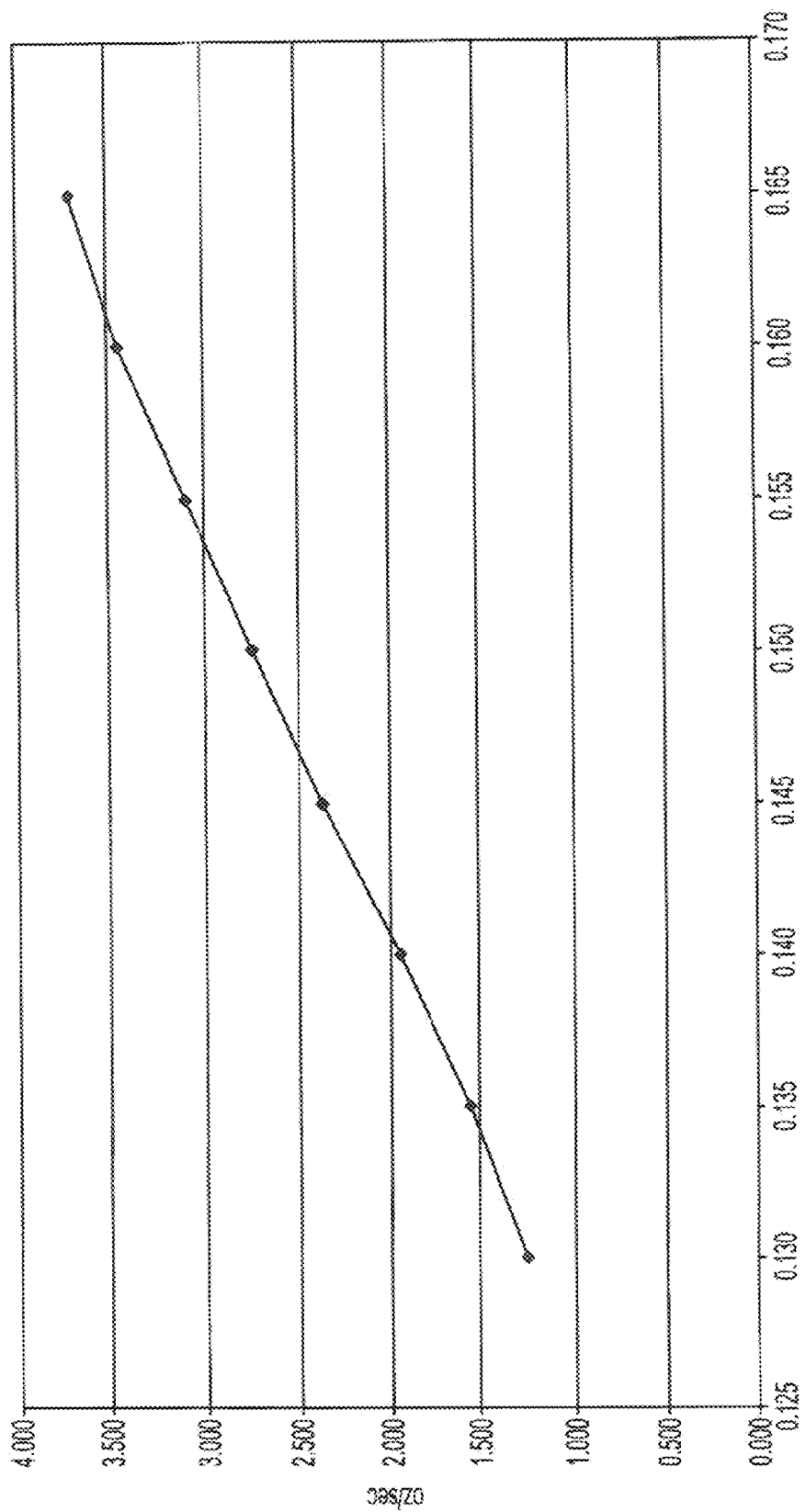
Figure 104:
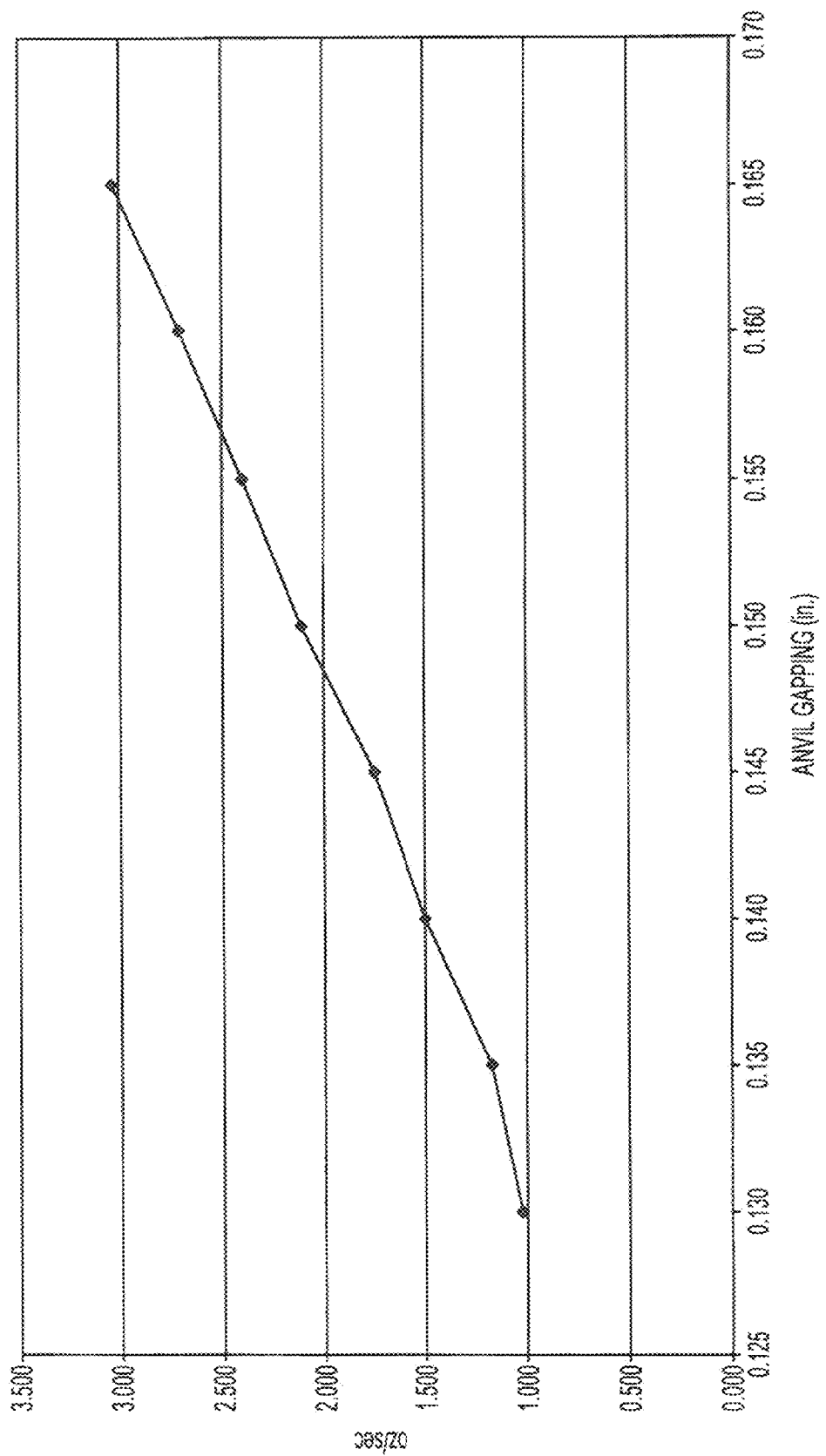
Figure 105:
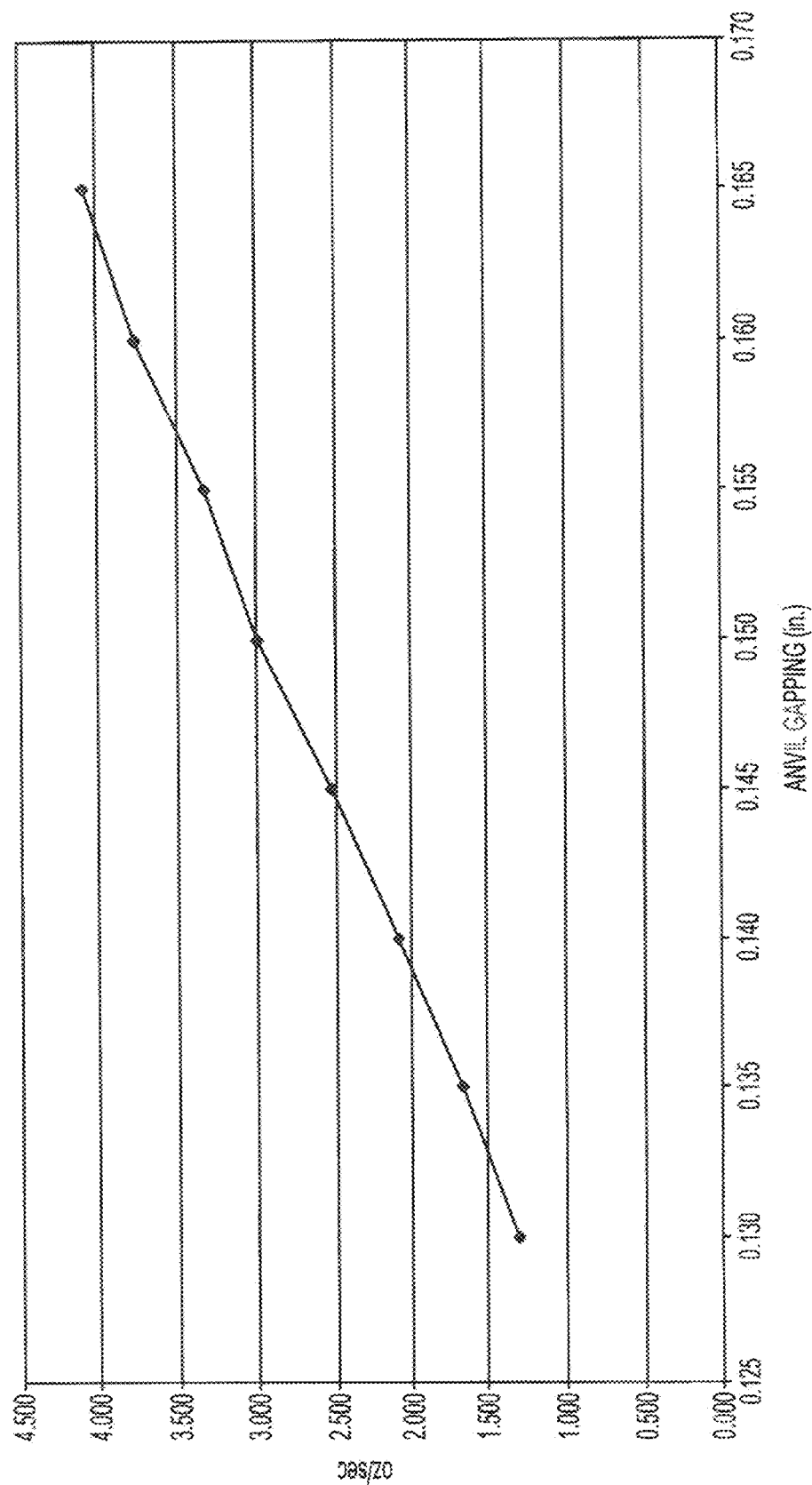
Figure 106:
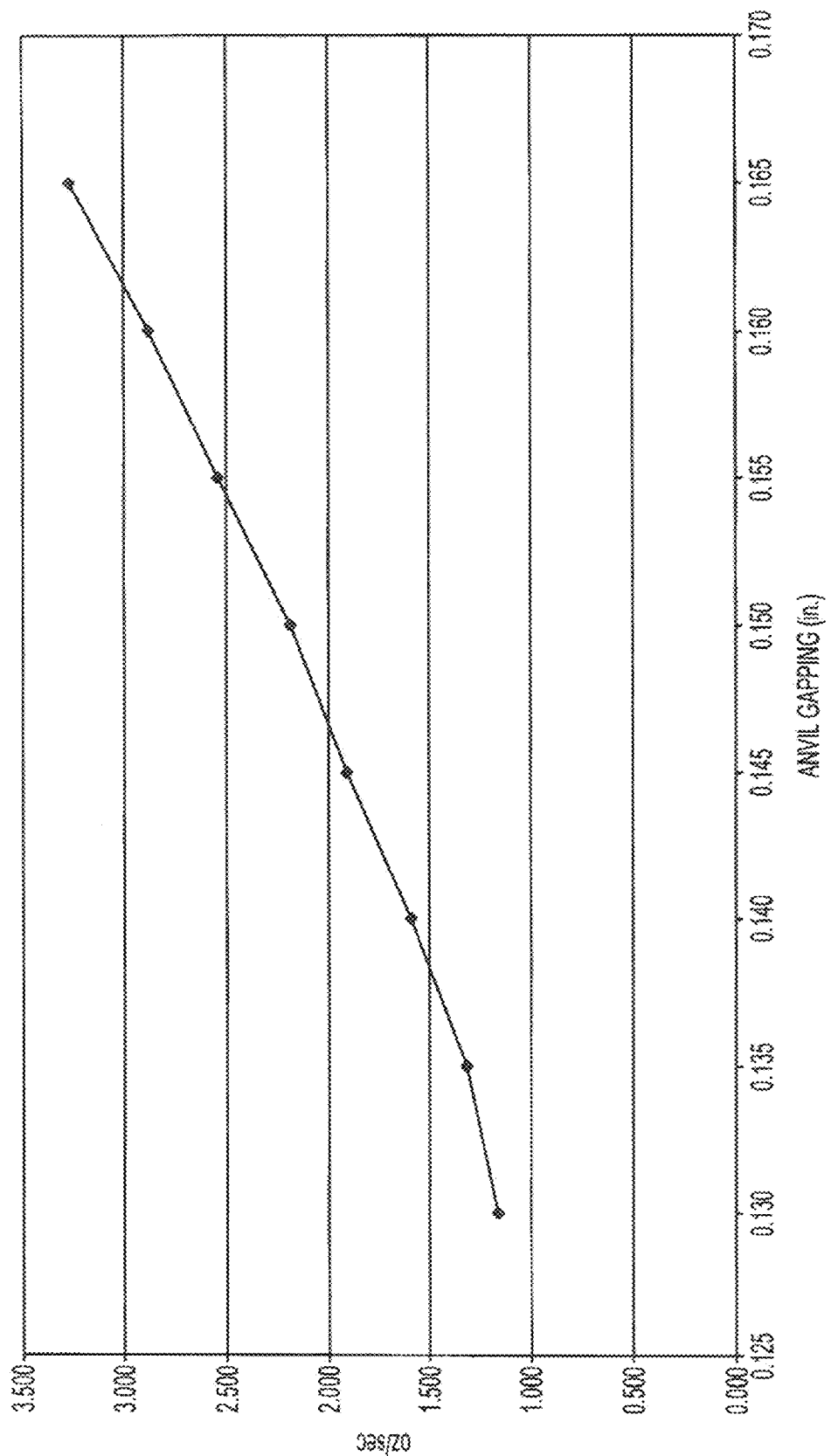

FIG. 101 shows a variable flow controller 101700 that differs from the flow controller 101400 by including an integrated turbine flow meter 101705. Inclusion of the liquid flow meter 101705 in the same liquid flow conduit as the digital flow controller permits the digital flow rate controller to function as a flow rate regulator in that it can actively hold and maintain a defined flow rate set point based upon a flow rate signal. This arrangement is particularly suited for this application because of its inherent relative linearity, its ability to be configured by adjustment, its comparatively fast speed of response, high predictability of response, essentially total lack of hysteresis or overshoot under flow adjustment, and lack of flow discontinuities in its flow rate curves, particularly at the extreme low end and extreme high end of useful flow range of a particular device.

FIGS. 97A and 97B somewhat schematically shows another embodiment in which shaft mounted spheres are manually movable coaxially in relation to hemispherical-circumferential elements fitted periodically to the internal diameter of a suitable rigid flow containment cylinder. Each pair of these structures comprises a series integrated flow rate node and varying the relative position of the annular or doughnut shaped orifice formed between the paired elements of each node can vary flow rate in a nearly linear manner.

In the 48 flow plots depicted in FIGS. 102 to 128, the empirical behavior of various embodiments of the device is extensively presented, these data and graphs serving as the basis for further comments and analysis on the functional flow rate behavior of the device. The plots illustrated in FIGS. 102-107 are examples of graphical plots of empirical flow data correlating flow rate expressed in fluid ounces per second against the flow node flow aperture diameter in fractional inches, defined as the compression gap or interval set consistently between each flow node defining anvil pair. The general form of the flow control used to gather this data is shown variously in FIGS. 86, 95, and 97. Flexible flow conduit size and flow pressure were held constant, while anvil spacing was varied over a 2:1 range and anvil count was varied over a 2:1 range.

Figure 107:
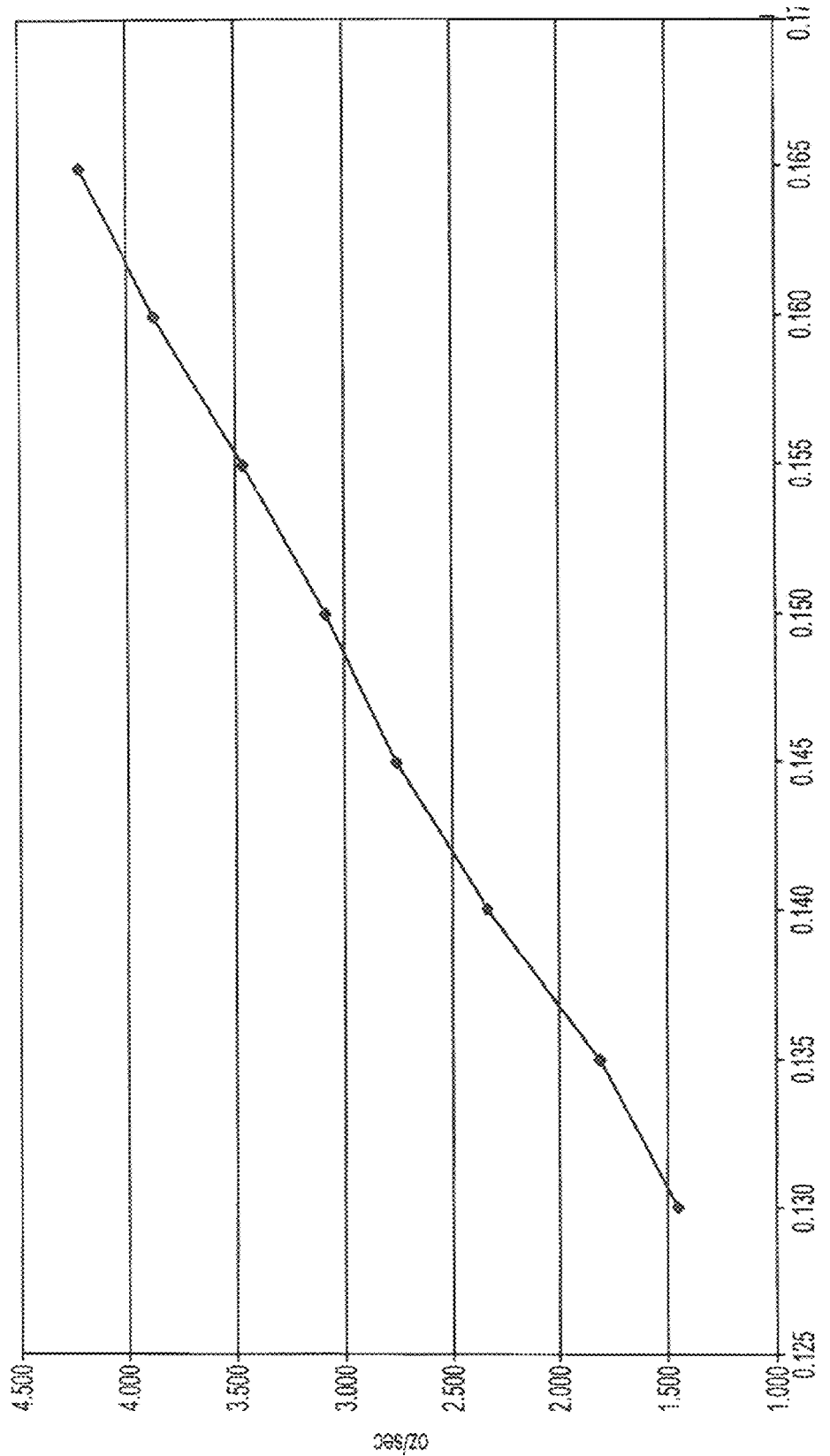
Figure 107A:
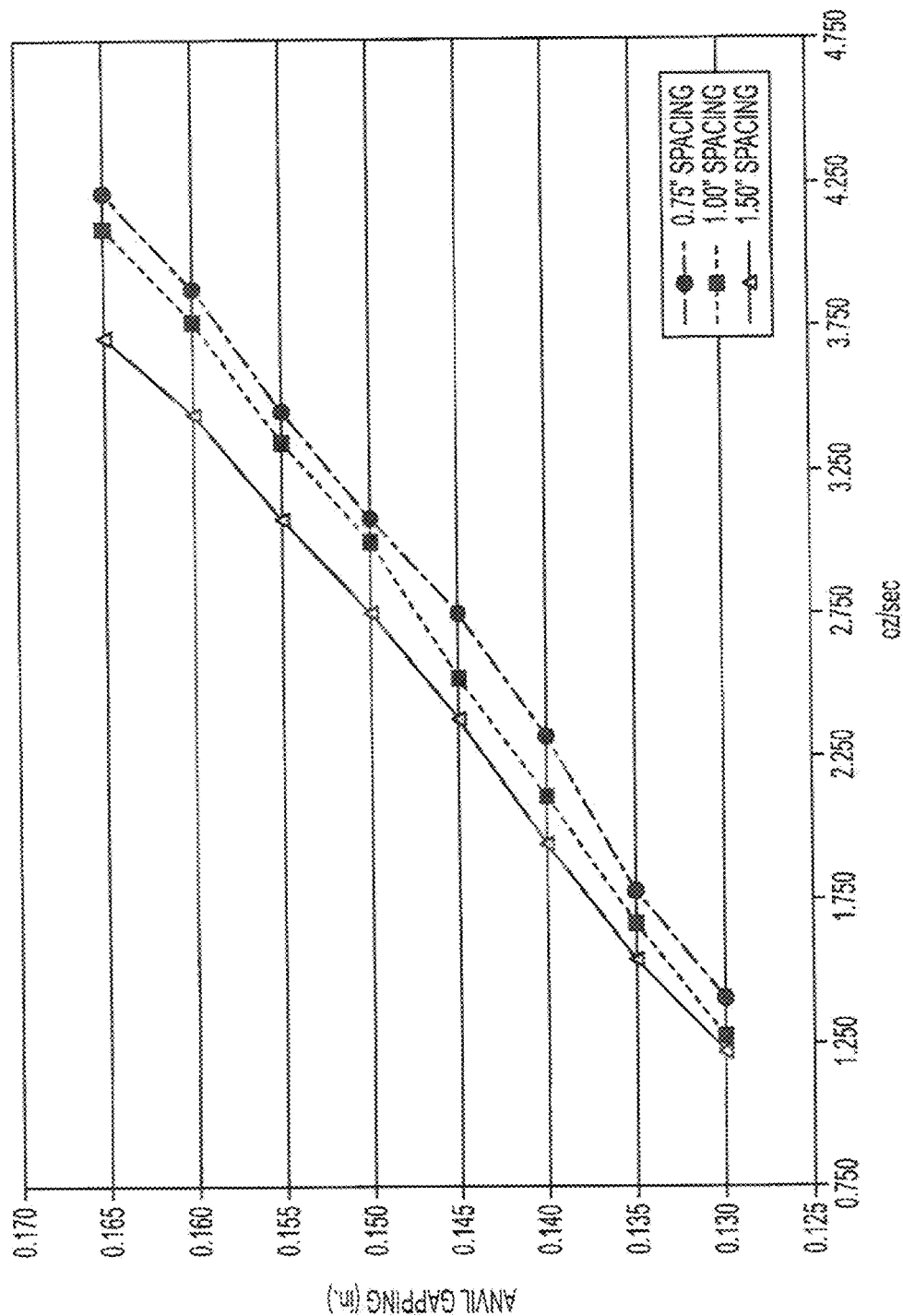
Figure 107B:
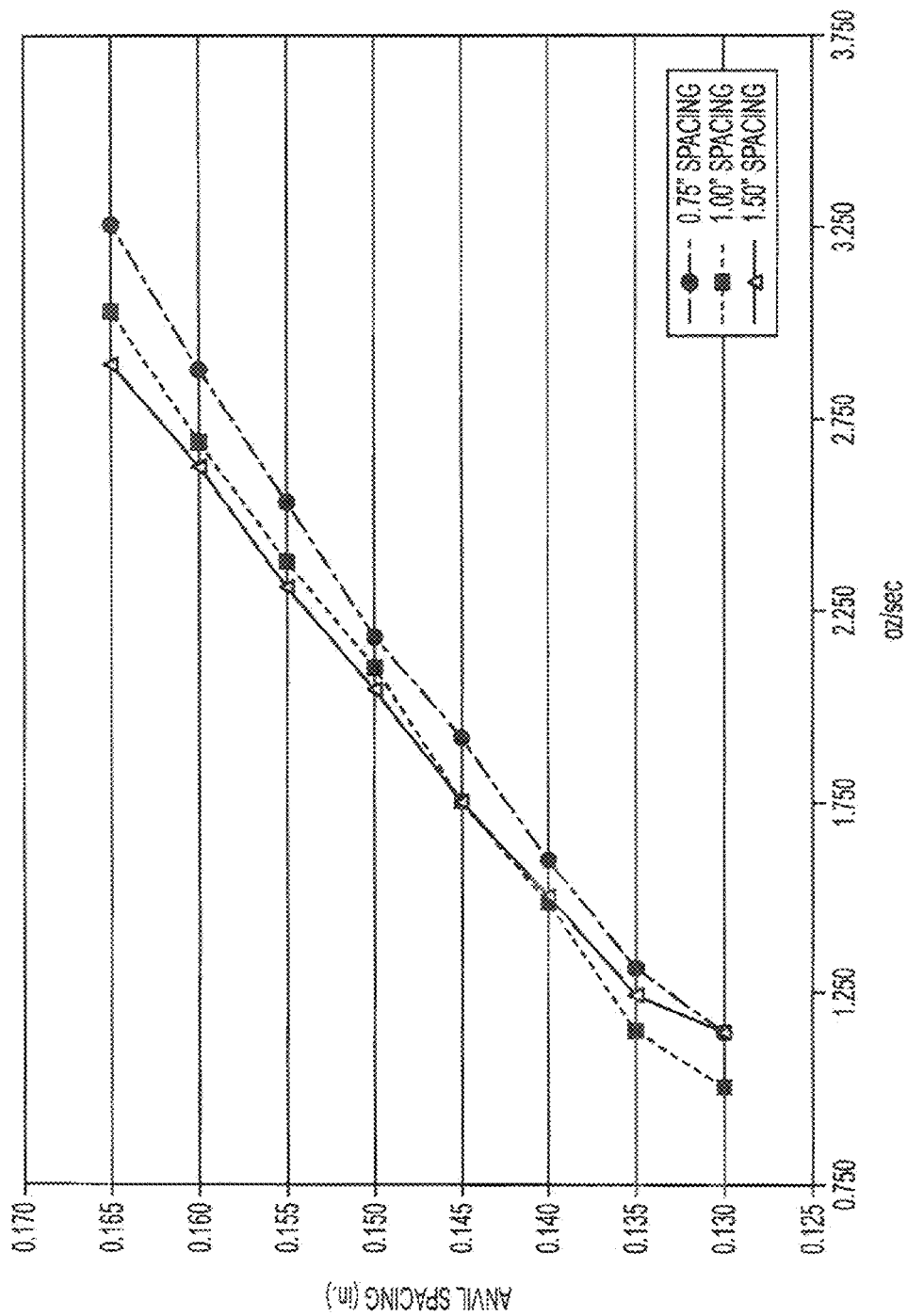
Figure 108A:
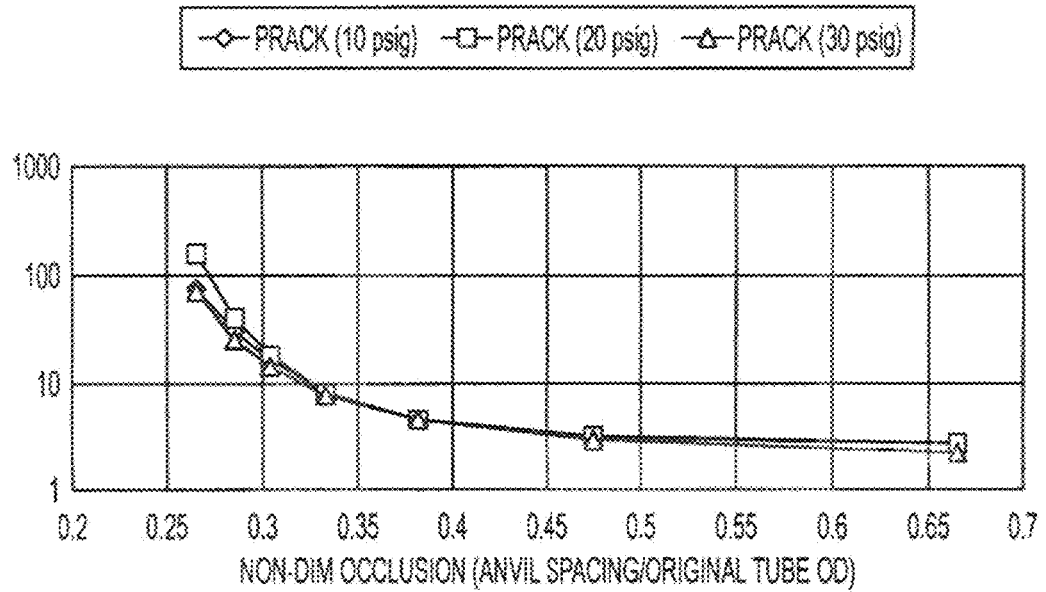
Figure 108B:
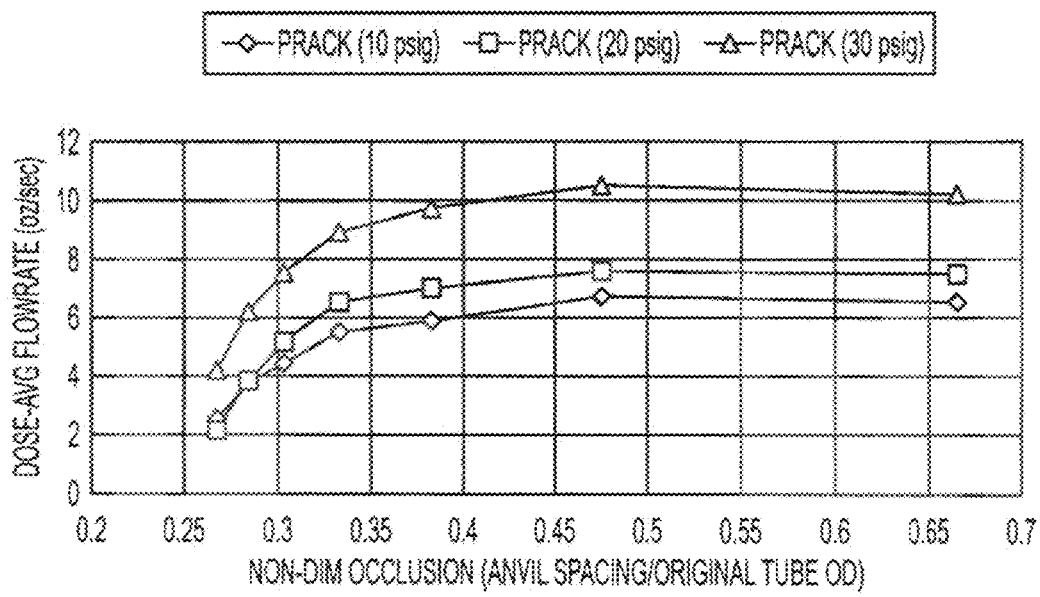

FIGS. 107A and 107B summarize these flow relationships, which can be shown to be representative of results with a broad range of flexible tube sizes and flow pressures. Thus, the flow control devices can be empirically shown to produce an average change in flow of 13.75 percent at a constant flow conduit diameter, constant flow pressure, and setting of the flow nodes gap ranging from about 0.35 to about 0.44 of the uncompressed inside diameter of the tube (termed herein as the flow orifice ratio), when the flow node count range is varied over a range of 5 nodes to 10 nodes (2:1 range) and when the center-to-center spacing of the nodes is varied from 0.75 inches to 1.5 inches (2:1) range. The flow change is inverse in relationship to the spacing of the flow nodes. Thus, flow can be varied as specified merely by changing the flow nodes spacing.

Linearity of flow rate with a change in flow nodes flow aperture sizing is also summarized in FIGS. 107A and 107B over the same range of test conditions as defined above. Thus, over the flow node aperture range defined by anvil gapping of about 0.35 to about 0.44 of the uncompressed inside diameter of the flexible tube, linearity is within 2.5 percent or better across a flow range that varies at least 3.5 times from minimum flow to maximum flow.

FIGS. 115A, 115B, 116A, and 116B are flow curve examples that show that the linear operation of the multi-node devices can be subdivided into two separate zones based upon the relative degree of flow aperture or orifice restriction expressed as a ratio of flow anvil spacing to the uncompressed inside dimension of the flexible flow tube. Thus, in the example of FIGS. 116A and 116B, at an illustrated 3:1 pressure range, a first linear range exists from an aperture ration of 0.35 to 0.44. A second linear range extends from an orifice ratio of 0.60 to 0.87. Because of this dual zone linearity, a flow control capability is recognized in which a coarse adjustment control of flow rate and a fine adjustment control of flow rate are possible. Consider, in FIGS. 116A and 116B, that adjustment in the first linear zone of the flow aperture ration of 0.35 to 0.44 changes flow rate through the device by a factor of 4:1 in the case of the highest pressure operating curve shown. In the second linear zone, adjustment from a flow aperture ration from 0.67 to 0.87 changes flow rate through the device by a ratio of 1.1:1. Thus, in the first zone, each 0.01 increment of aperture ratio change causes a flow change of 0.11 of the 4:1 range. In the second zone, each 0.01 increment of aperture ratio causes a flow change of 0.037 of the 1.1:1 range. Thus, the span and resolution of adjustment per increment of flow aperture ratio change are different in each case. This, in turn, allows the flow control device to be adjusted on a coarse and fine basis.

As another example of the coarse and fine adjustment, consider a unitized ten flow node element device in which five flow nodes are adjusted to approximately reach a desired flow within the first linear zone range. The remaining five node can then be used to adjust flow with significantly higher resolution in order to more precisely and more easily reach the exact desired flow rate value. This allows adjustments that are easier and faster to achieve and reduces the effects of setpoint undershoot and overshoot (manual or automatic) or a desired flow rate setpoint. This benefit can also be gained by using two separate devices in series flow, one operating in the high resolution zone, and one operating in the low resolution zone.

Figure 109:
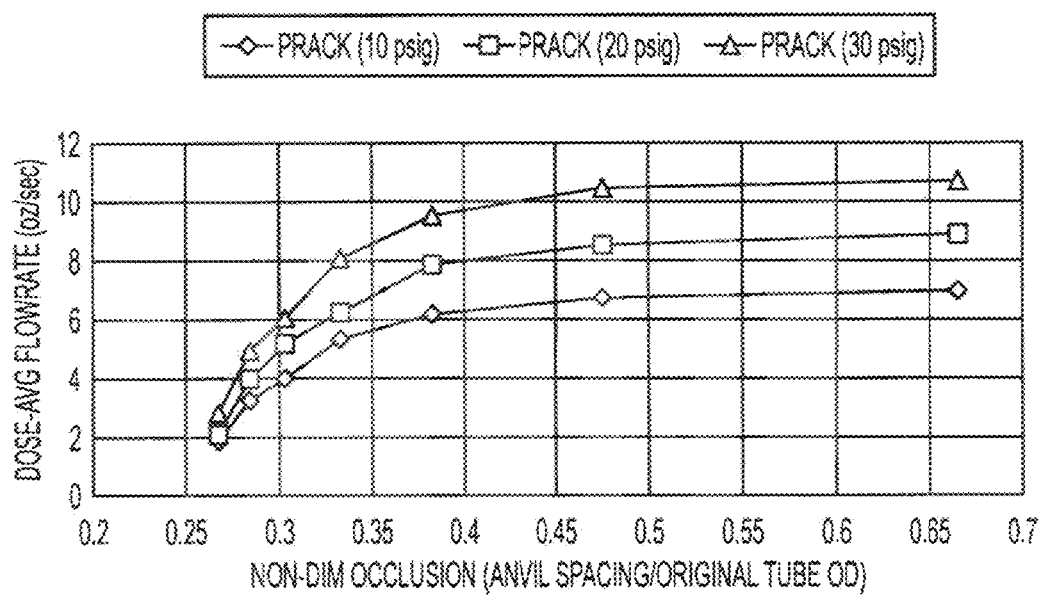
Figure 110A:
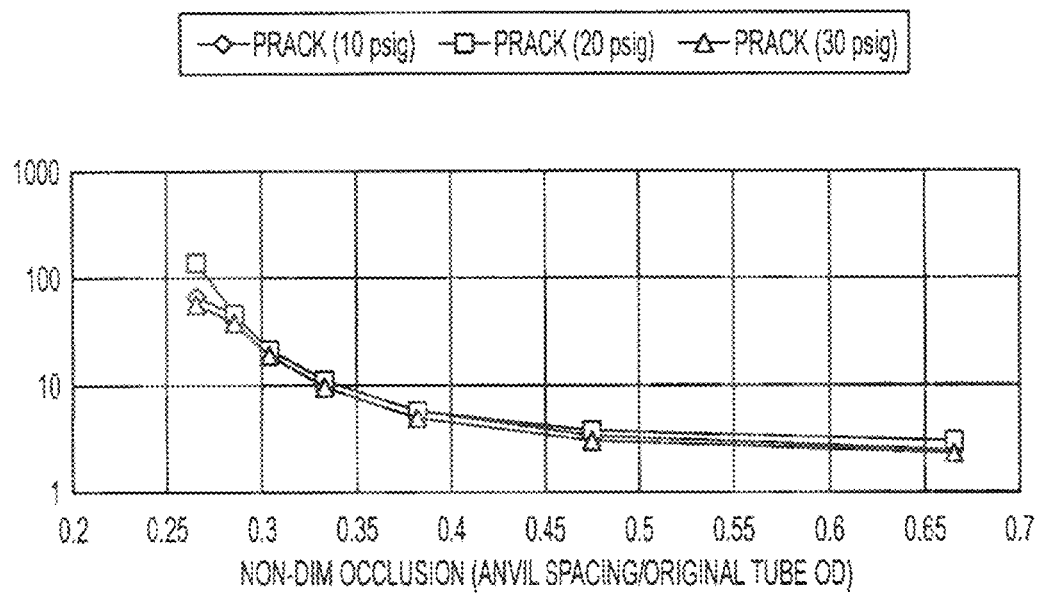
Figure 110B:
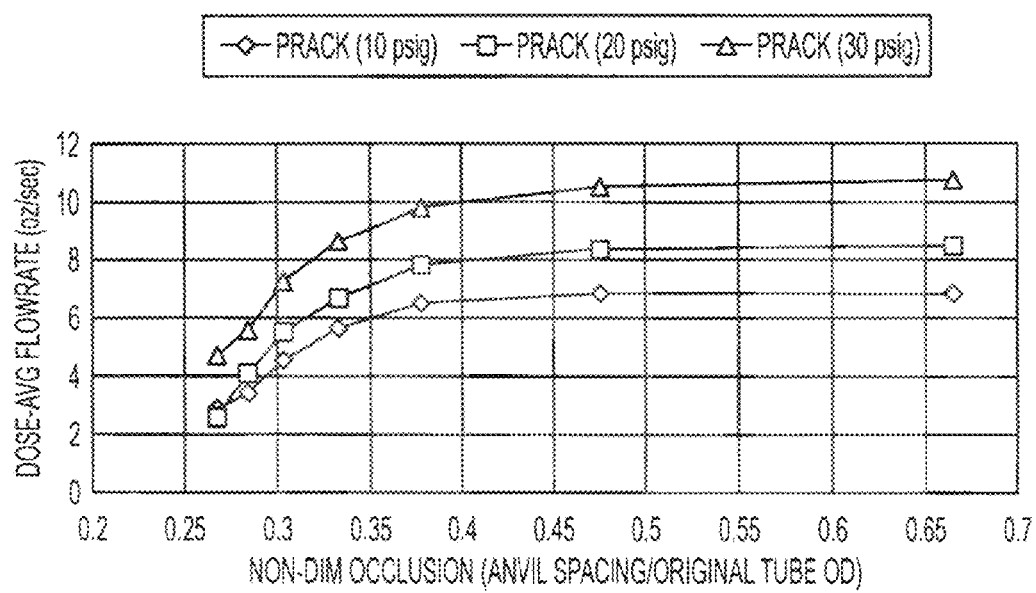
Figure 111A:
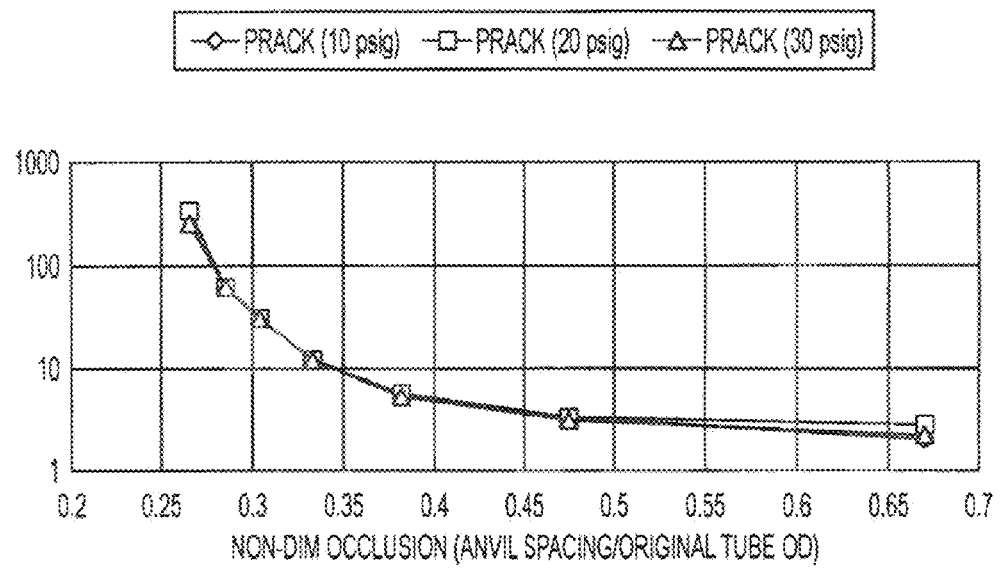
Figure 111B:
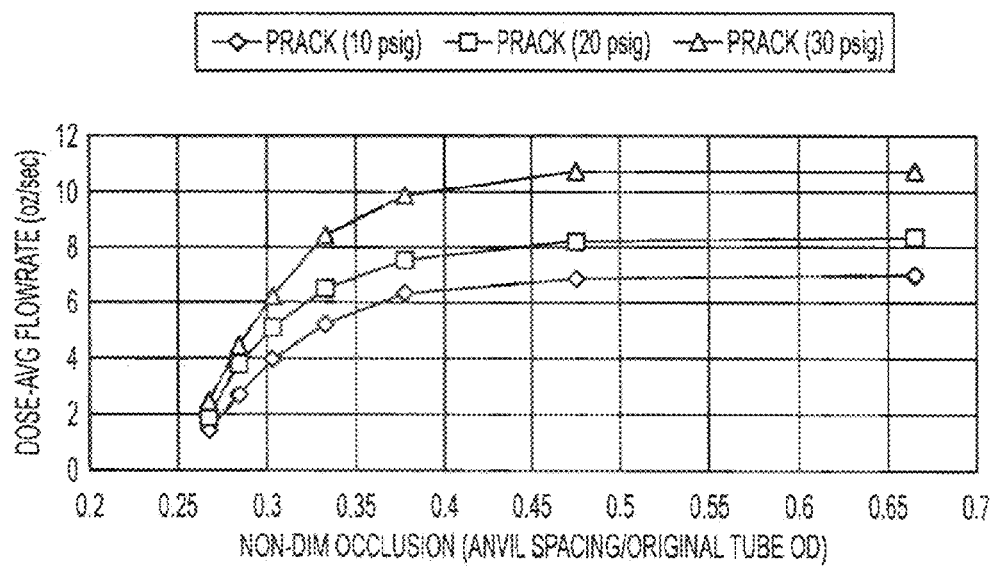
Figure 112A:
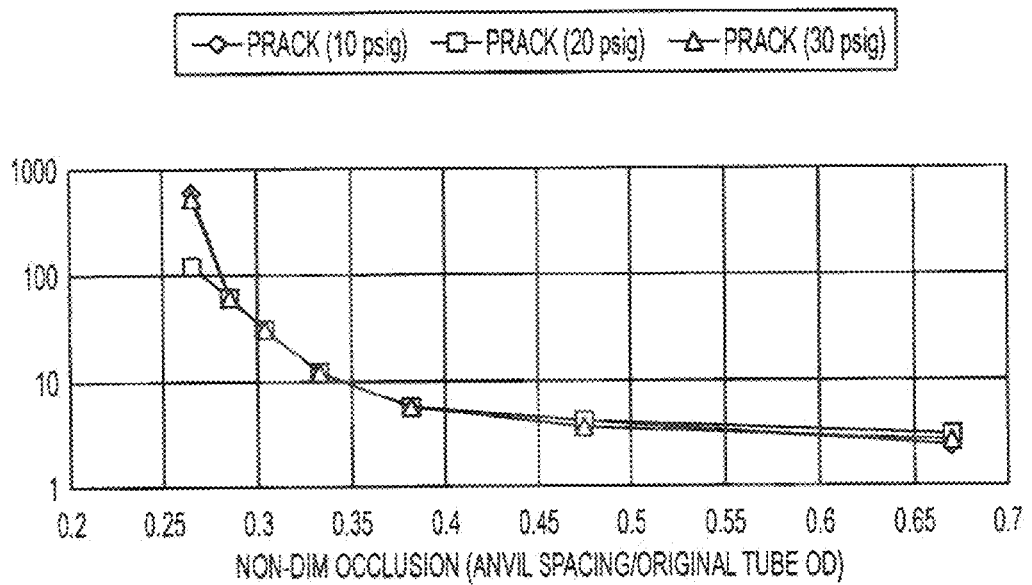
Figure 112B:
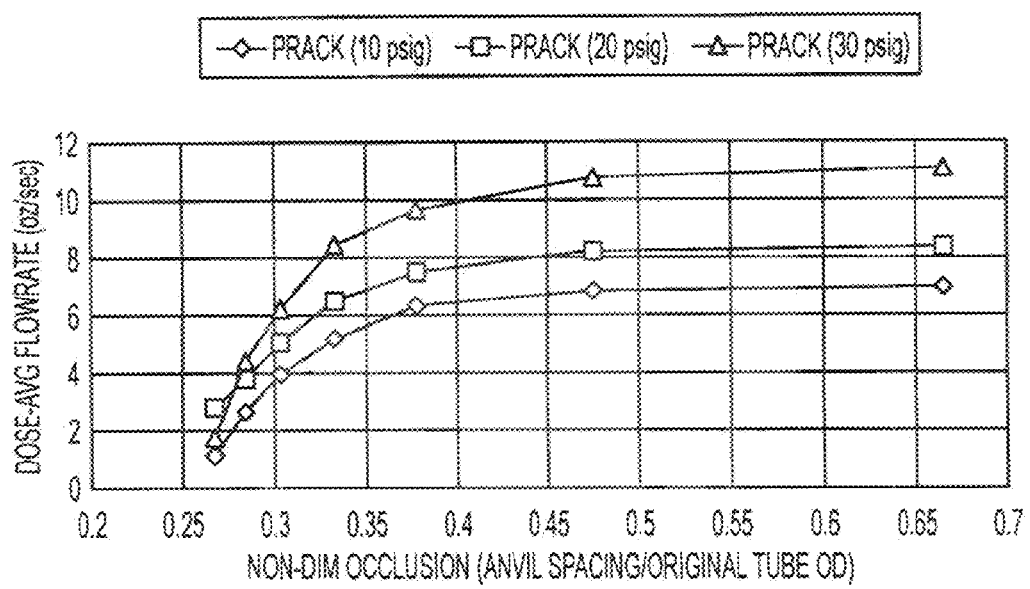
Figure 113A:
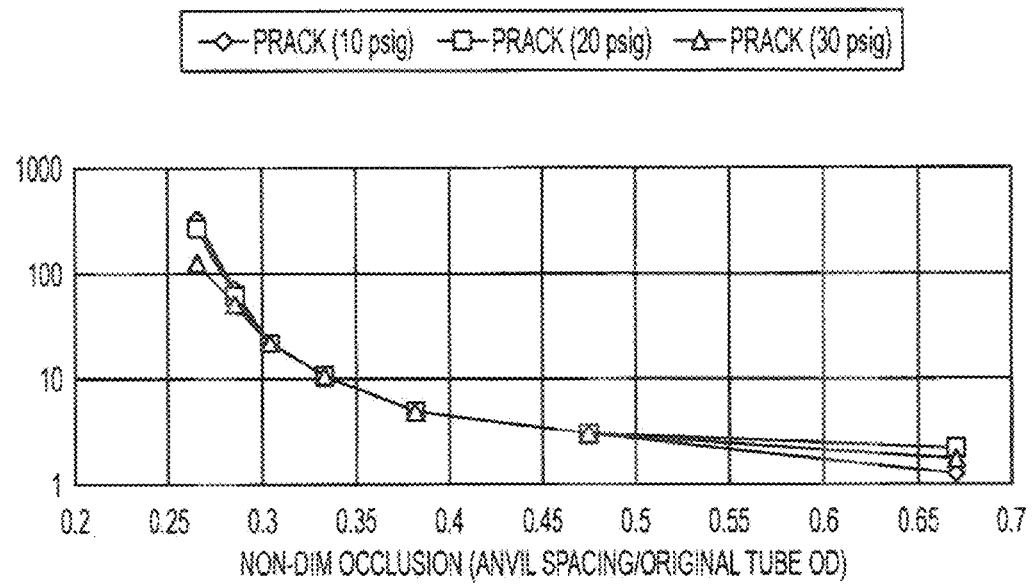
Figure 113B:
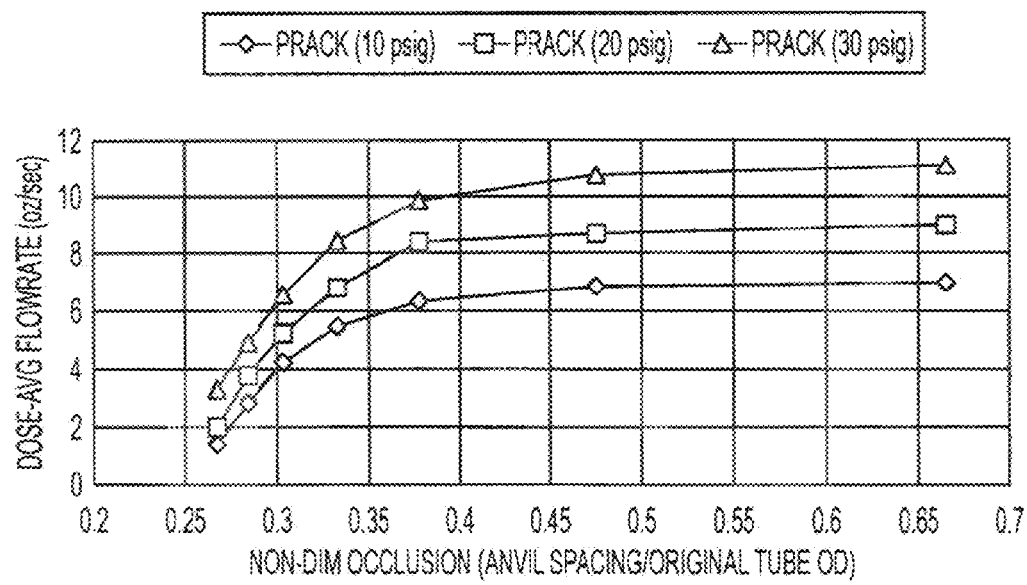
Figure 114A:
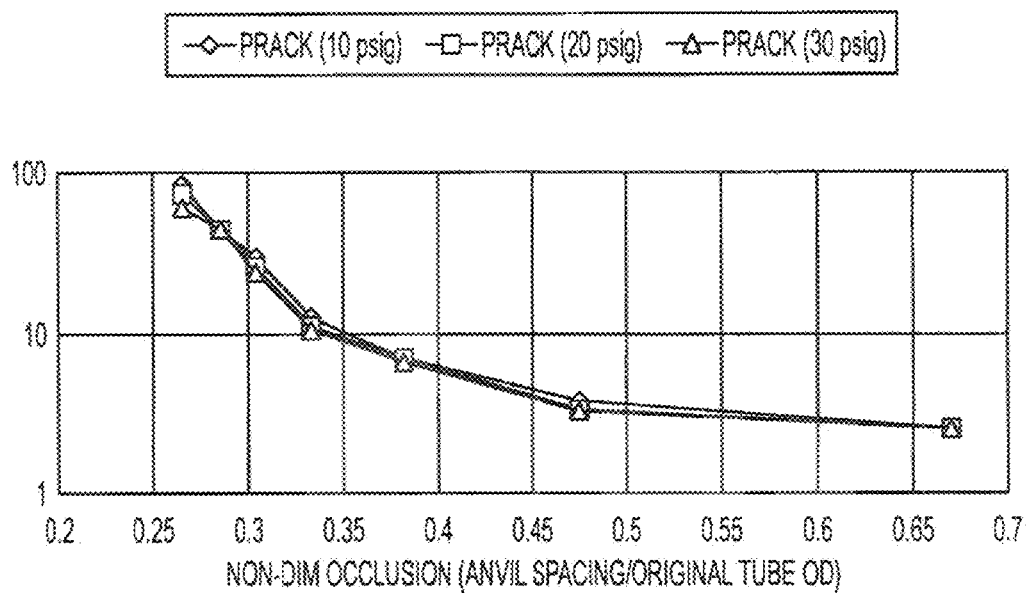
Figure 114B:
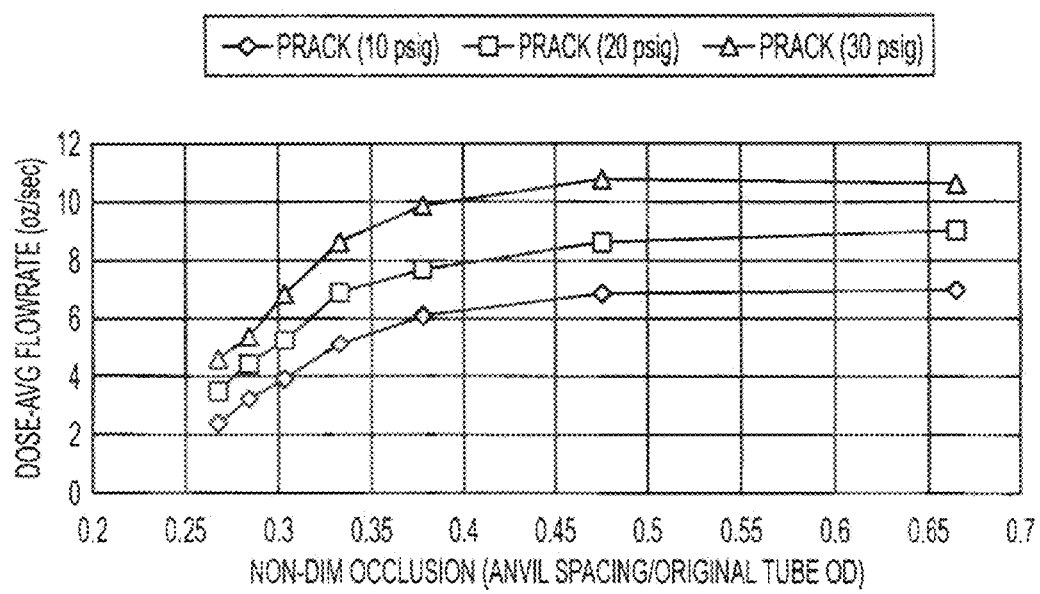
Figure 115:
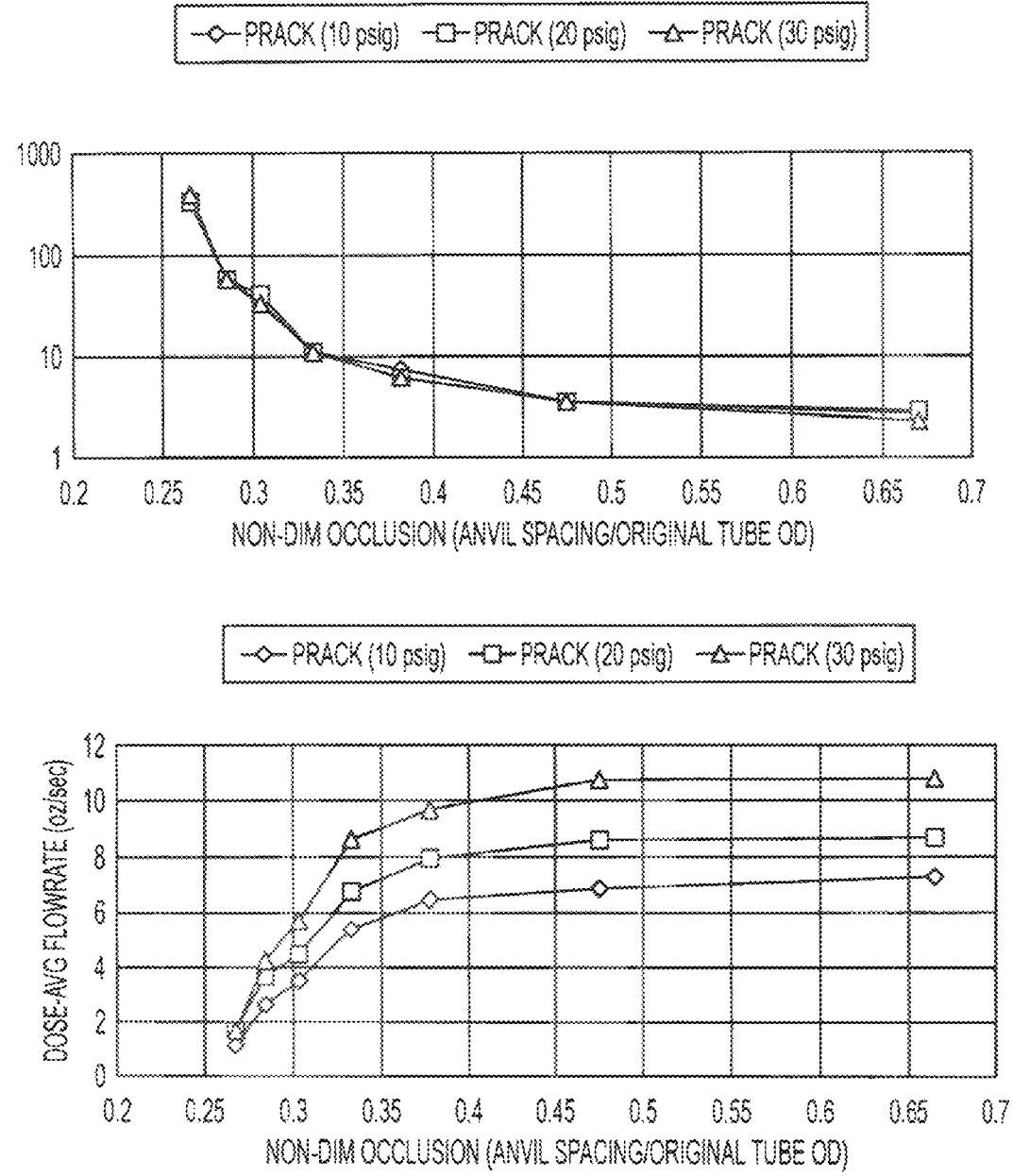
Figure 115A:
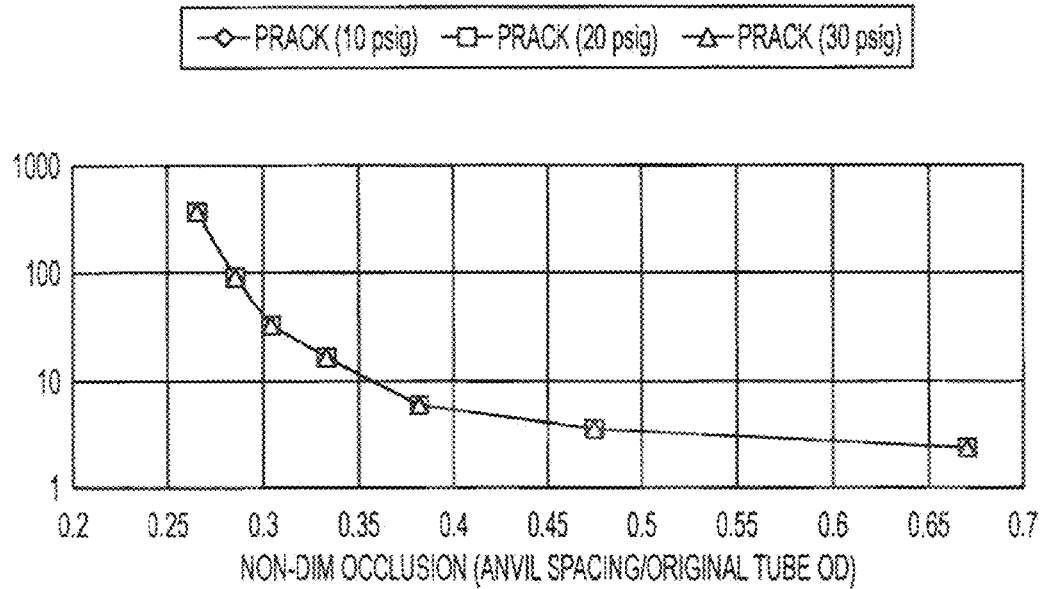
Figure 115B:
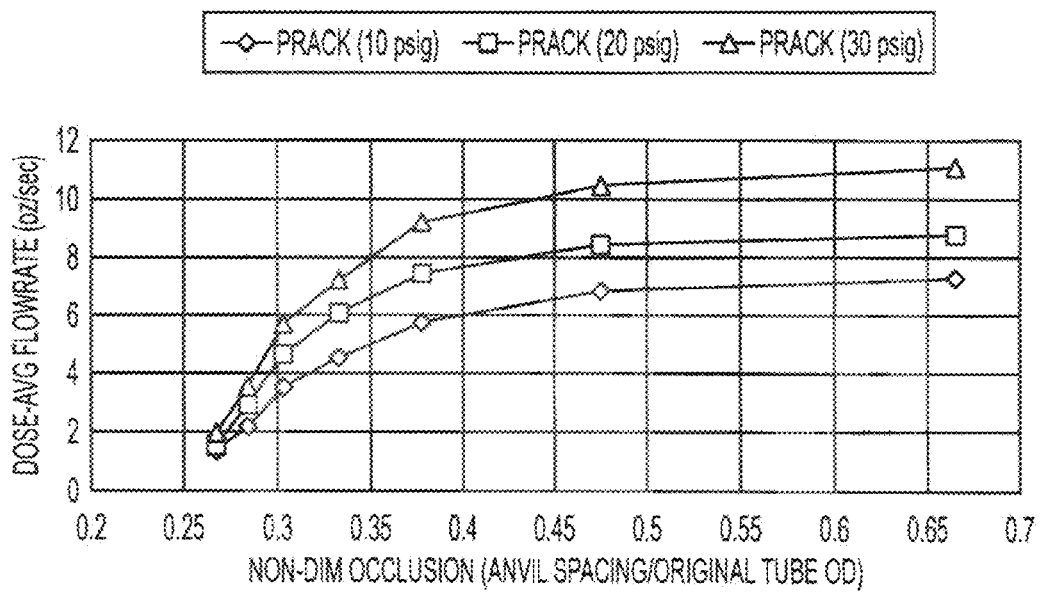
Figure 116A:
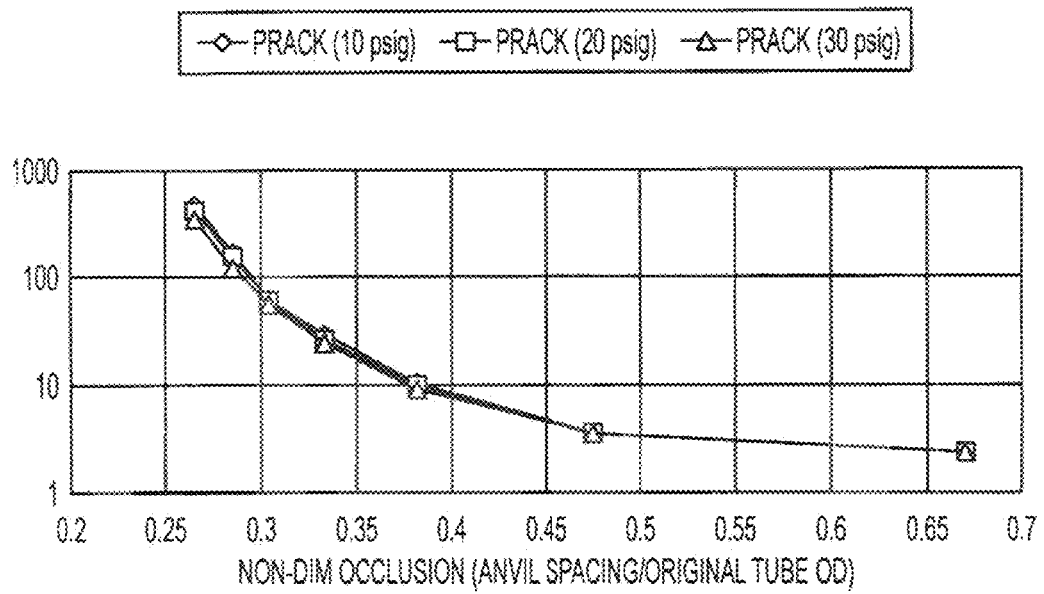
Figure 116B:
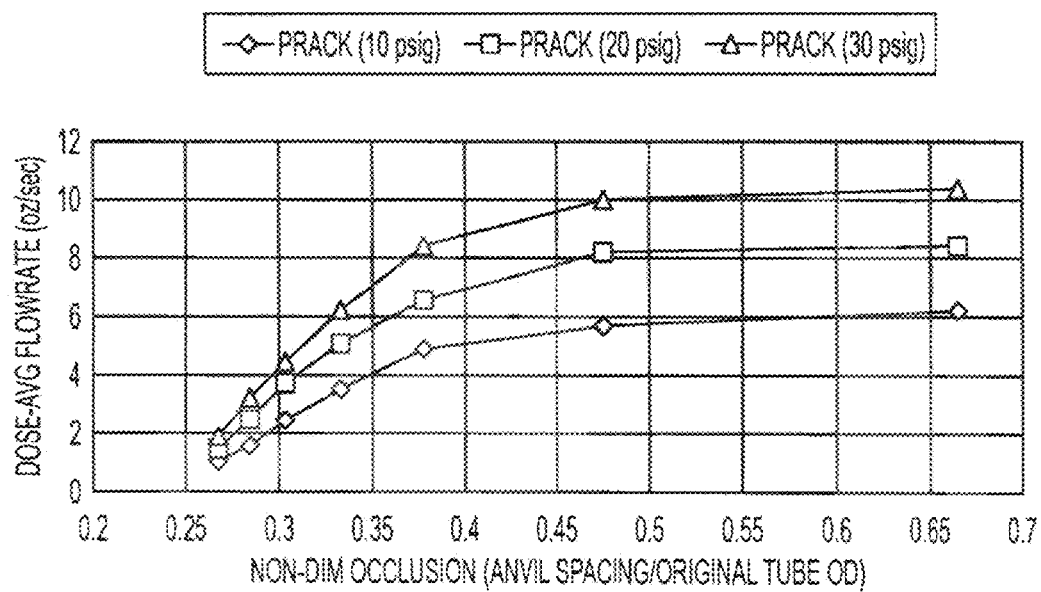
Figure 117:
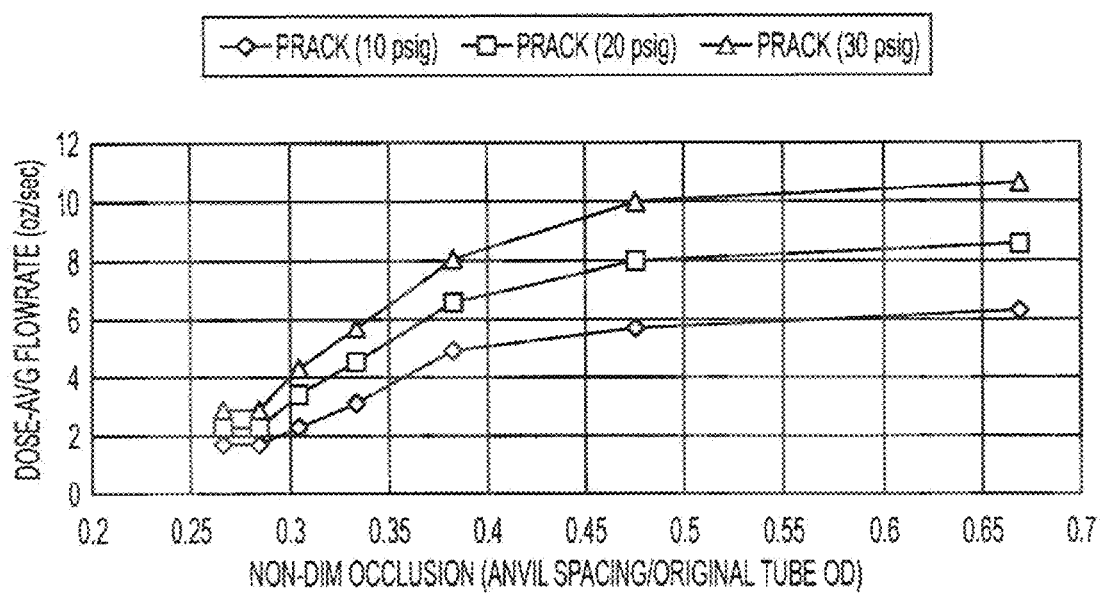
Figure 118A:
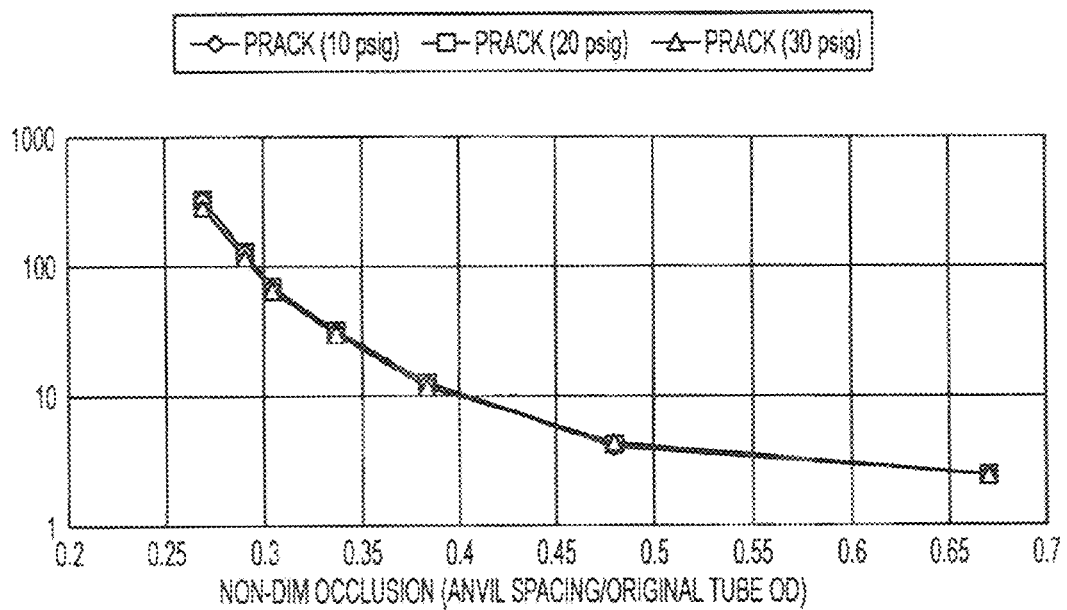
Figure 118B:
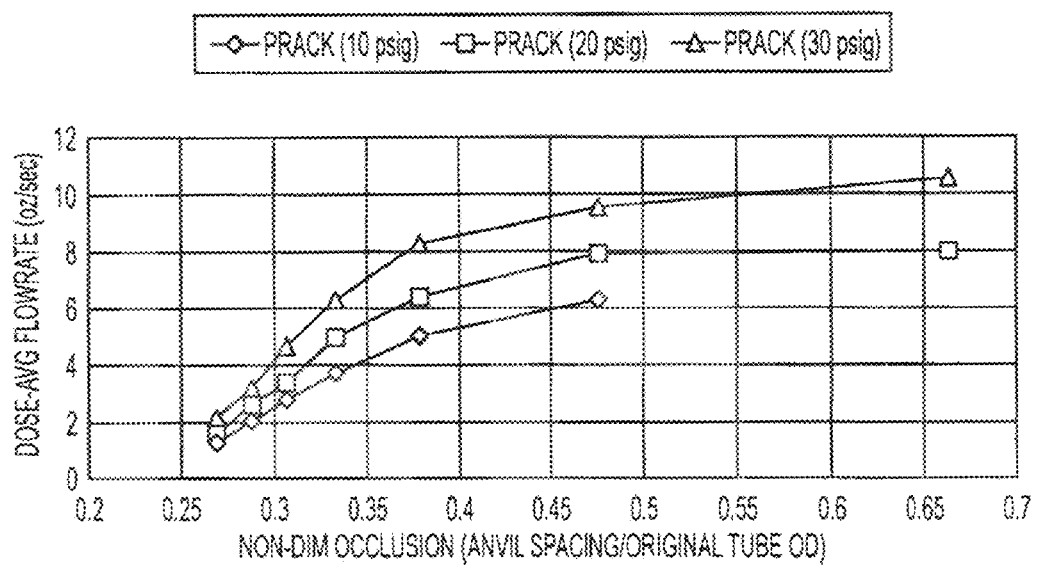
Figure 119A:
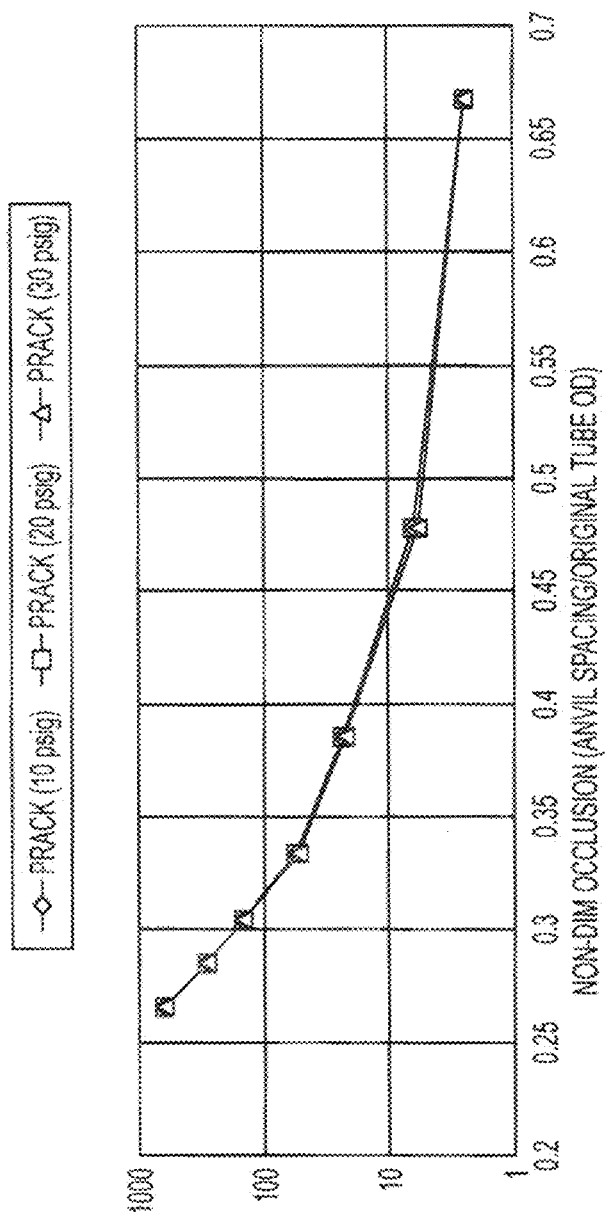
Figure 119B:
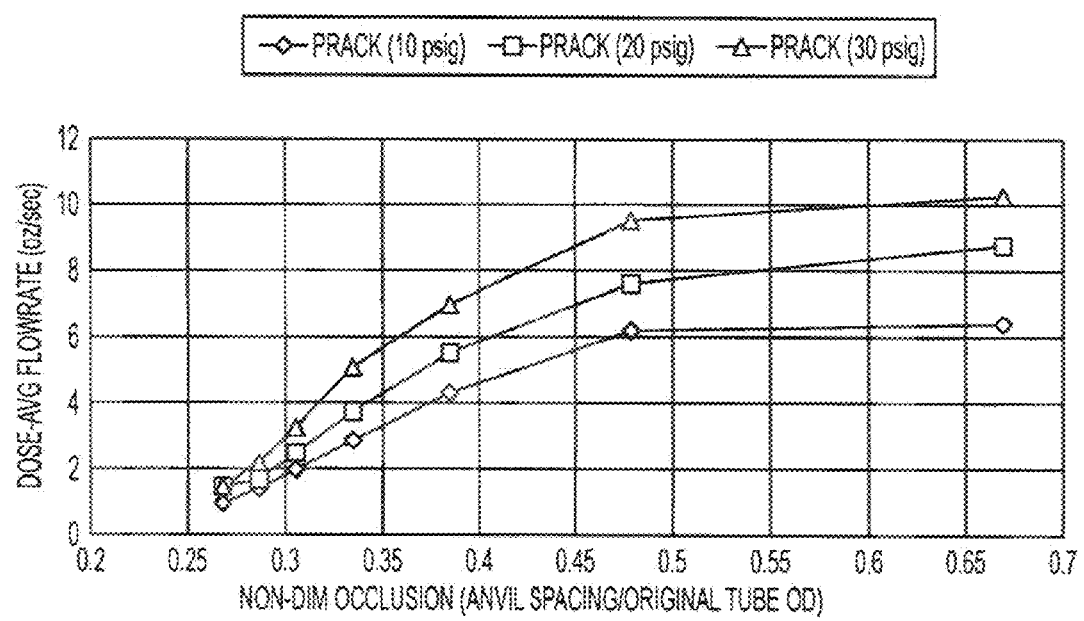
Figure 120:
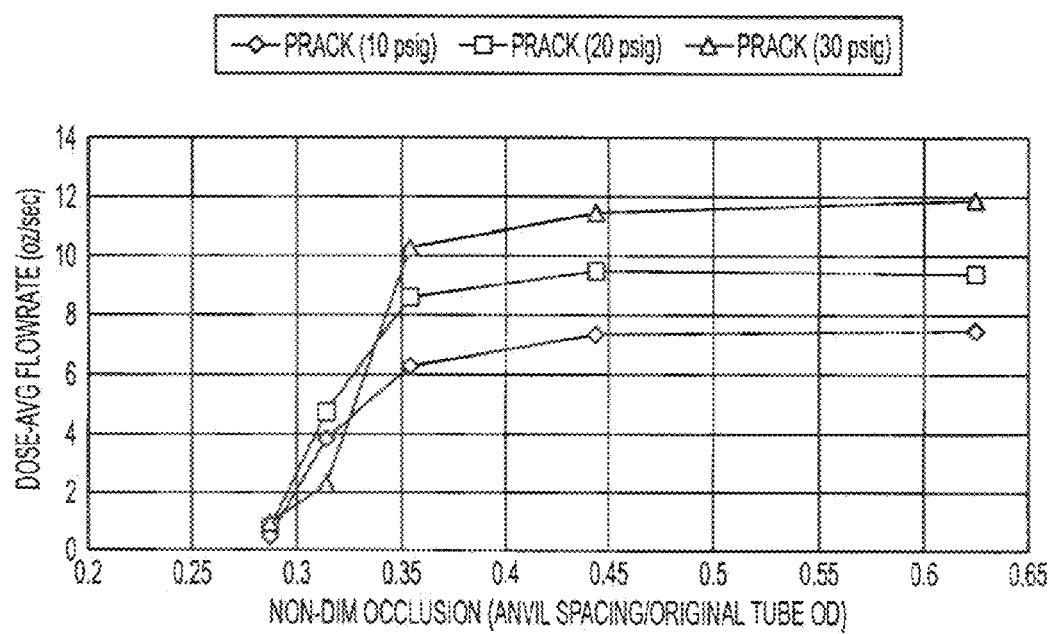
Figure 121A:
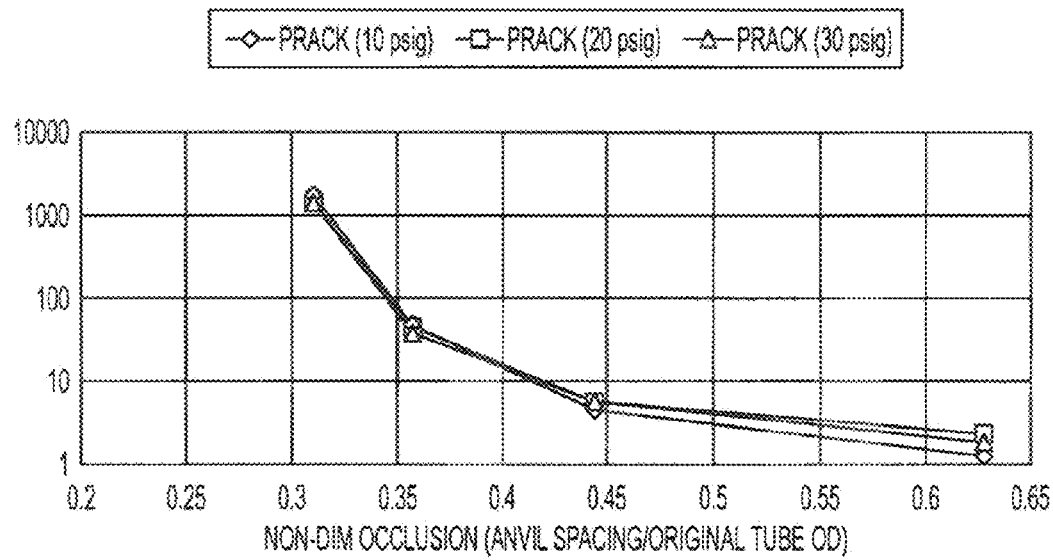
Figure 121B:
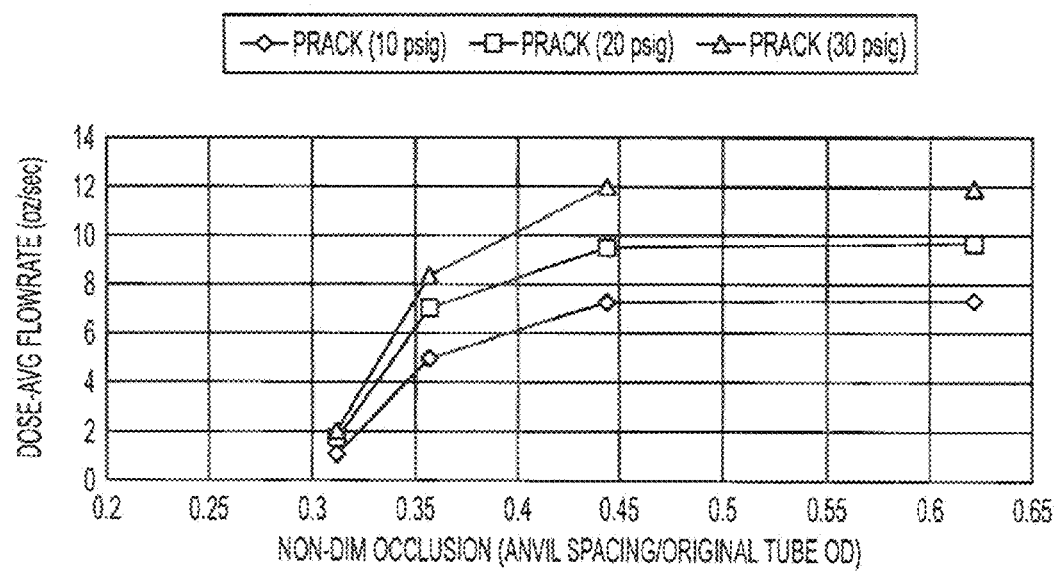
Figure 122A:
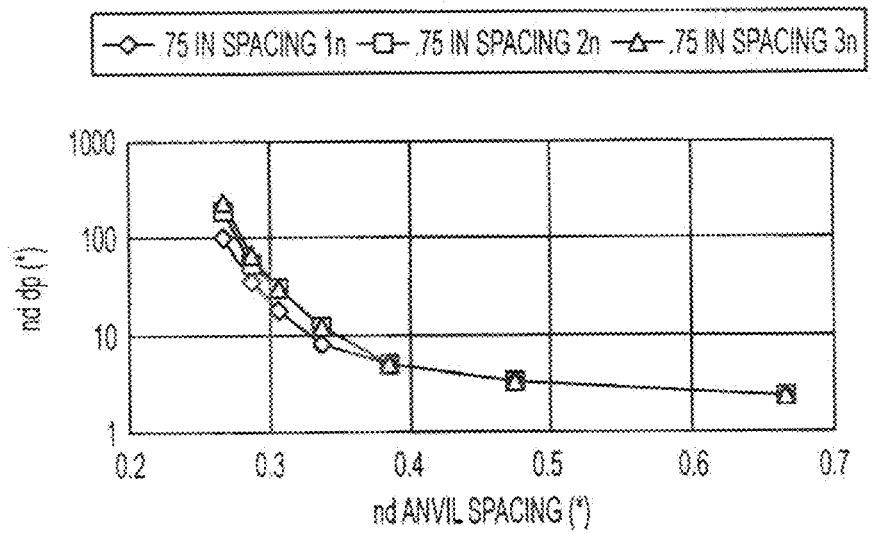
Figure 122B:
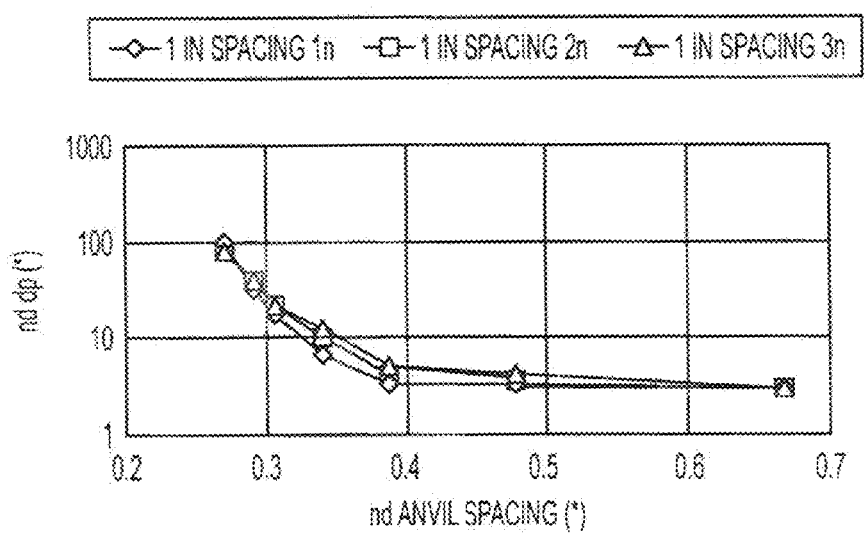
Figure 123A:
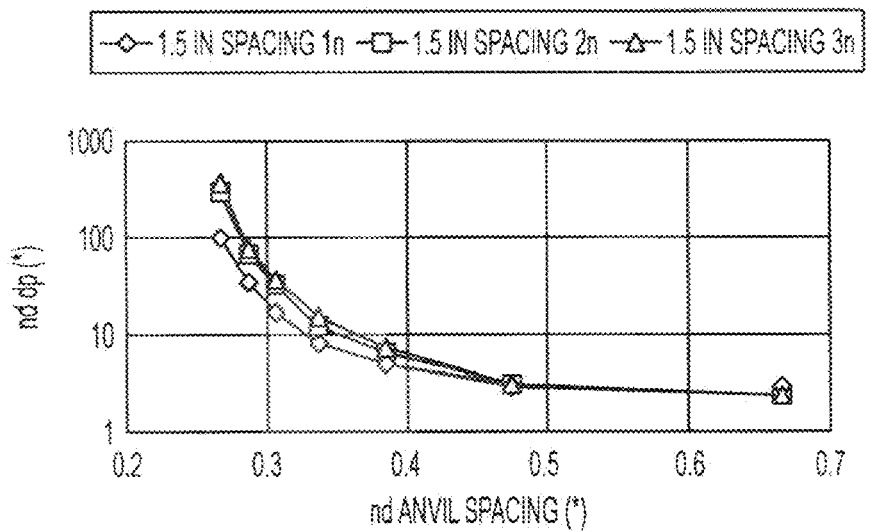
Figure 123B:
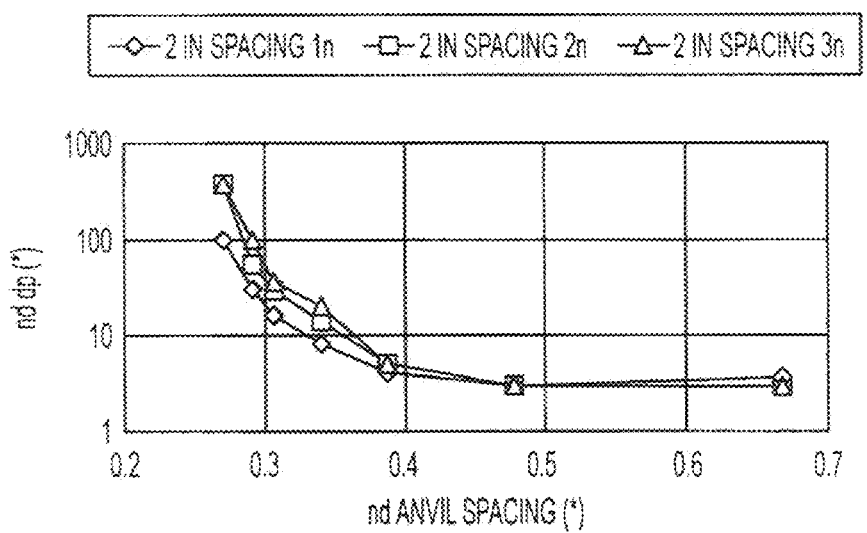
Figure 124A:
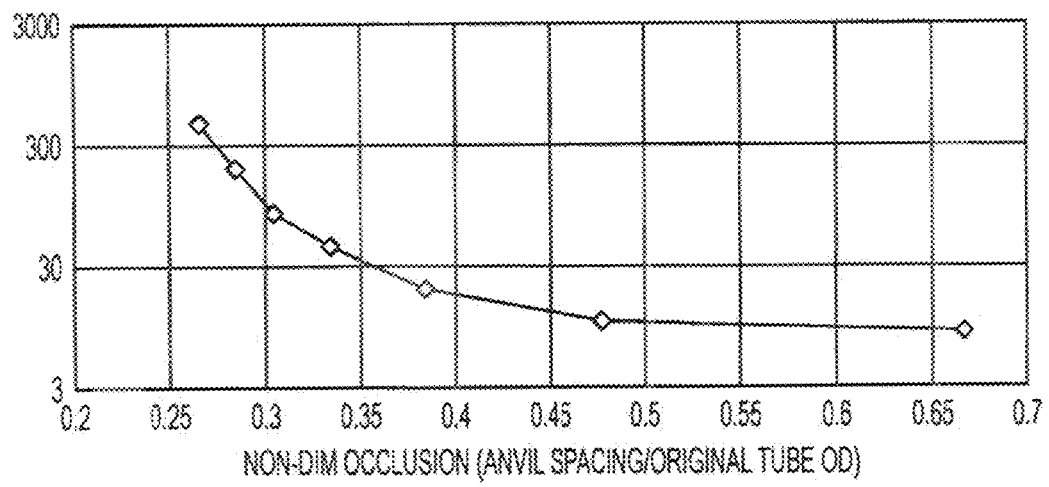
Figure 124B:
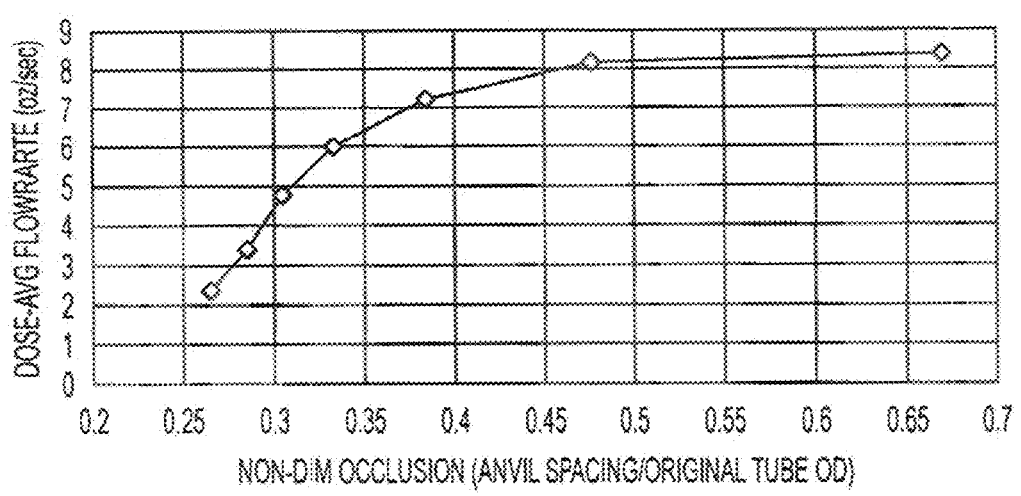
Figure 125A:
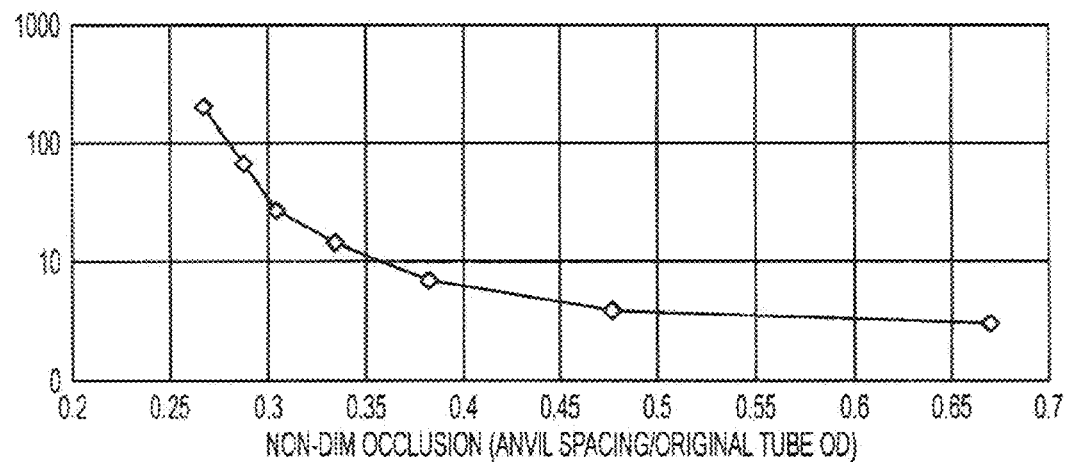
Figure 125B:
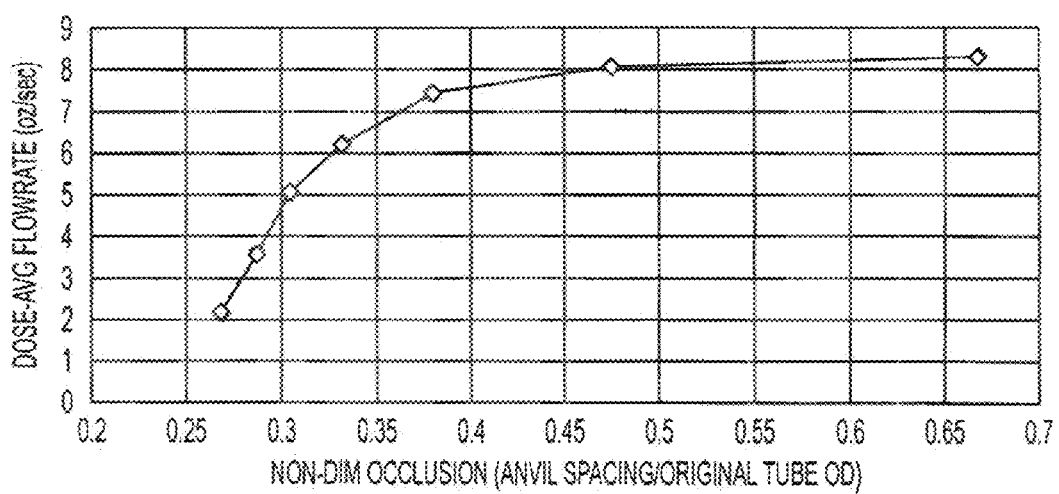
Figure 126A:
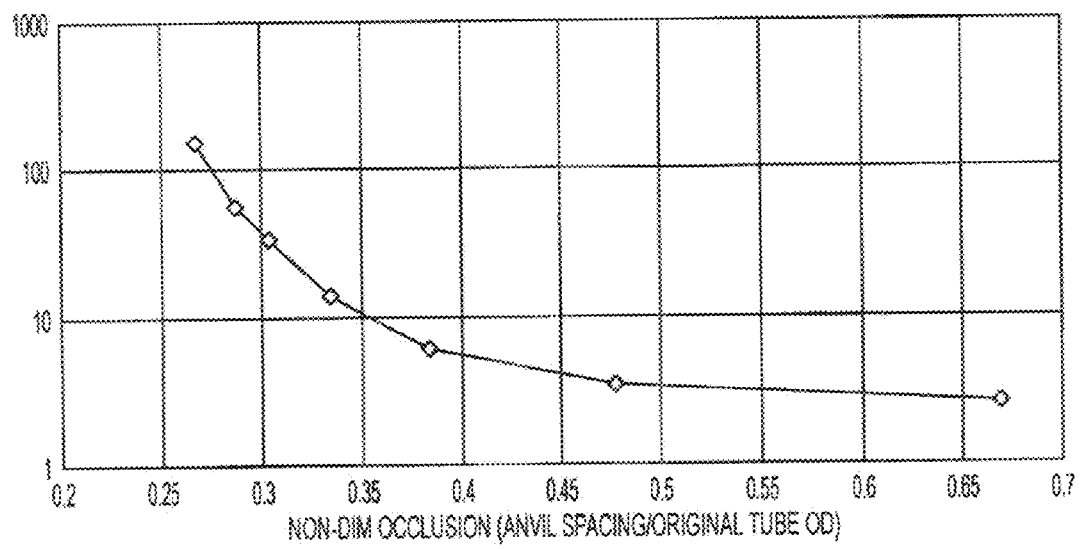
Figure 126B:
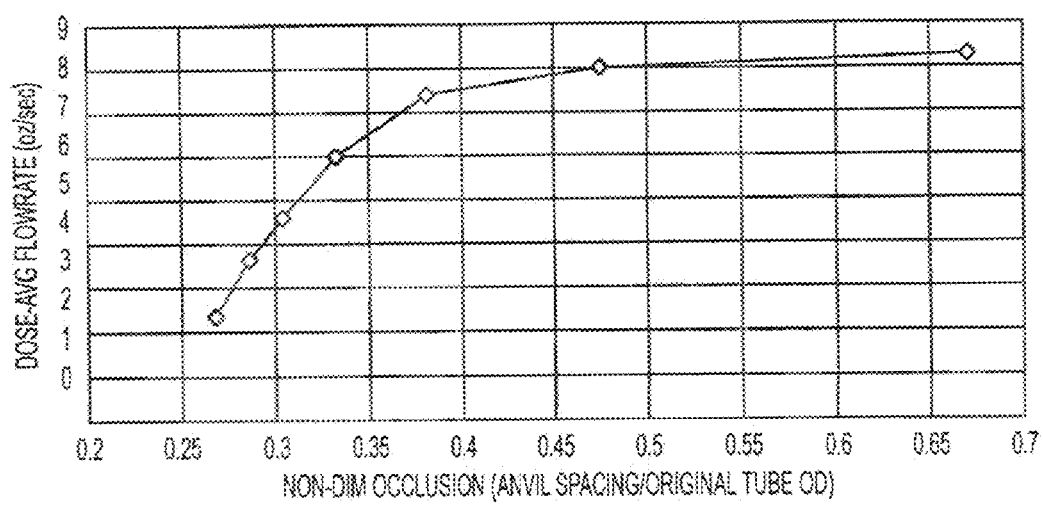
Figure 127:
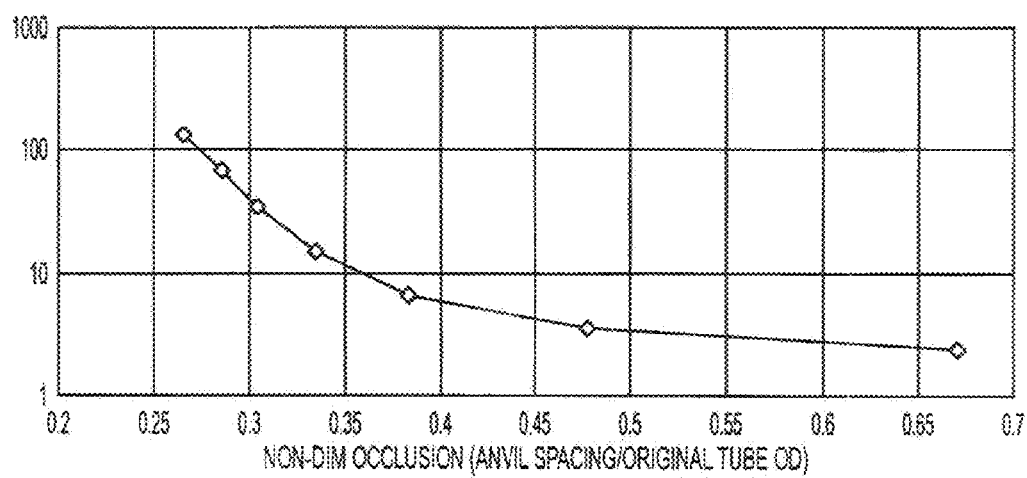
Figure 128:
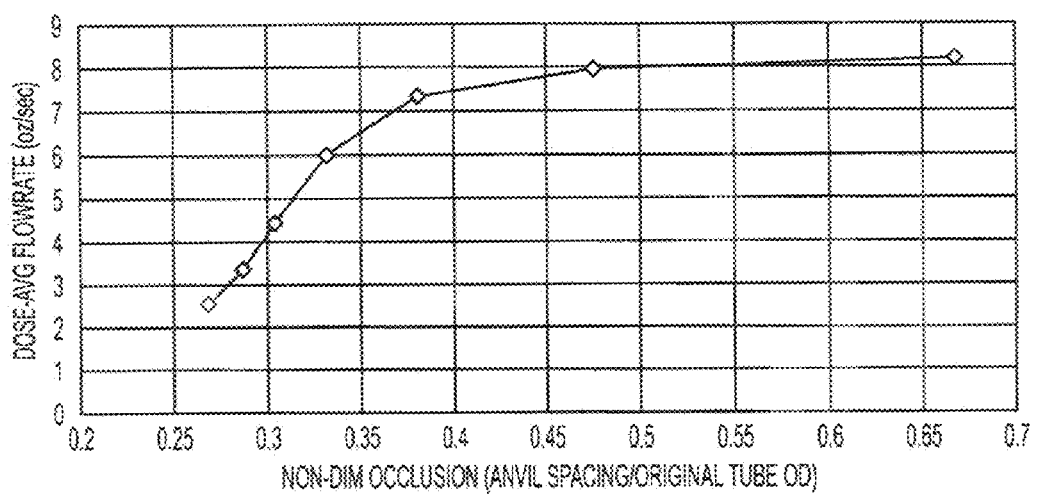

FIGS. 109 and 117 illustrate that a defined span of useful adjustment ranges, expressed as the flow orifice ratio span, increases as the number of series flow nodes in the flow control device increases. Thus, the resolution of flow adjustment per increment of flow rate change increases as the number of flow nodes increases. Therefore, by example in FIG. 109, a two flow nodes on one inch centers, the flow aperture ratio span to vary flow from two ounces per second to ten ounces per second is 0.21. At ten nodes on one inch centers and at the same flow pressure, the flow aperture ratio span to vary flow from over the same range is 0.27, which is an improvement over 28.5 percent.

A number of implementations of the invention have been described. Nevertheless, it will be understood that various modifications may be made. Accordingly, other implementations are within the scope of the following claims.

The invention claimed is:

1. A beverage dispenser for dispensing a carbonated beverage from a beverage source into a receptacle, the dispenser comprising:
   a housing defining an interior volume and having a first surface proximal to the beverage source and a second surface distal to the beverage source;
   a conduit in fluid communication with the beverage source entering the first surface of the housing and terminating proximate the second surface of the housing;
   a flow meter in fluid communication with the conduit;
   a flow rate controller disposed within the interior volume of said housing, the flow rate controller including a processor;
   a user interface including a user-selectable indicia for providing data to the processor;
   a subsurface dispensing nozzle in fluid communication with the terminal end of the conduit,
   wherein flow through the conduit to the subsurface dispensing nozzle is compensated by the flow rate controller to maintain substantially hydraulic beverage flow within the conduit; and
   wherein at least one of the beverage flow and aggregate volume of beverage dispensed is controlled by the flow rate controller based on data provided to the processor by a user operation of the user interface.

2. The beverage dispenser of claim 1, wherein the flow rate controller is configured to cause a local fluid flow restriction within the conduit.

3. The beverage dispenser of claim 1, wherein the flow rate controller further comprises a motive element configured and arranged to apply force to the beverage flow.

4. The beverage dispenser of claim 3, wherein the motive element comprises a thrust block and an adjustment member, the thrust block and adjustment member configured to provide for adjustment of minimum flow and maximum flow through the flow rate controller.

5. The beverage dispenser of claim 4, wherein the adjustment member comprises a threaded stud coupled to an adjustment nut.

6. The beverage dispenser of claim 5, wherein the threaded stud and adjustment nut are configured and arranged to provide fine adjustment of the minimum and maximum flow through the flow rate controller.

7. The beverage dispenser of claim 1, wherein the user-selectable indicia includes at least one condition selected from the group of conditions consisting of: the volume of the receptacle, duration of dispensation, and thickness of a foam layer of the beverage after dispensation.

8. The beverage dispenser of claim 1, wherein the flow rate controller is configured to be set for a maximum desired flow rate and a minimum desired flow rate.

9. The beverage dispenser of claim 1, wherein the dispenser is configured to be operable in an active mode and a passive mode.

10. The beverage dispenser of claim 9, wherein
    a motive element used to apply force to define a flow rate of fluid through the conduit; and
    wherein when the dispenser is operable in the active mode, the motive element is controlled via pulse width modulation.

11. The beverage dispenser of claim 1, wherein at least a portion of the subsurface dispensing nozzle actuates between a first position and a second position.

12. The beverage dispenser of claim 11, wherein the entire subsurface dispensing nozzle actuates between a first position and a second position.

13. The beverage dispenser of claim 1, wherein the conduit and flow rate controller are selected to minimize gas breakout during dispensation of the beverage.

14. The beverage dispenser of claim 1, wherein the subsurface dispensing nozzle further comprises a dispensing tip movable between a first, open position and a second, closed position.

15. The beverage dispenser of claim 14, wherein the dispensing tip selectively provides a subsurface foam-generating dispensation in response to input from a user of the dispenser.

16. The beverage dispenser of claim 1, further comprising at least one sensor selected from the group consisting of a pressure sensor and a temperature sensor.

17. The beverage dispenser of claim 1, further comprising a cooling circuit having a coolant disposed therein, the cooling circuit being configured to pass in proximity to the flow rate controller to provide a cooling effect to the beverage in the conduit.

18. The beverage dispenser of claim 1, wherein the flow rate controller is configured to create a turbulent fluid recirculation zone in the fluid flow pathway.

19. The beverage dispenser of claim 18, wherein the fluid recirculation zones are denoted by fluid flow separation from the conduit wall at points of flow restriction such that substantial head loss is introduced by way of turbulent energy dissipation within any ensuing recirculation zones.

20. The beverage dispenser of claim 18, wherein the flow rate controller is substantially completely housed within an internal fluid flow pathway of the subsurface nozzle.

21. The beverage dispenser of claim 1, further comprising a horizontal mounting surface, wherein the beverage source is disposed below the horizontal surface and the dispensing nozzle is disposed above the horizontal surface.

22. The beverage dispenser of claim 21, wherein the flow rate controller is disposed above the horizontal surface.

23. The beverage dispenser of claim 21, wherein the housing is disposed on the horizontal surface and wherein the dispensing nozzle is disposed within the housing.

24. The beverage dispenser of claim 23, wherein the housing is mounted on the horizontal surface and wherein the dispensing nozzle and the flow rate controller are disposed in the housing.

25. The beverage dispenser of claim 1, wherein the dispenser is capable of filling about one pint or 0.5 liter receptacle to a desired measured line with a wide variety of beverages in a dose time measured from start of beverage flow to end of beverage flow of about 3.5 seconds or less, with a manual or electronically definable and controllable amount of foam generation.

26. The beverage dispenser of claim 1, wherein the exterior surfaces of the dispensing nozzle comprise an antibacterial coating or film, the antibacterial coating or film configured to reduce the rate of bacterial growth on the nozzle.

27. The beverage dispenser of claim 1, wherein substantially all portions of the fluid flow pathway internal to the dispenser are configured to allow to be self-draining of fluid to enhance ease and efficacy of cleaning, rinsing, and sanitation.

28. A beverage dispensing system for use in an environment having an ambient pressure and temperature comprising:
a source of pressurized gas;
a beverage source including a beverage pressurized to a level greater than the ambient pressure by the source of pressurized gas;
a dispenser including a conduit in fluid communication with the beverage source and a subsurface dispensing nozzle in fluid communication with the conduit;
a flow meter in fluid communication with the conduit;
a flow rate controller disposed along said at least one conduit proximal to the beverage source in relation to the subsurface dispensing nozzle, the flow rate controller including a processor;
a user interface including a user-selectable indicia for providing data to the processor; and
wherein flow of the beverage through the conduit to the subsurface dispensing nozzle is compensated by the flow rate controller to maintain substantially hydraulic flow within the conduit; and
wherein at least one of the beverage flow and aggregate volume of beverage dispensed is controlled by the flow rate controller based on data provided to the processor by a user operation of the user interface.

29. The beverage dispensing system of claim 28, wherein the flow rate controller is disposed within the dispenser and in close proximity to a cooling circuit, the cooling circuit being configured and arranged to provide a cooling effect to a beverage in the conduit.

30. The beverage dispensing system of claim 28, wherein the subsurface dispensing nozzle includes a tip movable between a first position and a second position; and
wherein flow of a beverage through the conduit to the subsurface dispensing nozzle depends at least in part on a flow rate signal generated by the flow meter.

31. The beverage dispensing system of claim 30, wherein the subsurface dispensing nozzle tip is actuated using the same gas source as is used to pressurize the beverage source.

32. The beverage dispensing system of claim 30, wherein the subsurface dispensing nozzle tip is actuated using a gas source separate from that used to pressurize the beverage source.

33. The beverage dispensing system of claim 30, wherein the subsurface dispensing nozzle tip is actuated by action of an electric motor.

34. The beverage dispensing system of claim 30, wherein the subsurface dispensing nozzle tip is actuated by action of an electric solenoid.

35. The beverage dispensing system of claim 30, wherein the subsurface dispensing nozzle tip selectively provides a subsurface foam-generating dispensation in response to input from a user of the dispenser.

36. The beverage dispensing system of claim 30, wherein the subsurface dispensing nozzle tip provides at least one subsurface pulse of a fluid through the beverage in the receptacle to generate foam in the beverage.

37. The beverage dispensing system of claim 30, wherein the exterior surfaces of the dispensing nozzle are coated with an antibacterial coating or film, the antibacterial coating or film configured to reduce the rate of bacterial growth on the nozzle.

38. An apparatus for compensation of flow in a fluid dispensing system comprising:
a subsurface fluid dispensing nozzle for initiating and terminating fluid flow;
a fluid flow pathway; and
a volumetric fluid flow rate controller including a processor, the volumetric fluid flow controller in communication with the subsurface fluid dispensing nozzle via the fluid flow pathway and defining a first fluid flow rate through the subsurface fluid dispensing nozzle; and
a user interface including a user-selectable indicia for providing data to the processor;
a flow meter in fluid communication with a conduit; and
wherein flow of the beverage through the conduit to the subsurface dispensing nozzle is compensated by the flow rate controller to maintain substantially hydraulic flow within the conduit; and
wherein at least one of the first flow rate and an aggregate volume of dispensed fluid is controlled by the volumetric fluid flow controller based on data provided to the processor by a user operation of the user interface.

39. The apparatus of claim 38, wherein the volumetric fluid flow controller defines the first fluid flow rate during a first portion of a fluid dispense cycle and defines a second fluid flow rate through the subsurface fluid dispensing nozzle during a second portion of the fluid dispense cycle.

40. The apparatus of claim 39, wherein the volumetric fluid flow controller changes the second fluid flow rate to a third fluid flow rate through the subsurface fluid dispensing nozzle prior to the completion of the fluid dispense cycle.

41. The apparatus of claim 39, wherein the first fluid flow rate is less than the second fluid flow rate.

42. The apparatus of claim 39, wherein the third fluid flow rate is less than the second fluid flow rate.

43. The apparatus of claim 39, wherein the third fluid flow rate is higher than the second fluid flow rate.

44. The apparatus of claim 38, wherein the fluid flows through the subsurface fluid dispensing nozzle at the first fluid flow rate throughout the fluid dispense cycle.

45. The apparatus of claim 38, wherein the volumetric fluid flow controller is disposed upstream of the subsurface fluid dispensing nozzle in the fluid flow pathway,
the volumetric fluid flow controller in close proximity to a coolant circuit, the cooling circuit being configured and arranged to provide a cooling effect to a fluid in the conduit.

46. The apparatus of claim 38, wherein the volumetric fluid flow controller is disposed in the subsurface fluid dispensing nozzle.

47. The apparatus of claim 38, wherein the subsurface fluid dispensing nozzle includes an internal passageway having a diameter of less than about 1 inch.

48. The apparatus of claim 38, wherein the subsurface fluid dispensing nozzle includes a volumetric displacement that allows the entire beverage portion to be delivered into a receptacle with the dispensing nozzle remaining at the bottom of the receptacle without causing overflow of the receptacle.

49. The apparatus of claim 39, wherein the volumetric fluid flow controller defines the first, second, and third fluid flow rates based on temperature or pressure readings of the fluid flowing through the subsurface fluid dispensing nozzle.

50. A beverage dispenser for dispensing a carbonated beverage from a beverage source into a receptacle, the dispenser comprising:
- a housing defining an interior volume and having a first surface proximal to the beverage source and a second surface distal to the beverage source;
- a conduit in fluid communication with the beverage source entering the first surface of the housing and terminating proximate the second surface of the housing;
- a flow meter in fluid communication with the conduit;
- a flow rate controller including a processor and disposed within the interior volume of the housing;
- a subsurface dispensing nozzle in fluid communication with the terminal end of the conduit, wherein flow through the conduit to the subsurface dispensing nozzle is compensated to maintain substantially hydraulic beverage flow within the conduit by adjusting the contact between a flow rate controller and the conduit; and
- a user interface including a user-selectable indicia for providing data to the processor,
- the user interface configured and arranged for receiving information indicating at least one condition selected from the group of conditions consisting of: the volume of a receptacle, duration of dispensation, and thickness of a foam layer of the beverage after dispensation; and
- wherein at least one of the first volumetric flow rate and an aggregate volume of dispensed fluid is controlled by the volumetric flow rate controller based on data provided to the processor by a user operation of the user interface.

51. The beverage dispenser of claim 50, wherein the flow rate controller is separate and apart from the dispensing nozzle,
- the fluid flow rate controller in close proximity to a coolant circuit,
- the cooling circuit being configured and arranged to provide a cooling effect to a beverage in the conduit.

52. The beverage dispenser of claim 50, wherein the flow rate controller is hydraulically upstream of the dispensing nozzle; and
- wherein flow of a beverage through the conduit to the dispensing nozzle depends at least in part on a flow rate signal generated by the flow meter.

* * * * *